US012551552B2

(12) United States Patent
Fridman et al.

(10) Patent No.: US 12,551,552 B2
(45) Date of Patent: Feb. 17, 2026

(54) ANTIGENIC GLYCOPROTEIN E POLYPEPTIDES, COMPOSITIONS, AND METHODS OF USE THEREOF

(71) Applicant: Merck Sharp & Dohme LLC, Rahway, NJ (US)

(72) Inventors: Arthur Fridman, Lake Ariel, PA (US); Jennifer Dawn Galli, Telford, PA (US); Dai Wang, Blue Bell, PA (US); Lan Zhang, Chalfont, PA (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 1069 days.

(21) Appl. No.: 17/626,206

(22) PCT Filed: Jul. 14, 2020

(86) PCT No.: PCT/US2020/041889
§ 371 (c)(1),
(2) Date: Jan. 11, 2022

(87) PCT Pub. No.: WO2021/015987
PCT Pub. Date: Jan. 28, 2021

(65) Prior Publication Data
US 2022/0280636 A1    Sep. 8, 2022

Related U.S. Application Data

(60) Provisional application No. 62/876,093, filed on Jul. 19, 2019.

(51) Int. Cl.
*A61K 39/245* (2006.01)
*A61K 39/00* (2006.01)
*C12N 7/00* (2006.01)

(52) U.S. Cl.
CPC ............. *A61K 39/245* (2013.01); *C12N 7/00* (2013.01); *A61K 2039/53* (2013.01); *C12N 2710/16622* (2013.01); *C12N 2710/16634* (2013.01)

(58) Field of Classification Search
CPC .... A61K 39/245; A61K 2039/53; C12N 7/00; C12N 2710/16622; C12N 2710/16634
See application file for complete search history.

(56) References Cited

U.S. PATENT DOCUMENTS

| | | | |
|---|---|---|---|
| 4,912,094 A | 3/1990 | Myers et al. | |
| 5,057,540 A | 10/1991 | Kensil et al. | |
| 6,113,918 A | 9/2000 | Johnson et al. | |
| 6,207,646 B1 | 3/2001 | Krieg et al. | |
| 11,160,860 B2 * | 11/2021 | Wang | A61P 31/22 |
| 11,752,206 B2 * | 9/2023 | Ciaramella | A61K 9/5123 424/224.1 |
| 2020/0054737 A1 * | 2/2020 | Ciaramella | A61K 31/7105 |
| 2024/0156952 A1 * | 5/2024 | Ciaramella | A61K 47/6929 |

FOREIGN PATENT DOCUMENTS

| | | |
|---|---|---|
| WO | 1990014837 A1 | 12/1990 |
| WO | 1998020016 A1 | 5/1998 |
| WO | 2003086308 A2 | 10/2003 |
| WO | 2008030560 A2 | 3/2008 |
| WO | 2012074881 A2 | 6/2012 |
| WO | 2017070623 A1 | 4/2017 |
| WO | 2017157969 A1 | 9/2017 |
| WO | 2018170256 A1 | 9/2018 |
| WO | 2018200737 A1 | 11/2018 |
| WO | 2021013798 A1 | 1/2021 |

OTHER PUBLICATIONS

Sprague, Elizabeth R., Crystal Structure of the HSV-1 Fc Receptor Bound to Fc Reveals a Mechanism for Antibody Bipolar Bridging, Plos Biology, 2006, pp. 0975-0986, vol. 4, Issue 6.
Basu, Saswata et al., Characterization of regions of herpes simplex virus type 1 glycoprotein E involved in binding the Fc domain of monomeric IgG and in forming a complex with glycoprotein I, The Journal of Immunology, 1995, 260-267, 154.
Dubin, Gary et al., Characterization of Domains of Herpes Simplex Virus Type 1 Glycoprotein E Involved in Fc Binding Activity for Immunoglobulin G Aggregates, Journal of Virology, 1994, 2478-2486, 68(4).
Galli, Jennifer D. et al., Evaluation of HSV-2 gE Binding to IgG-Fc and Application for Vaccine Development, Vaccines, 2022, 1-22, 10, 184.
Nagashunmugam, Thandavarayan et al., In Vivo Immune Evasion Mediated by the Herpes Simplex Virus Type 1 Immunoglobulin G Fc Receptor, Journal of Virology, 1998, 5351-5359, 72(7).
Saldanha, Charles E. et al., Herpes Simplex Virus Type 1 Glycoprotein E Domains Involved in Virus Spread and Disease, Journal of Virology, 2000, 6712-6719, 74(15).
Weeks, Benjamin S. et al., The Herpes Simplex Virus-1 Glycoprotein E (gE) Mediates IgG Binding and Cell-to-Cell Spread through Distinct gE Domains, Biochemical and Biophysical Research Communications, 1997, 31-35, 235.
Akhrameyeva, Natalie V. et al., Development of a glycoprotein D-expressing dominant-negative and replication-defective herpes simplex virus 2 (HSV-2) recombinant viral vaccine against HSV-2 infection in mice, Journal of Virology, 2011, 5036-5047, 85(10).

(Continued)

*Primary Examiner* — Janet L Andres
*Assistant Examiner* — Carey Alexander Stuart
(74) *Attorney, Agent, or Firm* — Benjamin D. Atkins; Andrew Custer

(57) ABSTRACT

The disclosure relates to HSV glycoprotein E antigenic peptide constructs and HSV protein vaccines, as well as methods of using the vaccines and compositions comprising the vaccines. The present invention directed to immunogenic polypeptides of use for a vaccine against Herpes Simplex Virus (HSV). The polypeptides are glycoprotein E peptides that are mutated to reduce their binding to antibody Fc domain.

15 Claims, 17 Drawing Sheets
Specification includes a Sequence Listing.

(56) References Cited

OTHER PUBLICATIONS

Frank, Ian et al., A Novel Function of the Herpes Simplex Virus Type 1 Fc Receptor: Participation in Bipolar Bridging of Antiviral Immunoglobulin G, Journal of Virology, 1989, 4479-4488, 63(11).

Johnson, David C. et al., Herpes simplex virus immunoglobulin G Fc receptor activity depends on a complex of two viral glycoproteins, gE and gI, Journal of Virology, 1988, 1347-1354, 62(4).

Johnson, David C. et al., Identification of a novel herpes simplex virus type 1-induced glycoprotein which complexes with gE and binds immunoglobulin, Journal of Virology, 61(7), 2208-2216, 1987.

Sprague, Elizabeth R. et al., pH Dependence and Stoichiometry of Binding to the Fc Region of IgG by the Herpes Simplex Virus Fc Receptor gE-gI, The Journal of Biological Chemistry, 2004, 14184-14193, 279(14).

\* cited by examiner

```
HSV-1    1 MDRGAVVGFLLGVCVVSCLAGTPKTSWRRVSVGEDVSLLPAP-GPTGRGPTQKLLWAVEP
HSV-2    1 MARGAGLVFFVGVWVVSCLAAAPRTSWKRVTSGEDVVLLPAPAGPEERTRAHKLLWAAEP
           * ***    *  ** ******  * *** **  **** ***** **  *    ***** **

HSV-1   60 LDGCGPLHPSWVSLMPPKQVPETVVDAACMRAPVPLAMAYAPPAPSATGGLRTDFVWQER
HSV-2   61 LDACGPLRPSWVALWPPRRVLETVVDAACMRAPEPLAIAYSPPFPAGDEGLYSELAWRDR
           ** **** ****  * **  * *********** *** ** ** *       **     *  *

HSV-1  120 AAVVNRSLVIHGVRETDSGLYTLSVGDIKDPARQVASVVLVVQPAPVPTPPPTPADYDED
HSV-2  121 VAVVNESLVIYGALETDSGLYTLSVVGLSDEARQVASVVLVVEPAPVPTP--TPDDYDEE
            **** ****  *   **********    *  * **********  *******   ** ****

HSV-1  180 DNDEGEDESLAGTPASGTPRLPPPPAPPRSWPSAPEVSHVRGVTVRMETPEAILFSPGET
HSV-2  179 D-DAGVSERTPVSVPPPTPPRRPPVAPPTHPRVIPEVSHVRGVTVHMETPEAILFAPGET
           * * *   *          **   ** ***    ********** ******** ****

HSV-1  240 FSTNVSIHAIAHDDQTYSMDVVWLRFDVPTSCAEMRIYESCLYHPQLPECLSPADAPCAA
HSV-2  238 FGTNVSIHAIAHDDGPYAMDVVWMRFDVPSSCAEMRIYEACLYHPQLPECLSPADAPCAV
           * ***********   * *****  ****** ******* *******  ******************

HSV-1  300 STWTSRLAVRSYAGCSRTNPPPRCSAEAHMEPVPGLAWQAASVNLEFRDASPQHSGLYLC
HSV-2  298 SSWAYRLAVRSYAGCSRTTPPPRCFAEARMEPVPGLAWLASTVNLEFQHASPQHAGLYLC
           * *  ************* ****  *** **********   *   *****   *****  *****

HSV-1  360 VVYVNDHIHAWGHITISTAAQYRNAVVEQPLPQRGADLAEPTHPHVGAPPHAPPTHGALR
HSV-2  358 VVYVDDHIHAWGHMTISTAAQYRNAVVEQHLPQRQPEPVEPTRPHVRAPPPAPSARGPLR
           **** ********  ****************** ****      ****  ***  **  *  *  **
```

FIG.3

ANTIGENIC GLYCOPROTEIN E POLYPEPTIDES, COMPOSITIONS, AND METHODS OF USE THEREOF

CROSS REFERENCE TO RELATED APPLICATIONS

The present application is the 371 national phase application of International Application No. PCT/US2020/041889, filed Jul. 14, 2020, which claims benefit of U.S. Provisional Patent Application No. 62/876,093 filed Jul. 19, 2019, each of which is herein incorporated by reference in its entirety.

REFERENCE TO SEQUENCE LISTING SUBMITTED ELECTRONICALLY

The sequence listing of the present application is submitted electronically via EFS-Web as an ASCII formatted sequence listing with a file name 24758-US-PCT-SEQLIST-5JAN2022.txt, creation date of Dec. 10, 2021, and a size of 134 kb. This sequence listing submitted via EFS-Web is part of the specification and is herein incorporated by reference in its entirety.

SEQUENCE LISTING

The instant application contains a Sequence Listing which has been submitted electronically in ASCII format and is hereby incorporated by reference in its entirety. Said ASCII copy, created on Jun. 5, 2025, 2025, is named 24758-US-PCT_SL.txt and is 143,557 bytes in size.

BACKGROUND

Herpes simplex viruses (HSV) are double-stranded linear DNA viruses in the Herpesviridae family. Two members of the herpes simplex virus family infect humans, known as HSV-1 and HSV-2. Symptoms of HSV infection include the formation of blisters in the skin or mucous membranes of the mouth, lips, and/or genitals. HSV is a neuroinvasive virus that can cause sporadic recurring episodes of viral reactivation in infected individuals. HSV is transmitted by contact with an infected area of the skin during a period of viral activation. Despite a primed immune system, reactivation of the virus is frequent, often leading to lesions at the original site of infection.

The World Health Organization estimated that in 2012, 417 million people worldwide were infected with HSV-2, and 3.7 billion people under the age of 50 worldwide were infected with HSV-1. However, no HSV vaccine currently exists. Accordingly, there is a need for a vaccine that can reduce the prevalence of HSV infection.

SUMMARY

The present invention directed to immunogenic polypeptides of use for a vaccine against Herpes Simplex Virus (HSV). The polypeptides are glycoprotein E peptides that are mutated to reduce their binding to antibody Fc domain.

In one aspect, the present disclosure provides an isolated polypeptide comprising a mature amino acid sequence of any one of SEQ ID NOs: 12-27, or a variant thereof; the mature sequence being the sequence without the signal peptide sequence. The variant of SEQ ID NO: 12 does not vary any of positions 337-344, the variant of SEQ ID NO: 13 does not vary any of positions 337-340, the variant of SEQ ID NO: 14 does not vary any of positions 337-339, the variant of SEQ ID NO: 15 does not vary any of positions 337-340, the variant of SEQ ID NO: 16 does not vary any of positions 337-339, the variant of SEQ ID NO: 17 does not vary any of positions 337-340, the variant of SEQ ID NO: 18 does not vary any of positions 337-338, the variant of SEQ ID NO: 19 does not vary any of positions 337-340, the variant of SEQ ID NO: 20 does not vary any of positions 337-340, the variant of SEQ ID NO: 21 does not vary any of positions 245, 317, or 319, the variant of SEQ ID NO: 22 does not vary any of positions 245, 317, or 319, the variant of SEQ ID NO: 23 does not vary any of positions 245, 317, or 319, the variant of SEQ ID NO: 24 does not vary any of positions 245, 317, or 319, the variant of SEQ ID NO: 25 does not vary any of positions 245, 317, or 319, the variant of SEQ ID NO: 26 does not vary any of positions 245, 317, or 319, or the variant of SEQ ID NO: 27 does not vary any of positions 245, 317, or 319.

In one aspect, the present disclosure provides an isolated polypeptide that comprises a mature amino acid sequence of SEQ ID NOs: 12, 15, 17, 20-24, and 26, or a variant thereof; the mature sequence being the sequence without the signal peptide sequence. The variant of SEQ ID NO: 12 does not vary any of positions 337-344, the variant of SEQ ID NO: 15 does not vary any of positions 337-340, the variant of SEQ ID NO: 17 does not vary any of positions 337-340, the variant of SEQ ID NO: 20 does not vary any of positions 337-340, the variant of SEQ ID NO: 21 does not vary any of positions 245, 317, or 319, the variant of SEQ ID NO: 22 does not vary any of positions 245, 317, or 319, the variant of SEQ ID NO: 23 does not vary any of positions 245, 317, or 319, the variant of SEQ ID NO: 24 does not vary any of positions 245, 317, or 319, or the variant of SEQ ID NO: 26 does not vary any of positions 245, 317, or 319.

In one aspect, the present disclosure provides an isolated polypeptide that comprises a mature amino acid sequence of SEQ ID NO: 12, 20, 24, or 26, or a variant thereof; the mature sequence being the sequence without the signal peptide sequence. The variant of SEQ ID NO: 12 does not vary any of positions 337-344, the variant of SEQ ID NO: 20 does not vary any of positions 337-340, the variant of SEQ ID NO: 24 does not vary any of positions 245, 317, or 319, or the variant of SEQ ID NO: 26 does not vary any of positions 245, 317, or 319.

In one embodiment, the isolated polypeptide consists of a mature amino acid sequence of SEQ ID NO: 12, 20, 24, or 26, or a variant thereof. In such embodiments, the variant of SEQ ID NO: 12 does not vary any of positions 337-344, the variant of SEQ ID NO: 20 does not vary any of positions 337-340, the variant of SEQ ID NO: 24 does not vary any of positions 245, 317, or 319, or the variant of SEQ ID NO: 26 does not vary any of positions 245, 317, or 319.

In one aspect, the present disclosure provides an isolated polypeptide that comprises an amino acid sequence of positions 21-421 of SEQ ID NO: 12, or a variant thereof. In one embodiment, the isolated polypeptide comprises the entire amino acid sequence of SEQ ID NO: 12, or a variant thereof. In one embodiment, the variant of SEQ ID NO: 12 does not vary any of positions 337-344.

In another aspect, the present disclosure provides an isolated polypeptide that comprises an amino acid sequence of positions 21-417 of SEQ ID NO: 20, or a variant thereof. In one embodiment, the isolated polypeptide comprises the entire amino acid sequence of SEQ ID NO: 20, or a variant thereof. In one embodiment, the variant of SEQ ID NO: 20 does not vary any of positions 337-340.

In yet another aspect, the present disclosure provides an isolated polypeptide that comprises an amino acid sequence of positions 21-417 of SEQ ID NO: 24, or a variant thereof. In one embodiment, the isolated polypeptide comprises the entire amino acid sequence of SEQ ID NO: 24, or a variant thereof. In one embodiment, the variant of SEQ ID NO: 24 does not vary any of positions 245, 317, or 319.

In still another aspect, the present disclosure provides an isolated polypeptide that comprises an amino acid sequence of positions 21-417 of SEQ ID NO: 26, or a variant thereof. In one embodiment, the isolated polypeptide comprises the entire amino acid sequence of SEQ ID NO: 26, or a variant thereof. In one embodiment, the variant of SEQ ID NO: 26 does not vary any of positions 245, 317, or 319.

In one aspect, the disclosure provides an isolated polypeptide that comprises an amino acid sequence of SEQ ID NO: 12, 20, 24, or 26, or a variant thereof. The variant of SEQ ID NO: 12 does not vary any of positions 337-344, the variant of SEQ ID NO: 20 does not vary any of positions 337-340, the variant of SEQ ID NO: 24 does not vary any of positions 245, 317, or 319, or the variant of SEQ ID NO: 26 does not vary any of positions 245, 317, or 319.

In one embodiment, the isolated polypeptide consists of an amino acid sequence of SEQ ID NO: 12, 20, 24, or 26, or a variant thereof. The variant of SEQ ID NO: 12 does not vary any of positions 337-344, the variant of SEQ ID NO: 20 does not vary any of positions 337-340, the variant of SEQ ID NO: 24 does not vary any of positions 245, 317, or 319, or the variant of SEQ ID NO: 26 does not vary any of positions 245, 317, or 319.

In an embodiment of any one of the foregoing aspects, the variant amino acid sequence of the isolated polypeptide has 95-99% homology to the amino acid sequence of SEQ ID NO: 12, 13, 14, 15, 16, 17, 18, 19, 20, 21, 22, 23, 24, 25, 26, or 27.

In another aspect, the disclosure provides an isolated nucleic acid comprising a nucleotide sequence of SEQ ID NO: 29-44, or a variant thereof. The variant of SEQ ID NO: 29 comprises nucleotides at positions 1009-1032 that encode amino acids at positions 337-344 of SEQ ID NO: 12, the variant of SEQ ID NO: 30 comprises nucleotides at positions 1009-1020 that encode amino acids at positions 337-340 of SEQ ID NO: 13, the variant of SEQ ID NO: 31 comprises nucleotides at positions 1009-1017 that encode amino acids at positions 337-339 of SEQ ID NO: 14, the variant of SEQ ID NO: 32 comprises nucleotides at positions 1009-1020 that encode amino acids at positions 337-340 of SEQ ID NO: 15, the variant of SEQ ID NO: 33 comprises nucleotides at positions 1009-1017 that encode amino acids at positions 337-339 of SEQ ID NO: 16, the variant of SEQ ID NO: 34 comprises nucleotides at positions 1009-1020 that encode amino acids at positions 337-340 of SEQ ID NO: 17, the variant of SEQ ID NO: 35 comprises nucleotides at positions 1009-1014 that encode amino acids at positions 337-338 of SEQ ID NO: 18, the variant of SEQ ID NO: 36 comprises nucleotides at positions 1009-1020 that encode amino acids at positions 337-340 of SEQ ID NO: 19, the variant of SEQ ID NO: 37 comprises nucleotides at positions 1009-1020 that encode amino acids at positions 337-340 of SEQ ID NO: 20, the variant of SEQ ID NO: 38 comprises nucleotides at positions 733-735 that encode residue 245 of SEQ ID NO: 21, the variant of SEQ ID NO: 39 comprises nucleotides at positions 949-951 that encode residue 317 of SEQ ID NO: 22, the variant of SEQ ID NO: 40 comprises nucleotides at positions 955-957 that encode residue 319 of SEQ ID NO: 23 the variant of SEQ ID NO: 41 comprises nucleotides at positions 733-735 and 949-951 that encode amino acids at positions 245 and 317, respectively, of SEQ ID NO: 24, the variant of SEQ ID NO: 42 comprises nucleotides at positions 733-735 and 955-957 that encode amino acids at positions 245 and 319, respectively, of SEQ ID NO: 25, the variant of SEQ ID NO: 43 comprises nucleotides at positions 949-951 and 955-957 that encode amino acids at positions 317 and 319, respectively, of SEQ ID NO: 26, or the variant of SEQ ID NO: 44 comprises nucleotides at positions 733-735, 949-951, and 955-957 that encode amino acids at positions 245, 317, and 319, respectively, of SEQ ID NO: 27.

In another aspect, the disclosure provides an isolated nucleic acid comprising a nucleotide sequence of SEQ ID NO: 29, 32, 34, 37-41 or 43, or a variant thereof. The variant of SEQ ID NO: 29 comprises nucleotides at positions 1009-1032 that encode amino acids at positions 337-344 of SEQ ID NO: 12, the variant of SEQ ID NO: 32 comprises nucleotides at positions 1009-1020 that encode amino acids at positions 337-340 of SEQ ID NO: 15, the variant of SEQ ID NO: 34 comprises nucleotides at positions 1009-1020 that encode amino acids at positions 337-340 of SEQ ID NO: 17, the variant of SEQ ID NO: 37 comprises nucleotides at positions 1009-1020 that encode amino acids at positions 337-340 of SEQ ID NO: 20, the variant of SEQ ID NO: 38 comprises nucleotides at positions 733-735 that encode residue 245 of SEQ ID NO: 21, the variant of SEQ ID NO: 39 comprises nucleotides at positions 949-951 that encode residue 317 of SEQ ID NO: 22, the variant of SEQ ID NO: 40 comprises nucleotides at positions 955-957 that encode residue 319 of SEQ ID NO: 23, the variant of SEQ ID NO: 41 comprises nucleotides at positions 733-735 and 949-951 that encode amino acids at positions 245 and 317, respectively, of SEQ ID NO: 24, or the variant of SEQ ID NO: 43 comprises nucleotides at positions 949-951 and 955-957 that encode amino acids at positions 317 and 319, respectively, of SEQ ID NO: 26.

In another aspect, the disclosure provides an comprising a nucleotide sequence of SEQ ID NO: 29, 37, 41, or 43, or a variant thereof. The variant of SEQ ID NO: 29 comprises nucleotides at positions 1009-1032 that encode amino acids at positions 337-344 of SEQ ID NO: 12, the variant of SEQ ID NO: 37 comprises nucleotides at positions 1009-1020 that encode amino acids at positions 337-340 of SEQ ID NO: 20, the variant of SEQ ID NO: 41 comprises nucleotides at positions 733-735 and 949-951 that encode amino acids at positions 245 and 317, respectively, of SEQ ID NO: 24, or the variant of SEQ ID NO: 43 comprises nucleotides at positions 949-951 and 955-957 that encode amino acids at positions 317 and 319, respectively, of SEQ ID NO: 26

In another aspect, the disclosure provides an isolated nucleic acid including a nucleotide sequence of positions 61-1263 of SEQ ID NO: 29, or a variant thereof. In one embodiment, the isolated nucleic acid comprises the entire nucleotide sequence of SEQ ID NO: 29, or a variant thereof. The variant of SEQ ID NO: 29 comprises nucleotides at positions 1009-1032 that encode the amino acid sequence AARAASTV (SEQ ID NO: 45).

In another aspect, the disclosure provides an isolated nucleic acid comprising a nucleotide sequence of positions 61-1251 of SEQ ID NO: 37, or a variant thereof. In one embodiment, the isolated nucleic acid comprises the entire nucleotide sequence of SEQ ID NO: 37, or a variant thereof. The variant of SEQ ID NO: 37 comprises nucleotides at positions 1009-1020 that encode the amino acid sequence AGGG (SEQ ID NO: 47).

In another aspect, the disclosure provides an isolated nucleic acid comprising a nucleotide sequence of positions 61-1251 of SEQ ID NO: 41, or a variant thereof. In one embodiment, the isolated nucleic acid comprises the entire nucleotide sequence of SEQ ID NO: 41, or a variant thereof. The variant of SEQ ID NO: 41 comprises nucleotides at positions 949-957 that encode the amino acid sequence GGP.

In another aspect, the disclosure provides an isolated nucleic acid comprising a nucleotide sequence of positions 61-1251 of SEQ ID NO: 43, or a variant thereof. In one embodiment, the isolated nucleic acid comprises the entire nucleotide sequence of SEQ ID NO: 43, or a variant thereof. The variant of SEQ ID NO: 43 comprises nucleotides at positions 949-957 that encode the amino acid sequence HGG.

In yet another aspect, the disclosure provides an isolated nucleic acid comprising a nucleotide sequence of SEQ ID NO: 29, 37, 41, or 43, or a variant thereof. The variant of SEQ ID NO: 29 comprises nucleotides at positions 1009-1032 that encode the amino acid sequence AARAASTV (SEQ ID NO: 45), the variant of SEQ ID NO: 37 comprises nucleotides at positions 1009-1020 that encode the amino acid sequence AGGG (SEQ ID NO: 47), the variant of SEQ ID NO: 41 comprises nucleotides at positions 949-957 that encode the amino acid sequence GGP, and the variant of SEQ ID NO: 43 comprises nucleotides at positions 949-957 that encode the amino acid sequence HGG.

In one embodiment of any one of the foregoing aspects, the variant nucleic acid sequence of the isolated nucleic acid has 95-99% homology to the nucleic acid sequence of SEQ ID NO: 29, 30, 31, 32, 33, 34, 35, 36, 37, 38, 39, 40, 41, 42, 43, or 44.

In one aspect, the disclosure provides a Herpes Simplex Virus (HSV) vaccine comprising an isolated antigenic polypeptide, the isolated antigenic polypeptide comprising a mature amino acid sequence of SEQ ID NO: 12, 20, 24, or 26, or a variant thereof. The variant of SEQ ID NO: 12 does not vary any of positions 337-344, the variant of SEQ ID NO: 20 does not vary any of positions 337-340, the variant of SEQ ID NO: 24 does not vary any of positions 245, 317, or 319, or the variant of SEQ ID NO: 26 does not vary any of positions 245, 317, or 319.

In yet another aspect, the disclosure provides a Herpes Simplex Virus (HSV) vaccine comprising an isolated antigenic polypeptide, the isolated antigenic polypeptide consisting of a mature amino acid sequence of SEQ ID NO: 12, 20, 24, or 26, or a variant thereof. The variant of SEQ ID NO: 12 does not vary any of positions 337-344, the variant of SEQ ID NO: 20 does not vary any of positions 337-340, the variant of SEQ ID NO: 24 does not vary any of positions 245, 317, or 319, or the variant of SEQ ID NO: 26 does not vary any of positions 245, 317, or 319.

In one aspect, the disclosure provides a Herpes Simplex Virus (HSV) vaccine comprising an isolated antigenic polypeptide, the isolated antigenic polypeptide comprising a mature amino acid sequence of any one of SEQ ID NOs: 12-27, or a variant thereof. The variant of SEQ ID NO: 12 does not vary any of positions 337-344, the variant of SEQ ID NO: 13 does not vary any of positions 337-340, the variant of SEQ ID NO: 14 does not vary any of positions 337-339, the variant of SEQ ID NO: 15 does not vary any of positions 337-340, the variant of SEQ ID NO: 16 does not vary any of positions 337-339, the variant of SEQ ID NO: 17 does not vary any of positions 337-340, the variant of SEQ ID NO: 18 does not vary any of positions 337-338, the variant of SEQ ID NO: 19 does not vary any of positions 337-340, the variant of SEQ ID NO: 20 does not vary any of positions 337-340, the variant of SEQ ID NO: 21 does not vary any of positions 245, 317, or 319, n the variant of SEQ ID NO: 22 does not vary any of positions 245, 317, or 319, the variant of SEQ ID NO: 23 does not vary any of positions 245, 317, or 319, the variant of SEQ ID NO: 24 does not vary any of positions 245, 317, or 319, the variant of SEQ ID NO: 25 does not vary any of positions 245, 317, or 319, the variant of SEQ ID NO: 26 does not vary any of positions 245, 317, or 319, or the variant of SEQ ID NO: 27 does not vary any of positions 245, 317, or 319.

In one aspect, the disclosure provides a Herpes Simplex Virus (HSV) vaccine comprising an isolated antigenic polypeptide, the isolated antigenic polypeptide comprising a mature amino acid sequence of SEQ ID NOs: 12, 15, 17, 20-24, or 26, or a variant thereof. The variant of SEQ ID NO: 12 does not vary any of positions 337-344, the variant of SEQ ID NO: 15 does not vary any of positions 337-340, the variant of SEQ ID NO: 17 does not vary any of positions 337-340, the variant of SEQ ID NO: 20 does not vary any of positions 337-340, the variant of SEQ ID NO: 21 does not vary any of positions 245, 317, or 319, the variant of SEQ ID NO: 22 does not vary any of positions 245, 317, or 319, the variant of SEQ ID NO: 23 does not vary any of positions 245, 317, or 319, the variant of SEQ ID NO: 24 does not vary any of positions 245, 317, or 319, or the variant of SEQ ID NO: 26 does not vary any of positions 245, 317, or 319.

In an embodiment of any one of the foregoing aspects, the variant isolated antigenic polypeptide of the HSV vaccine has 95-99% homology to the amino acid sequence of SEQ ID NO: 12, 13, 14, 15, 16, 17, 18, 19, 20, 21, 22, 23, 24, 25, 26, or 27.

In one embodiment of the foregoing aspects, the HSV vaccine comprises a second isolated antigenic polypeptide, the second isolated antigenic polypeptide comprising the mature amino acid sequence of SEQ ID NO: 10, or a variant thereof. In one embodiment, the HSV vaccine comprises a second isolated antigenic polypeptide, the second isolated antigenic polypeptide consisting of the mature amino acid sequence of SEQ ID NO: 10, or a variant thereof. In one embodiment, the variant isolated antigenic polypeptide of the HSV vaccine has 95-99% homology to the mature amino acid sequence of SEQ ID NO: 10.

In one embodiment, the HSV vaccine is multivalent. In one embodiment, the HSV vaccine is formulated in an effective amount to produce an antigen-specific immune response. In one embodiment, the HSV vaccine is a therapeutically effective vaccine.

In one embodiment, the HSV vaccine comprises an adjuvant. In another embodiment, the HSV vaccine does not comprise an adjuvant.

In another aspect, the disclosure provides a method of inducing an immune response in a subject. The method comprises a step of administering to the subject an HSV vaccine of any one of the foregoing aspects and embodiments in an amount effective to produce an antigen-specific immune response in the subject.

In one embodiment of the foregoing method, the antigen specific immune response comprises a T cell response or a B cell response. In one embodiment, the subject is administered a single dose of the HSV vaccine. In one embodiment, the subject is administered a booster dose of the HSV vaccine. In one embodiment, the HSV vaccine is administered to the subject by intradermal injection or intramuscular injection.

In one embodiment of the foregoing method and embodiments, the subject has been exposed to HSV, the subject is infected with HSV, or the subject is at risk of infection by HSV.

Some embodiments of the present disclosure provide an HSV vaccine of any of the foregoing aspects and embodiments for use in a method of inducing an antigen-specific immune response in a subject. The method comprises administering to the subject the HSV vaccine in an amount effective to produce an antigen-specific immune response in the subject.

In one aspect, the disclosure provides use of an isolated polypeptide of any one of the foregoing aspects or the isolated nucleic acid of any one of the foregoing aspects in the manufacture of a medicament for use in a method of inducing an antigen-specific immune response in a subject. The method comprises a step of administering to the subject a HSV vaccine in an amount effective to produce an antigen-specific immune response in the subject.

In one aspect, the disclosure provides an HSV vaccine of any one of the foregoing aspects and embodiments for use in inducing an antigen-specific immune response in a subject.

In one aspect, the disclosure provides an HSV vaccine of any one of the foregoing aspects and embodiments for use in preventing or treating Herpes Simplex Virus infection in a subject.

In one aspect, the disclosure provides an isolated polypeptide of any one of the foregoing aspects and embodiments for use in inducing an antigen-specific immune response in a subject.

In one aspect, the disclosure provides an isolated polypeptide of any one of the foregoing aspects and embodiments for use in preventing or treating Herpes Simplex Virus infection in a subject.

In one aspect, the disclosure provides use of an isolated polypeptide or an isolated nucleic acid of any one of the foregoing aspects and embodiments in the manufacture of a medicament for inducing an antigen-specific immune response in a subject.

In one aspect, the disclosure provides use of an isolated polypeptide or an isolated nucleic acid of any one of the foregoing aspects and embodiments in the manufacture of a medicament for preventing or treating Herpes Simplex Virus infection in a subject.

The details of various embodiments of the disclosure are set forth in the description below. Other features, objects, and advantages of the disclosure will be apparent from the description and from the claims.

BRIEF DESCRIPTION OF THE DRAWINGS

The foregoing and other objects, features and advantages will be apparent from the following description of particular embodiments of the technology, as illustrated in the accompanying drawings in which like reference characters refer to the same parts throughout the different views. The drawings are not necessarily to scale, emphasis instead being placed upon illustrating the principles of various embodiments of the technology.

FIG. 3 is an alignment of glycoprotein E from HSV-1 strain KOS and HSV-2 strain 333. Amino acid positions 245, 317, 319, and 337-340 are underlined as targets for mutation. Figure discloses SEQ ID NOS 48-49, respectively, in order of appearance.

FIG. 4E is a graph of association of gE-2t/gI-2t heterodimer mutants #1-2, 4-6, and 8 with rabbit IgG whole molecule.

FIG. 4F is a graph of association of gE-2t/gI-2t heterodimer mutants #9-13 and 15 with rabbit IgG whole molecule.

FIG. 5A is a diagram of an immunization and serum collection timeline for a rabbit immunogenicity study.

FIG. 5B is a dot plot of interpolated titer of antibodies against gE, gI, and gE/gI heterodimers in rabbit serum.

FIG. 5C is a dot plot of neutralizing antibody titer ($NT_{50}$) measured in the serum of rabbits immunized with wild type or mutant gE/gI heterodimers.

DETAILED DESCRIPTION

HSV Glycoprotein E and Glycoprotein I

The HSV genome encodes multiple glycoproteins which are expressed on the virus surface. Glycoprotein E (gE) and glycoprotein I (gI) are expressed as a heterodimer on the virion’s surface and infected cells. This heterodimer is responsible for cell-to-cell spread of the virus. In epithelial cells, the heterodimer glycoprotein E (gE)/glycoprotein I (gI) is required for the cell-to-cell spread of the virus, by sorting nascent virions to cell junctions. An example of an HSV glycoprotein E is set forth in SEQ ID NO: 1. An example of an HSV glycoprotein I is set forth in SEQ ID NO: 10.

It has also been shown that gE binds to the Fc domain of immunoglobulin G (IgG) and inhibits activities mediated by the IgG Fc domain through a process described as antibody bipolar bridging (Frank and Friedman, J Virol. 1989 November; 63 (11): 4479-88; Johnson and Feenstra, J Virol. 1987 July; 61 (7): 2208-16). Evidence has shown that HSV-1 gE is capable of binding IgG Fc both alone and when complexed with HSV-1 gI, with the heterodimer having a 100-fold greater affinity for IgG Fc than gE alone (Sprague et al., J Biol Chem. 2004 Apr. 2; 279 (14): 14184-93).

DEFINITIONS AND ABBREVIATIONS

Figure 1A:
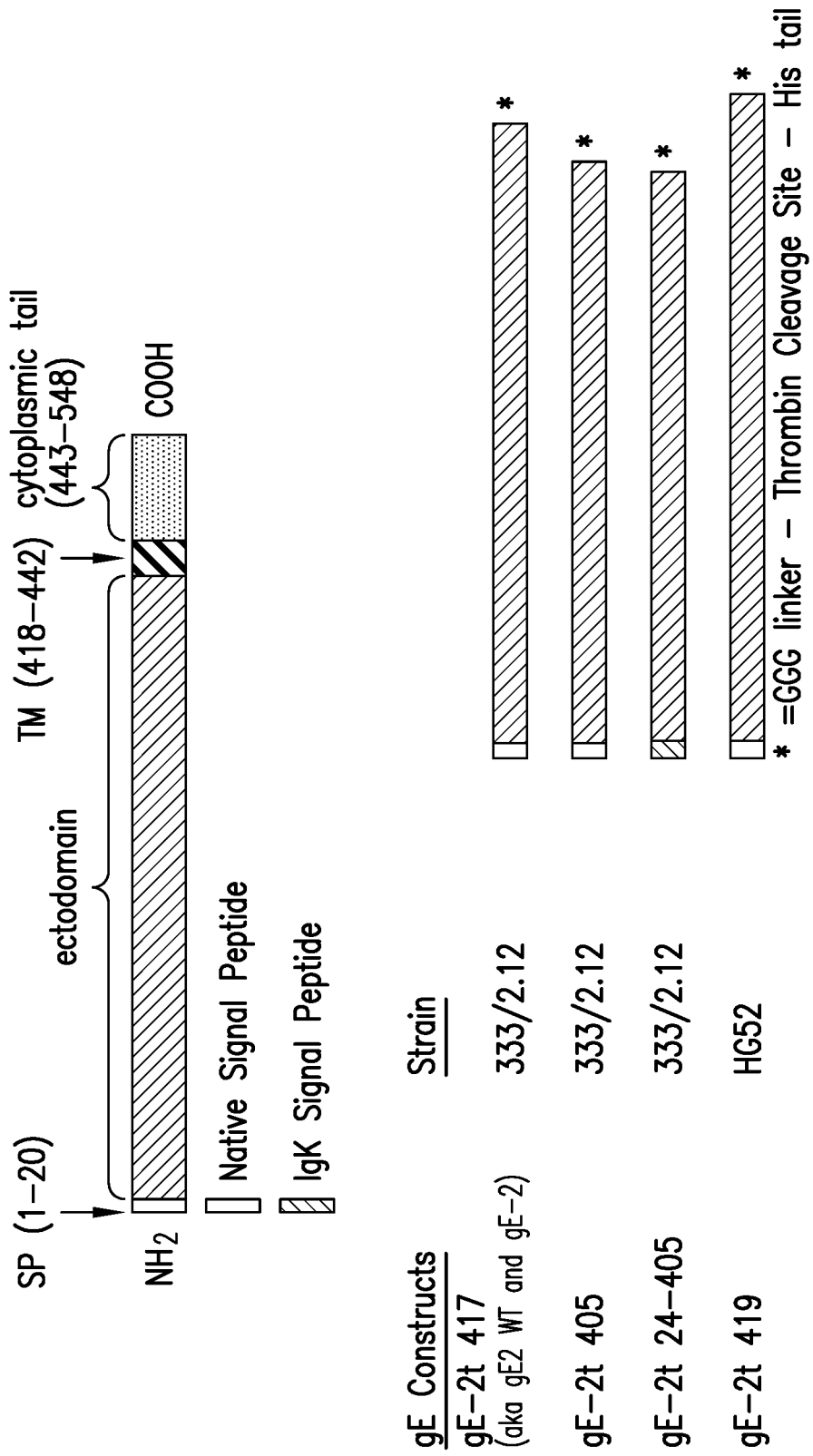
FIG. 1A is a diagram of wild type gE-2 (with amino acid numbering in parentheses), and various soluble gE-2 truncation constructs (with amino acid numbering for the gE-2 ectodomain C-terminal amino acid following “gE-2t”, or in the case of “gE-2t 24-405” the gE-2 ectodomain N-terminal through C-terminal amino acids).

As used throughout the specification and appended claims, the following abbreviations apply:
BSA bovine serum albumin
DAD diode array detector
HSV Herpes Simplex Virus
RU resonance units
PD post dose
PFU plaque forming units
PS-20 polysorbate-20
PS-80 polysorbate-80
SP signal peptide
SPR surface plasmon resonance
TM transmembrane
UV ultraviolet light
WT wild type
v/v volume/volume So that the invention may be more readily understood, certain technical and scientific terms are specifically defined below. Unless specifically defined elsewhere in this document, all other technical and scientific terms used herein have the meaning commonly understood by one of ordinary skill in the art to which this invention belongs.

As used throughout the specification and in the appended claims, the singular forms "a," "an," and "the" include the plural reference unless the context clearly dictates otherwise.

Reference to "or" indicates either or both possibilities unless the context clearly dictates one of the indicated possibilities. In some cases, "and/or" was employed to highlight either or both possibilities.

As used herein, the phrase "therapeutically-effective" in reference to a dose or amount of a composition refers to a dose required to elicit antibodies that significantly reduce the likelihood or severity of infectivity of an infectious agent, e.g., Herpes Simplex Virus, during a subsequent challenge.

As used herein, the term "multivalent" used in the context of a composition herein (e.g. "multivalent vaccine") refers to a pharmaceutical preparation comprising more than one active agent that provides active immunity to a disease or pathological condition caused by more than one strain of pathogen. For example, a multivalent vaccine against HSV-2 may protect against more than one strain of HSV-2.

An "adjuvant," as used herein, is a substance that serves to enhance the immunogenicity of a composition of the disclosure. An adjuvant may enhance an immune response to an antigen that is weakly immunogenic when administered alone, e.g., inducing no or weak antibody titers or cell-mediated immune response, increase antibody titers to the antigen, and/or lower the dose of the antigen effective to achieve an immune response in the individual. Thus, adjuvants are often given to boost the immune response and are well known to the skilled artisan.

A "patient" (alternatively referred to herein as a "subject") refers to a mammal capable of being infected with HSV. In preferred embodiments, the patient is a human. A patient can be treated prophylactically or therapeutically. Prophylactic treatment provides sufficient protective immunity to reduce the likelihood or severity of an HSV infection or the effects thereof. Therapeutic treatment can be performed to reduce the severity or prevent recurrence of an HSV infection or the clinical effects thereof. Prophylactic treatment can be performed using a composition of the invention, as described herein. The composition of the invention can be administered to the general population or to those persons at an increased risk of HSV infection.

As used herein, the term "treat" or "treating" means to administer a therapeutic agent, such as a composition containing any of the antibodies or antigen-binding fragments of the present invention, to a subject or patient having one or more disease symptoms, or being suspected of having a disease, for which the agent has therapeutic activity. Typically, the agent is administered in an amount effective to alleviate one or more disease symptoms in the treated subject or population, whether by inducing the regression of or inhibiting the progression of such symptom(s) by any clinically measurable degree. The amount of a therapeutic agent that is effective to alleviate any particular disease symptom may vary according to factors such as the disease state, age, and weight of the patient, and the ability of the drug to elicit a desired response in the subject. Whether a disease symptom has been alleviated can be assessed by any clinical measurement typically used by physicians or other skilled healthcare providers to assess the severity or progression status of that symptom. Treatment with the vaccines or polypeptides described herein could also combined with other interventions (antibodies, nucleic acids, vaccines and small molecule compounds) to treat other respiratory pathogens.

As used herein, the term "prevent" or "preventing" means to administer a prophylactic agent, such as a composition containing any of the vaccines or polypeptides of the present invention, to a subject or patient at risk of becoming infected by Herpes Simplex Virus (HSV), for which the agent has prophylactic activity. Preventing includes reducing the likelihood or severity of a subsequent HSV infection, ameliorating symptoms associated with HSV infection, and inducing immunity to protect against HSV infection. Typically, the agent is administered in an amount effective to neutralize HSV in the body in order block infection. The amount of a prophylactic agent that is effective to ameliorate any particular disease symptom may vary according to factors such as the age, and weight of the patient, and the ability of the agent to elicit a desired response in the subject. Whether a disease symptom has been ameliorated can be assessed by any clinical measurement typically used by physicians or other skilled healthcare providers to assess the severity or progression status of that symptom or in certain instances will ameliorate the need for hospitalization.

As used herein, the term "isolated" used in the context of polypeptides or polynucleotides refers to polypeptides or polynucleotides that are at least partially free of other biological molecules from the cells or cell cultures in which they are produced. Such biological molecules include other nucleic acids, proteins, lipids, carbohydrates, or other material such as cellular debris and growth medium. It may further be at least partially free of expression system components such as biological molecules from a host cell or of the growth medium thereof. Generally, the term "isolated" is not intended to refer to a complete absence of such biological molecules or to an absence of water, buffers, or salts or to components of a pharmaceutical formulation that includes the polypeptides or polynucleotides.

As used herein, the term "variant" is a molecule that differs in its amino acid sequence or nucleic acid sequence relative to a native sequence or a reference sequence. Sequence variants may possess substitutions, deletions, insertions, or a combination of any two or three of the foregoing, at certain positions within the sequence, as compared to a native sequence or a reference sequence. Ordinarily, variants possess at least 50% identity to a native sequence or a reference sequence. In some embodiments, variants share at least 80% identity or at least 90%, 91%, 92%, 93%, 94%, 05%, 96%, 97%, 98% or 99% identity with a native sequence or a reference sequence.

As used herein, the term "analog" is meant to include polypeptide variants that differ by one or more amino acid alterations, for example, substitutions, additions or deletions of amino acid residues that still maintain one or more of the properties of the parent or starting polypeptide.

The present disclosure provides several types of compositions that are polynucleotide or polypeptide based, including variants and derivatives. These include, for example, substitutional, insertional, deletion and covalent variants and derivatives. The term "derivative" is synonymous with the term "variant" and generally refers to a molecule that has been modified and/or changed in any way relative to a reference molecule or a starting molecule.

As such, polynucleotides encoding peptides or polypeptides containing substitutions, insertions and/or additions, deletions and covalent modifications with respect to reference sequences; in particular, the polypeptide sequences disclosed herein are included within the scope of this disclosure. For example, sequence tags or amino acids, such as one or more lysines, can be added to peptide sequences (e.g., at the N-terminal or C-terminal ends). Sequence tags can be used for peptide detection, purification or localization. Lysines can be used to increase peptide solubility or to allow for biotinylation. Alternatively, amino acid residues located at the carboxy and amino terminal regions of the amino acid sequence of a peptide or protein may optionally be deleted providing for truncated sequences. Certain amino acids (e.g., C-terminal residues or N-terminal residues) alternatively may be deleted depending on the use of the sequence, as for example, expression of the sequence as part of a larger sequence that is soluble or linked to a solid support.

"Substitutional variants" when referring to polypeptides, are those that have at least one amino acid residue in a native or starting sequence removed and a different amino acid inserted in its place at the same position. Substitutions may be single, where only one amino acid in the molecule has been substituted, or they may be multiple, where two or more (e.g., 3, 4 or 5) amino acids have been substituted in the same molecule.

As used herein the term "conservative amino acid substitution" refers to the substitution of an amino acid that is normally present in the sequence with a different amino acid of similar size, charge, or polarity. Examples of conservative substitutions include the substitution of a non-polar (hydrophobic) residue such as isoleucine, valine and leucine for another non-polar residue. Likewise, examples of conservative substitutions include the substitution of one polar (hydrophilic) residue for another such as between arginine and lysine, between glutamine and asparagine, and between glycine and serine. Additionally, the substitution of a basic residue such as lysine, arginine or histidine for another, or the substitution of one acidic residue such as aspartic acid or glutamic acid for another acidic residue are additional examples of conservative substitutions. Examples of non-conservative substitutions include the substitution of a non-polar (hydrophobic) amino acid residue such as isoleucine, valine, leucine, alanine, methionine for a polar (hydrophilic) residue such as cysteine, glutamine, glutamic acid or lysine and/or a polar residue for a non-polar residue.

As used herein when referring to polypeptides the term "domain" refers to a motif of a polypeptide having one or more identifiable structural or functional characteristics or properties (e.g., binding capacity, serving as a site for protein-protein interactions).

As used herein when referring to polypeptides the terms "site" as it pertains to amino acid-based embodiments is used synonymously with "amino acid residue" and "amino acid side chain." As used herein when referring to polynucleotides the terms "site" as it pertains to nucleotide-based embodiments is used synonymously with "nucleotide." A site represents a position within a peptide or polypeptide or polynucleotide that may be modified, manipulated, altered, derivatized, or varied within the polypeptide-based or polynucleotide-based molecules.

As used herein the terms "termini" or "terminus," when referring to polypeptides or polynucleotides, refer to an extremity of a polypeptide or polynucleotide respectively. Such extremity is not limited only to the first or final site of the polypeptide or polynucleotide but may include additional amino acids or nucleotides in the terminal regions. Polypeptide-based molecules may be characterized as having both an N-terminus (terminated by an amino acid with a free amino group ($NH_2$)) and a C-terminus (terminated by an amino acid with a free carboxyl group (COOH)). Proteins are in some cases made up of multiple polypeptide chains brought together by disulfide bonds or by non-covalent forces (multimers, oligomers). These proteins have multiple N- and C-termini. Alternatively, the termini of the polypeptides may be modified such that they begin or end with a non-polypeptide-based moiety such as an organic conjugate.

Nucleic Acids/Polynucleotides

DNA of the present disclosure, in some embodiments, are codon optimized. Codon optimization methods are known in the art and may be used as provided herein. Codon optimization, in some embodiments, may be used to match codon frequencies in target and host organisms to ensure proper folding; bias GC content to increase mRNA stability or reduce secondary structures; minimize tandem repeat codons or base runs that may impair gene construction or expression; customize transcriptional and translational control regions; insert or remove protein trafficking sequences; remove/add post translation modification sites in encoded protein (e.g. glycosylation sites); add, remove or shuffle protein domains; insert or delete restriction sites; modify ribosome binding sites and mRNA degradation sites; adjust translational rates to allow the various domains of the protein to fold properly; or to reduce or eliminate problem secondary structures within the polynucleotide. Codon optimization tools, algorithms and services are known in the art—non-limiting examples include services from GeneArt (Life Technologies), DNA2.0 (Menlo Park CA) and/or proprietary methods. In some embodiments, the open reading frame (ORF) sequence is optimized using optimization algorithms.

In some embodiments, a codon optimized sequence shares less than 95% sequence identity, less than 90% sequence identity, less than 85% sequence identity, less than 80% sequence identity, or less than 75% sequence identity to a naturally-occurring or wild type sequence.

In some embodiments, a codon-optimized sequence shares between 65% and 85% (e.g., between about 67% and about 85%, or between about 67% and about 80%) sequence identity to a naturally-occurring sequence or a wild type sequence. In some embodiments, a codon-optimized sequence shares between 65% and 75%, or about 80% sequence identity to a naturally-occurring sequence or wild type sequence.

Antigens/Antigenic Polypeptides

In some embodiments, an antigenic polypeptide includes gene products, naturally occurring polypeptides, synthetic polypeptides, homologs, orthologs, paralogs, fragments and other equivalents, variants, and analogs of the foregoing. A polypeptide may be a single molecule or may be a multi-molecular complex such as a dimer, trimer or tetramer. Polypeptides may also comprise single chain polypeptides or multichain polypeptides, such as antibodies or insulin, and may be associated or linked to each other. Most commonly, disulfide linkages are found in multichain polypeptides. The term "polypeptide" may also apply to amino acid polymers in which at least one amino acid residue is an artificial chemical analogue of a corresponding naturally-occurring amino acid.

As recognized by those skilled in the art, protein fragments, functional protein domains, and homologous proteins are also considered to be within the scope of polypeptides of interest. For example, provided herein is any protein fragment (meaning a polypeptide sequence at least one amino acid residue shorter than a reference polypeptide sequence but otherwise identical) of a reference protein having a length of 10, 20, 30, 40, 50, 60, 70, 80, 90, 100 or longer than 100 amino acids. In another example, any protein that comprises a stretch of 20, 30, 40, 50, or 100 (contiguous) amino acids that are 40%, 50%, 60%, 70%, 80%, 90%, 95%, 96%, 97%, 98%, 99% or 100% identical to any of the sequences described herein can be utilized in accordance with the disclosure. In some embodiments, a polypeptide comprises 2, 3, 4, 5, 6, 7, 8, 9, 10, or more mutations as shown in any of the sequences provided herein or referenced herein. In another example, any protein that comprises a stretch of 20, 30, 40, 50, or 100 amino acids that are greater than 80%, 90%, 95%, or 100% identical to any of the sequences described herein, wherein the protein has a stretch of 5, 10, 15, 20, 25, or 30 amino acids that are less than 80%, 75%, 70%, 65% to 60% identical to any of the sequences described herein can be utilized in accordance with the disclosure.

Polypeptide or polynucleotide molecules of the present disclosure may share a certain degree of sequence similarity or identity with the reference molecules (e.g., reference polypeptides or reference polynucleotides), for example, with art-described molecules (e.g., engineered or designed molecules or wild type molecules). The term "identity," as known in the art, refers to a relationship between the sequences of two or more polypeptides or polynucleotides, as determined by comparing the sequences. In the art, identity also means the degree of sequence relatedness between two sequences as determined by the number of matches between strings of two or more amino acid residues or nucleic acid residues. Identity measures the percent of identical matches between the smaller of two or more sequences with gap alignments (if any) addressed by a particular mathematical model or computer program (e.g., "algorithms"). Identity of related peptides can be readily calculated by known methods. The term "% identity" as it applies to polypeptide or polynucleotide sequences is defined as the percentage of residues (amino acid residues or nucleic acid residues) in the candidate amino acid or nucleic acid sequence that are identical with the residues in the amino acid sequence or nucleic acid sequence of a second sequence after aligning the sequences and introducing gaps, if necessary, to achieve the maximum percent identity. Methods and computer programs for the alignment are well known in the art. Identity depends on a calculation of percent identity but may differ in value due to gaps and penalties introduced in the calculation. Generally, variants of a particular polynucleotide or polypeptide have at least 40%, 45%, 50%, 55%, 60%, 65%, 70%, 75%, 80%, 85%, 90%, 91%, 92%, 93%, 94%, 95%, 96%, 97%, 98%, 99% but less than 100% sequence identity to that particular reference polynucleotide or polypeptide as determined by sequence alignment programs and parameters described herein and known to those skilled in the art. Such tools for alignment include those of the BLAST suite (Stephen F. Altschul, et al. (1997). "Gapped BLAST and PSI-BLAST: a new generation of protein database search programs," *Nucleic Acids Res.* 25:3389-3402). Another popular local alignment technique is based on the Smith-Waterman algorithm (Smith, T. F. & Waterman, M. S. (1981) "Identification of common molecular subsequences." *J. Mol. Biol.* 147:195-197). A general global alignment technique based on dynamic programming is the Needleman-Wunsch algorithm (Needleman, S. B. & Wunsch, C. D. (1970) "A general method applicable to the search for similarities in the amino acid sequences of two proteins." *J. Mol. Biol.* 48:443-453). More recently, a Fast Optimal Global Sequence Alignment Algorithm (FOGSAA) was developed that purportedly produces global alignment of nucleotide and protein sequences faster than other optimal global alignment methods, including the Needleman-Wunsch algorithm. Other tools are described herein, specifically in the definition of "identity" below.

As used herein, the term "homology" refers to the overall relatedness between polymeric molecules, e.g. between nucleic acid molecules (e.g. DNA molecules) and/or between polypeptide molecules. Polymeric molecules (e.g. nucleic acid molecules (e.g. DNA molecules) and/or polypeptide molecules) that share a threshold level of similarity or identity determined by alignment of matching residues are termed homologous. Homology is a qualitative term that describes a relationship between molecules and can be based upon the quantitative similarity or identity. Similarity or identity is a quantitative term that defines the degree of sequence match between two compared sequences. In some embodiments, polymeric molecules are "homologous" to one another if their sequences are at least 25%, 30%, 35%, 40%, 45%, 50%, 55%, 60%, 65%, 70%, 75%, 80%, 85%, 90%, 95%, 96%, 97%, 98% or 99% identical or similar. The term "homologous" necessarily refers to a comparison between at least two sequences (polynucleotide or polypeptide sequences). Two polynucleotide sequences are considered homologous if the polypeptides they encode are at least 50%, 60%, 70%, 80%, 90%, 95%, or even 99% for at least one stretch of at least 20 amino acids. In some embodiments, homologous polynucleotide sequences are characterized by the ability to encode a stretch of at least 4-5 uniquely specified amino acids. For polynucleotide sequences less than 60 nucleotides in length, homology is determined by the ability to encode a stretch of at least 4-5 uniquely specified amino acids. Two protein sequences are considered homologous if the proteins are at least 50%, 60%, 70%, 80%, or 90% identical for at least one stretch of at least 20 amino acids.

Homology implies that the compared sequences diverged in evolution from a common origin. The term "homolog" refers to a first amino acid sequence or nucleic acid sequence (e.g., gene (DNA or RNA) or protein sequence) that is related to a second amino acid sequence or nucleic acid sequence by descent from a common ancestral sequence. The term "homolog" may apply to the relationship between genes and/or proteins separated by the event of speciation or to the relationship between genes and/or proteins separated by the event of genetic duplication. "Orthologs" are genes (or proteins) in different species that evolved from a common ancestral gene (or protein) by speciation. Typically, orthologs retain the same function during evolution. "Paralogs" are genes (or proteins) related by duplication within a genome. Orthologs retain the same function during evolution, whereas paralogs evolve new functions, even if the new functions are related to the original function.

The term "identity" refers to the overall relatedness between polymeric molecules, for example, between polynucleotide molecules (e.g. DNA molecules) and/or between polypeptide molecules. Calculation of the percent identity of two polynucleic acid sequences, for example, can be performed by aligning the two sequences for optimal comparison purposes (e.g., gaps can be introduced in one or both of a first and a second nucleic acid sequences for optimal alignment and non-identical sequences can be disregarded for comparison purposes). In certain embodiments, the length of a sequence aligned for comparison purposes is at least 30%, at least 40%, at least 50%, at least 60%, at least 70%, at least 80%, at least 90%, at least 95%, or 100% of the length of the reference sequence. The nucleotides at corresponding nucleotide positions are then compared. When a position in the first sequence is occupied by the same nucleotide as the corresponding position in the second sequence, then the molecules are identical at that position. The percent identity between the two sequences is a function of the number of identical positions shared by the sequences, accounting for the number of gaps and the length of each gap, which needs to be introduced for optimal alignment of the two sequences. The comparison of sequences and determination of percent identity between two sequences can be accomplished using a mathematical algorithm. For example, the percent identity between two nucleic acid sequences can be determined using methods such as those described in Computational Molecular Biology, Lesk, A. M., ed., Oxford University Press, New York, 1988; Biocomputing: Informatics and Genome Projects, Smith, D. W., ed., Academic Press, New York, 1993; Sequence Analysis in Molecular Biology, von Heinje, G., Academic Press, 1987; Computer Analysis of Sequence Data, Part I, Griffin, A. M., and Griffin, H. G., eds., Humana Press, New Jersey, 1994; and Sequence Analysis Primer, Gribskov, M. and Devereux, J., eds., M Stockton Press, New York, 1991; each of which is incorporated herein by reference. For example, the percent identity between two nucleic acid sequences can be determined using the algorithm of Meyers and Miller (CABIOS, 1989, 4:11-17), which has been incorporated into the ALIGN program (version 2.0) using a PAM120 weight residue table, a gap length penalty of 12 and a gap penalty of 4. The percent identity between two nucleic acid sequences can, alternatively, be determined using the GAP program in the GCG software package using an NWSgapdna. CMP matrix. Methods commonly employed to determine percent identity between sequences include, but are not limited to those disclosed in Carillo, H., and Lipman, D., SIAM *J Applied Math.*, 48:1073 (1988); incorporated herein by reference. Techniques for determining identity are codified in publicly available computer programs. Exemplary computer software to determine homology between two sequences include, but are not limited to, GCG program package, Devereux, J., et al., *Nucleic Acids Research*, 12, 387 (1984)), BLASTP, BLASTN, and FASTA Altschul, S. F. et al., *J. Molec. Biol.*, 215, 403 (1990)).

Signal Peptides

In some embodiments, antigenic polypeptides comprise a signal peptide ("SP"). Signal peptides, comprising the N-terminal 15-60 amino acids of proteins, are typically needed for the translocation across the membrane on the secretory pathway and, thus, universally control the entry of most proteins both in eukaryotes and prokaryotes to the secretory pathway. ER processing produces mature proteins, wherein the signal peptide is cleaved from precursor proteins, typically by an ER-resident signal peptidase of the host cell, or they remain uncleaved and function as a membrane anchor. As used herein, the phrase "mature amino acid sequence" refers to an amino acid sequence that does not contain a signal peptide sequence.

Methods of Treatment

Provided herein are peptide compositions (e.g., pharmaceutical compositions) and methods for prevention and/or treatment of HSV in humans and other mammals. HSV vaccines can be used as therapeutic or prophylactic agents. They may be used in medicine to prevent and/or treat infectious disease. In exemplary aspects, the HSV vaccines of the present disclosure are used to provide prophylactic protection from HSV. Prophylactic protection from HSV can be achieved following administration of an HSV vaccine of the present disclosure. Vaccines can be administered once, twice, three times, four times or more. It is possible, although less desirable, to administer the vaccine to an infected individual to achieve a therapeutic response. Dosing may need to be adjusted accordingly.

In some embodiments, the HSV vaccines of the present disclosure can be used as a method of preventing an HSV infection in a subject, the method comprising administering to said subject at least one HSV vaccine as provided herein. In some embodiments, the HSV vaccines of the present disclosure can be used as a method of treating an HSV infection in a subject, the method comprising administering to the subject at least one HSV vaccine as provided herein. In some embodiments, the HSV vaccines of the present disclosure can be used as a method of reducing an incidence of HSV infection in a subject, the method comprising administering to said subject at least one HSV vaccine as provided herein. In some embodiments, the HSV vaccines of the present disclosure can be used as a method of inhibiting spread of HSV from a first subject infected with HSV to a second subject not infected with HSV, the method comprising administering to at least one of the first subject and the second subject at least one HSV vaccine as provided herein.

A method of eliciting an immune response in a subject against HSV is provided in aspects of this disclosure. The method involves administering to the subject an HSV vaccine described herein, thereby inducing in the subject an immune response specific to HSV antigenic polypeptide.

A prophylactically-effective dose is a therapeutically-effective dose that prevents infection with the virus at a clinically acceptable level. In some embodiments the therapeutically-effective dose is a dose listed in a package insert for the vaccine.

Therapeutic and Prophylactic Compositions

Provided herein are compositions (e.g., pharmaceutical compositions) and methods for prevention, treatment or diagnosis of HSV in humans and other mammals, for example. HSV vaccines can be used as therapeutic or prophylactic agents. They may be used in medicine to prevent and/or treat infectious disease. In some embodiments, the vaccines of the present disclosure are used for the priming of immune effector cells, for example, to activate peripheral blood mononuclear cells (PBMCs) ex vivo, which are then infused (re-infused) into a subject. In some embodiments, vaccines in accordance with the present disclosure may be used for treatment of HSV.

HSV vaccines may be administered prophylactically or therapeutically as part of an active immunization scheme to healthy individuals or early in infection during the incubation phase or during active infection after onset of symptoms. In some embodiments, the amount of vaccine of the present disclosure provided to a cell, a tissue or a subject may be an amount effective for immune prophylaxis.

HSV vaccines may be administered with other prophylactic or therapeutic compounds. As a non-limiting example, a prophylactic or therapeutic compound may be an adjuvant or a booster. As used herein, when referring to a prophylactic composition, such as a vaccine, the term "booster" refers to an extra administration of the prophylactic (vaccine) composition. A booster (or booster vaccine) may be given after an earlier administration of the prophylactic composition. The time of administration between the initial administration of the prophylactic composition and the booster may be, but is not limited to, 1 minute, 2 minutes, 3 minutes, 4 minutes, 5 minutes, 6 minutes, 7 minutes, 8 minutes, 9 minutes, 10 minutes, 15 minutes, 20 minutes 35 minutes, 40 minutes, 45 minutes, 50 minutes, 55 minutes, 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 1 day, 36 hours, 2 days, 3 days, 4 days, 5 days, 6 days, 1 week, 10 days, 2 weeks, 3 weeks, 1 month, 2 months, 3 months, 4 months, 5 months, 6 months, 7 months, 8 months, 9 months, 10 months, 11 months, 1 year, 18 months, 2 years, 3 years, 4 years, 5 years, 6 years, 7 years, 8 years, 9 years, 10 years, 11 years, 12 years, 13 years, 14 years, 15 years, 16 years, 17 years, 18 years, 19 years, 20 years, 25 years, 30 years, 35 years, 40 years, 45 years, 50 years, 55 years, 60 years, 65 years, 70 years, 75 years, 80 years, 85 years, 90 years, 95 years or more than 99 years. In some embodiments, the time of administration between the initial administration of the prophylactic composition and the booster may be, but is not limited to, 1 week, 2 weeks, 3 weeks, 1 month, 2 months, 3 months, 6 months or 1 year.

In some embodiments, HSV vaccines may be administered intramuscularly or intradermally. In some embodiments, HSV vaccines are administered intramuscularly.

Vaccines may be utilized in various settings depending on the prevalence of the infection or the degree or level of unmet medical need. Vaccines have superior properties in that they produce much larger antibody titers and produce responses early than commercially available anti-viral agents/compositions.

Adjuvants

HSV vaccines may be formulated or administered alone or in conjunction with one or more other components. For instance, HSV vaccines (vaccine compositions) may comprise other components including, but not limited to, adjuvants.

In some embodiments, vaccines of the instant disclosure do not include an adjuvant (they are adjuvant-free).

Suitable adjuvants to enhance effectiveness of the compositions disclosed herein include, but are not limited to:

(1) aluminum salts (alum), such as aluminum hydroxide, aluminum phosphate, aluminum sulfate, etc.;

(2) oil-in-water emulsion formulations (with or without other specific immunostimulating agents such as muramyl peptides (defined below) or bacterial cell wall components), such as, for example, (a) MF59 (International Patent Application Publication No. WO 90/14837), containing 5% Squalene, 0.5% Tween 80, and 0.5% Span 85 (optionally containing various amounts of MTP-PE) formulated into submicron particles using a microfluidizer such as Model 110Y microfluidizer (Microfluidics, Newton, MA), (b) SAF, containing 10% Squalene, 0.4% Tween 80, 5% pluronic-blocked polymer L121, and thr-MDP either microfluidized into a submicron emulsion or vortexed to generate a larger particle size emulsion, (c) RIBI adjuvant system (RAS), (Corixa, Hamilton, MT) containing 2% Squalene, 0.2% Tween 80, and one or more bacterial cell wall components from the group consisting of 3-O-deacylated monophosphorylipid A (MPL) described in U.S. Pat. No. 4,912,094, trehalose dimycolate (TDM), and cell wall skeleton (CWS), preferably MPL+CWS (DETOX); and (d) a Montanide ISA;

(3) saponin adjuvants, such as Quil A or STIMULON QS-21 (Antigenics, Framingham, MA) (see, e.g., U.S. Pat. No. 5,057,540) may be used or particles generated therefrom such as ISCOM (immunostimulating complexes formed by the combination of cholesterol, saponin, phospholipid, and amphipathic proteins) and ISCOMATRIX (having essentially the same structure as an ISCOM but without the protein);

(4) bacterial lipopolysaccharides, synthetic lipid A analogs such as aminoalkyl glucosamine phosphate compounds (AGP), or derivatives or analogs thereof, which are available from Corixa, and which are described in U.S. Pat. No. 6,113,918; one such AGP is 2-[(R)-3-tetradecanoyloxytetradecanoylamino]ethyl 2-Deoxy-4-O-phosphono-3-O—[(R)-3-tetradecanoyloxytetradecanoyl]-2-[(R)-3-tetradecanoyloxytetradecanoylamino]-b-D-glucopyranoside, which is also known as 529 (formerly known as RC529), which is formulated as an aqueous form or as a stable emulsion (5) synthetic polynucleotides such as oligonucleotides containing CpG motif(s) (U.S. Pat. No. 6,207,646); and (6) cytokines, such as interleukins (e.g., IL-1, IL-2, IL-4, IL-5, IL-6, IL-7, IL-12, IL-15, IL-18, etc.), interferons (e.g., gamma interferon), granulocyte macrophage colony stimulating factor (GM-CSF), macrophage colony stimulating factor (M-CSF), tumor necrosis factor (TNF), costimulatory molecules B7-1 and B7-2, etc.; and (7) complement, such as a trimer of complement component C3d.

In another embodiment, the adjuvant is a mixture of 2, 3, or more of the above adjuvants, e.g., SBAS2 (an oil-in-water emulsion also containing 3-deacylated monophosphoryl lipid A and QS21).

Muramyl peptides include, but are not limited to, N-acetyl-muramyl-L-threonyl-D-isoglutamine (thr-MDP), N-acetyl-normuramyl-L-alanine-2-(1'-2' dipalmitoyl-sn-glycero-3-hydroxyphosphoryloxy)-ethylamine (MTP-PE), etc.

In certain embodiments, the adjuvant is an aluminum salt. The aluminum salt adjuvant may be an alum-precipitated vaccine or an alum-adsorbed vaccine. Aluminum-salt adjuvants are well known in the art and are described, for example, in Harlow, E. and D. Lane (1988; Antibodies: A Laboratory Manual Cold Spring Harbor Laboratory) and Nicklas, W. (1992; Aluminum salts. Research in Immunology 143:489-493). The aluminum salt includes, but is not limited to, hydrated alumina, alumina hydrate, alumina trihydrate (ATH), aluminum hydrate, aluminum trihydrate, alhydrogel, Superfos, Amphogel, aluminum (III) hydroxide, aluminum hydroxyphosphate sulfate, Aluminum Phosphate Adjuvant (APA), amorphous alumina, trihydrated alumina, or trihydroxyaluminum.

APA is an aqueous suspension of aluminum hydroxyphosphate. APA is manufactured by blending aluminum chloride and sodium phosphate in a 1:1 volumetric ratio to precipitate aluminum hydroxyphosphate. After the blending process, the material is size-reduced with a high-shear mixer to achieve a monodisperse particle size distribution. The product is then diafiltered against physiological saline and steam sterilized.

In certain embodiments, a commercially available Al(OH)$_3$ (e.g. Alhydrogel or Superfos of Denmark/Accurate Chemical and Scientific Co., Westbury, NY) is used to adsorb proteins in a ratio of 50-200 µg protein/mg aluminum hydroxide. Adsorption of protein is dependent, in another embodiment, on the pI (Isoelectric pH) of the protein and the pH of the medium. A protein with a lower pI adsorbs to the positively charged aluminum ion more strongly than a protein with a higher pI. Aluminum salts may establish a depot of antigen that is released slowly over a period of 2-3 weeks, be involved in nonspecific activation of macrophages and complement activation, and/or stimulate innate immune mechanism (possibly through stimulation of uric acid). See, e.g., Lambrecht et al., 2009, Curr Opin Immunol 21:23.

In certain embodiments, the adjuvant is a CpG-containing nucleotide sequence, for example, a CpG-containing oligonucleotide, in particular, a CpG-containing oligodeoxynucleotide (CpG ODN). In another embodiment, the adjuvant is ODN 1826, which may be acquired from Coley Pharmaceutical Group.

Methods for use of CpG oligonucleotides are well known in the art and are described, for example, in Sur et al., 1999, J Immunol. 162:6284-93; Verthelyi, 2006, Methods Mol Med. 127:139-58; and Yasuda et al., 2006, Crit Rev Ther Drug Carrier Syst. 23:89-110.

Formulations

HSV vaccines may be formulated or administered in combination with one or more pharmaceutically-acceptable excipients. In some embodiments, vaccine compositions comprise at least one additional active substance, such as, for example, a therapeutically-active substance, a prophylactically-active substance, or a combination of both. Vaccine compositions may be sterile, pyrogen-free or both sterile and pyrogen-free. General considerations in the formulation and/or manufacture of pharmaceutical agents, such as vaccine compositions, may be found, for example, in Remington: The Science and Practice of Pharmacy 21st ed., Lippincott Williams & Wilkins, 2005 (incorporated herein by reference in its entirety). In some embodiments, HSV vaccines are administered to humans, human patients or subjects.

Formulations of the HSV vaccine compositions described herein may be prepared by any method known or hereafter developed in the art of pharmacology. In general, such preparatory methods include the step of bringing the active ingredient (e.g., polypeptide or polynucleotide) into association with an excipient and/or one or more other accessory ingredients, and then, if necessary and/or desirable, dividing, shaping and/or packaging the product into a desired single- or multi-dose unit.

Relative amounts of the active ingredient, the pharmaceutically acceptable excipient, and/or any additional ingredients in a pharmaceutical composition in accordance with the disclosure will vary, depending upon the identity, size, and/or condition of the subject treated and further depending upon the route by which the composition is to be administered. By way of example, the composition may comprise between 0.1% and 100%, e.g., between 0.5 and 50%, between 1-30%, between 5-80%, at least 80% (w/w) active ingredient.

Compositions of this disclosure can be formulated as single dose vials, multi-dose vials or as pre-filled glass or plastic syringes.

In another embodiment, compositions of the present disclosure are administered orally, and are thus formulated in a form suitable for oral administration, i.e., as a solid or a liquid preparation. Solid oral formulations include tablets, capsules, pills, granules, pellets and the like. Liquid oral formulations include solutions, suspensions, dispersions, emulsions, oils and the like.

Pharmaceutically acceptable carriers for liquid formulations are aqueous or non-aqueous solutions, suspensions, emulsions or oils. Examples of nonaqueous solvents are propylene glycol, polyethylene glycol, and injectable organic esters such as ethyl oleate. Aqueous carriers include water, alcoholic/aqueous solutions, emulsions or suspensions, including saline and buffered media. Examples of oils are those of animal, vegetable, or synthetic origin, for example, peanut oil, soybean oil, olive oil, sunflower oil, fish-liver oil, another marine oil, or a lipid from milk or eggs.

The pharmaceutical composition may be isotonic, hypotonic or hypertonic. However, it is often preferred that a pharmaceutical composition for infusion or injection is essentially isotonic, when it is administered. Hence, for storage the pharmaceutical composition may preferably be isotonic or hypertonic. If the pharmaceutical composition is hypertonic for storage, it may be diluted to become an isotonic solution prior to administration.

The isotonic agent may be an ionic isotonic agent such as a salt or a non-ionic isotonic agent such as a carbohydrate. Examples of ionic isotonic agents include but are not limited to NaCl, CaCl$_2$), KCl and MgCl$_2$. Examples of non-ionic isotonic agents include but are not limited to mannitol, sorbitol and glycerol.

It is also preferred that at least one pharmaceutically-acceptable additive is a buffer. For some purposes, for example, when the pharmaceutical composition is meant for infusion or injection, it is often desirable that the composition comprises a buffer, which is capable of buffering a solution to a pH in the range of 4 to 10, such as 5 to 9, for example 6 to 8.

The buffer may, for example, be selected from the group consisting of TRIS, acetate, glutamate, lactate, maleate, tartrate, phosphate, citrate, carbonate, glycinate, histidine, glycine, succinate and triethanolamine buffer.

The buffer may be selected from USP compatible buffers for parenteral use, in particular, when the pharmaceutical formulation is for parenteral use. For example, the buffer may be selected from the group consisting of monobasic acids such as acetic, benzoic, gluconic, glyceric and lactic; dibasic acids such as aconitic, adipic, ascorbic, carbonic, glutamic, malic, succinic and tartaric, polybasic acids such as citric and phosphoric; and bases such as ammonia, diethanolamine, glycine, triethanolamine, and TRIS.

Parenteral vehicles (for subcutaneous, intravenous, intraarterial, or intramuscular injection) include sodium chloride solution, Ringer's dextrose, dextrose and sodium chloride, lactated Ringer's and fixed oils. Intravenous vehicles include fluid and nutrient replenishers, electrolyte replenishers such as those based on Ringer's dextrose, and the like. Examples are sterile liquids such as water and oils, with or without the addition of a surfactant and other pharmaceutically acceptable adjuvants. In general, water, saline, aqueous dextrose and related sugar solutions, glycols such as propylene glycols or polyethylene glycol, Polysorbate 80 (PS-80), Polysorbate 20 (PS-20), and Poloxamer 188 (P188) are preferred liquid carriers, particularly for injectable solutions. Examples of oils are those of animal, vegetable, or synthetic origin, for example, peanut oil, soybean oil, olive oil, sunflower oil, fish-liver oil, another marine oil, or a lipid from milk or eggs.

The formulations of the disclosure may also contain a surfactant. Preferred surfactants include, but are not limited to: the polyoxyethylene sorbitan esters surfactants (commonly referred to as the Tweens), especially PS-20 and PS-80; copolymers of ethylene oxide (EO), propylene oxide (PO), and/or butylene oxide (BO), sold under the DOWFAX tradename, such as linear EO/PO block copolymers; octoxynols, which can vary in the number of repeating ethoxy (oxy-1,2-ethanediyl) groups, with octoxynol-9 (Triton X-100, or t-octylphenoxypolyethoxyethanol) being of particular interest; (octylphenoxy) polyethoxyethanol (IGEPAL CA-630/NP-40); phospholipids such as phosphatidylcholine (lecithin); nonylphenol ethoxylates, such as the TERGITOL NP series; polyoxyethylene fatty ethers derived from lauryl, cetyl, stearyl and oleyl alcohols (known as BRIJ surfactants), such as triethyleneglycol monolauryl ether (BRIJ 30); and sorbitan esters (commonly known as the SPANs), such as sorbitan trioleate (SPAN 85) and sorbitan monolaurate.

Mixtures of surfactants can be used, e.g. PS-80/Span 85 mixtures. A combination of a polyoxyethylene sorbitan ester such as polyoxyethylene sorbitan monooleate (PS-80) and an octoxynol such as t-octylphenoxypolyethoxyethanol (Triton X-100) is also suitable. Another useful combination comprises laureth 9 plus a polyoxyethylene sorbitan ester and/or an octoxynol.

Preferred amounts of surfactants (% by weight) are: polyoxyethylene sorbitan esters (such as PS-80) 0.01 to 1%, in particular about 0.1%; octyl- or nonylphenoxy polyoxyethanols (such as Triton X-100, or other detergents in the Triton series) 0.001 to 0.1%, in particular 0.005 to 0.02%; polyoxyethylene ethers (such as laureth 9) 0.1 to 20%, preferably 0.1 to 10% and in particular 0.1 to 1% or about 0.5%.

Modes of Vaccine Administration

HSV vaccines may be administered by any route which results in a therapeutically-effective outcome. These include, but are not limited, to intradermal, intramuscular, intranasal and/or subcutaneous administration. The present disclosure provides methods comprising administering vaccines to a subject in need thereof. The exact amount required will vary from subject to subject, depending on the species, age, and general condition of the subject, the severity of the disease, the particular composition, its mode of administration, its mode of activity, and the like. HSV vaccine compositions are typically formulated in dosage unit form for ease of administration and uniformity of dosage. It will be understood, however, that the total daily usage of vaccine compositions may be decided by the attending physician within the scope of sound medical judgment. The specific therapeutically-effective or appropriate imaging dose level for any particular patient will depend upon a variety of factors including the disorder being treated and the severity of the disorder; the activity of the specific compound employed; the specific composition employed; the age, body weight, general health, sex and diet of the patient; the time of administration, route of administration, and rate of excretion of the specific compound employed; the duration of the treatment; drugs used in combination or coincidental with the specific compound employed; and like factors well known in the medical arts.

In some embodiments, HSV vaccines compositions may be administered at dosage levels sufficient to deliver 0.0001 mg/kg to 100 mg/kg, 0.001 mg/kg to 0.05 mg/kg, 0.005 mg/kg to 0.05 mg/kg, 0.001 mg/kg to 0.005 mg/kg, 0.05 mg/kg to 0.5 mg/kg, 0.01 mg/kg to 50 mg/kg, 0.1 mg/kg to 40 mg/kg, 0.5 mg/kg to 30 mg/kg, 0.01 mg/kg to 10 mg/kg, 0.1 mg/kg to 10 mg/kg, or 1 mg/kg to 25 mg/kg, of subject body weight per day, one or more times a day, per week, per month, etc. to obtain the desired therapeutic, diagnostic, prophylactic, or imaging effect (see, e.g., the range of unit doses described in International Publication No WO2013/078199, the contents of which are herein incorporated by reference in their entirety). The desired dosage may be delivered three times a day, two times a day, once a day, every other day, every third day, every week, every two weeks, every three weeks, every four weeks, every 2 months, every three months, every 6 months, etc. In some embodiments, the desired dosage may be delivered using multiple administrations (e.g., two, three, four, five, six, seven, eight, nine, ten, eleven, twelve, thirteen, fourteen, or more administrations). When multiple administrations are employed, split dosing regimens such as those described herein may be used. In exemplary embodiments, HSV vaccines compositions may be administered at dosage levels sufficient to deliver 0.0005 mg/kg to 0.01 mg/kg, e.g., about 0.0005 mg/kg to about 0.0075 mg/kg, e.g., about 0.0005 mg/kg, about 0.001 mg/kg, about 0.002 mg/kg, about 0.003 mg/kg, about 0.004 mg/kg or about 0.005 mg/kg.

In some embodiments, HSV vaccine compositions may be administered once or twice (or more) at dosage levels sufficient to deliver 0.025 mg/kg to 0.250 mg/kg, 0.025 mg/kg to 0.500 mg/kg, 0.025 mg/kg to 0.750 mg/kg, or 0.025 mg/kg to 1.0 mg/kg.

An HSV vaccine pharmaceutical composition described herein can be formulated into a dosage form described herein, such as an intranasal, intratracheal, or injectable (e.g., intravenous, intraocular, intravitreal, intramuscular, intradermal, intracardiac, intraperitoneal, intranasal and subcutaneous).

HSV Vaccine Formulations and Methods of Use

Some aspects of the present disclosure provide formulations of the HSV vaccine, wherein the vaccine is formulated in an effective amount to produce an antigen specific immune response in a subject (e.g., production of antibodies specific to an HSV antigenic polypeptide). "An effective amount" is a dose of a vaccine effective to produce an antigen-specific immune response. Also provided herein are methods of inducing an antigen-specific immune response in a subject.

In some embodiments, the antigen-specific immune response is characterized by measuring an anti-HSV antigenic polypeptide antibody titer produced in a subject administered an HSV vaccine as provided herein. An antibody titer is a measurement of a concentration of antibodies within a subject, for example, antibodies that are specific to a particular antigen (e.g., an HSV antigenic polypeptide) or epitope of an antigen. Antibody titer is typically expressed as the inverse of the greatest dilution that provides a positive result. Enzyme-linked immunosorbent assay (ELISA) is a common assay for determining antibody titers, for example.

In some embodiments, an antibody titer is used to assess whether a subject has had an infection or to determine whether immunizations are required. In some embodiments, an antibody titer is used to determine the strength of an autoimmune response, to determine whether a booster immunization is needed, to determine whether a previous vaccine was effective, and to identify any recent or prior infections. In accordance with the present disclosure, an antibody titer may be used to determine the strength of an immune response induced in a subject by the HSV vaccine.

This disclosure is not limited in its application to the details of construction and the arrangement of components set forth in the following description or illustrated in the drawings. The compositions and methods disclosed herein can have other embodiments and can be practiced or carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

EXAMPLES

Figure 1B:
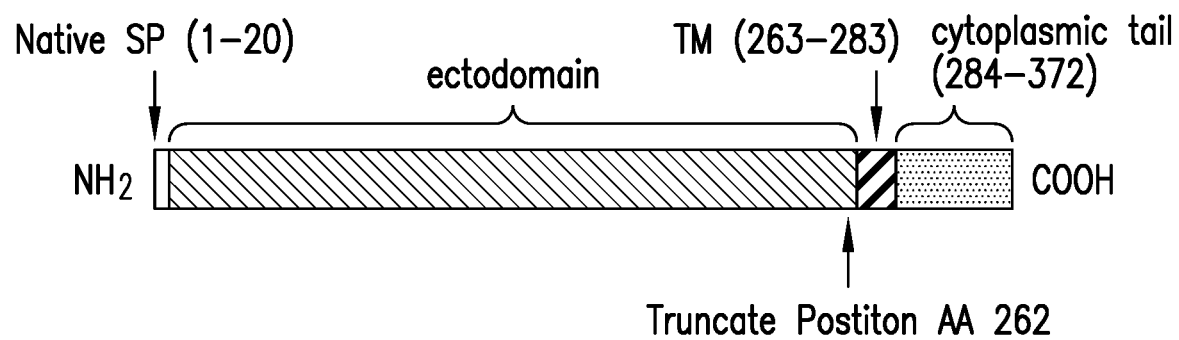
FIG. 1B is a diagram of wild type gI-2 protein (with amino acid numbering in parentheses), noting the location of a truncation position at amino acid 262 for the soluble construct.
Figure 2A:
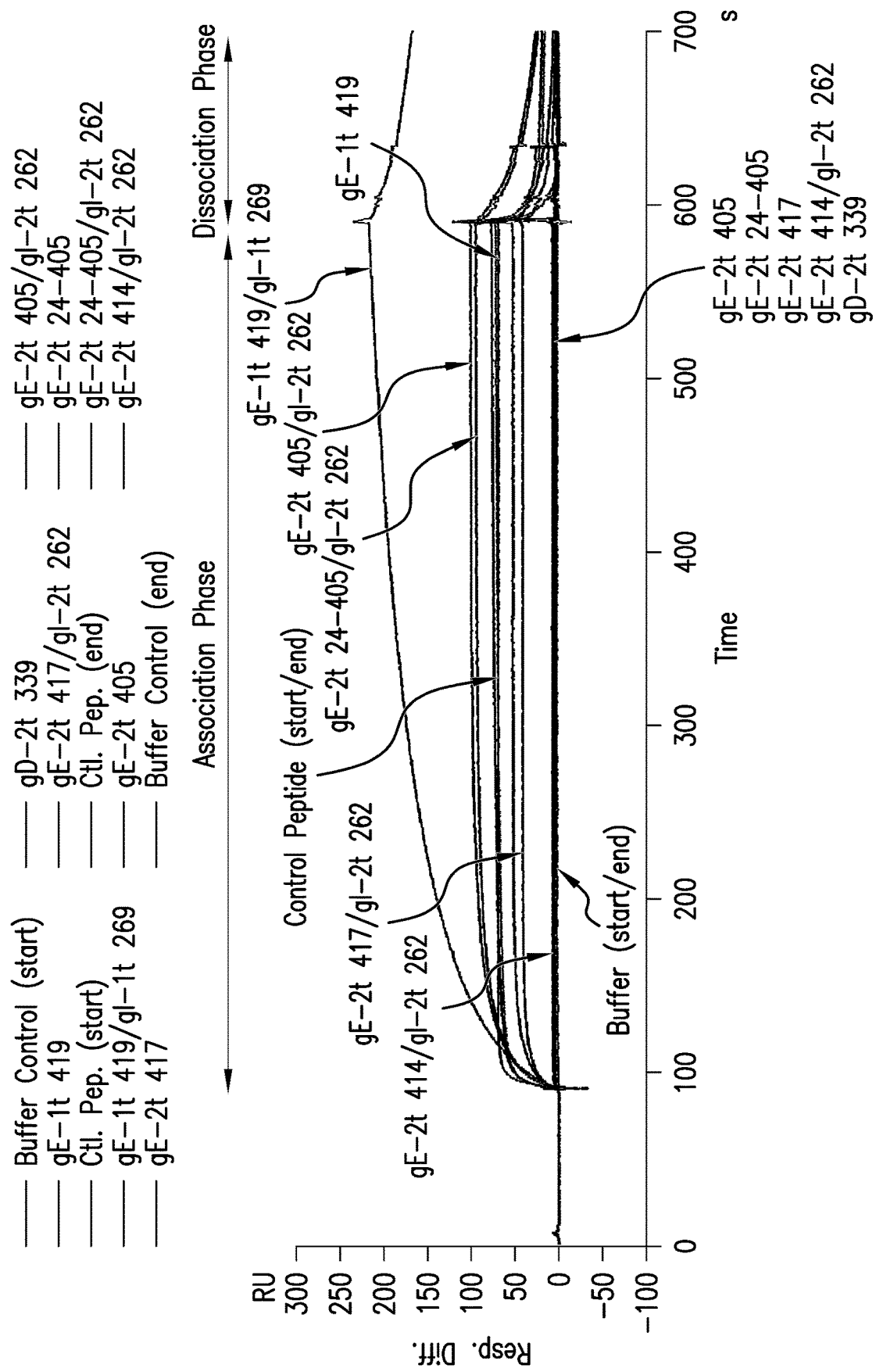
FIG. 2A is a graph of association of various gE monomers and gE/gI heterodimers to human IgG Fc.
Figure 2B:
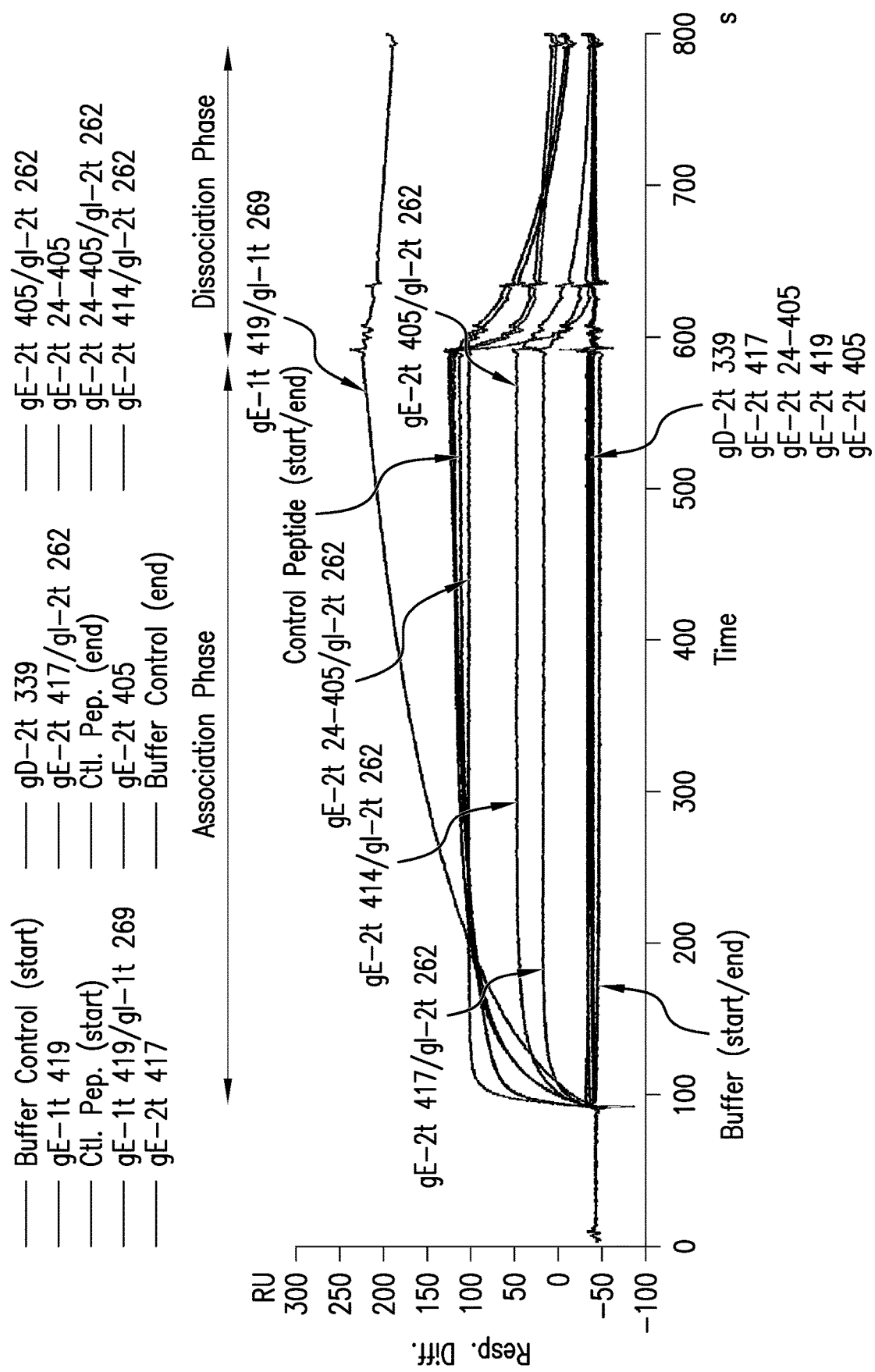
FIG. 2B is a graph of association of various gE monomers and gE/gI heterodimers to a whole molecule human IgG.
Figure 2C:
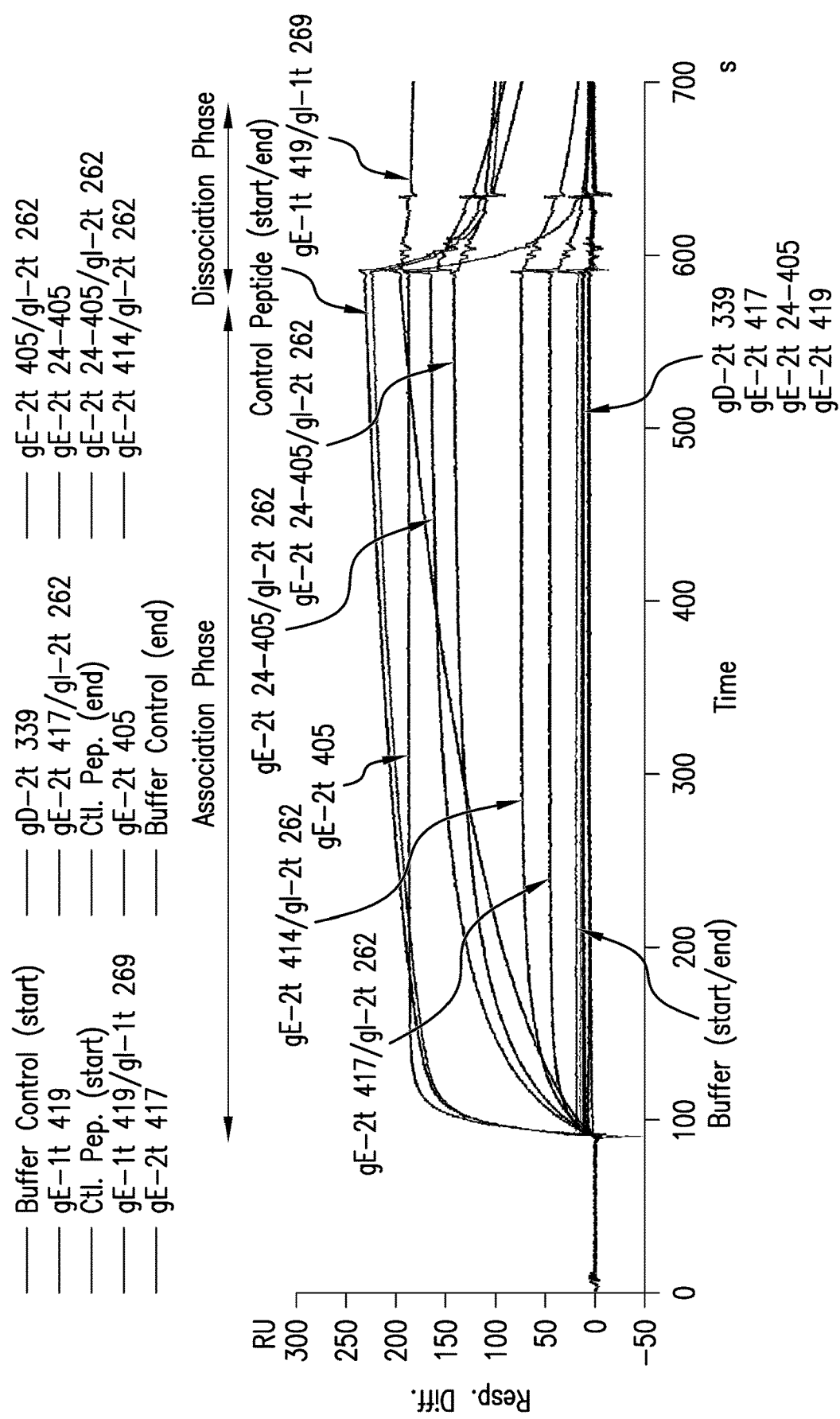
FIG. 2C is a graph of association of various gE monomers and gE/gI heterodimers to a whole molecule rabbit IgG.
Figure 2D:
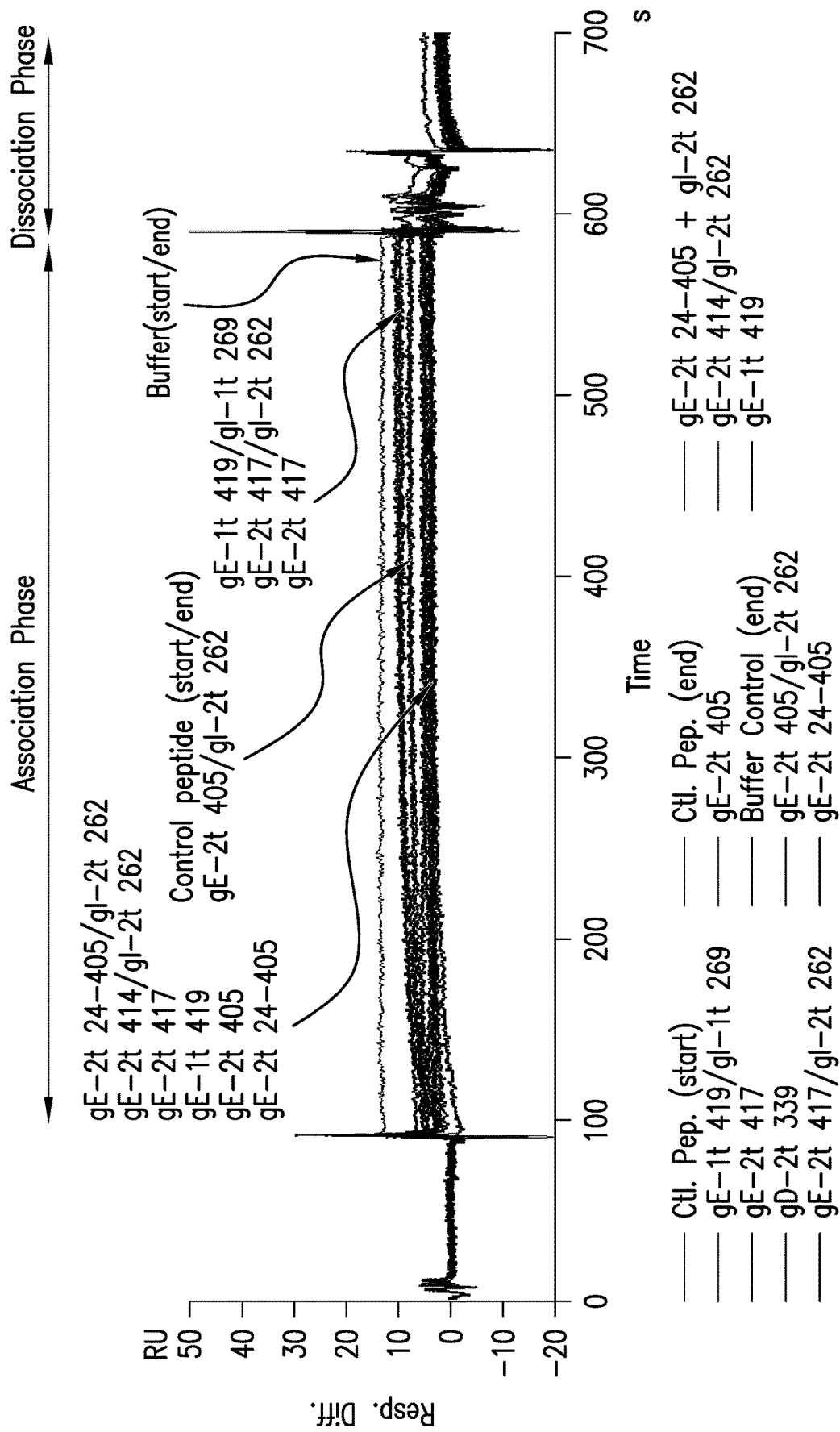
FIG. 2D is a graph of association of various gE monomers and gE/gI heterodimers to a whole molecule mouse IgG.
Figure 2E:
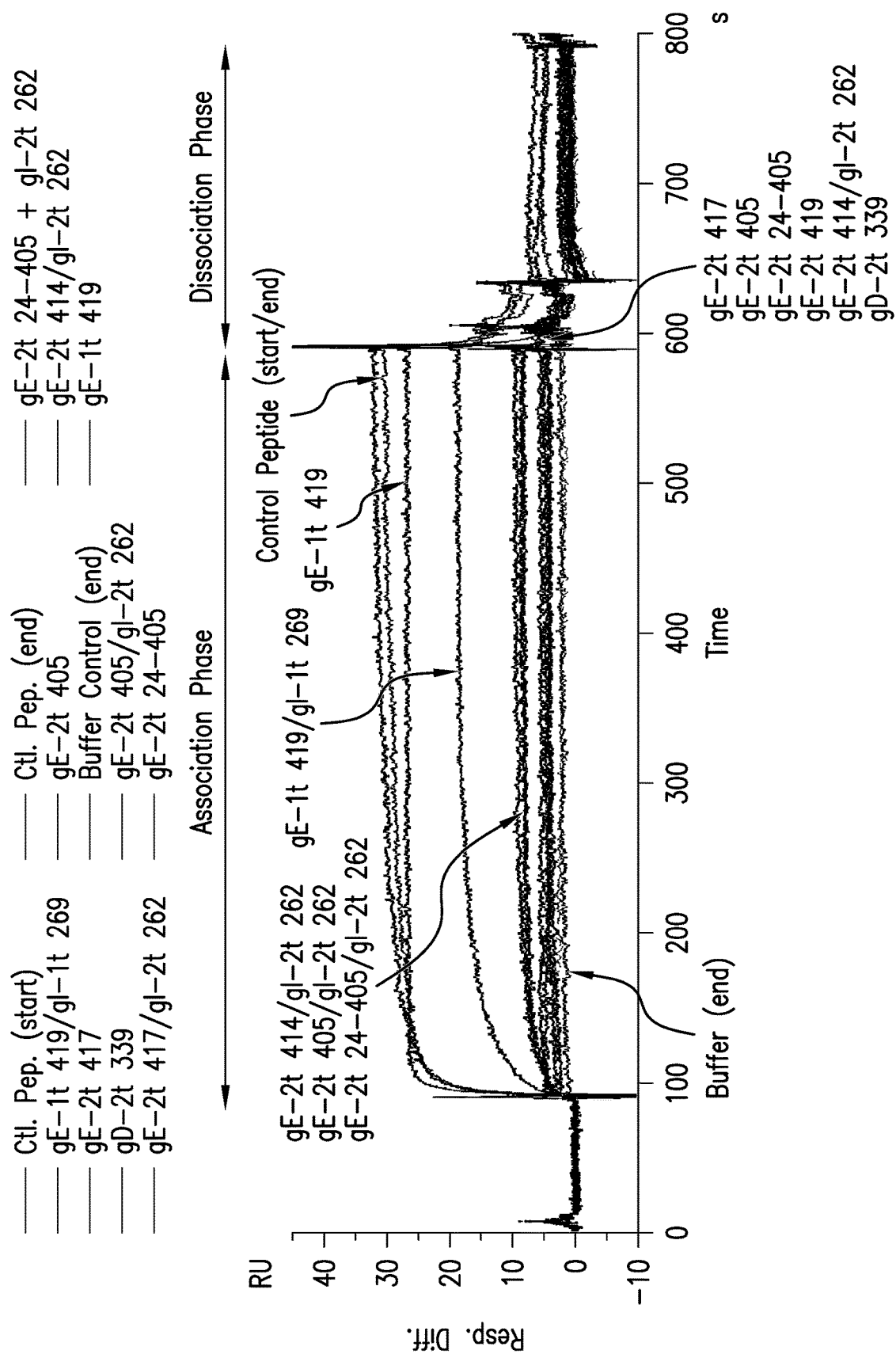
FIG. 2E is a graph of association of various gE monomers and gE/gI heterodimers to a whole molecule guinea pig IgG.
Figure 4A:
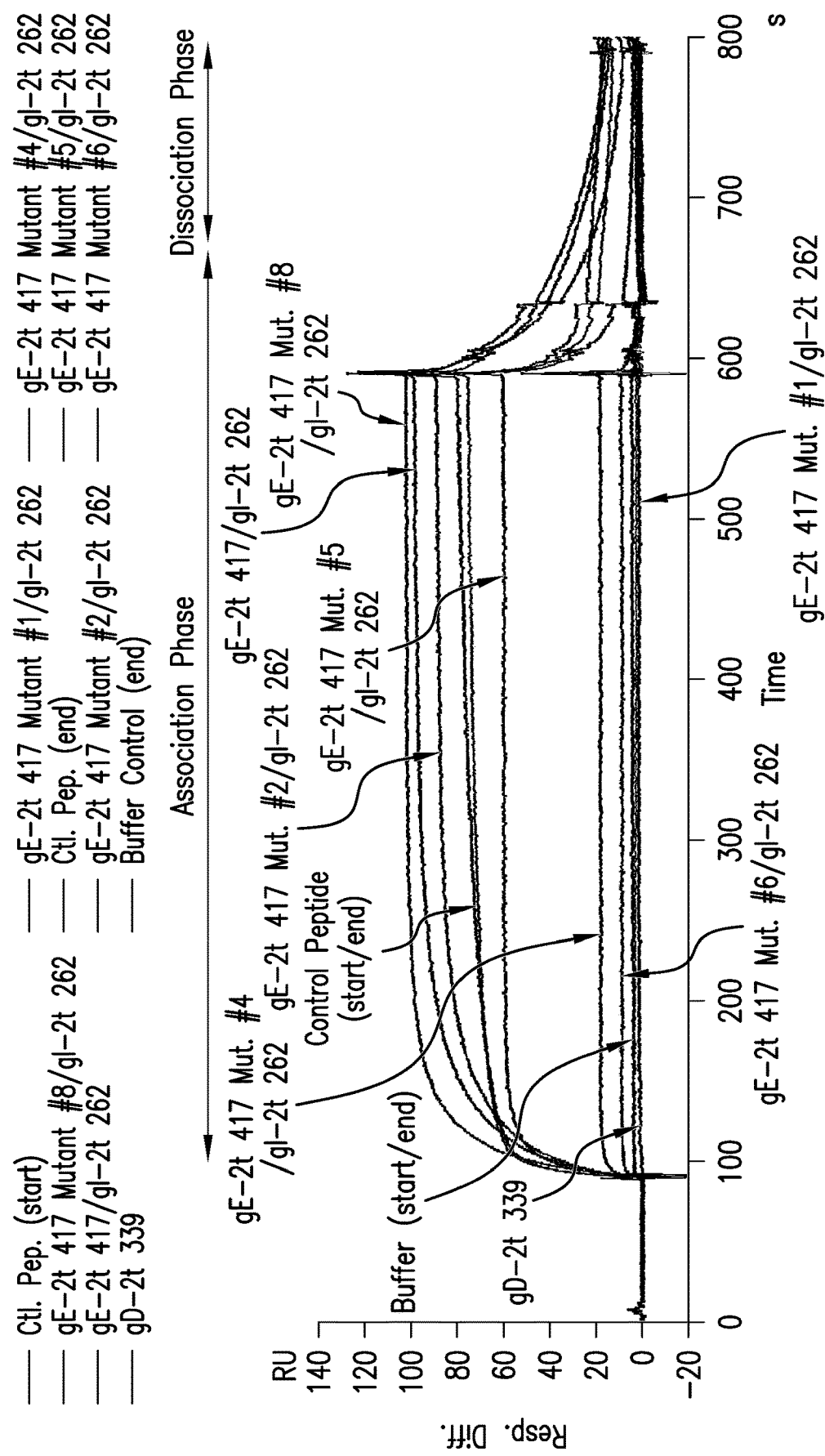
FIG. 4A is a graph of association of gE-2t/gI-2t heterodimer mutants #1-2, 4-6, and 8 with human IgG Fc domain.
Figure 4B:
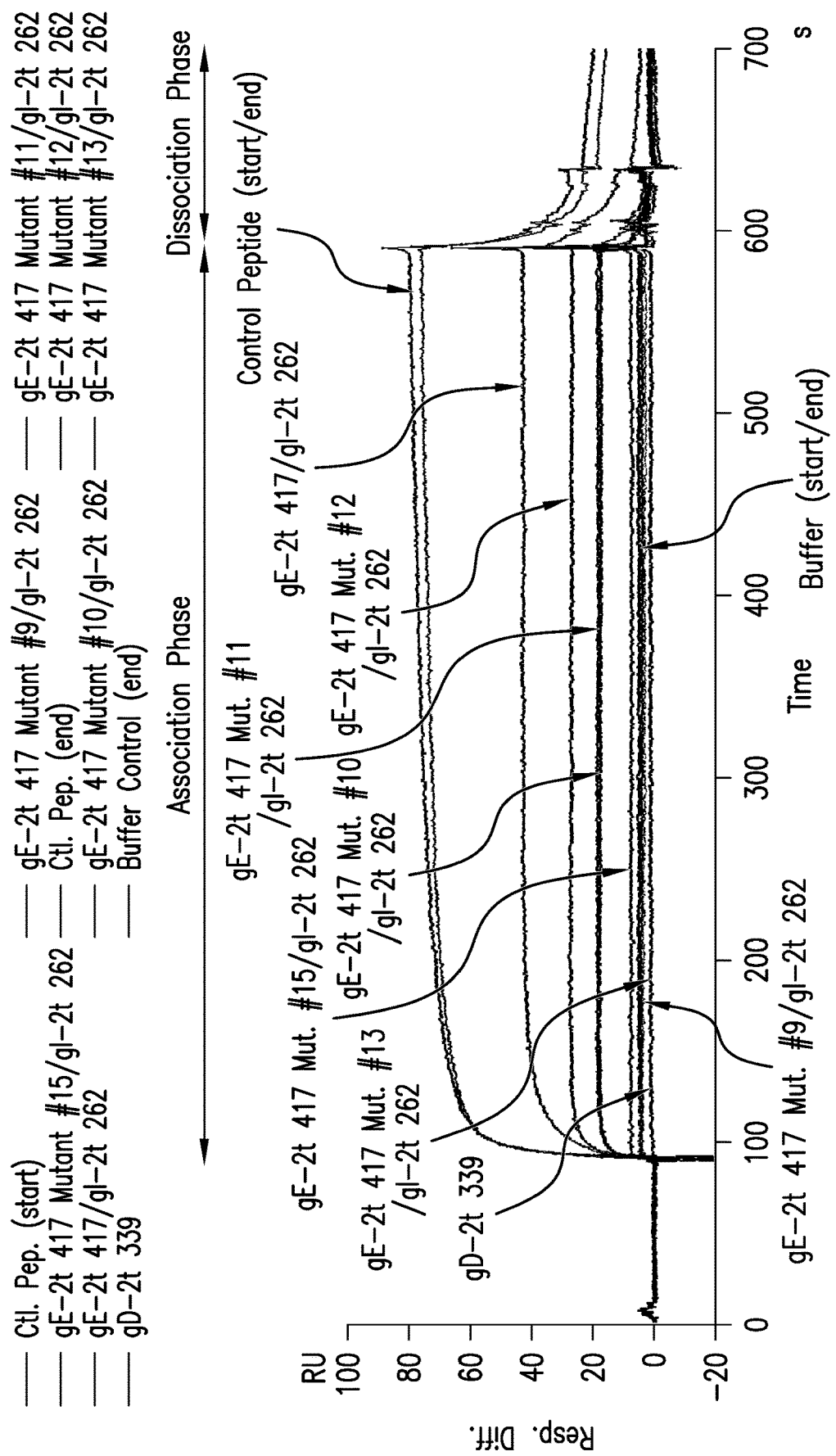
FIG. 4B is a graph of association of gE-2t/gI-2t heterodimer mutants #9-13 and 15 with human IgG Fc domain.
Figure 4C:
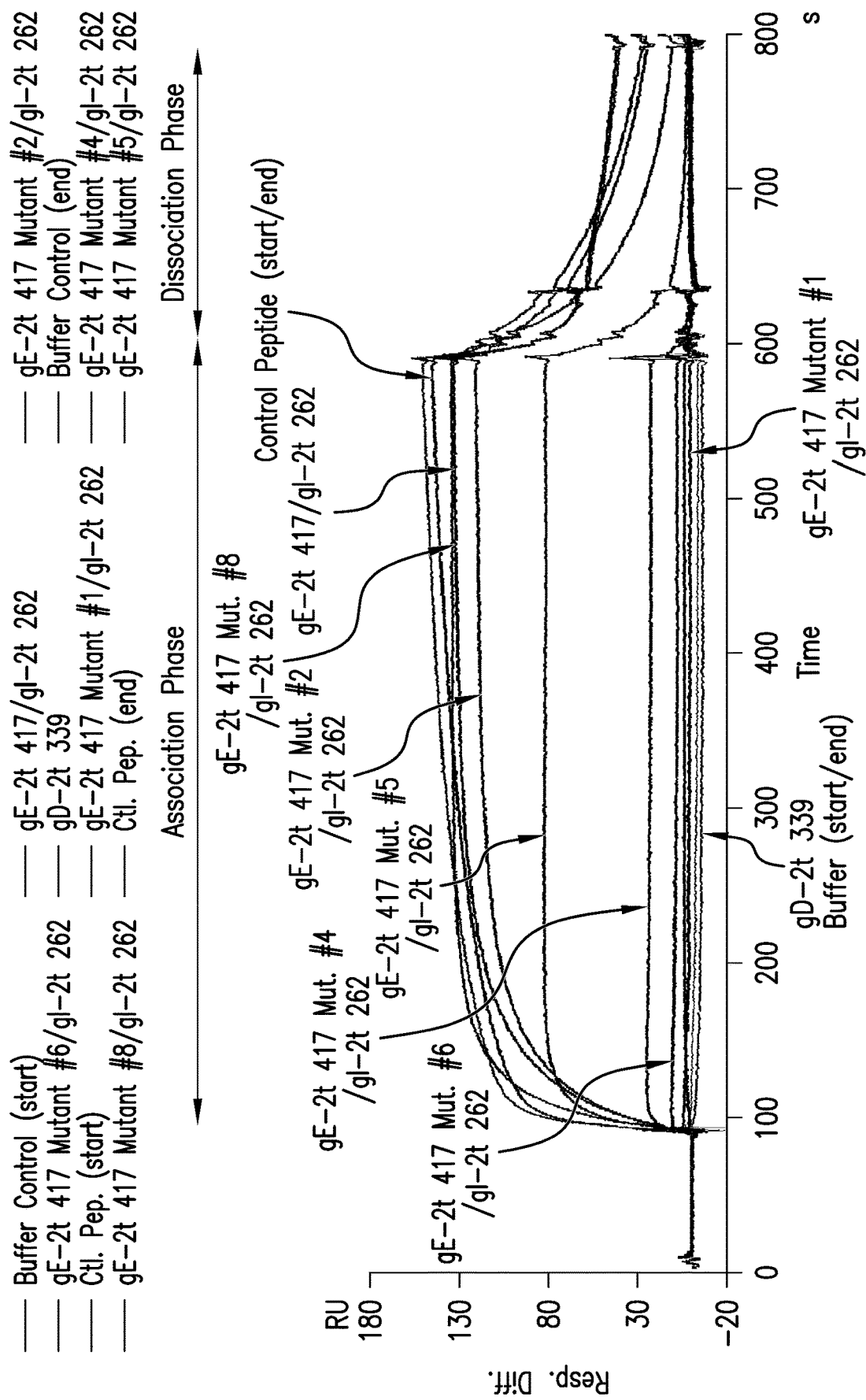
FIG. 4C is a graph of association of gE-2t/gI-2t heterodimer mutants #1-2, 4-6, and 8 with human IgG whole molecule.
Figure 4D:
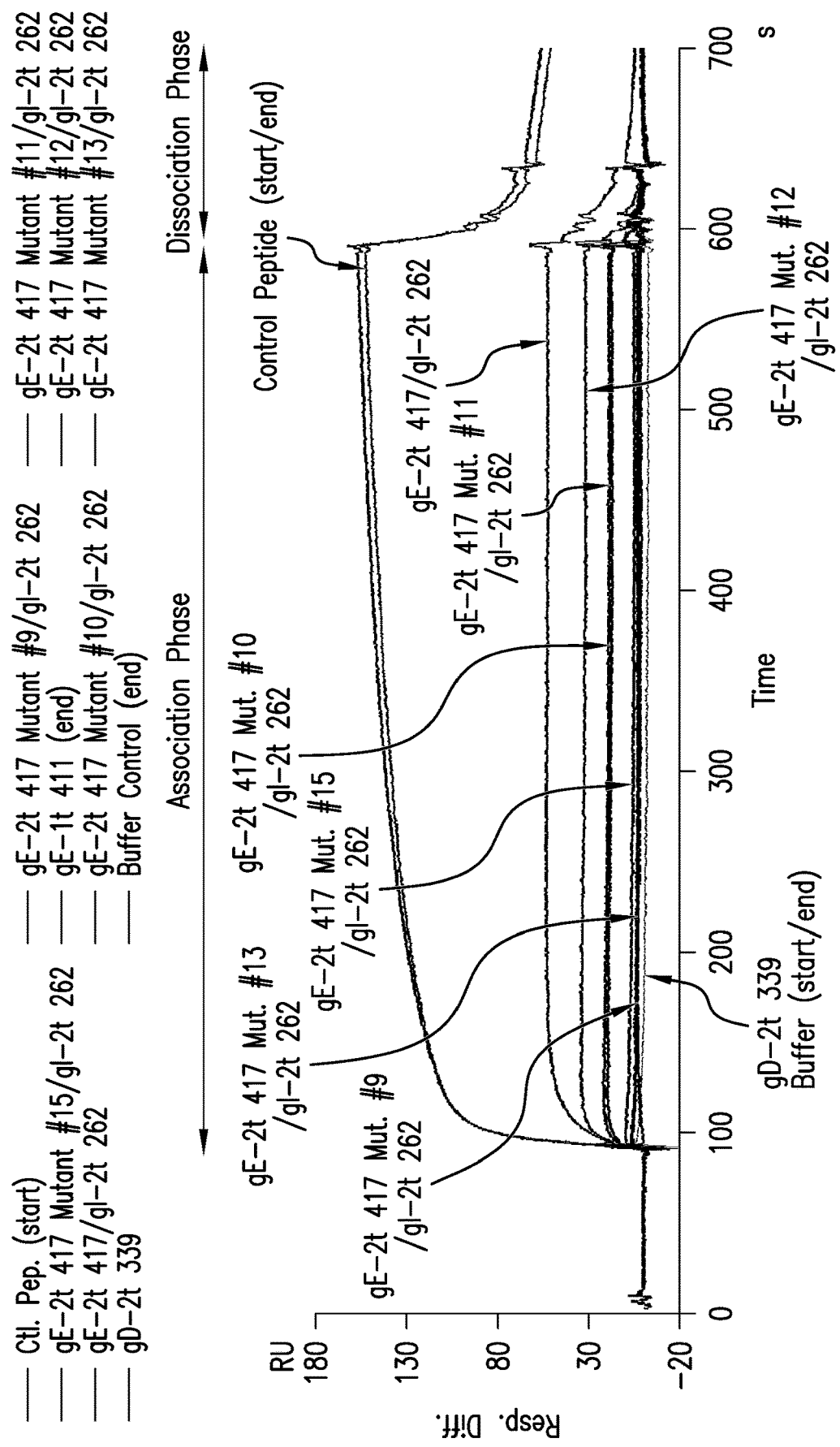
FIG. 4D is a graph of association of gE-2t/gI-2t heterodimer mutants #9-13 and 15 with human IgG whole molecule.
Figure 4E:
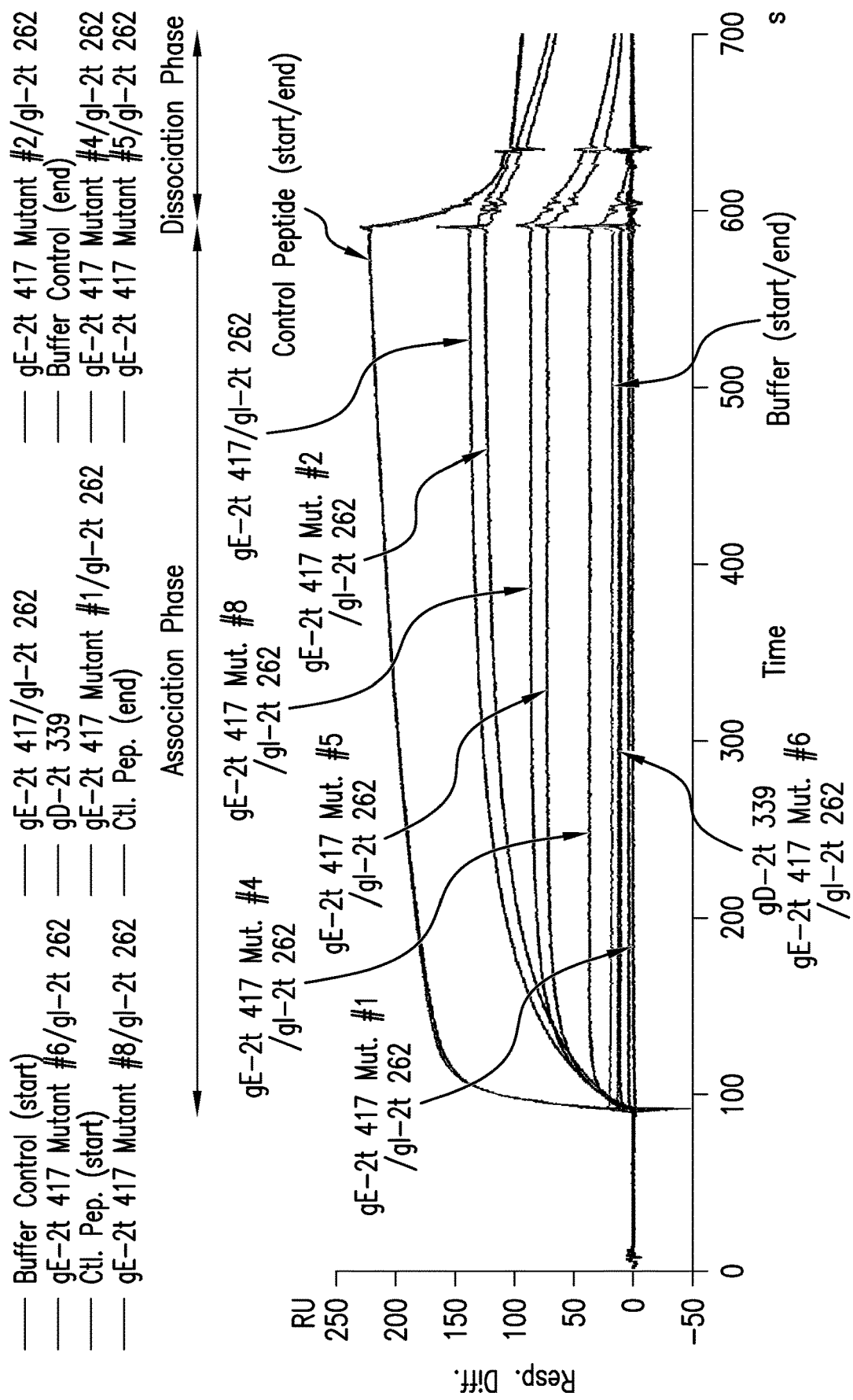
Figure 4F:
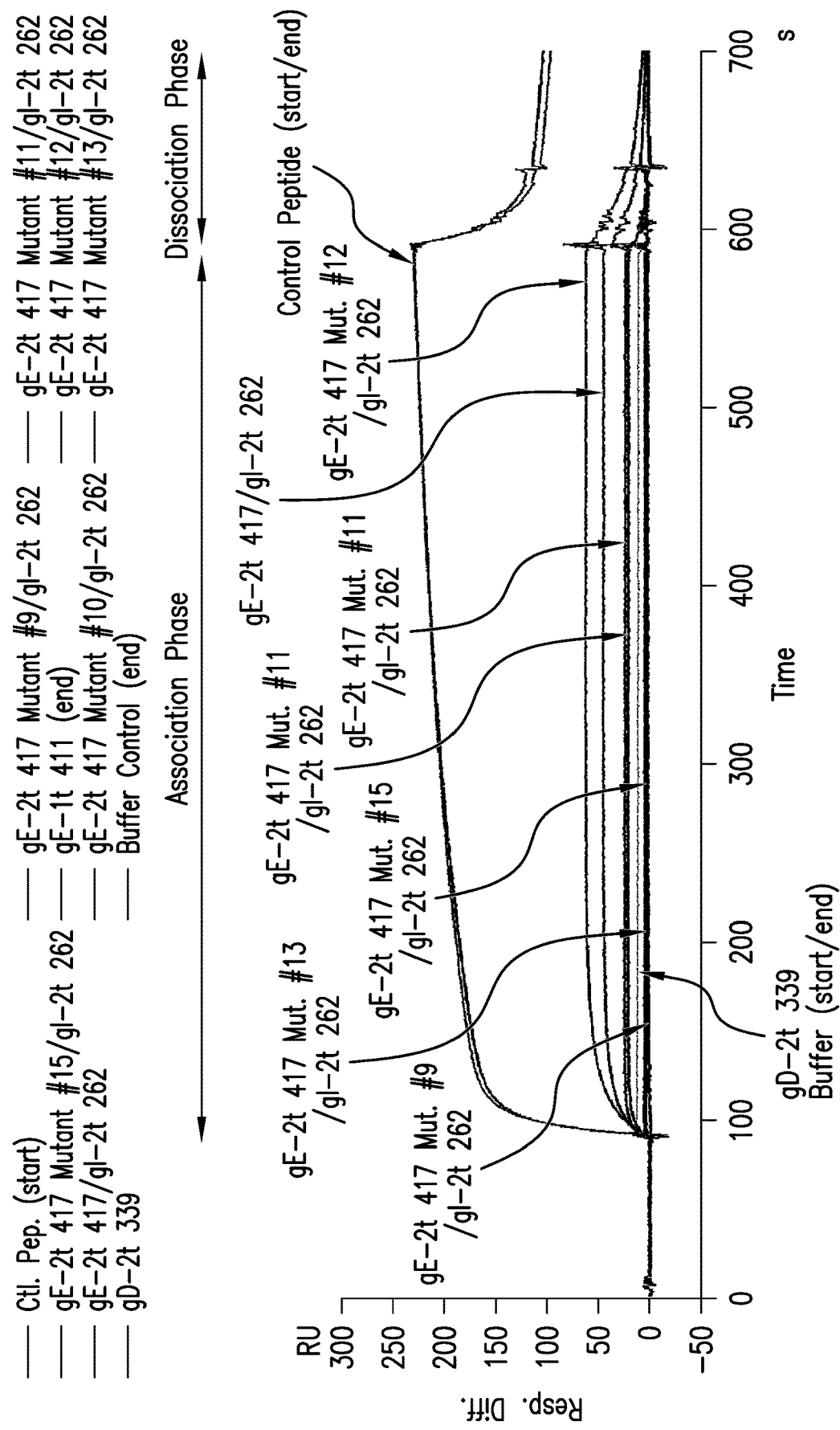
Figure 5A:
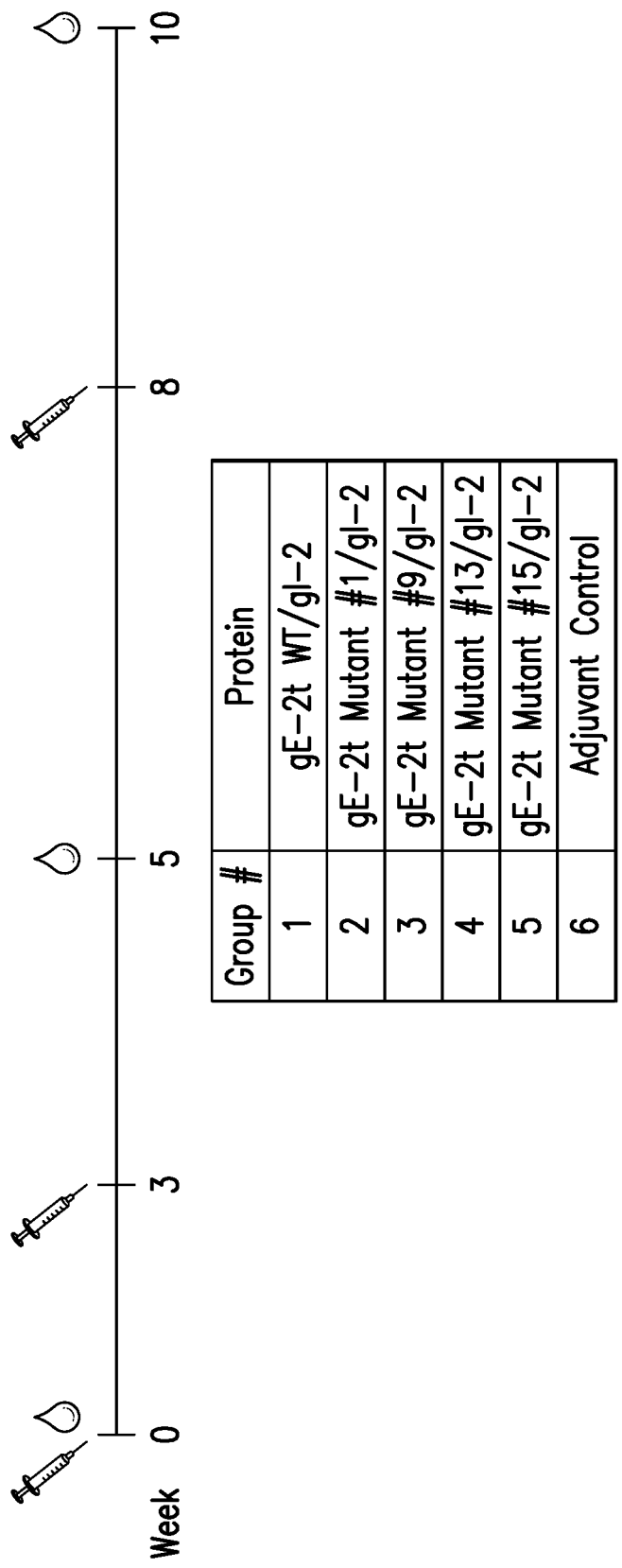
Figure 5B:
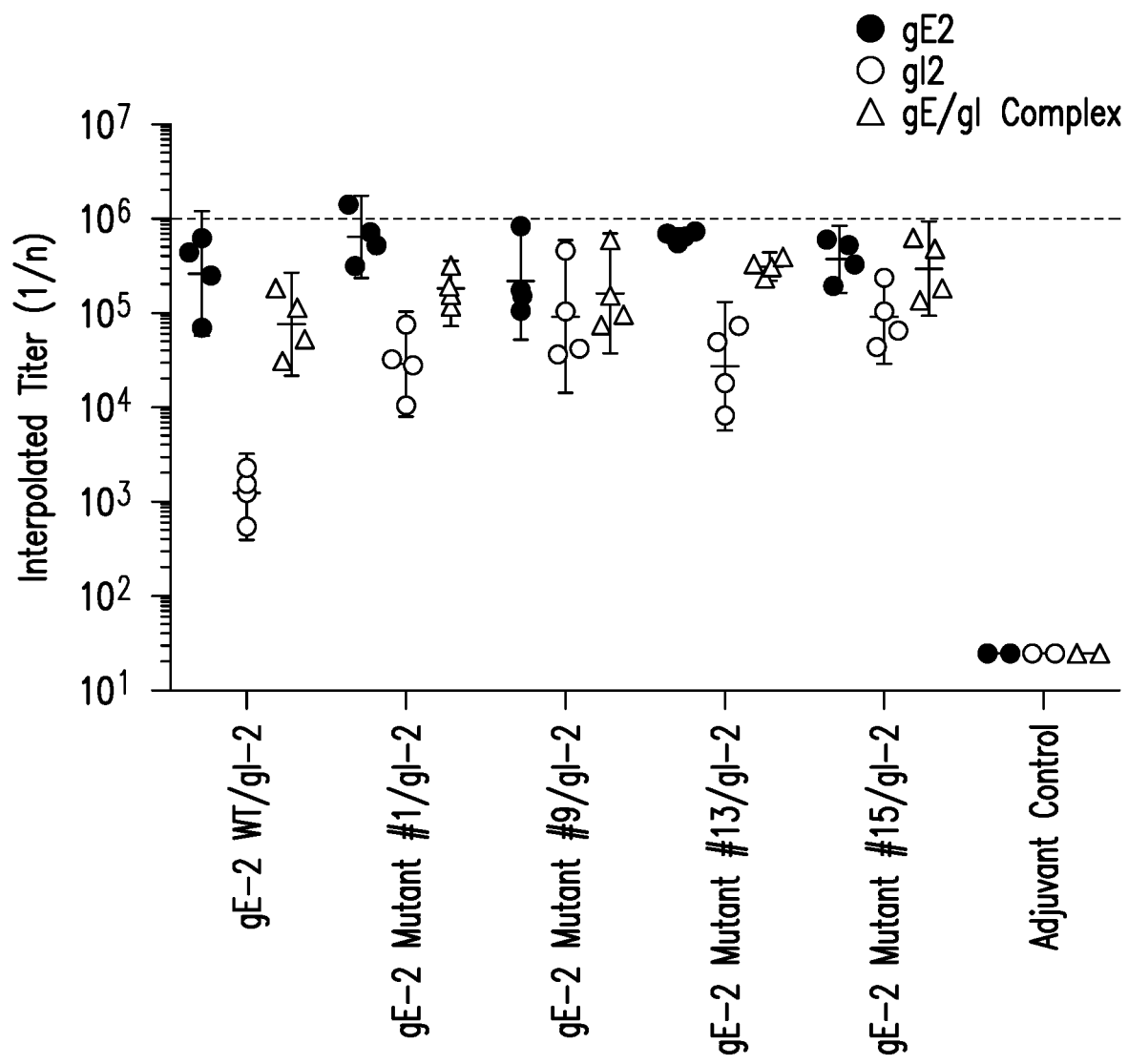
Figure 5C:
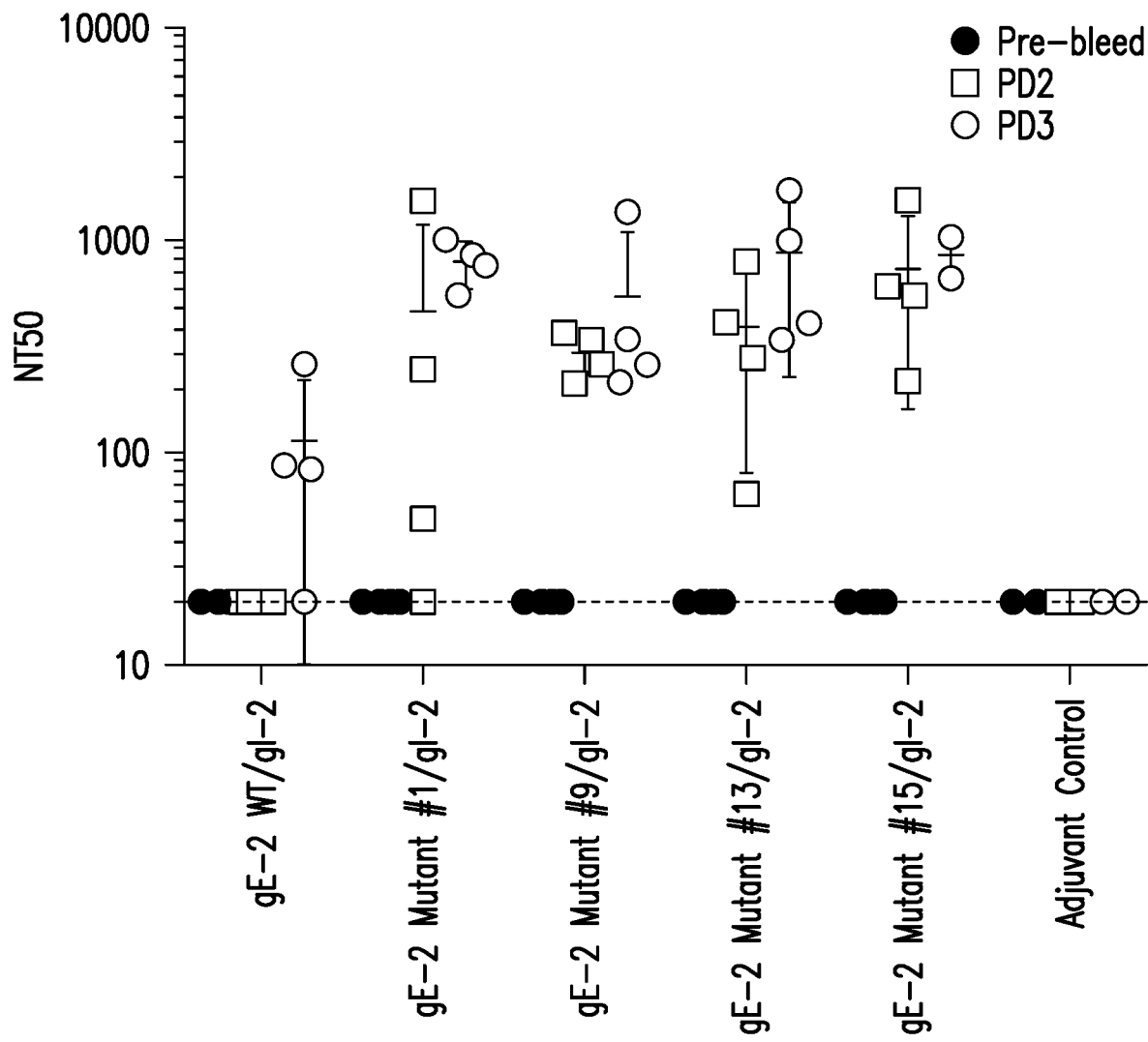

Example 1: Preparation and Binding Analysis of Truncated Glycoprotein E and Glycoprotein I Several soluble gE-2 (from HSV-2) and gE-1 (HSV-1) proteins were constructed by truncation at multiple positions upstream of the transmembrane region of gE, yielding various ectodomain lengths (see Table 1 below for sequences; FIG. 1A is a diagram of wild type and select truncated gE-2 proteins of Table 1; SEQ ID NO: 45 is the nucleic acid sequence of wild type gE-2). Soluble gI-2 (from HSV-2) and gI-1 (HSV-1) was constructed by truncation at amino acid 262 (see Table 1 for sequences; FIG. 1B is a diagram of wild type and truncated gE-2 proteins). A truncated gD-2 protein (gD-2t 339) was also created as an additional control for the Fc association analysis. These soluble ectodomains were fused to a glycine linker and thrombin-cleavable 6-Histidine tag used for purification.

Table 1 below lists the amino acid sequences summarized above. The signal sequence is underlined, and the soluble ectodomain sequence in wild type proteins is bolded.

TABLE 1

Antigenic Polypeptide Sequences

| SEQ ID NO | Name | Sequence |
|---|---|---|
| 1 | Wild Type gE-2 (HSV-2) | MARGAGLVFFVGVWVVSCLAAAPRTSWKRVTSGED VVLLPAPAGPEERTRAHKLLWAAEPLDACGPLRPS WVALWPPRRVLETVVDAACMRAPEPLAIAYSPPFP AGDEGLYSELAWRDRVAVVNESLVIYGALETDSGL YTLSVVGLSDEARQVASVVLVVEPAPVPTPTPDDY DEEDDAGVSERTPVSVPPPTPPRRPPVAPPTHPRV IPEVSHVRGVTVHMETPEAILFAPGETFGTNVSIH AIAHDDGPYAMDVVWMRFDVPSSCAEMRIYEACLY HPQLPECLSPADAPCAVSSWAYRLAVRSYAGCSRT TPPPRCFAEARMEPVPGLAWLASTVNLEFQHASPQ HAGLYLCVVYVDDHIHAWGHMTISTAAQYRNAVVE QHLPQRQPEPVEPTRPHVRAPPPAPSARGPLRLGA VLGAALLLAALGLSAWACMTCWRRSWRAVKSRAS ATGPTYIRVADSELYADWSSDSEGERDGSLWQDPP ERPDSPSTNGSGFEILSPTAPSVYPHSEGRKSRRP LTTFGSGSPGRRHSQASYSSVLW |
| 2 | gE-2t 417 (HSV-2) | MARGAGLVFFVGVWVVSCLAAAPRTSWKRVTSGED VVLLPAPAGPEERTRAHKLLWAAEPLDACGPLRPS WVALWPPRRVLETVVDAACMRAPEPLAIAYSPPFP AGDEGLYSELAWRDRVAVVNESLVIYGALETDSGL YTLSVVGLSDEARQVASVVLVVEPAPVPTPTPDDY DEEDDAGVSERTPVSVPPPTPPRRPPVAPPTHPRV IPEVSHVRGVTVHMETPEAILFAPGETFGTNVSIH AIAHDDGPYAMDVVWMRFDVPSSCAEMRIYEACLY HPQLPECLSPADAPCAVSSWAYRLAVRSYAGCSRT TPPPRCFAEARMEPVPGLAWLASTVNLEFQHASPQ HAGLYLCVVYVDDHIHAWGHMTISTAAQYRNAVVE QHLPQRQPEPVEPTRPHVRAPPPAPSARGPLR |
| 3 | gE-2t 405 (HSV-2) | MARGAGLVFFVGVWVVSCLAAAPRTSWKRVTSGED VVLLPAPAGPEERTRAHKLLWAAEPLDACGPLRPS WVALWPPRRVLETVVDAACMRAPEPLAIAYSPPFP AGDEGLYSELAWRDRVAVVNESLVIYGALETDSGL YTLSVVGLSDEARQVASVVLVVEPAPVPTPTPDDY DEEDDAGVSERTPVSVPPPTPPRRPPVAPPTHPRV IPEVSHVRGVTVHMETPEAILFAPGETFGTNVSIH AIAHDDGPYAMDVVWMRFDVPSSCAEMRIYEACLY HPQLPECLSPADAPCAVSSWAYRLAVRSYAGCSRT TPPPRCFAEARMEPVPGLAWLASTVNLEFQHASPQ HAGLYLCVVYVDDHIHAWGHMTISTAAQYRNAVVE QHLPQRQPEPVEPTRPHVRA |
| 4 | gE-2t 24-405 (HSV-2) | RTSWKRVTSGEDVVLLPAPAGPEERTRAHKLLWAA EPLDACGPLRPSWVALWPPRRVLETVVDAACMRAP EPLAIAYSPPFPAGDEGLYSELAWRDRVAVVNESL VIYGALETDSGLYTLSVVGLSDEARQVASVVLVVE PAPVPTPTPDDYDEEDDAGVSERTPVSVPPPTPPR RPPVAPPTHPRVIPEVSHVRGVTVHMETPEAILFA PGETFGTNVSIHAIAHDDGPYAMDVVWMRFDVPSS CAEMRIYEACLYHPQLPECLSPADAPCAVSSWAYR LAVRSYAGCSRTTPPPRCFAEARMEPVPGLAWLAS TVNLEFQHASPQHAGLYLCVVYVDDHIHAWGHMTI STAAQYRNAVVEQHLPQRQPEPVEPTRPHVRA |
| 5 | gE-2t 414 (HSV-2) | MARGAGLVFFVGVWVVSCLAAAPRTSWKRVTSGED VVLLPAPAGPEERTRAHKLLWAAEPLDACGPLRPS WVALWPPRRVLETVVDAACMRAPEPLAIAYSPPFP AGDEGLYSELAWRDRVAVVNESLVIYGALETDSGL YTLSVVGLSDEARQVASVVLVVEPAPVPTPTPDDY DEEDDAGVSERTPVSVPPPTPPRRPPVAPPTHPRV IPEVSHVRGVTVHMETPEAILFAPGETFGTNVSIH AIAHDDGPYAMDVVWMRFDVPSSCAEMRIYEACLY HPQLPECLSPADAPCAVSSWAYRLAVRSYAGCSRT TPPPRCFAEARMEPVPGLAWLASTVNLEFQHASPQ HAGLYLCVVYVDDHIHAWGHMTISTAAQYRNAVVE QHLPQRQPEPVEPTRPHVRAPPPAPSARG |
| 6 | gE-2t 419 (HSV-2) | MARGAGLVFFVGVWVVSCLAAAPRTSWKRVTSGED VVLLPAPAGPEERTRAHKLLWAAEPLDACGPLRPS WVALWPPRRVLETVVDAACMRAPEPLAIAYSPPFP AGDEGLYSELAWRDRVAVVNESLVIYGALETDSGL YTLSVVGLSDEARQVASVVLVVEPAPVPTPTPDDY DEEDDAGVSERTPVSVPPPTPPRRPPVAPPTHPRV IPEVSHVRGVTVHMETPEAILFAPGETFGTNVSIH AIAHDDGPYAMDVVWMRFDVPSSCAEMRIYEACLY HPQLPECLSPADAPCAVSSWAYRLAVRSYAGCSRT TPPPRCFAEARMEPVPGLAWLASTVNLEFQHASPQ HAGLYLCVVYVDDHIHAWGHMTISTAAQYRNAVVE QHLPQRQPEPVEPTRPHVRAPPPAPSARGPLRLG |
| 7 | gE-1t 419 (HSV-1) | MDRGAVVGFLLGVCVVSCLAGTPKTSWRRVSVGED VSLLPAPGPTGRGPTQKLLWAVEPLDGCPLHPSW VSLMPPKQVPETVVDAACMRAPVPLAMAYAPPAPS ATGGLRTDFVWQERAAVVNRSLVIHGVRETDSGLY TLSVGDIKDPARQVASVVLVVQPAPVPTPPPTPAD YDEDDNDEGEDESLAGTPASGTPRLPPPPAPPRSW PSAPEVSHVRGVTVRMETPEAILFSPGETFSTNVS IHAIAHDDQTYSMDVVWLRFDVPTSCAEMRIYESC LYHPQLPECLSPADAPCAASTWTSRLAVRSYAGCS RTNPPPRCSAEAHMEPVPGLAWQAASVNLEFRDAS PQHSGLYLCVVYVNDHIHAWGHITISTAAQYRNAV VEQPLPQRGADLAEPTHPHVGAPPHAPPTHGALR |

TABLE 1-continued

Antigenic Polypeptide Sequences

| SEQ ID NO | Name | Sequence |
|---|---|---|
| 8 | gD-2t 339 (HSV-2) | MGRLTSGVGTAALLVVAVGLRVVCAKYALADPSLK MADPNRFRGKNLPVLDQLTDPPGVKRVYHIQPSLE DPFQPPSIPITVYYAVLERACRSVLLHAPSEAPQI VRGASDEARKHTYNLTIAWYRMGDNCAIPITVMEY TECPYNKSLGVCPIRTQPRWSYYDSFSAVSEDNLG FLMHAPAFETAGTYLRLVKINDWTEITQFILEHRA RASCKYALPLRIPPAACLTSKAYQQGVTVDSIGML PRFIPENQRTVALYSLKIAGWHGPKPPYTSTLLPP ELSDTTNATQPELVPEDPEDSALLEDPAGTVSSQI PPNWHIPSIQDVAPHHAPAAPSNP |
| 9 | Wild Type gI-2 (HSV-2) | MPGRSLQGLAILGLWVCATGLVVRGPTVSLVSDSL VDAGAVGPQGFVEEDLRVFGELHFVGAQVPHTNYY DGIIELFHYPLGNHCPRVVHVVTLTACPRRPAVAF TLCRSTHHAHSPAYPTLELGLARQPLLRVRTATRD YAGLYVLRVWVGSATNASLFVLGVALSANGTFVYN GSDYGSCDPAQLPFSAPRLGPSSVYTPGASRPTPP RTTTSPSSPRDPTPAPGDTGTPAPASGERAPPNST RSASESRHRLTVAQVIQIAIPASIIAFVFLGSCIC FIHRCQRRYRRPRGQIYNPGGVSCAVNEAAMARLG AELRSHPNTPPKPRRRSSSSTTMPSLTSIAEEESEP GPVVLLSVSPRPRSGPTAPQEV |
| 10 | gI-2t 262 (HSV-2) | MPGRSLQGLAILGLWVCATGLVVRGPTVSLVSDSL VDAGAVGPQGFVEEDLRVFGELHFVGAQVPHTNYY DGIIELFHYPLGNHCPRVVHVVTLTACPRRPAVAF TLCRSTHHAHSPAYPTLELGLARQPLLRVRTATRD YAGLYVLRVWVGSATNASLFVLGVALSANGTFVYN GSDYGSCDPAQLPFSAPRLGPSSVYTPGASRPTPP RTTTSPSSPRDPTPAPGDTGTPAPASGERAPPNST RSASESRHRLTVAQVIQ |
| 11 | gI-1t 269 (HSV-1) | MPCRPLQGLVLVGLWVCATSLVVRGPTVSLVSNSF VDAGALGPDGVVEEDLLILGELRFVGDQVPHTTYY DGVVELWHYPMGHKCPRVVHVVTVTACPRRPAVAF ALCRATDSTHSPAYPTLELNLAQQPLLRVRRATRD YAGVYVLRVWVGDAPNASLFVLGMAIAAEGTLAYN GSAHGSCDPKLLPSSAPRLAPASVYQPAPNPASTP STTTSTPSTTIPAPQASTTPFPTGDPKPQPHGVNH EPPSNATRATRDSRYALTVTQIIQ |

SEC MALS Analysis of Soluble HSV-2 gE/gI Heterodimer Complex

Heterodimer complex formation between soluble gE-2t 417 and gI-2t 262 was analyzed using Size Exclusion Chromatography-Multiple Angle Laser Light Scattering (SEC-MALS). Briefly, 200 µg of protein sample was separated on a Superdex 200 10/300 GL column. The elution was monitored by ultraviolet light ("UV") using an Agilent 1100 diode array "DAD" detector. The refractive index and light scattering were detected using a Dawn II and TRex instrument. Molecular weight calculations were done by ASTRA software V6.1.2.84 using the protein conjugate method. Dn/dc for protein was kept at 0.185 and for carbohydrates at 0.15. A bovine serum albumin "BSA" control experiment was performed before and after the two samples to verify instrument performance. Apparent complex formation was positively verified (data not shown).

Surface Plasmon Resonance Analysis of gE-2 Monomer and gE-2/gI-2 Heterodimers Association with IgG gE monomers and gE/gI heterodimers from HSV-2 and HSV-1 were diluted to 750 µg/ml (except control peptide at 490 µg/ml) and flowed at 30 µl/min over human IgG Fc, and human, rabbit, mouse and guinea pig whole molecule IgG (854, 1348, 1094, 857, and 1143 resonance units (RU) respectively) amine coupled to CM5 chips. The surface was regenerated after each cycle with 0.25 M di-ammonium citrate, pH 5.0. HBS—P buffer (0.01 M HEPES pH 7.4, 0.15 M NaCl, 0.005% v/v Surfactant PS20) and control peptide were each flowed at the start and end of each set of serial flows. In some instances, HBS—P buffer was flowed only at the end of a set of serial flows.

FIGS. 2A-2E are graphs of association between the IgG molecules of various species, and the various gE monomers and gE/gI heterodimers. Table 2 below summarizes the end-point resonance units (RU) of the surface plasmon resonance ("SPR") association phase for each of the gE monomers, gE/gI heterodimers, and control HSV proteins.

TABLE 2

End-point RU for gE monomers and gE/gI heterodimers

| | | | RU Post Association | | | | |
|---|---|---|---|---|---|---|---|
| Protein Construct | Virus Strain | Expression System | Human IgG Fc | Human IgG[1] | Rabbit IgG[1] | Mouse IgG[1] | Guinea Pig IgG[1] |
| Control peptide (start/end) | 17 | Insect | 77/72 | 147/144 | 231/223 | 4/8 | 32/30 |
| gE-2t 417 | 333 | Mammal | 5 | 4 | 11 | 10 | 5 |
| gE-2t 417/ gI-2t 262 | 333/ 333 | Mammal | 41 | 52 | 46 | 10 | 9 |
| gE-2t 24-405 | 2.12 | Mammal | 8 | 7 | 6 | 4 | 5 |
| gE-2t 24-405/ gI-2t 262 | 2.12/ 333 | Mammal | 95 | 136 | 142 | 6 | 8 |
| gE-2t 405 | 2.12 | Mammal | 5 | 8 | 6 | 4 | 5 |
| gE-2t 405/ gI-2t 262 | 2.12/ 333 | Mammal | 100 | 142 | 165 | 8 | 9 |
| gE-2t 414/ gI-2t 262 | HG52/ HG52 | Mammal | 53 | 79 | 75 | 5 | 4 |
| gE-1t 419 | KOS | Mammal | 69 | 127 | 188 | 4 | 27 |
| gE-1t 419/ gI-1t 269 | KOS/ KOS | Mammal | 216 | 232 | 195 | 11 | 19 |

TABLE 2-continued

End-point RU for gE monomers and gE/gI heterodimers

| Protein Construct | Virus Strain | Expression System | RU Post Association | | | | |
|---|---|---|---|---|---|---|---|
| | | | Human IgG Fc | Human IgG[1] | Rabbit IgG[1] | Mouse IgG[1] | Guinea Pig IgG[1] |
| gD-2t 339 HBS-P, pH7.4 (start/end or *end only) | HG52 N/A | Mammal N/A | 4 4/4 | 2 −3/−3 | 11 18/18 | 4 13* | 2 2* |

[1]Whole Molecule gE-1 associated with IgG Fc in both monomer and gE-1/gI-1 heterodimer form. However, gE-2 shows no association with IgG Fc in monomer form, instead requiring its heterodimer gE-2/gI-2 form for association. gE-2 and gE-2/gI-2 association appears to be stronger (highest RU amplitude) with human and rabbit IgG and less strong (6-fold lower amplitude) with guinea pig IgG. Heterodimer gE-2t 414/gI-2t 262 from strain HG52 showed no association with guinea pig IgG, despite showing association to IgG from human and rabbit. No definitive association by any gE form was observed with mouse IgG.

Example 2: GE-2 Fc Binding Mutant Design and Fc Binding

A panel of HSV-2 gE mutants was designed, targeting two primary regions on gE-2 hypothesized to be at the gE2: Fc binding interface.

Alignment of the ectodomains of gE-1 and gE-2 revealed a 71.7% identity. Based on the gE-1: Fc co-crystal structure by Sprague et al. PLOS Biol. 2006 June; 4 (6): e148 (incorporated by reference herein), mutagenesis efforts of gE-2 focused on the surface-exposed loop at A337-V340 due to the analogous gE-1 loop having significant binding interactions with Fc. Table 3 summarizes the nine mutant gE-2 proteins created for amino acids 337-340 of gE-2t 417. SEQ ID NO: 46 (AARAA) is the amino acid sequence for residues 337-341 inserted at wild type position 337 for gE-2t 417 Mutant #1.

TABLE 3

Summary of gE-2 mutant constructs at AA 337-340

| SEQ ID NO | Construct | Amino Acid Number (based on gE-2 Sequence) | | | | Mutation Type | Obtained Protein Expression (Y/N) |
|---|---|---|---|---|---|---|---|
| | | 337 | 338 | 339 | 340 | | |
| 1 | gE-2t 417 WT | A | S | T | V | N/A | Y |
| 12 | gE-2t 417 Mutant #1 | AARAA | S | T | V | Insertion | Y |
| 13 | gE-2t 417 Mutant #2 | A | G | T | V | Substitution | Y |
| 14 | gE-2t 417 Mutant #3 | A | — | T | V | Deletion | N |
| 15 | gE-2t 417 Mutant #4 | A | S | G | V | Substitution | Y |
| 16 | gE-2t 417 Mutant #5 | A | S | — | V | Deletion | Y |
| 17 | gE-2t 417 Mutant #6 | A | G | G | V | Substitution | Y |
| 18 | gE-2t 417 Mutant #7 | A | — | — | V | Deletion | N |
| 19 | gE-2t 417 Mutant #8 | G | G | G | V | Substitution | Y |
| 20 | gE-2t 417 Mutant #9 | A | G | G | G | Substitution | Y |

A second series of mutations in gE-2 were made at positions H245, P317, and P319 owing to the gE-1 equivalent amino acids' proximities, within 5 Å, of Fc in the co-crystal structure. Table 4 summarizes the amino acid mutations for the seven gE-2t 417 mutant constructs.

TABLE 4

Summary of gE-2 mutant constructs at AA 245, 317, and 319

| SEQ ID NO | Construct | Amino Acid Number (based on gE-2 Sequence) 245 | 317 | 319 | Mutation Type | Obtained Protein Expression (Y/N) |
|---|---|---|---|---|---|---|
| 1 | gE-2t 417 WT | H | P | P | N/A | Y |
| 21 | gE-2t 417 Mutant #10 | G | P | P | Substitution | Y |
| 22 | gE-2t 417 Mutant #11 | H | G | P | Substitution | Y |
| 23 | gE-2t 417 Mutant #12 | H | P | G | Substitution | Y |
| 24 | gE-2t 417 Mutant #13 | G | G | P | Substitution | Y |
| 25 | gE-2t 417 Mutant #14 | G | P | G | Substitution | N |
| 26 | gE-2t 417 Mutant #15 | H | G | G | Substitution | Y |
| 27 | gE-2t 417 Mutant #16 | G | G | G | Substitution | N |

Table 5 below provides the full amino acid sequences for the mutant gE sequences listed in Tables 3 and 4 above. Substituted amino acids are underlined and deleted amino acid positions are marked by an underscore.

TABLE 5 gE Mutant Construct Polypeptides

| SEQ ID NO | Name | Sequence |
|---|---|---|
| 12 | gE-2t 417 Mutant # 1 | MARGAGLVFFVGVWVVSCLAAAPRTSWKRVTSGEDVVLLPAPAGPEERTRAH<br>KLLWAAEPLDACGPLRPSWVALWPPRRVLETVVDAACMRAPEPLAIAYSPPFPA<br>GDEGLYSELAWRDRVAVVNESLVIYGALETDSGLYTLSVVGLSDEARQVASVV<br>LVVEPAPVPTPTPDDYDEEDDAGVSERTPVSVPPPTPPRRPPVAPPTHPRVIPEVS<br>HVRGVTVHMETPEAILFAPGETFGTNVSIHAIAHDDGPYAMDVVWMRFDVPSS<br>CAEMRIYEACLYHPQLPECLSPADAPCAVSSWAYRLAVRSYAGCSRTTPPPRCF<br>AEARMEPVPGLAWLAARAASTVNLEFQHASPQHAGLYLCVVYVDDHIHAWGH<br>MTISTAAQYRNAVVEQHLPQRQPEPVEPTRPHVRAPPPAPSARGPLR |
| 13 | gE-2t 417 Mutant # 2 | MARGAGLVFFVGVWVVSCLAAAPRTSWKRVTSGEDVVLLPAPAGPEERTRAH<br>KLLWAAEPLDACGPLRPSWVALWPPRRVLETVVDAACMRAPEPLAIAYSPPFPA<br>GDEGLYSELAWRDRVAVVNESLVIYGALETDSGLYTLSVVGLSDEARQVASVV<br>LVVEPAPVPTPTPDDYDEEDDAGVSERTPVSVPPPTPPRRPPVAPPTHPRVIPEVS<br>HVRGVTVHMETPEAILFAPGETFGTNVSIHAIAHDDGPYAMDVVWMRFDVPSS<br>CAEMRIYEACLYHPQLPECLSPADAPCAVSSWAYRLAVRSYAGCSRTTPPPRCF<br>AEARMEPVPGLAWLAGTVNLEFQHASPQHAGLYLCVVYVDDHIHAWGHMTIS<br>TAAQYRNAVVEQHLPQRQPEPVEPTRPHVRAPPPAPSARGPLR |
| 14 | gE-2t 417 Mutant # 3 | MARGAGLVFFVGVWVVSCLAAAPRTSWKRVTSGEDVVLLPAPAGPEERTRAH<br>KLLWAAEPLDACGPLRPSWVALWPPRRVLETVVDAACMRAPEPLAIAYSPPFPA<br>GDEGLYSELAWRDRVAVVNESLVIYGALETDSGLYTLSVVGLSDEARQVASVV<br>LVVEPAPVPTPTPDDYDEEDDAGVSERTPVSVPPPTPPRRPPVAPPTHPRVIPEVS<br>HVRGVTVHMETPEAILFAPGETFGTNVSIHAIAHDDGPYAMDVVWMRFDVPSS<br>CAEMRIYEACLYHPQLPECLSPADAPCAVSSWAYRLAVRSYAGCSRTTPPPRCF<br>AEARMEPVPGLAWLA_TVNLEFQHASPQHAGLYLCVVYVDDHIHAWGHMTIST<br>AAQYRNAVVEQHLPQRQPEPVEPTRPHVRAPPPAPSARGPLR |
| 15 | gE-2t 417 Mutant # 4 | MARGAGLVFFVGVWVVSCLAAAPRTSWKRVTSGEDVVLLPAPAGPEERTRAH<br>KLLWAAEPLDACGPLRPSWVALWPPRRVLETVVDAACMRAPEPLAIAYSPPFPA<br>GDEGLYSELAWRDRVAVVNESLVIYGALETDSGLYTLSVVGLSDEARQVASVV<br>LVVEPAPVPTPTPDDYDEEDDAGVSERTPVSVPPPTPPRRPPVAPPTHPRVIPEVS<br>HVRGVTVHMETPEAILFAPGETFGTNVSIHAIAHDDGPYAMDVVWMRFDVPSS<br>CAEMRIYEACLYHPQLPECLSPADAPCAVSSWAYRLAVRSYAGCSRTTPPPRCF<br>AEARMEPVPGLAWLASGVNLEFQHASPQHAGLYLCVVYVDDHIHAWGHMTIS<br>TAAQYRNAVVEQHLPQRQPEPVEPTRPHVRAPPPAPSARGPLR |
| 16 | gE-2t 417 Mutant # 5 | MARGAGLVFFVGVWVVSCLAAAPRTSWKRVTSGEDVVLLPAPAGPEERTRAH<br>KLLWAAEPLDACGPLRPSWVALWPPRRVLETVVDAACMRAPEPLAIAYSPPFPA<br>GDEGLYSELAWRDRVAVVNESLVIYGALETDSGLYTLSVVGLSDEARQVASVV<br>LVVEPAPVPTPTPDDYDEEDDAGVSERTPVSVPPPTPPRRPPVAPPTHPRVIPEVS |

TABLE 5-continued gE Mutant Construct Polypeptides

| SEQ ID NO | Name | Sequence |
|---|---|---|
| | | HVRGVTVHMETPEAILFAPGETFGTNVSIHAIAHDDGPYAMDVVWMRFDVPSS<br>CAEMRIYEACLYHPQLPECLSPADAPCAVSSWAYRLAVRSYAGCSRTTPPPRCF<br>AEARMEPVPGLAWLAS_VNLEFQHASPQHAGLYLCVVYVDDHIHAWGHMTIST<br>AAQYRNAVVEQHLPQRQPEPVEPTRPHVRAPPPAPSARGPLR |
| 17 | gE-2t 417 Mutant # 6 | MARGAGLVFFVGVWVVSCLAAAPRTSWKRVTSGEDVVLLPAPAGPEERTRAH<br>KLLWAAEPLDACGPLRPSWVALWPPRRVLETVVDAACMRAPEPLAIAYSPPFPA<br>GDEGLYSELAWRDRVAVVNESLVIYGALETDSGLYTLSVVGLSDEARQVASVV<br>LVVEPAPVPTPTPDDYDEEDDAGVSERTPVSVPPPTPPRRPPVAPPTHPRVIPEVS<br>HVRGVTVHMETPEAILFAPGETFGTNVSIHAIAHDDGPYAMDVVWMRFDVPSS<br>CAEMRIYEACLYHPQLPECLSPADAPCAVSSWAYRLAVRSYAGCSRTTPPPRCF<br>AEARMEPVPGLAWLAGGVNLEFQHASPQHAGLYLCVVYVDDHIHAWGHMTIS<br>TAAQYRNAVVEQHLPQRQPEPVEPTRPHVRAPPPAPSARGPLR |
| 18 | gE-2t 417 Mutant # 7 | MARGAGLVFFVGVWVVSCLAAAPRTSWKRVTSGEDVVLLPAPAGPEERTRAH<br>KLLWAAEPLDACGPLRPSWVALWPPRRVLETVVDAACMRAPEPLAIAYSPPFPA<br>GDEGLYSELAWRDRVAVVNESLVIYGALETDSGLYTLSVVGLSDEARQVASVV<br>LVVEPAPVPTPTPDDYDEEDDAGVSERTPVSVPPPTPPRRPPVAPPTHPRVIPEVS<br>HVRGVTVHMETPEAILFAPGETFGTNVSIHAIAHDDGPYAMDVVWMRFDVPSS<br>CAEMRIYEACLYHPQLPECLSPADAPCAVSSWAYRLAVRSYAGCSRTTPPPRCF<br>AEARMEPVPGLAWLA_VNLEFQHASPQHAGLYLCVVYVDDHIHAWGHMTIST<br>AAQYRNAVVEQHLPQRQPEPVEPTRPHVRAPPPAPSARGPLR |
| 19 | gE-2t 417 Mutant # 8 | MARGAGLVFFVGVWVVSCLAAAPRTSWKRVTSGEDVVLLPAPAGPEERTRAH<br>KLLWAAEPLDACGPLRPSWVALWPPRRVLETVVDAACMRAPEPLAIAYSPPFPA<br>GDEGLYSELAWRDRVAVVNESLVIYGALETDSGLYTLSVVGLSDEARQVASVV<br>LVVEPAPVPTPTPDDYDEEDDAGVSERTPVSVPPPTPPRRPPVAPPTHPRVIPEVS<br>HVRGVTVHMETPEAILFAPGETFGTNVSIHAIAHDDGPYAMDVVWMRFDVPSS<br>CAEMRIYEACLYHPQLPECLSPADAPCAVSSWAYRLAVRSYAGCSRTTPPPRCF<br>AEARMEPVPGLAWLGGGVNLEFQHASPQHAGLYLCVVYVDDHIHAWGHMTIS<br>TAAQYRNAVVEQHLPQRQPEPVEPTRPHVRAPPPAPSARGPLR |
| 20 | gE-2t 417 Mutant # 9 | MARGAGLVFFVGVWVVSCLAAAPRTSWKRVTSGEDVVLLPAPAGPEERTRAH<br>KLLWAAEPLDACGPLRPSWVALWPPRRVLETVVDAACMRAPEPLAIAYSPPFPA<br>GDEGLYSELAWRDRVAVVNESLVIYGALETDSGLYTLSVVGLSDEARQVASVV<br>LVVEPAPVPTPTPDDYDEEDDAGVSERTPVSVPPPTPPRRPPVAPPTHPRVIPEVS<br>HVRGVTVHMETPEAILFAPGETFGTNVSIHAIAHDDGPYAMDVVWMRFDVPSS<br>CAEMRIYEACLYHPQLPECLSPADAPCAVSSWAYRLAVRSYAGCSRTTPPPRCF<br>AEARMEPVPGLAWLAGGVNLEFQHASPQHAGLYLCVVYVDDHIHAWGHMTIS<br>TAAQYRNAVVEQHLPQRQPEPVEPTRPHVRAPPPAPSARGPLR |
| 21 | gE-2t 417 Mutant # 10 | MARGAGLVFFVGVWVVSCLAAAPRTSWKRVTSGEDVVLLPAPAGPEERTRAH<br>KLLWAAEPLDACGPLRPSWVALWPPRRVLETVVDAACMRAPEPLAIAYSPPFPA<br>GDEGLYSELAWRDRVAVVNESLVIYGALETDSGLYTLSVVGLSDEARQVASVV<br>LVVEPAPVPTPTPDDYDEEDDAGVSERTPVSVPPPTPPRRPPVAPPTHPRVIPEVS<br>HVRGVTVHMETPEAILFAPGETFGTNVSIGAIAHDDGPYAMDVVWMRFDVPSS<br>CAEMRIYEACLYHPQLPECLSPADAPCAVSSWAYRLAVRSYAGCSRTTPPPRCF<br>AEARMEPVPGLAWLASTVNLEFQHASPQHAGLYLCVVYVDDHIHAWGHMTIS<br>TAAQYRNAVVEQHLPQRQPEPVEPTRPHVRAPPPAPSARGPLR |
| 22 | gE-2t 417 Mutant # 11 | MARGAGLVFFVGVWVVSCLAAAPRTSWKRVTSGEDVVLLPAPAGPEERTRAH<br>KLLWAAEPLDACGPLRPSWVALWPPRRVLETVVDAACMRAPEPLAIAYSPPFPA<br>GDEGLYSELAWRDRVAVVNESLVIYGALETDSGLYTLSVVGLSDEARQVASVV<br>LVVEPAPVPTPTPDDYDEEDDAGVSERTPVSVPPPTPPRRPPVAPPTHPRVIPEVS<br>HVRGVTVHMETPEAILFAPGETFGTNVSIHAIAHDDGPYAMDVVWMRFDVPSS<br>CAEMRIYEACLYHPQLPECLSPADAPCAVSSWAYRLAVRSYAGCSRTTGPPRCF<br>AEARMEPVPGLAWLASTVNLEFQHASPQHAGLYLCVVYVDDHIHAWGHMTIS<br>TAAQYRNAVVEQHLPQRQPEPVEPTRPHVRAPPPAPSARGPLR |
| 23 | gE-2t 417 Mutant # 12 | MARGAGLVFFVGVWVVSCLAAAPRTSWKRVTSGEDVVLLPAPAGPEERTRAH<br>KLLWAAEPLDACGPLRPSWVALWPPRRVLETVVDAACMRAPEPLAIAYSPPFPA<br>GDEGLYSELAWRDRVAVVNESLVIYGALETDSGLYTLSVVGLSDEARQVASVV<br>LVVEPAPVPTPTPDDYDEEDDAGVSERTPVSVPPPTPPRRPPVAPPTHPRVIPEVS<br>HVRGVTVHMETPEAILFAPGETFGTNVSIHAIAHDDGPYAMDVVWMRFDVPSS<br>CAEMRIYEACLYHPQLPECLSPADAPCAVSSWAYRLAVRSYAGCSRTTPPGRCF<br>AEARMEPVPGLAWLASTVNLEFQHASPQHAGLYLCVVYVDDHIHAWGHMTIS<br>TAAQYRNAVVEQHLPQRQPEPVEPTRPHVRAPPPAPSARGPLR |
| 24 | gE-2t 417 Mutant # 13 | MARGAGLVFFVGVWVVSCLAAAPRTSWKRVTSGEDVVLLPAPAGPEERTRAH<br>KLLWAAEPLDACGPLRPSWVALWPPRRVLETVVDAACMRAPEPLAIAYSPPFPA<br>GDEGLYSELAWRDRVAVVNESLVIYGALETDSGLYTLSVVGLSDEARQVASVV<br>LVVEPAPVPTPTPDDYDEEDDAGVSERTPVSVPPPTPPRRPPVAPPTHPRVIPEVS<br>HVRGVTVHMETPEAILFAPGETFGTNVSIGAIAHDDGPYAMDVVWMRFDVPSS<br>CAEMRIYEACLYHPQLPECLSPADAPCAVSSWAYRLAVRSYAGCSRTTGPPRCF |

TABLE 5-continued gE Mutant Construct Polypeptides

| SEQ ID NO | Name | Sequence |
|---|---|---|
| | | AEARMEPVPGLAWLASTVNLEFQHASPQHAGLYLCVVYVDDHIHAWGHMTIS TAAQYRNAVVEQHLPQRQPEPVEPTRPHVRAPPPAPSARGPLR |
| 25 | gE-2t 417 Mutant # 14 | MARGAGLVFFVGVWVVSCLAAAPRTSWKRVTSGEDVVLLPAPAGPEERTRAH KLLWAAEPLDACGPLRPSWVALWPPRRVLETVVDAACMRAPEPLAIAYSPPFPA GDEGLYSELAWRDRVAVVNESLVIYGALETDSGLYTLSVVGLSDEARQVASVV LVVEPAPVPTPTPDDYDEEDDAGVSERTPVSVPPPTPPRRPPVAPPTHPRVIPEVS HVRGVTVHMETPEAILFAPGETFGTNVSIGAIAHDDGPYAMDVVWMRFDVPSS CAEMRIYEACLYHPQLPECLSPADAPCAVS̄SWAYRLAVRSYAGCSRTTPPGRCF AEARMEPVPGLAWLASTVNLEFQHASPQHAGLYLCVVYVDDHIHAWGHMT̄IS TAAQYRNAVVEQHLPQRQPEPVEPTRPHVRAPPPAPSARGPLR |
| 26 | gE-2t 417 Mutant # 15 | MARGAGLVFFVGVWVVSCLAAAPRTSWKRVTSGEDVVLLPAPAGPEERTRAH KLLWAAEPLDACGPLRPSWVALWPPRRVLETVVDAACMRAPEPLAIAYSPPFPA GDEGLYSELAWRDRVAVVNESLVIYGALETDSGLYTLSVVGLSDEARQVASVV LVVEPAPVPTPTPDDYDEEDDAGVSERTPVSVPPPTPPRRPPVAPPTHPRVIPEVS HVRGVTVHMETPEAILFAPGETFGTNVSIHAIAHDDGPYAMDVVWMRFDVPSS CAEMRIYEACLYHPQLPECLSPADAPCAVSSWAYRLAVRSYAGCSRTTGPGRCF AEARMEPVPGLAWLASTVNLEFQHASPQHAGLYLCVVYVDDHIHAWGHM̄TIS TAAQYRNAVVEQHLPQRQPEPVEPTRPHVRAPPPAPSARGPLR |
| 27 | gE-2t 417 Mutant # 16 | MARGAGLVFFVGVWVVSCLAAAPRTSWKRVTSGEDVVLLPAPAGPEERTRAH KLLWAAEPLDACGPLRPSWVALWPPRRVLETVVDAACMRAPEPLAIAYSPPFPA GDEGLYSELAWRDRVAVVNESLVIYGALETDSGLYTLSVVGLSDEARQVASVV LVVEPAPVPTPTPDDYDEEDDAGVSERTPVSVPPPTPPRRPPVAPPTHPRVIPEVS HVRGVTVHMETPEAILFAPGETFGTNVSIGAIAHDDGPYAMDVVWMRFDVPSS CAEMRIYEACLYHPQLPECLSPADAPCAVS̄SWAYRLAVRSYAGCSRTTGPGRCF AEARMEPVPGLAWLASTVNLEFQHASPQHAGLYLCVVYVDDHIHAWGHM̄TIS TAAQYRNAVVEQHLPQRQPEPVEPTRPHVRAPPPAPSARGPLR |

FIG. 3 is an alignment of the amino acid sequence of glycoprotein E from HSV-1 strain KOS (SEQ ID NO: 28) and HSV-2 strain 333 (SEQ ID NO: 1). Targeted amino acid positions 337-340, and 245, 317, and 319 are underlined.

Table 6 below lists the nucleic acid sequences SEQ ID NOs: 29-44 encoding the amino acid sequences for SEQ ID NOs: 12-27, respectively. The codons for SEQ ID NOs: 29-44 were optimized for expression in mammalian cells.

TABLE 6 gE mutant construct nucleic acid sequences

| SEQ ID NO | Name | Sequence |
|---|---|---|
| 29 | gE-2t 417 Mutant # 1 | ATGGCTCGCGGGGCCGGGTTGGTGTTTTTTGTTGGAGTTTGGGTCGTATCGT GCCTGGCGGCAGCACCCAGAACGTCCTGGAAACGGGTAACCTCGGGCGAG GACGTGGTGTTGCTTCCGGCGCCCGCGGGGCCGGAGGAACGCACCCGGGCC CACAAACTACTGTGGGCCGCGGAACCCCTGGATGCCTGCGGTCCCCTGCGC CCGTCGTGGGTGGCGCTGTGGCCCCCCCGACGGGTGCTCGAGACGGTCGTG GATGCGGCGTGCATGCGCGCCCCGGAACCGCTCGCCATAGCATACAGTCCC CCGTTCCCCGCGGGCGACGAGGGACTGTATTCGGAGTTGGCGTGGCGCGAT CGCGTAGCCGTGGTCAACGAGAGTCTGGTCATCTACGGGGCCCTGGAGACG GACAGCGGTCTGTACACCCTGTCCGTGGTCGGCCTAAGCGACGAGGCGCGC CAAGTGGCGTCGGTGGTTCTGGTCGTGGAGCCCGCCCCTGTGCCGACCCCG ACCCCCGACGACTACGACGAAGAAGACGACGCGGGCGTGAGCGAACGCAC GCCGGTCAGCGTTCCCCCCCCAACCCCCCCCCGTCGTCCCCCCGTCGCCCCC CCGACGCACCCTCGTGTTATCCCCGAGGTGTCCCACGTGCGCGGGGTAACG GTCCATATGGAGACCCCGGAGGCCATTCTGTTTGCCCCCGGGGAGACGTTT GGGACGAACGTCTCCATCCACGCCATTGCCCACGACGACGGTCCGTACGCC ATGGACGTCGTCTGGATGCGGTTTGACGTGCCGTCCTCGTGCGCCGAGATG CGGATCTACGAAGCTTGTCTGTATCACCCGCAGCTTCCAGAGTGTCTATCTC CGGCCGACGCGCCGTGCGCCGTAAGTTCCTGGGCGTACCGCCTGGCGGTCC GCAGCTACGCCGGCTGTTCCAGGACTACGCCCCCGCCGCGATGTTTTGCCG AGGCTCGCATGGAACCGGTCCCGGGGTTGGCGTGGCTGGCCGCCCGCGCCG CCTCCACCGTCAATCTGGAATTCCAGCACGCCTCCCCCCAGCACGCCGGCCT CTACCTGTGCGTGGTGTACGTGGACGATCATATCCACGCCTGGGGCCACAT GACCATCAGCACCGCGGCGCAGTACCGGAACGCGGTGGTGGAACAGCACC TCCCCCAGCGCCAGCCCGAGCCCGTCGAGCCCACCCGCCCGCACGTGAGAG CCCCCCCTCCCGCGCCCTCCGCGCGCGGCCCGCTGCGC |
| 30 | gE-2t 417 Mutant # 2 | ATGGCTCGCGGGGCCGGGTTGGTGTTTTTTGTTGGAGTTTGGGTCGTATCGT GCCTGGCGGCAGCACCCAGAACGTCCTGGAAACGGGTAACCTCGGGCGAG |

TABLE 6-continued gE mutant construct nucleic acid sequences

| SEQ ID NO | Name | Sequence |
|---|---|---|
| | | GACGTGGTGTTGCTTCCGGCGCCCGCGGGGCCGGAGGAACGCACCCGGGCC<br>CACAAACTACTGTGGGCCGCGGAACCCCTGGATGCCTGCGGTCCCCTGCGC<br>CCGTCGTGGGTGGCGCTGTGGCCCCCCCGACGGGTGCTCGAGACGGTCGTG<br>GATGCGGCGTGCATGCGCGCCCCGGAACCGCTCGCCATAGCATACAGTCCC<br>CCGTTCCCCGCGGGCGACGAGGGACTGTATTCGGAGTTGGCGTGGCGCGAT<br>CGCGTAGCCGTGGTCAACGAGAGTCTGGTCATCTACGGGGCCCTGGAGACG<br>GACAGCGGTCTGTACACCCTGTCCGTGGTCGGCCTAAGCGACGAGGCGCGC<br>CAAGTGGCGTCGGTGGTTCTGGTCGTGGAGCCCGCCCCTGTGCCGACCCCG<br>ACCCCCGACGACTACGACGAAGAAGACGACGGGCGTGAGCGAACGCAC<br>GCCGGTCAGCGTTCCCCCCCCAACCCCCCCCCGTCGTCCCCCCGTCGCCCCC<br>CCGACGCACCCTCGTGTTATCCCCGAGGTGTCCCACGTGCGCGGGGTAACG<br>GTCCATATGGAGACCCCGGAGGACATTCTGTTTGCCCCCGGGGAGACGTTT<br>GGGACGAACGTCTCCATCCACGCCATTGCCCACGACGACGGTCCGTACGCC<br>ATGGACGTCGTCTGGATGCGGTTTGACGTGCCGTCCTCGTGCGCCGAGATG<br>CGGATCTACGAAGCTTGTCTGTATCACCCGCAGCTTCCAGAGTGTCTATCTC<br>CGGCCGACGCGCCGTGCGCCGTAAGTTCCTGGGCGTACCGCCTGGCGGTCC<br>GCAGCTACGCCGGCTGTTCCAGGACTACGCCCCCGCCGCGATGTTTTGCCG<br>AGGCTCGCATGGAACCGGTCCCGGGGTTGGCGTGGCTGGCCACCGTCA<br>ATCTGGAATTCCAGCACGCCTCCCCCCAGCACGCCGGCCTCTACCTGTGCGT<br>GGTGTACGTGGACGATCATATCCACGCCTGGGGCCACATGACCATCAGCAC<br>CGCGGCGCAGTACCGGAACGCGGTGGTGGAACAGCACCTCCCCCAGCGCC<br>AGCCCGAGCCCGTCGAGCCCACCCGCCCGCACGTGAGAGCCCCCCCTCCCG<br>CGCCCTCCGCGCGCGGCCCGCTGCGC |
| 31 | gE-2t 417 Mutant # 3 | ATGGCTCGCGGGGCCGGGTTGGTGTTTTTTGTTGGAGTTTGGGTCGTATCGT<br>GCCTGGCGGCAGCACCCAGAACGTCCTGGAAACGGGTAACCTCGGGCGAG<br>GACGTGGTGTTGCTTCCGGCGCCCGCGGGGCCGGAGGAACGCACCCGGGCC<br>CACAAACTACTGTGGGCCGCGGAACCCCTGGATGCCTGCGGTCCCCTGCGC<br>CCGTCGTGGGTGGCGCTGTGGCCCCCCCGACGGGTGCTCGAGACGGTCGTG<br>GATGCGGCGTGCATGCGCGCCCCGGAACCGCTCGCCATAGCATACAGTCCC<br>CCGTTCCCCGCGGGCGACGAGGGACTGTATTCGGAGTTGGCGTGGCGCGAT<br>CGCGTAGCCGTGGTCAACGAGAGTCTGGTCATCTACGGGGCCCTGGAGACG<br>GACAGCGGTCTGTACACCCTGTCCGTGGTCGGCCTAAGCGACGAGGCGCGC<br>CAAGTGGCGTCGGTGGTTCTGGTCGTGGAGCCCGCCCCTGTGCCGACCCCG<br>ACCCCCGACGACTACGACGAAGAAGACGACGGGCGTGAGCGAACGCAC<br>GCCGGTCAGCGTTCCCCCCCCAACCCCCCCCCGTCGTCCCCCCGTCGCCCCC<br>CCGACGCACCCTCGTGTTATCCCCGAGGTGTCCCACGTGCGCGGGGTAACG<br>GTCCATATGGAGACCCCGGAGGACATTCTGTTTGCCCCCGGGGAGACGTTT<br>GGGACGAACGTCTCCATCCACGCCATTGCCCACGACGACGGTCCGTACGCC<br>ATGGACGTCGTCTGGATGCGGTTTGACGTGCCGTCCTCGTGCGCCGAGATG<br>CGGATCTACGAAGCTTGTCTGTATCACCCGCAGCTTCCAGAGTGTCTATCTC<br>CGGCCGACGCGCCGTGCGCCGTAAGTTCCTGGGCGTACCGCCTGGCGGTCC<br>GCAGCTACGCCGGCTGTTCCAGGACTACGCCCCCGCCGCGATGTTTTGCCG<br>AGGCTCGCATGGAACCGGTCCCGGGGTTGGCGTGGCTGGCCACCGTCAATC<br>TGGAATTCCAGCACGCCTCCCCCCAGCACGCCGGCCTCTACCTGTGCGTGGT<br>GTACGTGGACGATCATATCCACGCCTGGGGCCACATGACCATCAGCACCGC<br>GGCGCAGTACCGGAACGCGGTGGTGGAACAGCACCTCCCCCAGCGCCAGC<br>CCGAGCCCGTCGAGCCCACCCGCCCGCACGTGAGAGCCCCCCCTCCCGCGC<br>CCTCCGCGCGCGGCCCGCTGCGC |
| 32 | gE-2t 417 Mutant # 4 | ATGGCTCGCGGGGCCGGGTTGGTGTTTTTTGTTGGAGTTTGGGTCGTATCGT<br>GCCTGGCGGCAGCACCCAGAACGTCCTGGAAACGGGTAACCTCGGGCGAG<br>GACGTGGTGTTGCTTCCGGCGCCCGCGGGGCCGGAGGAACGCACCCGGGCC<br>CACAAACTACTGTGGGCCGCGGAACCCCTGGATGCCTGCGGTCCCCTGCGC<br>CCGTCGTGGGTGGCGCTGTGGCCCCCCCGACGGGTGCTCGAGACGGTCGTG<br>GATGCGGCGTGCATGCGCGCCCCGGAACCGCTCGCCATAGCATACAGTCCC<br>CCGTTCCCCGCGGGCGACGAGGGACTGTATTCGGAGTTGGCGTGGCGCGAT<br>CGCGTAGCCGTGGTCAACGAGAGTCTGGTCATCTACGGGGCCCTGGAGACG<br>GACAGCGGTCTGTACACCCTGTCCGTGGTCGGCCTAAGCGACGAGGCGCGC<br>CAAGTGGCGTCGGTGGTTCTGGTCGTGGAGCCCGCCCCTGTGCCGACCCCG<br>ACCCCCGACGACTACGACGAAGAAGACGACGGGCGTGAGCGAACGCAC<br>GCCGGTCAGCGTTCCCCCCCCAACCCCCCCCCGTCGTCCCCCCGTCGCCCCC<br>CCGACGCACCCTCGTGTTATCCCCGAGGTGTCCCACGTGCGCGGGGTAACG<br>GTCCATATGGAGACCCCGGAGGACATTCTGTTTGCCCCCGGGGAGACGTTT<br>GGGACGAACGTCTCCATCCACGCCATTGCCCACGACGACGGTCCGTACGCC<br>ATGGACGTCGTCTGGATGCGGTTTGACGTGCCGTCCTCGTGCGCCGAGATG<br>CGGATCTACGAAGCTTGTCTGTATCACCCGCAGCTTCCAGAGTGTCTATCTC<br>CGGCCGACGCGCCGTGCGCCGTAAGTTCCTGGGCGTACCGCCTGGCGGTCC<br>GCAGCTACGCCGGCTGTTCCAGGACTACGCCCCCGCCGCGATGTTTTGCCG<br>AGGCTCGCATGGAACCGGTCCCGGGGTTGGCGTGGCTGGCCTCCGGCGTCA |

TABLE 6-continued gE mutant construct nucleic acid sequences

| SEQ ID NO | Name | Sequence |
|---|---|---|
| | | ATCTGGAATTCCAGCACGCCTCCCCCAGCACGCCGGCCTCTACCTGTGCGT<br>GGTGTACGTGGACGATCATATCCACGCCTGGGGCCACATGACCATCAGCAC<br>CGCGGCGCAGTACCGGAACGCGGTGGTGGAACAGCACCTCCCCCAGCGCC<br>AGCCCGAGCCCGTCGAGCCCACCCGCCCGCACGTGAGAGCCCCCCCTCCCG<br>CGCCCTCCGCGCGCGGGCCCGCTGCGC |
| 33 | gE-2t 417<br>Mutant # 5 | ATGGCTCGCGGGGCCGGGTTGGTGTTTTTTGTTGGAGTTTGGGTCGTATCGT<br>GCCTGGCGGCAGCACCCAGAACGTCCTGGAAACGGGTAACCTCGGGCGAG<br>GACGTGGTGTTGCTTCCGGCGCCCGCGGGGCCGGAGGAACGCACCCGGGCC<br>CACAAACTACTGTGGGCCGCGGAACCCCTGGATGCCTGCGGTCCCCTGCGC<br>CCGTCGTGGGTGGCGCTGTGGCCCCCCCGACGGGTGCTCGAGACGGTCGTG<br>GATGCGGCGTGCATGCGCGCCCCGGAACCGCTCGCCATAGCATACAGTCCC<br>CCGTTCCCCGCGGGCGACGAGGGACTGTATTCGGAGTTGGCGTGGCGCGAT<br>CGCGTAGCCGTGGTCAACGAGAGTCTGGTCATCTACGGGGCCCTGGAGACG<br>GACAGCGGTCTGTACACCCTGTCCGTGGTCGGCCTAAGCGACGAGGCGCGC<br>CAAGTGGCGTCGGTGGTTCTGGTCGTGGAGCCCGCCCCTGTGCCGACCCCG<br>ACCCCCGACGACTACGACGAAGAAGACGACGCGGGCGTGAGCGAACGCAC<br>GCCGGTCAGCGTTCCCCCCCCAACCCCCCCCGTCGTCCCCCCGTCGCCCCC<br>CCGACGCACCCTCGTGTTATCCCCGAGGTGTCCCACGTGCGCGGGGTAACG<br>GTCCATATGGAGACCCCGGAGGCCATTCTGTTTGCCCCCGGGGAGACGTTT<br>GGGACGAACGTCTCCATCCACGCCATTGCCCACGACGACGGTCCGTACGCC<br>ATGGACGTCGTCTGGATGCGGTTTGACGTGCCGTCCTCGTGCGCCGAGATG<br>CGGATCTACGAAGCTTGTCTGTATCACCCGCAGCTTCCAGAGTGTCTATCTC<br>CGGCCGACGCGCCGTGCGCCGTAAGTTCCTGGGCGTACCGCCTGGCGGTCC<br>GCAGCTACGCCGGCTGTTCCAGGACTACGCCCCCGCCGCGATGTTTTGCCG<br>AGGCTCGCATGGAACCGGTCCCGGGGTTGGCGTGGCTGGCCTCCGTCAATC<br>TGGAATTCCAGCACGCCTCCCCCCAGCACGCCGGCCTCTACCTGTGCGTGGT<br>GTACGTGGACGATCATATCCACGCCTGGGGCCACATGACCATCAGCACCGC<br>GGCGCAGTACCGGAACGCGGTGGTGGAACAGCACCTCCCCCAGCGCCAGC<br>CCGAGCCCGTCGAGCCCACCCGCCCGCACGTGAGAGCCCCCCCTCCCGCGC<br>CCTCCGCGCGCGGGCCCGCTGCGC |
| 34 | gE-2t 417<br>Mutant # 6 | ATGGCTCGCGGGGCCGGGTTGGTGTTTTTTGTTGGAGTTTGGGTCGTATCGT<br>GCCTGGCGGCAGCACCCAGAACGTCCTGGAAACGGGTAACCTCGGGCGAG<br>GACGTGGTGTTGCTTCCGGCGCCCGCGGGGCCGGAGGAACGCACCCGGGCC<br>CACAAACTACTGTGGGCCGCGGAACCCCTGGATGCCTGCGGTCCCCTGCGC<br>CCGTCGTGGGTGGCGCTGTGGCCCCCCCGACGGGTGCTCGAGACGGTCGTG<br>GATGCGGCGTGCATGCGCGCCCCGGAACCGCTCGCCATAGCATACAGTCCC<br>CCGTTCCCCGCGGGCGACGAGGGACTGTATTCGGAGTTGGCGTGGCGCGAT<br>CGCGTAGCCGTGGTCAACGAGAGTCTGGTCATCTACGGGGCCCTGGAGACG<br>GACAGCGGTCTGTACACCCTGTCCGTGGTCGGCCTAAGCGACGAGGCGCGC<br>CAAGTGGCGTCGGTGGTTCTGGTCGTGGAGCCCGCCCCTGTGCCGACCCCG<br>ACCCCCGACGACTACGACGAAGAAGACGACGCGGGCGTGAGCGAACGCAC<br>GCCGGTCAGCGTTCCCCCCCCAACCCCCCCCGTCGTCCCCCCGTCGCCCCC<br>CCGACGCACCCTCGTGTTATCCCCGAGGTGTCCCACGTGCGCGGGGTAACG<br>GTCCATATGGAGACCCCGGAGGCCATTCTGTTTGCCCCCGGGGAGACGTTT<br>GGGACGAACGTCTCCATCCACGCCATTGCCCACGACGACGGTCCGTACGCC<br>ATGGACGTCGTCTGGATGCGGTTTGACGTGCCGTCCTCGTGCGCCGAGATG<br>CGGATCTACGAAGCTTGTCTGTATCACCCGCAGCTTCCAGAGTGTCTATCTC<br>CGGCCGACGCGCCGTGCGCCGTAAGTTCCTGGGCGTACCGCCTGGCGGTCC<br>GCAGCTACGCCGGCTGTTCCAGGACTACGCCCCCGCCGCGATGTTTTGCCG<br>AGGCTCGCATGGAACCGGTCCCGGGGTTGGCGTGGCTGGCCGGCGCGTCA<br>ATCTGGAATTCCAGCACGCCTCCCCCCAGCACGCCGGCCTCTACCTGTGCGT<br>GGTGTACGTGGACGATCATATCCACGCCTGGGGCCACATGACCATCAGCAC<br>CGCGGCGCAGTACCGGAACGCGGTGGTGGAACAGCACCTCCCCCAGCGCC<br>AGCCCGAGCCCGTCGAGCCCACCCGCCCGCACGTGAGAGCCCCCCCTCCCG<br>CGCCCTCCGCGCGCGGGCCCGCTGCGC |
| 35 | gE-2t 417<br>Mutant # 7 | ATGGCTCGCGGGGCCGGGTTGGTGTTTTTTGTTGGAGTTTGGGTCGTATCGT<br>GCCTGGCGGCAGCACCCAGAACGTCCTGGAAACGGGTAACCTCGGGCGAG<br>GACGTGGTGTTGCTTCCGGCGCCCGCGGGGCCGGAGGAACGCACCCGGGCC<br>CACAAACTACTGTGGGCCGCGGAACCCCTGGATGCCTGCGGTCCCCTGCGC<br>CCGTCGTGGGTGGCGCTGTGGCCCCCCCGACGGGTGCTCGAGACGGTCGTG<br>GATGCGGCGTGCATGCGCGCCCCGGAACCGCTCGCCATAGCATACAGTCCC<br>CCGTTCCCCGCGGGCGACGAGGGACTGTATTCGGAGTTGGCGTGGCGCGAT<br>CGCGTAGCCGTGGTCAACGAGAGTCTGGTCATCTACGGGGCCCTGGAGACG<br>GACAGCGGTCTGTACACCCTGTCCGTGGTCGGCCTAAGCGACGAGGCGCGC<br>CAAGTGGCGTCGGTGGTTCTGGTCGTGGAGCCCGCCCCTGTGCCGACCCCG<br>ACCCCCGACGACTACGACGAAGAAGACGACGCGGGCGTGAGCGAACGCAC<br>GCCGGTCAGCGTTCCCCCCCCAACCCCCCCCGTCGTCCCCCCGTCGCCCCC<br>CCGACGCACCCTCGTGTTATCCCCGAGGTGTCCCACGTGCGCGGGGTAACG<br>GTCCATATGGAGACCCCGGAGGCCATTCTGTTTGCCCCCGGGGAGACGTTT<br>GGGACGAACGTCTCCATCCACGCCATTGCCCACGACGACGGTCCGTACGCC<br>ATGGACGTCGTCTGGATGCGGTTTGACGTGCCGTCCTCGTGCGCCGAGATG |

TABLE 6-continued gE mutant construct nucleic acid sequences

| SEQ ID NO | Name | Sequence |
|---|---|---|
| | | CGGATCTACGAAGCTTGTCTGTATCACCCGCAGCTTCCAGAGTGTCTATCTC<br>CGGCCGACGCGCCGTGCGCCGTAAGTTCCTGGGCGTACCGCCTGGCGGTCC<br>GCAGCTACGCCGGCTGTTCCAGGACTACGCCCCCGCCGCGATGTTTTGCCG<br>AGGCTCGCATGGAACCGGTCCCGGGGTTGGCGTGGCTGGCCGTCAATCTGG<br>AATTCCAGCACGCCTCCCCCCAGCACGCCGGCCTCTACCTGTGCGTGGTGTA<br>CGTGGACGATCATATCCACGCCTGGGGCCACATGACCATCAGCACCGCGGC<br>GCAGTACCGGAACGCGGTGGTGGAACAGCACCTCCCCCAGCGCCCAGCCCG<br>AGCCCGTCGAGCCCACCCGCCCGCACGTGAGAGCCCCCCCTCCCGCGCCCT<br>CCGCGCGCGGCCCGCTGCGC |
| 26 | gE-2t 417<br>Mutant # 8 | ATGGCTCGCGGGGCCGGGTTGGTGTTTTTTGTTGGAGTTTGGGTCGTATCGT<br>GCCTGGCGGCAGCACCCAGAACGTCCTGGAAACGGGTAACCTCGGGCGAG<br>GACGTGGTGTTGCTTCCGGCGCCCGCGGGGCCGGAGGAACGCACCCGGGCC<br>CACAAACTACTGTGGGCCGCGGAACCCCTGGATGCCTGCGGTCCCCTGCGC<br>CCGTCGTGGGTGGCGCTGTGGCCCCCCCGACGGGTGCTCGAGACGGTCGTG<br>GATGCGGCGTGCATGCGCGCCCCGGAACCGCTCGCCATAGCATACAGTCCC<br>CCGTTCCCCGCGGGCGACGAGGGACTGTATTCGGAGTTGGCGTGGCGCGAT<br>CGCGTAGCCGTGGTCAACGAGAGTCTGGTCATCTACGGGGCCCTGGAGACG<br>GACAGCGGTCTGTACACCCTGTCCGTGGTCGGCCTAAGCGACGAGGCGCGC<br>CAAGTGGCGTCGGTGGTTCTGGTCGTGGAGCCCGCCCCTGTGCCGACCCCG<br>ACCCCCGACGACTACGACGAAGAAGACGACGCGGGCGTGAGCGAACGCAC<br>GCCGGTCAGCGTTCCCCCCCCAACCCCCCCCCGTCGTCCCCCCGTCGCCCCC<br>CCGACGCACCCTCGTGTTATCCCCGAGGTGTCCCACGTGCGCGGGGTAACG<br>GTCCATATGGAGACCCCGGAGGCCATTCTGTTTGCCCCCGGGGAGACGTTT<br>GGGACGAACGTCTCCATCCACGCCATTGCCCACGACGACGGTCCGTACGCC<br>ATGGACGTCGTCTGGATGCGGTTTGACGTGCCGTCCTCGTGCGCCGAGATG<br>CGGATCTACGAAGCTTGTCTGTATCACCCGCAGCTTCCAGAGTGTCTATCTC<br>CGGCCGACGCGCCGTGCGCCGTAAGTTCCTGGGCGTACCGCCTGGCGGTCC<br>GCAGCTACGCCGGCTGTTCCAGGACTACGCCCCCGCCGCGATGTTTTGCCG<br>AGGCTCGCATGGAACCGGTCCCGGGGTTGGCGTGGCTGGCCGGCGGCGTCA<br>ATCTGGAATTCCAGCACGCCTCCCCCCAGCACGCCGGCCTCTACCTGTGCGT<br>GGTGTACGTGGACGATCATATCCACGCCTGGGGCCACATGACCATCAGCAC<br>CGCGGCGCAGTACCGGAACGCGGTGGTGGAACAGCACCTCCCCCAGCGCC<br>AGCCCGAGCCCGTCGAGCCCACCCGCCCGCACGTGAGAGCCCCCCTCCCG<br>CGCCCTCCGCGCGCGGCCCGCTGCGC |
| 37 | gE-2t 417<br>Mutant # 9 | ATGGCTCGCGGGGCCGGGTTGGTGTTTTTTGTTGGAGTTTGGGTCGTATCGT<br>GCCTGGCGGCAGCACCCAGAACGTCCTGGAAACGGGTAACCTCGGGCGAG<br>GACGTGGTGTTGCTTCCGGCGCCCGCGGGGCCGGAGGAACGCACCCGGGCC<br>CACAAACTACTGTGGGCCGCGGAACCCCTGGATGCCTGCGGTCCCCTGCGC<br>CCGTCGTGGGTGGCGCTGTGGCCCCCCCGACGGGTGCTCGAGACGGTCGTG<br>GATGCGGCGTGCATGCGCGCCCCGGAACCGCTCGCCATAGCATACAGTCCC<br>CCGTTCCCCGCGGGCGACGAGGGACTGTATTCGGAGTTGGCGTGGCGCGAT<br>CGCGTAGCCGTGGTCAACGAGAGTCTGGTCATCTACGGGGCCCTGGAGACG<br>GACAGCGGTCTGTACACCCTGTCCGTGGTCGGCCTAAGCGACGAGGCGCGC<br>CAAGTGGCGTCGGTGGTTCTGGTCGTGGAGCCCGCCCCTGTGCCGACCCCG<br>ACCCCCGACGACTACGACGAAGAAGACGACGCGGGCGTGAGCGAACGCAC<br>GCCGGTCAGCGTTCCCCCCCCAACCCCCCCCCGTCGTCCCCCCGTCGCCCCC<br>CCGACGCACCCTCGTGTTATCCCCGAGGTGTCCCACGTGCGCGGGGTAACG<br>GTCCATATGGAGACCCCGGAGGCCATTCTGTTTGCCCCCGGGGAGACGTTT<br>GGGACGAACGTCTCCATCCACGCCATTGCCCACGACGACGGTCCGTACGCC<br>ATGGACGTCGTCTGGATGCGGTTTGACGTGCCGTCCTCGTGCGCCGAGATG<br>CGGATCTACGAAGCTTGTCTGTATCACCCGCAGCTTCCAGAGTGTCTATCTC<br>CGGCCGACGCGCCGTGCGCCGTAAGTTCCTGGGCGTACCGCCTGGCGGTCC<br>GCAGCTACGCCGGCTGTTCCAGGACTACGCCCCCGCCGCGATGTTTTGCCG<br>AGGCTCGCATGGAACCGGTCCCGGGGTTGGCGTGGCTGGCCGGCGGCGGCA<br>ATCTGGAATTCCAGCACGCCTCCCCCCAGCACGCCGGCCTCTACCTGTGCGT<br>GGTGTACGTGGACGATCATATCCACGCCTGGGGCCACATGACCATCAGCAC<br>CGCGGCGCAGTACCGGAACGCGGTGGTGGAACAGCACCTCCCCCAGCGCC<br>AGCCCGAGCCCGTCGAGCCCACCCGCCCGCACGTGAGAGCCCCCCTCCCG<br>CGCCCTCCGCGCGCGGCCCGCTGCGC |
| 38 | gE-2t 417<br>Mutant # 10 | ATGGCTCGCGGGGCCGGGTTGGTGTTTTTTGTTGGAGTTTGGGTCGTATCGT<br>GCCTGGCGGCAGCACCCAGAACGTCCTGGAAACGGGTAACCTCGGGCGAG<br>GACGTGGTGTTGCTTCCGGCGCCCGCGGGGCCGGAGGAACGCACCCGGGCC<br>CACAAACTACTGTGGGCCGCGGAACCCCTGGATGCCTGCGGTCCCCTGCGC<br>CCGTCGTGGGTGGCGCTGTGGCCCCCCCGACGGGTGCTCGAGACGGTCGTG<br>GATGCGGCGTGCATGCGCGCCCCGGAACCGCTCGCCATAGCATACAGTCCC<br>CCGTTCCCCGCGGGCGACGAGGGACTGTATTCGGAGTTGGCGTGGCGCGAT<br>CGCGTAGCCGTGGTCAACGAGAGTCTGGTCATCTACGGGGCCCTGGAGACG<br>GACAGCGGTCTGTACACCCTGTCCGTGGTCGGCCTAAGCGACGAGGCGCGC<br>CAAGTGGCGTCGGTGGTTCTGGTCGTGGAGCCCGCCCCTGTGCCGACCCCG<br>ACCCCCGACGACTACGACGAAGAAGACGACGCGGGCGTGAGCGAACGCAC<br>GCCGGTCAGCGTTCCCCCCCCAACCCCCCCCCGTCGTCCCCCCGTCGCCCCC |

TABLE 6-continued gE mutant construct nucleic acid sequences

| SEQ ID NO | Name | Sequence |
|---|---|---|
| | | CCGACGCACCCTCGTGTTATCCCCGAGGTGTCCCACGTGCGCGGGGTAACG GTCCATATGGAGACCCCGGAGGCCATTCTGTTTGCCCCCGGGGAGACGTTT GGGACGAACGTCTCCATCGGCGCCATTGCCCACGACGACGGTCCGTACGCC ATGGACGTCGTCTGGATGCGGTTTGACGTGCCGTCCTCGTGCGCCGAGATG CGGATCTACGAAGCTTGTCTGTATCACCCGCAGCTTCCAGAGTGTCTATCTC CGGCCGACGCGCCGTGCGCCGTAAGTTCCTGGGCGTACCGCCTGGCGGTCC GCAGCTACGCCGGCTGTTCCAGGACTACGCCCCCGCCGCGATGTTTTGCCG AGGCTCGCATGGAACCGGTCCCGGGGTTGGCGTGGCTGGCCTCCACCGTCA ATCTGGAATTCCAGCACGCCTCCCCCAGCACGCCGGCCTCTACCTGTGCGT GGTGTACGTGGACGATCATATCCACGCCTGGGCCACATGACCATCAGCAC CGCGGCGCAGTACCGGAACGCGGTGGTGGAACAGCACCTCCCCCAGCGCC AGCCCGAGCCCGTCGAGCCCACCCGCCCGCACGTGAGAGCCCCCCCTCCCG CGCCCTCCGCGCGCGGCCCGCTGCGC |
| 39 | gE-2t 417 Mutant # 11 | ATGGCTCGCGGGGCCGGGTTGGTGTTTTTTGTTGGAGTTTGGGTCGTATCGT GCCTGGCGGCAGCACCCAGAACGTCCTGGAAACGGGTAACCTCGGGCGAG GACGTGGTGTTGCTTCCGGCGCCCGCGGGGCCGGAGGAACGCACCCGGGCC CACAAACTACTGTGGGCCGCGGAACCCCTGGATGCCTGCGGTCCCCTGCGC CCGTCGTGGGTGGCGCTGTGGCCCCCCCGACGGGTGCTCGAGACGGTCGTG GATGCGGCGTGCATGCGCGCCCCGGAACCGCTCGCCATAGCATACAGTCCC CCGTTCCCCGCGGGCGACGAGGGACTGTATTCGGAGTTGGCGTGGCGCGAT CGCGTAGCCGTGGTCAACGAGAGTCTGGTCATCTACGGGGCCCTGGAGACG GACAGCGGTCTGTACACCCTGTCCGTGGTCGGCCTAAGCGACGAGGCGCGC CAAGTGGCGTCGGTGGTTCTGGTCGTGGAGCCCGCCCCTGTGCCGACCCCG ACCCCCGACGACTACGACGAAGAAGACGACGGGCGTGAGCGAACGCAC GCCGGTCAGCGTTCCCCCCCCAACCCCCCCCCGTCGTCCCCCGTCGCCCCC CCGACGCACCCTCGTGTTATCCCCGAGGTGTCCCACGTGCGCGGGGTAACG GTCCATATGGAGACCCCGGAGGCCATTCTGTTTGCCCCCGGGGAGACGTTT GGGACGAACGTCTCCATCCACGCCATTGCCCACGACGACGGTCCGTACGCC ATGGACGTCGTCTGGATGCGGTTTGACGTGCCGTCCTCGTGCGCCGAGATG CGGATCTACGAAGCTTGTCTGTATCACCCGCAGCTTCCAGAGTGTCTATCTC CGGCCGACGCGCCGTGCGCCGTAAGTTCCTGGGCGTACCGCCTGGCGGTCC GCAGCTACGCCGGCTGTTCCAGGACTACGGGCCCGCCGCGATGTTTTGCCG AGGCTCGCATGGAACCGGTCCCGGGGTTGGCGTGGCTGGCCTCCACCGTCA ATCTGGAATTCCAGCACGCCTCCCCCAGCACGCCGGCCTCTACCTGTGCGT GGTGTACGTGGACGATCATATCCACGCCTGGGCCACATGACCATCAGCAC CGCGGCGCAGTACCGGAACGCGGTGGTGGAACAGCACCTCCCCCAGCGCC AGCCCGAGCCCGTCGAGCCCACCCGCCCGCACGTGAGAGCCCCCCCTCCCG CGCCCTCCGCGCGCGGCCCGCTGCGC |
| 40 | gE-2t 417 Mutant # 12 | ATGGCTCGCGGGGCCGGGTTGGTGTTTTTTGTTGGAGTTTGGGTCGTATCGT GCCTGGCGGCAGCACCCAGAACGTCCTGGAAACGGGTAACCTCGGGCGAG GACGTGGTGTTGCTTCCGGCGCCCGCGGGGCCGGAGGAACGCACCCGGGCC CACAAACTACTGTGGGCCGCGGAACCCCTGGATGCCTGCGGTCCCCTGCGC CCGTCGTGGGTGGCGCTGTGGCCCCCCCGACGGGTGCTCGAGACGGTCGTG GATGCGGCGTGCATGCGCGCCCCGGAACCGCTCGCCATAGCATACAGTCCC CCGTTCCCCGCGGGCGACGAGGGACTGTATTCGGAGTTGGCGTGGCGCGAT CGCGTAGCCGTGGTCAACGAGAGTCTGGTCATCTACGGGGCCCTGGAGACG GACAGCGGTCTGTACACCCTGTCCGTGGTCGGCCTAAGCGACGAGGCGCGC CAAGTGGCGTCGGTGGTTCTGGTCGTGGAGCCCGCCCCTGTGCCGACCCCG ACCCCCGACGACTACGACGAAGAAGACGACGGGCGTGAGCGAACGCAC GCCGGTCAGCGTTCCCCCCCCAACCCCCCCCCGTCGTCCCCCGTCGCCCCC CCGACGCACCCTCGTGTTATCCCCGAGGTGTCCCACGTGCGCGGGGTAACG GTCCATATGGAGACCCCGGAGGCCATTCTGTTTGCCCCCGGGGAGACGTTT GGGACGAACGTCTCCATCCACGCCATTGCCCACGACGACGGTCCGTACGCC ATGGACGTCGTCTGGATGCGGTTTGACGTGCCGTCCTCGTGCGCCGAGATG CGGATCTACGAAGCTTGTCTGTATCACCCGCAGCTTCCAGAGTGTCTATCTC CGGCCGACGCGCCGTGCGCCGTAAGTTCCTGGGCGTACCGCTGGCGGTCC GCAGCTACGCCGGCTGTTCCAGGACTACGCCCCCGGGCCGATGTTTTGCCG AGGCTCGCATGGAACCGGTCCCGGGGTTGGCGTGGCTGGCCTCCACCGTCA ATCTGGAATTCCAGCACGCCTCCCCCAGCACGCCGGCCTCTACCTGTGCGT GGTGTACGTGGACGATCATATCCACGCCTGGGCCACATGACCATCAGCAC CGCGGCGCAGTACCGGAACGCGGTGGTGGAACAGCACCTCCCCCAGCGCC AGCCCGAGCCCGTCGAGCCCACCCGCCCGCACGTGAGAGCCCCCCCTCCCG CGCCCTCCGCGCGCGGCCCGCTGCGC |
| 41 | gE-2t 417 Mutant # 13 | ATGGCTCGCGGGGCCGGGTTGGTGTTTTTTGTTGGAGTTTGGGTCGTATCGT GCCTGGCGGCAGCACCCAGAACGTCCTGGAAACGGGTAACCTCGGGCGAG GACGTGGTGTTGCTTCCGGCGCCCGCGGGGCCGGAGGAACGCACCCGGGCC CACAAACTACTGTGGGCCGCGGAACCCCTGGATGCCTGCGGTCCCCTGCGC CCGTCGTGGGTGGCGCTGTGGCCCCCCCGACGGGTGCTCGAGACGGTCGTG GATGCGGCGTGCATGCGCGCCCCGGAACCGCTCGCCATAGCATACAGTCCC CCGTTCCCCGCGGGCGACGAGGGACTGTATTCGGAGTTGGCGTGGCGCGAT CGCGTAGCCGTGGTCAACGAGAGTCTGGTCATCTACGGGGCCCTGGAGACG |

TABLE 6-continued gE mutant construct nucleic acid sequences

| SEQ ID NO | Name | Sequence |
|---|---|---|
| | | GACAGCGGTCTGTACACCCTGTCCGTGGTCGGCCTAAGCGACGAGGCGCGC<br>CAAGTGGCGTCGGTGGTTCTGGTCGTGGAGCCCGCCCCTGTGCCGACCCCG<br>ACCCCCGACGACTACGACGAAGAAGACGACGCGGGCGTGAGCGAACGCAC<br>GCCGGTCAGCGTTCCCCCCCCAACCCCCCCCCGTCGTCCCCCCGTCGCCCCC<br>CCGACGCACCCTCGTGTTATCCCCGAGGTGTCCCACGTGCGCGGGGTAACG<br>GTCCATATGGAGACCCCGGAGGCCATTCTGTTTGCCCCCCGGGGAGACGTTT<br>GGGACGAACGTCTCCATCGGCGCCATTGCCCACGACGACGGTCCGTACGCC<br>ATGGACGTCGTCTGGATGCGGTTTGACGTGCCGTCCTCGTGCGCCGAGATG<br>CGGATCTACGAAGCTTGTCTGTATCACCCGCAGCTTCCAGAGTGTCTATCTC<br>CGGCCGACGCGCCGTGCGCCGTAAGTTCCTGGGCGTACCGCCTGGCGGTCC<br>GCAGCTACGCCGGCTGTTCCAGGACTACGGGCCCGCCGCGATGTTTTGCCG<br>AGGCTCGCATGGAACCGGTCCCGGGGTTGGCGTGGCTGGCCTCCACCGTCA<br>ATCTGGAATTCCAGCACGCCTCCCCCCAGCACGCCGGCCTCTACCTGTGCGT<br>GGTGTACGTGGACGATCATATCCACGCCTGGGGCCACATGACCATCAGCAC<br>CGCGGCGCAGTACCGGAACGCGGTGGTGGAACAGCACCTCCCCCAGCGCC<br>AGCCCGAGCCCGTCGAGCCCACCCGCCCGCACGTGAGAGCCCCCCCTCCCG<br>CGCCCTCCGCGCGCGGCCCGCTGCGC |
| 42 | gE-2t 417 Mutant # 14 | ATGGCTCGCGGGGCCGGGTTGGTGTTTTTTGTTGGAGTTTGGGTCGTATCGT<br>GCCTGGCGGCAGCACCCAGAACGTCCTGGAAACGGGTAACCTCGGGCGAG<br>GACGTGGTGTTGCTTCCGGCGCCCGCGGGGCCGGAGGAACGCACCCGGGCC<br>CACAAACTACTGTGGGCCGCGGAACCCCTGGATGCCTGCGGTCCCCTGCGC<br>CCGTCGTGGGTGGCGCTGTGGCCCCCCCGACGGGTGCTCGAGACGGTCGTG<br>GATGCGGCGTGCATGCGCGCCCCGGAACCGCTCGCCATAGCATACAGTCCC<br>CCGTTCCCCGCGGGCGACGAGGGACTGTATTCGGAGTTGGCGTGGCGCGAT<br>CGCGTAGCCGTGGTCAACGAGAGTCTGGTCATCTACGGGGCCCTGGAGACG<br>GACAGCGGTCTGTACACCCTGTCCGTGGTCGGCCTAAGCGACGAGGCGCGC<br>CAAGTGGCGTCGGTGGTTCTGGTCGTGGAGCCCGCCCCTGTGCCGACCCCG<br>ACCCCCGACGACTACGACGAAGAAGACGACGCGGGCGTGAGCGAACGCAC<br>GCCGGTCAGCGTTCCCCCCCCAACCCCCCCCCGTCGTCCCCCCGTCGCCCCC<br>CCGACGCACCCTCGTGTTATCCCCGAGGTGTCCCACGTGCGCGGGGTAACG<br>GTCCATATGGAGACCCCGGAGGCCATTCTGTTTGCCCCCCGGGGAGACGTTT<br>GGGACGAACGTCTCCATCGGCGCCATTGCCCACGACGACGGTCCGTACGCC<br>ATGGACGTCGTCTGGATGCGGTTTGACGTGCCGTCCTCGTGCGCCGAGATG<br>CGGATCTACGAAGCTTGTCTGTATCACCCGCAGCTTCCAGAGTGTCTATCTC<br>CGGCCGACGCGCCGTGCGCCGTAAGTTCCTGGGCGTACCGCCTGGCGGTCC<br>GCAGCTACGCCGGCTGTTCCAGGACTACGCCCCGGGCCGATGTTTTGCCG<br>AGGCTCGCATGGAACCGGTCCCGGGGTTGGCGTGGCTGGCCTCCACCGTCA<br>ATCTGGAATTCCAGCACGCCTCCCCCCAGCACGCCGGCCTCTACCTGTGCGT<br>GGTGTACGTGGACGATCATATCCACGCCTGGGGCCACATGACCATCAGCAC<br>CGCGGCGCAGTACCGGAACGCGGTGGTGGAACAGCACCTCCCCCAGCGCC<br>AGCCCGAGCCCGTCGAGCCCACCCGCCCGCACGTGAGAGCCCCCCCTCCCG<br>CGCCCTCCGCGCGCGGCCCGCTGCGC |
| 43 | gE-2t 417 Mutant # 15 | ATGGCTCGCGGGGCCGGGTTGGTGTTTTTTGTTGGAGTTTGGGTCGTATCGT<br>GCCTGGCGGCAGCACCCAGAACGTCCTGGAAACGGGTAACCTCGGGCGAG<br>GACGTGGTGTTGCTTCCGGCGCCCGCGGGGCCGGAGGAACGCACCCGGGCC<br>CACAAACTACTGTGGGCCGCGGAACCCCTGGATGCCTGCGGTCCCCTGCGC<br>CCGTCGTGGGTGGCGCTGTGGCCCCCCCGACGGGTGCTCGAGACGGTCGTG<br>GATGCGGCGTGCATGCGCGCCCCGGAACCGCTCGCCATAGCATACAGTCCC<br>CCGTTCCCCGCGGGCGACGAGGGACTGTATTCGGAGTTGGCGTGGCGCGAT<br>CGCGTAGCCGTGGTCAACGAGAGTCTGGTCATCTACGGGGCCCTGGAGACG<br>GACAGCGGTCTGTACACCCTGTCCGTGGTCGGCCTAAGCGACGAGGCGCGC<br>CAAGTGGCGTCGGTGGTTCTGGTCGTGGAGCCCGCCCCTGTGCCGACCCCG<br>ACCCCCGACGACTACGACGAAGAAGACGACGCGGGCGTGAGCGAACGCAC<br>GCCGGTCAGCGTTCCCCCCCCAACCCCCCCCCGTCGTCCCCCCGTCGCCCCC<br>CCGACGCACCCTCGTGTTATCCCCGAGGTGTCCCACGTGCGCGGGGTAACG<br>GTCCATATGGAGACCCCGGAGGCCATTCTGTTTGCCCCCCGGGGAGACGTTT<br>GGGACGAACGTCTCCATCCACGCCATTGCCCACGACGACGGTCCGTACGCC<br>ATGGACGTCGTCTGGATGCGGTTTGACGTGCCGTCCTCGTGCGCCGAGATG<br>CGGATCTACGAAGCTTGTCTGTATCACCCGCAGCTTCCAGAGTGTCTATCTC<br>CGGCCGACGCGCCGTGCGCCGTAAGTTCCTGGGCGTACCGCCTGGCGGTCC<br>GCAGCTACGCCGGCTGTTCCAGGACTACGGGCCCGGGCCGATGTTTTGCCG<br>AGGCTCGCATGGAACCGGTCCCGGGGTTGGCGTGGCTGGCCTCCACCGTCA<br>ATCTGGAATTCCAGCACGCCTCCCCCCAGCACGCCGGCCTCTACCTGTGCGT<br>GGTGTACGTGGACGATCATATCCACGCCTGGGGCCACATGACCATCAGCAC<br>CGCGGCGCAGTACCGGAACGCGGTGGTGGAACAGCACCTCCCCCAGCGCC<br>AGCCCGAGCCCGTCGAGCCCACCCGCCCGCACGTGAGAGCCCCCCCTCCCG<br>CGCCCTCCGCGCGCGGCCCGCTGCGC |
| 44 | gE-2t 417 Mutant # 16 | ATGGCTCGCGGGGCCGGGTTGGTGTTTTTTGTTGGAGTTTGGGTCGTATCGT<br>GCCTGGCGGCAGCACCCAGAACGTCCTGGAAACGGGTAACCTCGGGCGAG<br>GACGTGGTGTTGCTTCCGGCGCCCGCGGGGCCGGAGGAACGCACCCGGGCC<br>CACAAACTACTGTGGGCCGCGGAACCCCTGGATGCCTGCGGTCCCCTGCGC |

TABLE 6-continued gE mutant construct nucleic acid sequences

| SEQ ID NO | Name | Sequence |
|---|---|---|
| | | CCGTCGTGGGTGGCGCTGTGGCCCCCCCGACGGGTGCTCGAGACGGTCGTG GATGCGGCGTGCATGCGCGCCCCGGAACCGCTCGCCATAGCATACAGTCCC CCGTTCCCCGCGGGCGACGAGGGACTGTATTCGGAGTTGGCGTGGCGCGAT CGCGTAGCCGTGGTCAACGAGAGTCTGGTCATCTACGGGGCCCTGGAGACG GACAGCGGTCTGTACACCCTGTCCGTGGTCGGCCTAAGCGACGAGGCGCGC CAAGTGGCGTCGGTGGTTCTGGTCGTGGAGCCCGCCCCTGTGCCGACCCCG ACCCCCGACGACTACGACGAAGAAGACGACGCGGGCGTGAGCGAACGCAC GCCGGTCAGCGTTCCCCCCCCAACCCCCCCCCGTCGTCCCCCGTCGCCCCC CCGACGCACCCTCGTGTTATCCCCGAGGTGTCCCACGTGCGCGGGGTAACG GTCCATATGGAGACCCCGGAGGCCATTCTGTTTGCCCCCGGGGAGACGTTT GGGACGAACGTCTCCATCGGCGCCATTGCCCACGACGACGGTCCGTACGCC ATGGACGTCGTCTGGATGCGGTTTGACGTGCCGTCCTCGTGCGCCGAGATG CGGATCTACGAAGCTTGTCTGTATCACCCGCAGCTTCCAGAGTGTCTATCTC CGGCCGACGCGCCGTGCGCCGTAAGTTCCTGGGCGTACCGCCTGGCGGTCC GCAGCTACGCCGGCTGTTCCAGGACTACGGGCCCGGGCCGATGTTTTGCCG AGGCTCGCATGGAACCGGTCCCGGGGTTGGCGTGGCTGGCCTCCACCGTCA ATCTGGAATTCCAGCACGCCTCCCCCCAGCACGCCGGCCTCTACCTGTGCGT GGTGTACGTGGACGATCATATCCACGCCTGGGGCCACATGACCATCAGCAC CGCGGCGCAGTACCGGAACGCGGTGGTGGAACAGCACCTCCCCCAGCGCC AGCCCGAGCCCGTCGAGCCCACCCGCCCGCACGTGAGAGCCCCCCCTCCCG CGCCCTCCGCGCGCGGCCCGCTGCGC |

Surface Plasmon Resonance Analysis of Mutant Construct gE-2 Monomers and Mutant gE-2/gI-2 Heterodimer to IgG gE-2/gI-2 wildtype control and mutant gE-2/gI-2 heterodimers were analyzed for binding to human and rabbit IgG using SPR analysis. gE-2/gI-2 wild type control and mutant gE-2/gI-2 heterodimers were diluted to 750 μg/ml (except for control peptide at 490 μg/ml) and flowed at 30 μl/min over human IgG Fc, human, and rabbit wh TABLE 8-continued End-point RU for gE mutant/gI heterodimers (#9-13, 15)

| Protein Construct | Virus Strain | Expression System | Human IgG Fc | RU Post Association Human IgG Whole Molecule | Rabbit IgG Whole Molecule |
|---|---|---|---|---|---|
| gE-2t 417 Mutant #11/gI-2t 262 | 333/333 | Mammal | 19 | 18 | 21 |
| gE-2t 417 Mutant #12/gI-2t 262 | 333/333 | Mammal | 27 | 32 | 62 |
| gE-2t 417 Mutant #13/gI-2t 262 | 333/333 | Mammal | 5 | 3 | 5 |
| gE-2t 417 Mutant #15/gI-2t 262 | 333/333 | Mammal | 8 | 5 | 4 |
| gD-2t 339 | HG52 | Mammal | 1 | 3 | 2 |
| HBS-P, pH 7.4 (end) | N/A | N/A | 3 | 2 | 11 |

Four of the mutants abrogated the ability of the gE-2/gI-2 heterodimer to associate with IgG Fc: mutants #1, #9, #13 and #15 (SEQ ID NOs: 12, 20, 24, and 26). Additionally, five mutants decreased the ability of the gE-2/gI-2 heterodimer to associate with IgG Fc: mutants #4, #6, #10, #11, and #12 (SEQ ID NOs: 15, 17, 21, 22, and 23). Mutant constructs #2, #5, and #8 (SEQ ID NOs: 13, 16, and 19) did not affect heterodimer association with IgG Fc.

Example 3: Immunogenicity of Mutant gE-2/gI Heterodimers

The gE-2/gI-2 heterodimers deficient in associating with IgG Fc (mutants #1, #9, #13, and #15) were evaluated in a rabbit immunogenicity study. Groups of 3 to 4 month-old female New Zealand white rabbits (N=4) were immunized with intramuscular injections of 20 μg of protein in the presence of 90 μg aluminum adjuvant (ADJU-PHOS). A control group of ADJU-PHOS alone in 0.5-mL saline was included (Group 6). Animals were immunized at weeks 0, 3, and 8. Immune sera were collected at week 0 (pre-bleed), 5 and 10. FIG. 5A is a diagram of the immunization and serum collection timeline, and a table of the immunization groups (the syringe symbol indicates immunization times and the blood droplet indicates a serum collection time).

Serum antibody ELISA was conducted to detect the antibody response to the wild type (WT) gE, gI, or gE-2/gI-2 heterodimers in the serum samples. Plates were coated with 0.1 μg of antigen (WT soluble gE-2, WT soluble gI-2, or WT soluble gE-2/gI-2 heterodimer). Serially diluted serum samples were added at 100 μl per well and incubated for 1 hour. Plates were developed colorimetrically using 3,3',5,5'-Tetramethylbenzidine (TMB) substrate and read for absorbance at 450 nm.

FIG. 5B shows a dot plot of interpolated titer for each immunized group. Antibodies in the animals that were immunized with mutant gE-2/gI-2 heterodimer titers were similar for all the mutant gE-2/gI-2 heterodimers and were equal to, or better than, titers elicited by the wild type gE-2/gI-2 heterodimer.

A serum neutralization antibody assay was also conducted to analyze the ability of the antibodies from animals immunized with mutant gE-2/gI-2 heterodimer to reduce HSV plaque forming units ("PFU") in the presence of complement (see Akhrameyeva et al., J Virol. 2011 May; 85 (10): 5036-47, and Johnson et al., J Virol. 1988 April; 62 (4): 1347-54, each of which is incorporated by reference herein). U-2 OS cells were seeded at $5\times10^4$ cells per well. Serum samples were diluted 1:10 initially and serially diluted 4-fold, with or without 5% baby rabbit complement. HSV-2 N2 lacZ reporter virus was diluted, with or without 5% baby rabbit complement, to $2.5\times10^4$ pfu/ml and an equal volume was added to the serum. The serum/virus mix was overlaid onto cells and incubated 18-24 hours. Cells were lysed, treated with development substrate, and $OD_{562}$ was read on a VERSAmax microplate reader.

FIG. 5C is a dot plot of the neutralizing antibody titer ($NT_{50}$) detected in the serum of the immunized groups. All mutant gE-2/gI-2 heterodimers elicited significantly higher serum neutralization antibody levels than the wild type gE-2/gI-2 heterodimer. This includes post dose 2 ("PD2") and post dose 3 ("PD3"). These data show that the quality of the elicited anti-gE antibodies was improved when the gE-2 immunogens were not masked by plasma IgG.

Table of Sequences

| SEQ ID NO: | Description | Sequence |
|---|---|---|
| 1 | Full length gE-2 (HSV-2), wild type Positions 1-20 - signal sequence Positions 21-417-ectodomain | MARGAGLVFFVGVWVVSCLAAAPRTSWKRVTSGEDVVL LPAPAGPEERTRAHKLLWAAEPLDACGPLRPSWVALWPP RRVLETVVDAACMRAPEPLAIAYSPPFPAGDEGLYSELA WRDRVAVVNESLVIYGALETDSGLYTLSVVGLSDEARQV ASVVLVVEPAPVPTPTPDDYDEEDDAGVSERTPVSVPPPT PPRRPPVAPPTHPRVIPEVSHVRGVTVHMETPEAILFAPGE TFGTNVSIHAIAHDDGPYAMDVVWMRFDVPSSCAEMRIY EACLYHPQLPECLSPADAPCAVSSWAYRLAVRSYAGCSR TTPPPRCFAEARMEPVPGLAWLASTVNLEFQHASPQHAG LYLCVVYVDDHIHAWGHMTISTAAQYRNAVVEQHLPQR QPEPVEPTRPHVRAPPPAPSARGPLRLGAVLGAALLLAAL GLSAWACMTCWRRRSWRAVKSRASATGPTYIRVADSEL YADWSSDSEGERDGSLWQDPPERPDSPSTNGSGFEILSPT APSVYPHSEGRKSRRPLTTFGSGSPGRRHSQASYSSVLW |
| 2 | gE-2t 417 wild type Positions 1-20 - signal sequence | MARGAGLVFFVGVWVVSCLAAAPRTSWKRVTSGEDVVL LPAPAGPEERTRAHKLLWAAEPLDACGPLRPSWVALWPP RRVLETVVDAACMRAPEPLAIAYSPPFPAGDEGLYSELA WRDRVAVVNESLVIYGALETDSGLYTLSVVGLSDEARQV ASVVLVVEPAPVPTPTPDDYDEEDDAGVSERTPVSVPPPT PPRRPPVAPPTHPRVIPEVSHVRGVTVHMETPEAILFAPGE TFGTNVSIHAIAHDDGPYAMDVVWMRFDVPSSCAEMRIY |

| SEQ ID NO: | Description | Sequence |
|---|---|---|
| | | EACLYHPQLPECLSPADAPCAVSSWAYRLAVRSYAGCSR<br>TTPPPRCFAEARMEPVPGLAWLASTVNLEFQHASPQHAG<br>LYLCVVYVDDHIHAWGHMTISTAAQYRNAVVEQHLPQR<br>QPEPVEPTRPHVRAPPPAPSARGPLR |
| 3 | gE-2t 405<br>Positions 1-20 -<br>signal<br>sequence | MARGAGLVFFVGVWVVSCLAAAPRTSWKRVTSGEDVVL<br>LPAPAGPEERTRAHKLLWAAEPLDACGPLRPSWVALWPP<br>RRVLETVVDAACMRAPEPLAIAYSPPFPAGDEGLYSELA<br>WRDRVAVVNESLVIYGALETDSGLYTLSVVGLSDEARQV<br>ASVVLVVEPAPVPTPTPDDYDEEDDAGVSERTPVSVPPPT<br>PPRRPPVAPPTHPRVIPEVSHVRGVTVHMETPEAILFAPGE<br>TFGTNVSIHAIAHDDGPYAMDVVWMRFDVPSSCAEMRIY<br>EACLYHPQLPECLSPADAPCAVSSWAYRLAVRSYAGCSR<br>TTPPPRCFAEARMEPVPGLAWLASTVNLEFQHASPQHAG<br>LYLCVVYVDDHIHAWGHMTISTAAQYRNAVVEQHLPQR<br>QPEPVEPTRPHVRA |
| 4 | gE-2t 24-405 | PRTSWKRVTSGEDVVLLPAPAGPEERTRAHKLLWAAEPL<br>DACGPLRPSWVALWPPRRVLETVVDAACMRAPEPLAIAY<br>SPPFPAGDEGLYSELAWRDRVAVVNESLVIYGALETDSGL<br>YTLSVVGLSDEARQVASVVLVVEPAPVPTPTPDDYDEED<br>DAGVSERTPVSVPPPTPPRRPPVAPPTHPRVIPEVSHVRGV<br>TVHMETPEAILFAPGETFGTNVSIHAIAHDDGPYAMDVV<br>WMRFDVPSSCAEMRIYEACLYHPQLPECLSPADAPCAVS<br>SWAYRLAVRSYAGCSRTTPPPRCFAEARMEPVPGLAWLA<br>STVNLEFQHASPQHAGLYLCVVYVDDHIHAWGHMTISTA<br>AQYRNAVVEQHLPQRQPEPVEPTRPHVRA |
| 5 | gE-2t 414<br>positions 1-20 -<br>signal<br>sequence | MARGAGLVFFVGVWVVSCLAAAPRTSWKRVTSGEDVVL<br>LPAPAGPEERTRAHKLLWAAEPLDACGPLRPSWVALWPP<br>RRVLETVVDAACMRAPEPLAIAYSPPFPAGDEGLYSELA<br>WRDRVAVVNESLVIYGALETDSGLYTLSVVGLSDEARQV<br>ASVVLVVEPAPVPTPTPDDYDEEDDAGVSERTPVSVPPPT<br>PPRRPPVAPPTHPRVIPEVSHVRGVTVHMETPEAILFAPGE<br>TFGTNVSIHAIAHDDGPYAMDVVWMRFDVPSSCAEMRIY<br>EACLYHPQLPECLSPADAPCAVSSWAYRLAVRSYAGCSR<br>TTPPPRCFAEARMEPVPGLAWLASTVNLEFQHASPQHAG<br>LYLCVVYVDDHIHAWGHMTISTAAQYRNAVVEQHLPQR<br>QPEPVEPTRPHVRAPPPAPSARG |
| 6 | gE-2t 419<br>positions 1-20 -<br>signal<br>sequence | MARGAGLVFFVGVWVVSCLAAAPRTSWKRVTSGEDVVL<br>LPAPAGPEERTRAHKLLWAAEPLDACGPLRPSWVALWPP<br>RRVLETVVDAACMRAPEPLAIAYSPPFPAGDEGLYSELA<br>WRDRVAVVNESLVIYGALETDSGLYTLSVVGLSDEARQV<br>ASVVLVVEPAPVPTPTPDDYDEEDDAGVSERTPVSVPPPT<br>PPRRPPVAPPTHPRVIPEVSHVRGVTVHMETPEAILFAPGE<br>TFGTNVSIHAIAHDDGPYAMDVVWMRFDVPSSCAEMRIY<br>EACLYHPQLPECLSPADAPCAVSSWAYRLAVRSYAGCSR<br>TTPPPRCFAEARMEPVPGLAWLASTVNLEFQHASPQHAG<br>LYLCVVYVDDHIHAWGHMTISTAAQYRNAVVEQHLPQR<br>QPEPVEPTRPHVRAPPPAPSARGPLRLG |
| 7 | gE-1t 419<br>positions 1-20 -<br>signal<br>sequence | MDRGAVVGFLLGVCVVSCLAGTPKTSWRRVSVGEDVSL<br>LPAPGPTGRGPTQKLLWAVEPLDGCGPLHPSWVSLMPPK<br>QVPETVVDAACMRAPVPLAMAYAPPAPSATGGLRTDFV<br>WQERAAVVNRSLVIHGVRETDSGLYTLSVGDIKDPARQV<br>ASVVLVVQPAPVPTPPPTPADYDEDDNDEGEDESLAGTP<br>ASGTPRLPPPPAPPRSWPSAPEVSHVRGVTVRMETPEAILF<br>SPGETFSTNVSIHAIAHDDQTYSMDVVWLRFDVPTSCAE<br>MRIYESCLYHPQLPECLSPADAPCAASTWTSRLAVRSYAG<br>CSRTNPPPRCSAEAHMEPVPGLAWQAASVNLEFRDASPQ<br>HSGLYLCVVYVNDHIHAWGHITISTAAQYRNAVVEQPLP<br>QRGADLAEPTHPVGAPPHAPPTHGALR |
| 8 | gD-2t 339<br>positions 1-25 -<br>signal<br>sequence | MGRLTSGVGTAALLVVAVGLRVVCAKYALADPSLKMA<br>DPNRFRGKNLPVLDQLTDPPGVKRVYHIQPSLEDPFQPPSI<br>PITVYYAVLERACRSVLLHAPSEAPQIVRGASDEARKHTY<br>NLTIAWYRMGDNCAIPITVMEYTECPYNKSLGVCPIRTQP<br>RWSYYDSFSAVSEDNLGFLMHAPAFETAGTYLRLVKIND<br>WTEITQFILEHRARASCKYALPLRIPPAACLTSKAYQQGV<br>TVDSIGMLPRFIPENQRTVALYSLKIAGWHGPKPPYTSTLL<br>PPELSDTTNATQPELVPEDPEDSALLEDPAGTVSSQIPPNW<br>HIPSIQDVAPHHAPAAPSNP |

Table of Sequences

| SEQ ID NO: | Description | Sequence |
|---|---|---|
| 9 | Full length gI-2 wild type Positions 1-20 signal peptide Positions 21-262 - ectodomain | MPGRSLQGLAILGLWVCATGLVVRGPTVSLVSDSLVDAG AVGPQGFVEEDLRVFGELHFVGAQVPHTNYYDGIIELFHY PLGNHCPRVVHVVTLTACPRRPAVAFTLCRSTHHAHSPA YPTLELGLARQPLLRVRTATRDYAGLYVLRVWVGSATN ASLFVLGVALSANGTFVYNGSDYGSCDPAQLPFSAPRLGP SSVYTPGASRPTPPRTTTSPSSPRDPTPAPGDTGTPAPASGE RAPPNSTRSASESRHRLTVAQVIQIAIPASIIAFVFLGSCICFI HRCQRRYRRPRGQIYNPGGVSCAVNEAAMARLGAELRS HPNTPPKPRRRSSSSTTMPSLTSIAEESEPGPVVLLSVSPRP RSGPTAPQEV |
| 10 | gI-2t 262 | MPGRSLQGLAILGLWVCATGLVVRGPTVSLVSDSLVDAG AVGPQGFVEEDLRVFGELHFVGAQVPHTNYYDGIIELFHY PLGNHCPRVVHVVTLTACPRRPAVAFTLCRSTHHAHSPA YPTLELGLARQPLLRVRTATRDYAGLYVLRVWVGSATN ASLFVLGVALSANGTFVYNGSDYGSCDPAQLPFSAPRLGP SSVYTPGASRPTPPRTTTSPSSPRDPTPAPGDTGTPAPASGE RAPPNSTRSASESRHRLTVAQVIQ |
| 11 | gI-1t 269 positions 1-20 signal peptide | MPCRPLQGLVLVGLWVCATSLVVRGPTVSLVSNSFVDAG ALGPDGVVEEDLLILGELRFVGDQVPHTTYYDGVVELWH YPMGHKCPRVVHVVTVTACPRRPAVAFALCRATDSTHSP AYPTLELNLAQQPLLRVRRATRDYAGVYVLRVWVGDAP NASLFVLGMAIAAEGTLAYNGSAHGSCDPKLLPSSAPRLA PASVYQPAPNPASTPSTTTSTPSTTIPAPQASTTPFPTGDPK PQPHGVNHEPPSNATRATRDSRYALTVTQIIQ |
| 12 | gE-2t 417 Mutant #1 positions 1-20 signal peptide positions 337-344 - mutated surface-exposed loop | MARGAGLVFFVGVWVVSCLAAAPRTSWKRVTSGEDVVL LPAPAGPEERTRAHKLLWAAEPLDACGPLRPSWVALWPP RRVLETVVDAACMRAPEPLAIAYSPPPFPAGDEGLYSELA WRDRVAVVNESLVIYGALETDSGLYTLSVVGLSDEARQV ASVVLVVEPAPVPTPTPDDYDEEDDAGVSERTPVSVPPPT PPRRPPVAPPTHPRVIPEVSHVRGVTVHMETPEAILFAPGE TFGTNVSIHAIAHDDGPYAMDVVWMRFDVPSSCAEMRIY EACLYHPQLPECLSPADAPCAVSSWAYRLAVRSYAGCSR TTPPPRCFAEARMEPVPGLAWLAARAASTVNLEFQHASP QHAGLYLCVVYVDDHIHAWGHMTISTAAQYRNAVVEQ HLPQRQPEPVEPTRPHVRAPPPAPSARGPLR |
| 13 | gE-2t 417 Mutant #2 positions 1-20 signal peptide positions 337-340 - mutated surface-exposed loop | MARGAGLVFFVGVWVVSCLAAAPRTSWKRVTSGEDVVL LPAPAGPEERTRAHKLLWAAEPLDACGPLRPSWVALWPP RRVLETVVDAACMRAPEPLAIAYSPPPFPAGDEGLYSELA WRDRVAVVNESLVIYGALETDSGLYTLSVVGLSDEARQV ASVVLVVEPAPVPTPTPDDYDEEDDAGVSERTPVSVPPPT PPRRPPVAPPTHPRVIPEVSHVRGVTVHMETPEAILFAPGE TFGTNVSIHAIAHDDGPYAMDVVWMRFDVPSSCAEMRIY EACLYHPQLPECLSPADAPCAVSSWAYRLAVRSYAGCSR TTPPPRCFAEARMEPVPGLAWLAGTVNLEFQHASPQHAG LYLCVVYVDDHIHAWGHMTISTAAQYRNAVVEQHLPQR QPEPVEPTRPHVRAPPPAPSARGPLR |
| 14 | gE-2t 417 Mutant #3 positions 1-20 signal peptide positions 337-339 - mutated surface-exposed loop | MARGAGLVFFVGVWVVSCLAAAPRTSWKRVTSGEDVVL LPAPAGPEERTRAHKLLWAAEPLDACGPLRPSWVALWPP RRVLETVVDAACMRAPEPLAIAYSPPPFPAGDEGLYSELA WRDRVAVVNESLVIYGALETDSGLYTLSVVGLSDEARQV ASVVLVVEPAPVPTPTPDDYDEEDDAGVSERTPVSVPPPT PPRRPPVAPPTHPRVIPEVSHVRGVTVHMETPEAILFAPGE TFGTNVSIHAIAHDDGPYAMDVVWMRFDVPSSCAEMRIY EACLYHPQLPECLSPADAPCAVSSWAYRLAVRSYAGCSR TTPPPRCFAEARMEPVPGLAWLATVNLEFQHASPQHAGL YLCVVYVDDHIHAWGHMTISTAAQYRNAVVEQHLPQRQ PEPVEPTRPHVRAPPPAPSARGPLR |

-continued

Table of Sequences

| SEQ ID NO: | Description | Sequence |
|---|---|---|
| 15 | gE-2t 417 Mutant #4 positions 1-20 - signal peptide positions 337-340 - mutated surface-exposed loop | MARGAGLVFFVGVWVVSCLAAAPRTSWKRVTSGEDVVL<br>LPAPAGPEERTRAHKLLWAAEPLDACGPLRPSWVALWPP<br>RRVLETVVDAACMRAPEPLAIAYSPPFPAGDEGLYSELA<br>WRDRVAVVNESLVIYGALETDSGLYTLSVVGLSDEARQV<br>ASVVLVVEPAPVPTPTPDDYDEEDDAGVSERTPVSVPPPT<br>PPRRPPVAPPTHPRVIPEVSHVRGVTVHMETPEAILFAPGE<br>TFGTNVSIHAIAHDDGPYAMDVVWMRFDVPSSCAEMRIY<br>EACLYHPQLPECLSPADAPCAVSSWAYRLAVRSYAGCSR<br>TTPPPRCFAEARMEPVPGLAWLASGVNLEFQHASPQHAG<br>LYLCVVYVDDHIHAWGHMTISTAAQYRNAVVEQHLPQR |
| 16 | gE-2t 417 Mutant #5 positions 1-20 - signal peptide positions 337-339 - mutated surface-exposed loop | MARGAGLVFFVGVWVVSCLAAAPRTSWKRVTSGEDVVL<br>LPAPAGPEERTRAHKLLWAAEPLDACGPLRPSWVALWPP<br>RRVLETVVDAACMRAPEPLAIAYSPPFPAGDEGLYSELA<br>WRDRVAVVNESLVIYGALETDSGLYTLSVVGLSDEARQV<br>ASVVLVVEPAPVPTPTPDDYDEEDDAGVSERTPVSVPPPT<br>PPRRPPVAPPTHPRVIPEVSHVRGVTVHMETPEAILFAPGE<br>TFGTNVSIHAIAHDDGPYAMDVVWMRFDVPSSCAEMRIY<br>EACLYHPQLPECLSPADAPCAVSSWAYRLAVRSYAGCSR<br>TTPPPRCFAEARMEPVPGLAWLASVNLEFQHASPQHAGL<br>YLCVVYVDDHIHAWGHMTISTAAQYRNAVVEQHLPQRQ<br>PEPVEPTRPHVRAPPPAPSARGPLR |
| 17 | gE-2t 417 Mutant #6 positions 1-20 - signal peptide positions 337-340 - mutated surface-exposed loop | MARGAGLVFFVGVWVVSCLAAAPRTSWKRVTSGEDVVL<br>LPAPAGPEERTRAHKLLWAAEPLDACGPLRPSWVALWPP<br>RRVLETVVDAACMRAPEPLAIAYSPPFPAGDEGLYSELA<br>WRDRVAVVNESLVIYGALETDSGLYTLSVVGLSDEARQV<br>ASVVLVVEPAPVPTPTPDDYDEEDDAGVSERTPVSVPPPT<br>PPRRPPVAPPTHPRVIPEVSHVRGVTVHMETPEAILFAPGE<br>TFGTNVSIHAIAHDDGPYAMDVVWMRFDVPSSCAEMRIY<br>EACLYHPQLPECLSPADAPCAVSSWAYRLAVRSYAGCSR<br>TTPPPRCFAEARMEPVPGLAWLAGGVNLEFQHASPQHAG<br>LYLCVVYVDDHIHAWGHMTISTAAQYRNAVVEQHLPQR<br>QPEPVEPTRPHVRAPPPAPSARGPLR |
| 18 | gE-2t 417 Mutant #7 positions 1-20 - signal peptide positions 337-338 - mutated surface-exposed loop | MARGAGLVFFVGVWVVSCLAAAPRTSWKRVTSGEDVVL<br>LPAPAGPEERTRAHKLLWAAEPLDACGPLRPSWVALWPP<br>RRVLETVVDAACMRAPEPLAIAYSPPFPAGDEGLYSELA<br>WRDRVAVVNESLVIYGALETDSGLYTLSVVGLSDEARQV<br>ASVVLVVEPAPVPTPTPDDYDEEDDAGVSERTPVSVPPPT<br>PPRRPPVAPPTHPRVIPEVSHVRGVTVHMETPEAILFAPGE<br>TFGTNVSIHAIAHDDGPYAMDVVWMRFDVPSSCAEMRIY<br>EACLYHPQLPECLSPADAPCAVSSWAYRLAVRSYAGCSR<br>TTPPPRCFAEARMEPVPGLAWLAVNLEFQHASPQHAGLY<br>LCVVYVDDHIHAWGHMTISTAAQYRNAVVEQHLPQRQP<br>EPVEPTRPHVRAPPPAPSARGPLR |
| 19 | gE-2t 417 Mutant #8 positions 1-20 - signal peptide positions 337-340 - mutated surface-exposed loop | MARGAGLVFFVGVWVVSCLAAAPRTSWKRVTSGEDVVL<br>LPAPAGPEERTRAHKLLWAAEPLDACGPLRPSWVALWPP<br>RRVLETVVDAACMRAPEPLAIAYSPPFPAGDEGLYSELA<br>WRDRVAVVNESLVIYGALETDSGLYTLSVVGLSDEARQV<br>ASVVLVVEPAPVPTPTPDDYDEEDDAGVSERTPVSVPPPT<br>PPRRPPVAPPTHPRVIPEVSHVRGVTVHMETPEAILFAPGE<br>TFGTNVSIHAIAHDDGPYAMDVVWMRFDVPSSCAEMRIY<br>EACLYHPQLPECLSPADAPCAVSSWAYRLAVRSYAGCSR<br>TTPPPRCFAEARMEPVPGLAWLGGGVNLEFQHASPQHAG<br>LYLCVVYVDDHIHAWGHMTISTAAQYRNAVVEQHLPQR<br>QPEPVEPTRPHVRAPPPAPSARGPLR |
| 20 | gE-2t 417 Mutant #9 positions 1-20 - signal peptide positions 337-340 - mutated surface-exposed loop | MARGAGLVFFVGVWVVSCLAAAPRTSWKRVTSGEDVVL<br>LPAPAGPEERTRAHKLLWAAEPLDACGPLRPSWVALWPP<br>RRVLETVVDAACMRAPEPLAIAYSPPFPAGDEGLYSELA<br>WRDRVAVVNESLVIYGALETDSGLYTLSVVGLSDEARQV<br>ASVVLVVEPAPVPTPTPDDYDEEDDAGVSERTPVSVPPPT<br>PPRRPPVAPPTHPRVIPEVSHVRGVTVHMETPEAILFAPGE<br>TFGTNVSIHAIAHDDGPYAMDVVWMRFDVPSSCAEMRIY<br>EACLYHPQLPECLSPADAPCAVSSWAYRLAVRSYAGCSR<br>TTPPPRCFAEARMEPVPGLAWLAGGGNLEFQHASPQHAG<br>LYLCVVYVDDHIHAWGHMTISTAAQYRNAVVEQHLPQR<br>QPEPVEPTRPHVRAPPPAPSARGPLR |

Table of Sequences

| SEQ ID NO: | Description | Sequence |
|---|---|---|
| 21 | gE-2t 417 Mutant #10 positions 1-20 - signal peptide position 245 - residue substitution from wild type | MARGAGLVFFVGVWVVSCLAAAPRTSWKRVTSGEDVVL LPAPAGPEERTRAHKLLWAAEPLDACGPLRPSWVALWPP RRVLETVVDAACMRAPEPLAIAYSPPFPAGDEGLYSELA WRDRVAVVNESLVIYGALETDSGLYTLSVVGLSDEARQV ASVVLVVEPAPVPTPTPDDYDEEDDAGVSERTPVSVPPPT PPRRPPVAPPTHPRVIPEVSHVRGVTVHMETPEAILFAPGE TFGTNVSIGAIAHDDGPYAMDVVWMRFDVPSSCAEMRIY EACLYHPQLPECLSPADAPCAVSSWAYRLAVRSYAGCSR TTPPPRCFAEARMEPVPGLAWLASTVNLEFQHASPQHAG LYLCVVYVDDHIHAWGHMTISTAAQYRNAVVEQHLPQR QPEPVEPTRPHVRAPPPAPSARGPLR |
| 22 | gE-2t 417 Mutant #11 positions 1-20 - signal peptide position 317 - residue substitution from wild type | MARGAGLVFFVGVWVVSCLAAAPRTSWKRVTSGEDVVL LPAPAGPEERTRAHKLLWAAEPLDACGPLRPSWVALWPP RRVLETVVDAACMRAPEPLAIAYSPPFPAGDEGLYSELA WRDRVAVVNESLVIYGALETDSGLYTLSVVGLSDEARQV ASVVLVVEPAPVPTPTPDDYDEEDDAGVSERTPVSVPPPT PPRRPPVAPPTHPRVIPEVSHVRGVTVHMETPEAILFAPGE TFGTNVSIHAIAHDDGPYAMDVVWMRFDVPSSCAEMRIY EACLYHPQLPECLSPADAPCAVSSWAYRLAVRSYAGCSR TTGPPRCFAEARMEPVPGLAWLASTVNLEFQHASPQHAG LYLCVVYVDDHIHAWGHMTISTAAQYRNAVVEQHLPQR QPEPVEPTRPHVRAPPPAPSARGPLR |
| 23 | gE-2t 417 Mutant #12 positions 1-20 - signal peptide position 317 - residue substitution from wild type | MARGAGLVFFVGVWVVSCLAAAPRTSWKRVTSGEDVVL LPAPAGPEERTRAHKLLWAAEPLDACGPLRPSWVALWPP RRVLETVVDAACMRAPEPLAIAYSPPFPAGDEGLYSELA WRDRVAVVNESLVIYGALETDSGLYTLSVVGLSDEARQV ASVVLVVEPAPVPTPTPDDYDEEDDAGVSERTPVSVPPPT PPRRPPVAPPTHPRVIPEVSHVRGVTVHMETPEAILFAPGE TFGTNVSIHAIAHDDGPYAMDVVWMRFDVPSSCAEMRIY EACLYHPQLPECLSPADAPCAVSSWAYRLAVRSYAGCSR TTPPGRCFAEARMEPVPGLAWLASTVNLEFQHASPQHAG LYLCVVYVDDHIHAWGHMTISTAAQYRNAVVEQHLPQR QPEPVEPTRPHVRAPPPAPSARGPLR |
| 24 | gE-2t 417 Mutant #13 positions 1-20 - signal peptide positions 245, 317 - residue substitutions from wild type | MARGAGLVFFVGVWVVSCLAAAPRTSWKRVTSGEDVVL LPAPAGPEERTRAHKLLWAAEPLDACGPLRPSWVALWPP RRVLETVVDAACMRAPEPLAIAYSPPFPAGDEGLYSELA WRDRVAVVNESLVIYGALETDSGLYTLSVVGLSDEARQV ASVVLVVEPAPVPTPTPDDYDEEDDAGVSERTPVSVPPPT PPRRPPVAPPTHPRVIPEVSHVRGVTVHMETPEAILFAPGE TFGTNVSIGAIAHDDGPYAMDVVWMRFDVPSSCAEMRIY EACLYHPQLPECLSPADAPCAVSSWAYRLAVRSYAGCSR TTGPPRCFAEARMEPVPGLAWLASTVNLEFQHASPQHAG LYLCVVYVDDHIHAWGHMTISTAAQYRNAVVEQHLPQR QPEPVEPTRPHVRAPPPAPSARGPLR |
| 25 | gE-2t 417 Mutant #14 positions 1-20 - signal peptide positions 245, 319 - residue substitutions from wild type | MARGAGLVFFVGVWVVSCLAAAPRTSWKRVTSGEDVVL LPAPAGPEERTRAHKLLWAAEPLDACGPLRPSWVALWPP RRVLETVVDAACMRAPEPLAIAYSPPFPAGDEGLYSELA WRDRVAVVNESLVIYGALETDSGLYTLSVVGLSDEARQV ASVVLVVEPAPVPTPTPDDYDEEDDAGVSERTPVSVPPPT PPRRPPVAPPTHPRVIPEVSHVRGVTVHMETPEAILFAPGE TFGTNVSIGAIAHDDGPYAMDVVWMRFDVPSSCAEMRIY EACLYHPQLPECLSPADAPCAVSSWAYRLAVRSYAGCSR TTPPGRCFAEARMEPVPGLAWLASTVNLEFQHASPQHAG LYLCVVYVDDHIHAWGHMTISTAAQYRNAVVEQHLPQR QPEPVEPTRPHVRAPPPAPSARGPLR |
| 26 | gE-2t 417 Mutant #15 positions 1-20 - signal peptide positions 317, 319 - residue substitutions from wild type | MARGAGLVFFVGVWVVSCLAAAPRTSWKRVTSGEDVVL LPAPAGPEERTRAHKLLWAAEPLDACGPLRPSWVALWPP RRVLETVVDAACMRAPEPLAIAYSPPFPAGDEGLYSELA WRDRVAVVNESLVIYGALETDSGLYTLSVVGLSDEARQV ASVVLVVEPAPVPTPTPDDYDEEDDAGVSERTPVSVPPPT PPRRPPVAPPTHPRVIPEVSHVRGVTVHMETPEAILFAPGE TFGTNVSIHAIAHDDGPYAMDVVWMRFDVPSSCAEMRIY EACLYHPQLPECLSPADAPCAVSSWAYRLAVRSYAGCSR TTGPGRCFAEARMEPVPGLAWLASTVNLEFQHASPQHAG LYLCVVYVDDHIHAWGHMTISTAAQYRNAVVEQHLPQR QPEPVEPTRPHVRAPPPAPSARGPLR |

Table of Sequences

| SEQ ID NO: | Description | Sequence |
|---|---|---|
| 27 | gE-2t 417 Mutant #16 positions 1-20 - signal peptide positions 245, 317, 319 - residue substitutions from wild type | MARGAGLVFFVGVWVVSCLAAAPRTSWKRVTSGEDVVL LPAPAGPEERTRAHKLLWAAEPLDACGPLRPSWVALWPP RRVLETVVDAACMRAPEPLAIAYSPPFPAGDEGLYSELA WRDRVAVVNESLVIYGALETDSGLYTLSVVGLSDEARQV ASVVLVVEPAPVPTPTPDDYDEEDDAGVSERTPVSVPPPT PPRRPPVAPPTHPRVIPEVSHVRGVTVHMETPEAILFAPGE TFGTNVSIGAIAHDDGPYAMDVVWMRFDVPSSCAEMRIY EACLYHPQLPECLSPADAPCAVSSWAYRLAVRSYAGCSR TTGPGRCFAEARMEPVPGLAWLASTVNLEFQHASPQHAG LYLCVVYVDDHIHAWGHMTISTAAQYRNAVVEQHLPQR QPEPVEPTRPHVRAPPPAPSARGPLR |
| 28 | gE-1 strain KOS positions 1-20 - signal peptide | MDRGAVVGFLLGVCVVSCLAGTPKTSWRRVSVGEDVSL LPAPGPTGRGPTQKLLWAVEPLDGCGPLHPSWVSLMPPK QVPETVVDAACMRAPVPLAMAYAPPAPSATGGLRTDFV WQERAAVVNRSLVIHGVRETDSGLYTLSVGDIKDPARQV ASVVLVVQPAPVPTPPPTPADYDEDDNDEGEDESLAGTP ASGTPRLPPPPAPPRSWPSAPEVSHVRGVTVRMETPEAILF SPGETFSTNVSIHAIAHDDQTYSMDVVWLRFDVPTSCAE MRIYESCLYHPQLPECLSPADAPCAASTWTSRLAVRSYAG CSRTNPPPRCSAEAHMEPVPGLAWQAASVNLEFRDASPQ HSGLYLCVVYVNDHIHAWGHITISTAAQYRNAVVEQPLP QRGADLAEPTHPHVGAPPHAPPTHGALRLGAVMGAALL LSALGLSVWACMTCWRRRAWRAVKSRASGKGPTYIRVA DSELYADWSSDSEGERDQVPWLAPPERPDSPSTNGSGFEI LSPTAPSVYPRSDGHQSRRQLTTFGSGRPDRRYSQASDSS VFW |
| 29 | gE-2t 417 Mutant #1 positions 1-60 - signal peptide positions 1009-1032 - encodes mutated surface-exposed loop | ATGGCTCGCGGGGCCGGGTTGGTGTTTTTTGTTGGAGT TTGGGTCGTATCGTGCCTGGCGGCAGCACCCAGAACGT CCTGGAAACGGGTAACCTCGGGCGAGGACGTGGTGTT GCTTCCGGCGCCCGCGGGGCCGGAGGAACGCACCCGG GCCCACAAACTACTGTGGGCCGCGGAACCCCTGGATGC CTGCGGTCCCCTGCGCCCGTCGTGGGTGGCGCTGTGGC CCCCCCGACGGGTGCTCGAGACGGTCGTGGATGCGGCG TGCATGCGCGCCCCGGAACCGCTCGCCATAGCATACAG TCCCCCGTTCCCCGCGGGCGACGAGGGACTGTATTCGG AGTTGGCGTGGCGCGATCGCGTAGCCGTGGTCAACGAG AGTCTGGTCATCTACGGGGCCCTGGAGACGGACAGCG GTCTGTACACCCTGTCCGTGGTCGGCCTAAGCGACGAG GCGCGCCAAGTGGCCGTCGGTGGTTCTGGTCGTGGAGCC CGCCCCTGTGCCGACCCCGACCCCCGACGACTACGACG AAGAAGACGACGCGGGCGTGAGCGAACGCACGCCGGT CAGCGTTCCCCCCCAACCCCCCCCCGTCGTCCCCCCGT CGCCCCCCCGACGCACCCTCGTGTTATCCCCGAGGTGT CCCACGTGCGCGGGGTAACGGTCCATATGGAGACCCCG GAGGCCATTCTGTTTGCCCCCGGGGAGACGTTTGGGAC GAACGTCTCCATCCACGCCATTGCCCACGACGACGGTC CGTACGCCATGGACGTCGTCTGGATGCGGTTTGACGTG CCGTCCTCGTGCGCCGAGATGCGGATCTACGAAGCTTG TCTGTATCACCCGCAGCTTCCAGAGTGTCTATCTCCGGC CGACGCGCCGTGCGCCGTAAGTTCCTGGGCGTACCGCC TGGCGGTCCGCAGCTACGCCGGCTGTTCCAGGACTACG CCCCCGCCGCGATGTTTTGCCGAGGCTCGCATGGAACC GGTCCCGGGGTTGGCGTGGCTGGCCGCCCGCGCCGCCT CCACCGTCAATCTGGAATTCCAGCACGCCTCCCCCCAG CACGCCGGCCTCTACCTGTGCGCGTGGTGTACGTGGACGA TCATATCCACGCCTGGGGCCACATGACCATCAGCACCG CGGCGCAGTACCGGAACGCGGTGGTGGAACAGCACCT CCCCCAGCGCCAGCCCGAGCCCGTCGAGCCCACCCGCC CGCACGTGAGAGCCCCCCCTCCCGCGCCCTCCGCGCGC GGCCCGCTGCGC |
| 30 | gE-2t 417 Mutant #2 positions 1-60 - signal peptide positions 1009-1020 - encodes | ATGGCTCGCGGGGCCGGGTTGGTGTTTTTTGTTGGAGT TTGGGTCGTATCGTGCCTGGCGGCAGCACCCAGAACGT CCTGGAAACGGGTAACCTCGGGCGAGGACGTGGTGTT GCTTCCGGCGCCCGCGGGGCCGGAGGAACGCACCCGG GCCCACAAACTACTGTGGGCCGCGGAACCCCTGGATGC CTGCGGTCCCCTGCGCCCGTCGTGGGTGGCGCTGTGGC CCCCCCGACGGGTGCTCGAGACGGTCGTGGATGCGGCG TGCATGCGCGCCCCGGAACCGCTCGCCATAGCATACAG |

-continued

Table of Sequences

| SEQ ID NO: | Description | Sequence |
|---|---|---|
| | mutated surface-exposed loop | TCCCCCGTTCCCCGCGGGCGACGAGGGACTGTATTCGG AGTTGGCGTGGCGCGATCGCGTAGCCGTGGTCAACGAG AGTCTGGTCATCTACGGGGCCCTGGAGACGGACAGCG GTCTGTACACCCTGTCCGTGGTCGGCCTAAGCGACGAG GCGCGCCAAGTGGCGTCGGTGGTTCTGGTCGTGGAGCC CGCCCCTGTGCCGACCCCGACCCCCGACGACTACGACG AAGAAGACGACGCGGGCGTGAGCGAACGCACGCCGGT CAGCGTTCCCCCCCCAACCCCCCCCCGTCGTCCCCCCGT CGCCCCCCCGACGCACCCTCGTGTTATCCCCGAGGTGT CCCACGTGCGCGGGGTAACGGTCCATATGGAGACCCCG GAGGCCATTCTGTTTGCCCCCGGGGAGACGTTTGGGAC GAACGTCTCCATCCACGCCATTGCCCACGACGACGGTC CGTACGCCATGGACGTCGTCTGGATGCGGTTTGACGTG CCGTCCTCGTGCGCCGAGATGCGGATCTACGAAGCTTG TCTGTATCACCCGCAGCTTCCAGAGTGTCTATCTCCGGC CGACGCGCCGTGCGCCGTAAGTTCCTGGGCGTACCGCC TGGCGGTCCGCAGCTACGCCGGCTGTTCCAGGACTACG CCCCCGCCGCGATGTTTTGCCGAGGCTCGCATGGAACC GGTCCCGGGGTTGGCGTGGCTGGCCGGCACCGTCAATC TGGAATTCCAGCACGCCTCCCCCCAGCACGCCGGCCTC TACCTGTGCGTGGTGTACGTGGACGATCATATCCACGC CTGGGGCCACATGACCATCAGCACCGCGGCGCAGTACC GGAACGCGGTGGTGGAACAGCACCTCCCCCAGCGCCA GCCCGAGCCCGTCGAGCCCACCCGCCCGCACGTGAGA GCCCCCCCTCCCGCGCCCTCCGCGCGCGGCCCGCTGCG C |
| 31 | gE-2t 417 Mutant #3 positions 1-60 - signal peptide positions 1009-1017 - encodes mutated surface-exposed loop | ATGGCTCGCGGGGCCGGGTTGGTGTTTTTTGTTGGAGT TTGGGTCGTATCGTGCCTGGCGGCAGCACCCAGAACGT CCTGGAAACGGGTAACCTCGGGCGAGGACGTGGTGTT GCTTCCGGCGCCCGCGGGGCCGGAGGAACGCACCCGG GCCCACAAACTACTGTGGGCCGCGGAACCCCTGGATGC CTGCGGTCCCCTGCGCCCGTCGTGGGTGGCGCTGTGGC CCCCCCGACGGGTGCTCGAGACGGTCGTGGATGCGGCG TGCATGCGCGCCCCGGAACCGCTCGCCATAGCATACAG TCCCCCGTTCCCCGCGGGCGACGAGGGACTGTATTCGG AGTTGGCGTGGCGCGATCGCGTAGCCGTGGTCAACGAG AGTCTGGTCATCTACGGGGCCCTGGAGACGGACAGCG GTCTGTACACCCTGTCCGTGGTCGGCCTAAGCGACGAG GCGCGCCAAGTGGCGTCGGTGGTTCTGGTCGTGGAGCC CGCCCCTGTGCCGACCCCGACCCCCGACGACTACGACG AAGAAGACGACGCGGGCGTGAGCGAACGCACGCCGGT CAGCGTTCCCCCCCCAACCCCCCCCCGTCGTCCCCCCGT CGCCCCCCCGACGCACCCTCGTGTTATCCCCGAGGTGT CCCACGTGCGCGGGGTAACGGTCCATATGGAGACCCCG GAGGCCATTCTGTTTGCCCCCGGGGAGACGTTTGGGAC GAACGTCTCCATCCACGCCATTGCCCACGACGACGGTC CGTACGCCATGGACGTCGTCTGGATGCGGTTTGACGTG CCGTCCTCGTGCGCCGAGATGCGGATCTACGAAGCTTG TCTGTATCACCCGCAGCTTCCAGAGTGTCTATCTCCGGC CGACGCGCCGTGCGCCGTAAGTTCCTGGGCGTACCGCC TGGCGGTCCGCAGCTACGCCGGCTGTTCCAGGACTACG CCCCCGCCGCGATGTTTTGCCGAGGCTCGCATGGAACC GGTCCCGGGGTTGGCGTGGCTGGCCACCGTCAATCTGG AATTCCAGCACGCCTCCCCCCAGCACGCCGGCCTCTAC CTGTGCGTGGTGTACGTGGACGATCATATCCACGCCTG GGGCCACATGACCATCAGCACCGCGGCGCAGTACCGG AACGCGGTGGTGGAACAGCACCTCCCCCAGCGCCAGC CCGAGCCCGTCGAGCCCACCCGCCCGCACGTGAGAGCC CCCCCTCCCGCGCCCTCCGCGCGCGGCCCGCTGCGC |
| 32 | gE-2t 417 Mutant #4 positions 1-60 - signal peptide positions 1009-1017 - encodes mutated surface-exposed loop | ATGGCTCGCGGGGCCGGGTTGGTGTTTTTTGTTGGAGT TTGGGTCGTATCGTGCCTGGCGGCAGCACCCAGAACGT CCTGGAAACGGGTAACCTCGGGCGAGGACGTGGTGTT GCTTCCGGCGCCCGCGGGGCCGGAGGAACGCACCCGG GCCCACAAACTACTGTGGGCCGCGGAACCCCTGGATGC CTGCGGTCCCCTGCGCCCGTCGTGGGTGGCGCTGTGGC CCCCCCGACGGGTGCTCGAGACGGTCGTGGATGCGGCG TGCATGCGCGCCCCGGAACCGCTCGCCATAGCATACAG TCCCCCGTTCCCCGCGGGCGACGAGGGACTGTATTCGG AGTTGGCGTGGCGCGATCGCGTAGCCGTGGTCAACGAG AGTCTGGTCATCTACGGGGCCCTGGAGACGGACAGCG GTCTGTACACCCTGTCCGTGGTCGGCCTAAGCGACGAG |

-continued

Table of Sequences

| SEQ ID NO: | Description | Sequence |
|---|---|---|
| | | GCGCGCCAAGTGGCGTCGGTGGTTCTGGTCGTGGAGCC<br>CGCCCCTGTGCCGACCCCGACCCCCGACGACTACGACG<br>AAGAAGACGACGCGGGCGTGAGCGAACGCACGCCGGT<br>CAGCGTTCCCCCCCCAACCCCCCCCCGTCGTCCCCCCGT<br>CGCCCCCCCGACGCACCCTCGTGTTATCCCCGAGGTGT<br>CCCACGTGCGCGGGGTAACGGTCCATATGGAGACCCCG<br>GAGGCCATTCTGTTTGCCCCCGGGGAGACGTTTGGGAC<br>GAACGTCTCCATCCACGCCATTGCCCACGACGACGGTC<br>CGTACGCCATGGACGTCGTCTGGATGCGGTTTGACGTG<br>CCGTCCTCGTGCGCCGAGATGCGGATCTACGAAGCTTG<br>TCTGTATCACCCGCAGCTTCCAGAGTGTCTATCTCCGGC<br>CGACGCGCCGTGCGCCGTAAGTTCCTGGGCGTACCGCC<br>TGGCGGTCCGCAGCTACGCCGGCTGTTCCAGGACTACG<br>CCCCCGCCGCGATGTTTTGCCGAGGCTCGCATGGAACC<br>GGTCCCGGGGTTGGCGTGGCTGGCCTCCGGCGTCAATC<br>TGGAATTCCAGCACGCCTCCCCCCAGCACGCCGGCCTC<br>TACCTGTGCGTGGTGTACGTGGACGATCATATCCACGC<br>CTGGGGCCACATGACCATCAGCACCGCGGCGCAGTACC<br>GGAACGCGGTGGTGGAACAGCACCTCCCCCAGCGCCA<br>GCCCGAGCCCGTCGAGCCCACCCGCCCGCACGTGAGA<br>GCCCCCCCTCCCGCGCCCTCCGCGCGCGGCCCGCTGCG<br>C |
| 33 | gE-2t 417 Mutant #5 positions 1-60 - signal peptide positions 1009-1017 - encodes mutated surface-exposed loop | ATGGCTCGCGGGGCCGGGTTGGTGTTTTTTGTTGGAGT<br>TTGGGTCGTATCGTGCCTGGCGGCAGCACCCAGAACGT<br>CCTGGAAACGGGTAACCTCGGGCGAGGACGTGGTGTT<br>GCTTCCGGCGCCCGCGGGGCCGGAGGAACGCACCCGG<br>GCCCACAAACTACTGTGGGCCGCGGAACCCCTGGATGC<br>CTGCGGTCCCCTGCGCCCGTCGTGGGTGGCGCTGTGGC<br>CCCCCCGACGGGTGCTCGAGACGGTCGTGGATGCGGCG<br>TGCATGCGCGCCCCGGAACCGCTCGCCATAGCATACAG<br>TCCCCCGTTCCCCGCGGGCGACGAGGGACTGTATTCGG<br>AGTTGGCGTGGCGCGATCGCGTAGCCGTGGTCAACGAG<br>AGTCTGGTCATCTACGGGGCCCTGGAGACGGACAGCG<br>GTCTGTACACCCTGTCCGTGGTCGGCCTAAGCGACGAG<br>GCGCGCCAAGTGGCGTCGGTGGTTCTGGTCGTGGAGCC<br>CGCCCCTGTGCCGACCCCGACCCCCGACGACTACGACG<br>AAGAAGACGACGCGGGCGTGAGCGAACGCACGCCGGT<br>CAGCGTTCCCCCCCCAACCCCCCCCCGTCGTCCCCCCGT<br>CGCCCCCCCGACGCACCCTCGTGTTATCCCCGAGGTGT<br>CCCACGTGCGCGGGGTAACGGTCCATATGGAGACCCCG<br>GAGGCCATTCTGTTTGCCCCCGGGGAGACGTTTGGGAC<br>GAACGTCTCCATCCACGCCATTGCCCACGACGACGGTC<br>CGTACGCCATGGACGTCGTCTGGATGCGGTTTGACGTG<br>CCGTCCTCGTGCGCCGAGATGCGGATCTACGAAGCTTG<br>TCTGTATCACCCGCAGCTTCCAGAGTGTCTATCTCCGGC<br>CGACGCGCCGTGCGCCGTAAGTTCCTGGGCGTACCGCC<br>TGGCGGTCCGCAGCTACGCCGGCTGTTCCAGGACTACG<br>CCCCCGCCGCGATGTTTTGCCGAGGCTCGCATGGAACC<br>GGTCCCGGGGTTGGCGTGGCTGGCCTCCGTCAATCTGG<br>AATTCCAGCACGCCTCCCCCCAGCACGCCGGCCTCTAC<br>CTGTGCGTGGTGTACGTGGACGATCATATCCACGCCTG<br>GGGCCACATGACCATCAGCACCGCGGCGCAGTACCGG<br>AACGCGGTGGTGGAACAGCACCTCCCCCAGCGCCAGC<br>CCGAGCCCGTCGAGCCCACCCGCCCGCACGTGAGAGCC<br>CCCCCTCCCGCGCCCTCCGCGCGCGGCCCGCTGCGC |
| 34 | gE-2t 417 Mutant #6 positions 1-60 - signal peptide positions 1009-1020 - encodes mutated surface-exposed loop | ATGGCTCGCGGGGCCGGGTTGGTGTTTTTTGTTGGAGT<br>TTGGGTCGTATCGTGCCTGGCGGCAGCACCCAGAACGT<br>CCTGGAAACGGGTAACCTCGGGCGAGGACGTGGTGTT<br>GCTTCCGGCGCCCGCGGGGCCGGAGGAACGCACCCGG<br>GCCCACAAACTACTGTGGGCCGCGGAACCCCTGGATGC<br>CTGCGGTCCCCTGCGCCCGTCGTGGGTGGCGCTGTGGC<br>CCCCCCGACGGGTGCTCGAGACGGTCGTGGATGCGGCG<br>TGCATGCGCGCCCCGGAACCGCTCGCCATAGCATACAG<br>TCCCCCGTTCCCCGCGGGCGACGAGGGACTGTATTCGG<br>AGTTGGCGTGGCGCGATCGCGTAGCCGTGGTCAACGAG<br>AGTCTGGTCATCTACGGGGCCCTGGAGACGGACAGCG<br>GTCTGTACACCCTGTCCGTGGTCGGCCTAAGCGACGAG<br>GCGCGCCAAGTGGCGTCGGTGGTTCTGGTCGTGGAGCC<br>CGCCCCTGTGCCGACCCCGACCCCCGACGACTACGACG<br>AAGAAGACGACGCGGGCGTGAGCGAACGCACGCCGGT<br>CAGCGTTCCCCCCCCAACCCCCCCCCGTCGTCCCCCCGT |

-continued

Table of Sequences

| SEQ ID NO: | Description | Sequence |
|---|---|---|
| | | CGCCCCCCCGACGCACCCTCGTGTTATCCCCGAGGTGT<br>CCCACGTGCGCGGGGTAACGGTCCATATGGAGACCCCG<br>GAGGCCATTCTGTTTGCCCCCGGGGAGACGTTTGGGAC<br>GAACGTCTCCATCCACGCCATTGCCCACGACGACGGTC<br>CGTACGCCATGGACGTCGTCTGGATGCGGTTTGACGTG<br>CCGTCCTCGTGCGCCGAGATGCGGATCTACGAAGCTTG<br>TCTGTATCACCCGCAGCTTCCAGAGTGTCTATCTCCGGC<br>CGACGCGCCGTGCGCCGTAAGTTCCTGGGCGTACCGCC<br>TGGCGGTCCGCAGCTACGCCGGCTGTTCCAGGACTACG<br>CCCCCGCCGCGATGTTTTGCCGAGGCTCGCATGGAACC<br>GGTCCCGGGGTTGGCGTGGCTGGCCGGCGGCGTCAATC<br>TGGAATTCCAGCACGCCTCCCCCCAGCACGCCGGCCTC<br>TACCTGTGCGTGGTGTACGTGGACGATCATATCCACGC<br>CTGGGGCCACATGACCATCAGCACCGCGGCGCAGTACC<br>GGAACGCGGTGGTGGAACAGCACCTCCCCCAGCGCCA<br>GCCCGAGCCCGTCGAGCCCACCCGCCCGCACGTGAGA<br>GCCCCCCCTCCCGCGCCCTCCGCGCGCGGCCCGCTGCG<br>C |
| 35 | gE-2t 417 Mutant #7 positions 1-60 - signal peptide positions 1009-1014 - encodes mutated surface-exposed loop | ATGGCTCGCGGGGCCGGGTTGGTGTTTTTTGTTGGAGT<br>TTGGGTCGTATCGTGCCTGGCGGCAGCACCCAGAACGT<br>CCTGGAAACGGGTAACCTCGGGCGAGGACGTGGTGTT<br>GCTTCCGGCGCCCGCGGGGCCGGAGGAACGCACCCGG<br>GCCCACAAACTACTGTGGGCCGCGGAACCCCTGGATGC<br>CTGCGGTCCCCTGCGCCCGTCGTGGGTGGCGCTGTGGC<br>CCCCCCGACGGGTGCTCGAGACGGTCGTGGATGCGGCG<br>TGCATGCGCGCCCCGGAACCGCTCGCCATAGCATACAG<br>TCCCCCGTTCCCCGCGGGCGACGAGGGACTGTATTCGG<br>AGTTGGCGTGGCGCGATCGCGTAGCCGTGGTCAACGAG<br>AGTCTGGTCATCTACGGGGCCCTGGAGACGGACAGCG<br>GTCTGTACACCCTGTCCGTGGTCGGCCTAAGCGACGAG<br>GCGCGCCAAGTGGCGTCGGTGGTTCTGGTCGTGGAGCC<br>CGCCCCTGTGCCGACCCCGACCCCCGACGACTACGACG<br>AAGAAGACGACGCGGGCGTGAGCGAACGCACGCCGGT<br>CAGCGTTCCCCCCCCAACCCCCCCCCCGTCGTCCCCCCGT<br>CGCCCCCCCGACGCACCCTCGTGTTATCCCCGAGGTGT<br>CCCACGTGCGCGGGGTAACGGTCCATATGGAGACCCCG<br>GAGGCCATTCTGTTTGCCCCCGGGGAGACGTTTGGGAC<br>GAACGTCTCCATCCACGCCATTGCCCACGACGACGGTC<br>CGTACGCCATGGACGTCGTCTGGATGCGGTTTGACGTG<br>CCGTCCTCGTGCGCCGAGATGCGGATCTACGAAGCTTG<br>TCTGTATCACCCGCAGCTTCCAGAGTGTCTATCTCCGGC<br>CGACGCGCCGTGCGCCGTAAGTTCCTGGGCGTACCGCC<br>TGGCGGTCCGCAGCTACGCCGGCTGTTCCAGGACTACG<br>CCCCCGCCGCGATGTTTTGCCGAGGCTCGCATGGAACC<br>GGTCCCGGGGTTGGCGTGGCTGGCCGTCAATCTGGAAT<br>TCCAGCACGCCTCCCCCCAGCACGCCGGCCTCTACCTG<br>TGCGTGGTGTACGTGGACGATCATATCCACGCCTGGGG<br>CCACATGACCATCAGCACCGCGGCGCAGTACCGGAAC<br>GCGGTGGTGGAACAGCACCTCCCCCAGCGCCAGCCCG<br>AGCCCGTCGAGCCCACCCGCCCGCACGTGAGAGCCCCC<br>CCTCCCGCGCCCTCCGCGCGCGGCCCGCTGCGC |
| 36 | gE-2t 417 Mutant #8 positions 1-60 - signal peptide positions 1009-1020 - encodes mutated surface-exposed loop | ATGGCTCGCGGGGCCGGGTTGGTGTTTTTTGTTGGAGT<br>TTGGGTCGTATCGTGCCTGGCGGCAGCACCCAGAACGT<br>CCTGGAAACGGGTAACCTCGGGCGAGGACGTGGTGTT<br>GCTTCCGGCGCCCGCGGGGCCGGAGGAACGCACCCGG<br>GCCCACAAACTACTGTGGGCCGCGGAACCCCTGGATGC<br>CTGCGGTCCCCTGCGCCCGTCGTGGGTGGCGCTGTGGC<br>CCCCCCGACGGGTGCTCGAGACGGTCGTGGATGCGGCG<br>TGCATGCGCGCCCCGGAACCGCTCGCCATAGCATACAG<br>TCCCCCGTTCCCCGCGGGCGACGAGGGACTGTATTCGG<br>AGTTGGCGTGGCGCGATCGCGTAGCCGTGGTCAACGAG<br>AGTCTGGTCATCTACGGGGCCCTGGAGACGGACAGCG<br>GTCTGTACACCCTGTCCGTGGTCGGCCTAAGCGACGAG<br>GCGCGCCAAGTGGCGTCGGTGGTTCTGGTCGTGGAGCC<br>CGCCCCTGTGCCGACCCCGACCCCCGACGACTACGACG<br>AAGAAGACGACGCGGGCGTGAGCGAACGCACGCCGGT<br>CAGCGTTCCCCCCCCAACCCCCCCCCCGTCGTCCCCCCGT<br>CGCCCCCCCGACGCACCCTCGTGTTATCCCCGAGGTGT<br>CCCACGTGCGCGGGGTAACGGTCCATATGGAGACCCCG<br>GAGGCCATTCTGTTTGCCCCCGGGGAGACGTTTGGGAC<br>GAACGTCTCCATCCACGCCATTGCCCACGACGACGGTC |

-continued

Table of Sequences

| SEQ ID NO: | Description | Sequence |
|---|---|---|
| | | CGTACGCCATGGACGTCGTCTGGATGCGGTTTGACGTG<br>CCGTCCTCGTGCGCCGAGATGCGGATCTACGAAGCTTG<br>TCTGTATCACCCGCAGCTTCCAGAGTGTCTATCTCCGGC<br>CGACGCGCCGTGCGCCGTAAGTTCCTGGGCGTACCGCC<br>TGGCGGTCCGCAGCTACGCCGGCTGTTCCAGGACTACG<br>CCCCCGCCGCGATGTTTTGCCGAGGCTCGCATGGAACC<br>GGTCCCGGGGTTGGCGTGGCTGGGCGGCGGCGTCAATC<br>TGGAATTCCAGCACGCCTCCCCCCAGCACGCCGGCCTC<br>TACCTGTGCGTGGTGTACGTGGACGATCATATCCACGC<br>CTGGGGCCACATGACCATCAGCACCGCGGCGCAGTACC<br>GGAACGCGGTGGTGGAACAGCACCTCCCCCAGCGCCA<br>GCCCGAGCCCGTCGAGCCCACCCGCCCGCACGTGAGA<br>GCCCCCCCTCCCGCGCCCTCCGCGCGCGGCCCGCTGCG<br>C |
| 37 | gE-2t 417 Mutant #9 positions 1-60 - signal peptide positions 1009-1020 - encodes mutated surface-exposed loop | ATGGCTCGCGGGGCCGGGTTGGTGTTTTTTGTTGGAGT<br>TTGGGTCGTATCGTGCCTGGCGGCAGCACCCAGAACGT<br>CCTGGAAACGGGTAACCTCGGGCGAGGACGTGGTGTT<br>GCTTCCGGCGCCCGCGGGGCCGGAGGAACGCACCCGG<br>GCCCACAAACTACTGTGGGCCGCGGAACCCCTGGATGC<br>CTGCGGTCCCCTGCGCCCGTCGTGGGTGGCGCTGTGGC<br>CCCCCCGACGGGTGCTCGAGACGGTCGTGGATGCGGCG<br>TGCATGCGCGCCCCGGAACCGCTCGCCATAGCATACAG<br>TCCCCCGTTCCCCGCGGGCGACGAGGGACTGTATTCGG<br>AGTTGGCGTGGCGCGATCGCGTAGCCGTGGTCAACGAG<br>AGTCTGGTCATCTACGGGGCCCTGGAGACGGACAGCG<br>GTCTGTACACCCTGTCCGTGGTCGGCCTAAGCGACGAG<br>GCGCGCCAAGTGGCGTCGGTGGTTCTGGTCGTGGAGCC<br>CGCCCCTGTGCCGACCCCGACCCCCGACGACTACGACG<br>AAGAAGACGACGCGGGCGTGAGCGAACGCACGCCGGT<br>CAGCGTTCCCCCCCCAACCCCCCCCCGTCGTCCCCCCGT<br>CGCCCCCCCGACGCACCCTCGTGTTATCCCCGAGGTGT<br>CCCACGTGCGCGGGGTAACGGTCCATATGGAGACCCCG<br>GAGGCCATTCTGTTTGCCCCCGGGGAGACGTTTGGGAC<br>GAACGTCTCCATCCACGCCATTGCCCACGACGACGGTC<br>CGTACGCCATGGACGTCGTCTGGATGCGGTTTGACGTG<br>CCGTCCTCGTGCGCCGAGATGCGGATCTACGAAGCTTG<br>TCTGTATCACCCGCAGCTTCCAGAGTGTCTATCTCCGGC<br>CGACGCGCCGTGCGCCGTAAGTTCCTGGGCGTACCGCC<br>TGGCGGTCCGCAGCTACGCCGGCTGTTCCAGGACTACG<br>CCCCCGCCGCGATGTTTTGCCGAGGCTCGCATGGAACC<br>GGTCCCGGGGTTGGCGTGGCTGGCCGGCGGCGGCAATC<br>TGGAATTCCAGCACGCCTCCCCCCAGCACGCCGGCCTC<br>TACCTGTGCGTGGTGTACGTGGACGATCATATCCACGC<br>CTGGGGCCACATGACCATCAGCACCGCGGCGCAGTACC<br>GGAACGCGGTGGTGGAACAGCACCTCCCCCAGCGCCA<br>GCCCGAGCCCGTCGAGCCCACCCGCCCGCACGTGAGA<br>GCCCCCCCTCCCGCGCCCTCCGCGCGCGGCCCGCTGCG<br>C |
| 38 | gE-2t 417 Mutant #10 positions 1-60 - signal peptide positions 733-735 - mutation | ATGGCTCGCGGGGCCGGGTTGGTGTTTTTTGTTGGAGT<br>TTGGGTCGTATCGTGCCTGGCGGCAGCACCCAGAACGT<br>CCTGGAAACGGGTAACCTCGGGCGAGGACGTGGTGTT<br>GCTTCCGGCGCCCGCGGGGCCGGAGGAACGCACCCGG<br>GCCCACAAACTACTGTGGGCCGCGGAACCCCTGGATGC<br>CTGCGGTCCCCTGCGCCCGTCGTGGGTGGCGCTGTGGC<br>CCCCCCGACGGGTGCTCGAGACGGTCGTGGATGCGGCG<br>TGCATGCGCGCCCCGGAACCGCTCGCCATAGCATACAG<br>TCCCCCGTTCCCCGCGGGCGACGAGGGACTGTATTCGG<br>AGTTGGCGTGGCGCGATCGCGTAGCCGTGGTCAACGAG<br>AGTCTGGTCATCTACGGGGCCCTGGAGACGGACAGCG<br>GTCTGTACACCCTGTCCGTGGTCGGCCTAAGCGACGAG<br>GCGCGCCAAGTGGCGTCGGTGGTTCTGGTCGTGGAGCC<br>CGCCCCTGTGCCGACCCCGACCCCCGACGACTACGACG<br>AAGAAGACGACGCGGGCGTGAGCGAACGCACGCCGGT<br>CAGCGTTCCCCCCCCAACCCCCCCCCGTCGTCCCCCCGT<br>CGCCCCCCCGACGCACCCTCGTGTTATCCCCGAGGTGT<br>CCCACGTGCGCGGGGTAACGGTCCATATGGAGACCCCG<br>GAGGCCATTCTGTTTGCCCCCGGGGAGACGTTTGGGAC<br>GAACGTCTCCATCGGCGCCATTGCCCACGACGACGGTC<br>CGTACGCCATGGACGTCGTCTGGATGCGGTTTGACGTG<br>CCGTCCTCGTGCGCCGAGATGCGGATCTACGAAGCTTG<br>TCTGTATCACCCGCAGCTTCCAGAGTGTCTATCTCCGGC |

Table of Sequences

| SEQ ID NO: | Description | Sequence |
|---|---|---|
| | | CGACGCGCCGTGCGCCGTAAGTTCCTGGGCGTACCGCC<br>TGGCGGTCCGCAGCTACGCCGGCTGTTCCAGGACTACG<br>CCCCCGCCGCGATGTTTTGCCGAGGCTCGCATGGAACC<br>GGTCCCGGGGTTGGCGTGGCTGGCCTCCACCGTCAATC<br>TGGAATTCCAGCACGCCTCCCCCCAGCACGCCGGCCTC<br>TACCTGTGCGTGGTGTACGTGGACGATCATATCCACGC<br>CTGGGGCCACATGACCATCAGCACCGCGGCGCAGTACC<br>GGAACGCGGTGGTGGAACAGCACCTCCCCCAGCGCCA<br>GCCCGAGCCCGTCGAGCCCACCCGCCCGCACGTGAGA<br>GCCCCCCTCCCGCGCCCTCCGCGCGCGGCCCGCTGCG<br>C |
| 39 | gE-2t 417 Mutant #11 positions 1-60 - signal peptide positions 949-951 - mutation | ATGGCTCGCGGGGCCGGGTTGGTGTTTTTTGTTGGAGT<br>TTGGGTCGTATCGTGCCTGGCGGCAGCACCCAGAACGT<br>CCTGGAAACGGGTAACCTCGGGCGAGGACGTGGTGTT<br>GCTTCCGGCGCCCGCGGGGCCGGAGGAACGCACCCGG<br>GCCCACAAACTACTGTGGGCCGCGGAACCCCTGGATGC<br>CTGCGGTCCCCTGCGCCCGTCGTGGGTGGCGCTGTGGC<br>CCCCCCGACGGGTGCTCGAGACGGTCGTGGATGCGGCG<br>TGCATGCGCGCCCCGGAACCGCTCGCCATAGCATACAG<br>TCCCCCGTTCCCCGCGGGCGACGAGGGACTGTATTCGG<br>AGTTGGCGTGGCGCGATCGCGTAGCCGTGGTCAACGAG<br>AGTCTGGTCATCTACGGGGCCCTGGAGACGGACAGCG<br>GTCTGTACACCCTGTCCGTGGTCGGCCTAAGCGACGAG<br>GCGCGCCAAGTGGCGTCGGTGGTTCTGGTCGTGGAGCC<br>CGCCCCTGTGCCGACCCCGACCCCGACGACTACGACG<br>AAGAAGACGACGCGGGCGTGAGCGAACGCACGCCGGT<br>CAGCGTTCCCCCCCAACCCCCCCGTCGTCCCCCCGT<br>CGCCCCCCCGACGCACCCTCGTGTTATCCCCGAGGTGT<br>CCCACGTGCGCGGGGTAACGGTCCATATGGAGACCCCG<br>GAGGCCATTCTGTTTGCCCCCGGGGAGACGTTTGGGAC<br>GAACGTCTCCATCCACGCCATTGCCCACGACGACGGTC<br>CGTACGCCATGGACGTCGTCTGGATGCGGTTTGACGTG<br>CCGTCCTCGTGCGCCGAGATGCGGATCTACGAAGCTTG<br>TCTGTATCACCCGCAGCTTCCAGAGTGTCTATCTCCGGC<br>CGACGCGCCGTGCGCCGTAAGTTCCTGGGCGTACCGCC<br>TGGCGGTCCGCAGCTACGCCGGCTGTTCCAGGACTACG<br>GGCCCGCCGCGATGTTTTGCCGAGGCTCGCATGGAACC<br>GGTCCCGGGGTTGGCGTGGCTGGCCTCCACCGTCAATC<br>TGGAATTCCAGCACGCCTCCCCCCAGCACGCCGGCCTC<br>TACCTGTGCGTGGTGTACGTGGACGATCATATCCACGC<br>CTGGGGCCACATGACCATCAGCACCGCGGCGCAGTACC<br>GGAACGCGGTGGTGGAACAGCACCTCCCCCAGCGCCA<br>GCCCGAGCCCGTCGAGCCCACCCGCCCGCACGTGAGA<br>GCCCCCCTCCCGCGCCCTCCGCGCGCGGCCCGCTGCG<br>C |
| 40 | gE-2t 417 Mutant #12 positions 1-60 - signal peptide positions 955-957 - mutation | ATGGCTCGCGGGGCCGGGTTGGTGTTTTTTGTTGGAGT<br>TTGGGTCGTATCGTGCCTGGCGGCAGCACCCAGAACGT<br>CCTGGAAACGGGTAACCTCGGGCGAGGACGTGGTGTT<br>GCTTCCGGCGCCCGCGGGGCCGGAGGAACGCACCCGG<br>GCCCACAAACTACTGTGGGCCGCGGAACCCCTGGATGC<br>CTGCGGTCCCCTGCGCCCGTCGTGGGTGGCGCTGTGGC<br>CCCCCCGACGGGTGCTCGAGACGGTCGTGGATGCGGCG<br>TGCATGCGCGCCCCGGAACCGCTCGCCATAGCATACAG<br>TCCCCCGTTCCCCGCGGGCGACGAGGGACTGTATTCGG<br>AGTTGGCGTGGCGCGATCGCGTAGCCGTGGTCAACGAG<br>AGTCTGGTCATCTACGGGGCCCTGGAGACGGACAGCG<br>GTCTGTACACCCTGTCCGTGGTCGGCCTAAGCGACGAG<br>GCGCGCCAAGTGGCGTCGGTGGTTCTGGTCGTGGAGCC<br>CGCCCCTGTGCCGACCCCGACCCCGACGACTACGACG<br>AAGAAGACGACGCGGGCGTGAGCGAACGCACGCCGGT<br>CAGCGTTCCCCCCCAACCCCCCCGTCGTCCCCCCGT<br>CGCCCCCCCGACGCACCCTCGTGTTATCCCCGAGGTGT<br>CCCACGTGCGCGGGGTAACGGTCCATATGGAGACCCCG<br>GAGGCCATTCTGTTTGCCCCCGGGGAGACGTTTGGGAC<br>GAACGTCTCCATCCACGCCATTGCCCACGACGACGGTC<br>CGTACGCCATGGACGTCGTCTGGATGCGGTTTGACGTG<br>CCGTCCTCGTGCGCCGAGATGCGGATCTACGAAGCTTG<br>TCTGTATCACCCGCAGCTTCCAGAGTGTCTATCTCCGGC<br>CGACGCGCCGTGCGCCGTAAGTTCCTGGGCGTACCGCC<br>TGGCGGTCCGCAGCTACGCCGGCTGTTCCAGGACTACG<br>CCCCCGGGGCCGATGTTTTGCCGAGGCTCGCATGGAACC |

| SEQ ID NO: | Description | Sequence |
|---|---|---|
| | | GGTCCCGGGGTTGGCGTGGCTGGCCTCCACCGTCAATC TGGAATTCCAGCACGCCTCCCCCCAGCACGCCGGCCTC TACCTGTGCGTGGTGTACGTGGACGATCATATCCACGC CTGGGGCCACATGACCATCAGCACCGCGGCGCAGTACC GGAACGCGGTGGTGGAACAGCACCTCCCCCAGCGCCA GCCCGAGCCCGTCGAGCCCACCCGCCCGCACGTGAGA GCCCCCCTCCCGCGCCCTCCGCGCGCGGCCCGCTGCG C |
| 41 | gE-2t 417 Mutant #13 positions 1-60 - signal peptide positions 733-735, 949-951 - mutation | ATGGCTCGCGGGGCCGGGTTGGTGTTTTTTGTTGGAGT TTGGGTCGTATCGTGCCTGGCGGCAGCACCCAGAACGT CCTGGAAACGGGTAACCTCGGGCGAGGACGTGGTGTT GCTTCCGGCGCCCGCGGGGCCGGAGGAACGCACCCGG GCCCACAAACTACTGTGGGCCGCGGAACCCCTGGATGC CTGCGGTCCCCTGCGCCCGTCGTGGGTGGCGCTGTGGC CCCCCCGACGGGTGCTCGAGACGGTCGTGGATGCGGCG TGCATGCGCGCCCCGGAACCGCTCGCCATAGCATACAG TCCCCCGTTCCCCGCGGGCGACGAGGGACTGTATTCGG AGTTGGCGTGGCGCGATCGCGTAGCCGTGGTCAACGAG AGTCTGGTCATCTACGGGGCCCTGGAGACGGACAGCG GTCTGTACACCCTGTCCGTGGTCGGCCTAAGCGACGAG GCGCGCCAAGTGGCGTCGGTGGTTCTGGTCGTGGAGCC CGCCCCTGTGCCGACCCCGACCCCCGACGACTACGACG AAGAAGACGACGCGGGCGTGAGCGAACGCACGCCGGT CAGCGTTCCCCCCCCAACCCCCCCCCGTCGTCCCCCCGT CGCCCCCCGACGCACCCTCGTGTTATCCCCGAGGTGT CCCACGTGCGCGGGGTAACGGTCCATATGGAGACCCCG GAGGCCATTCTGTTTGCCCCCGGGGAGACGTTTGGGAC GAACGTCTCCATCGGCGCCATTGCCCACGACGACGGTC CGTACGCCATGGACGTCGTCTGGATGCGGTTTGACGTG CCGTCCTCGTGCGCCGAGATGCGGATCTACGAAGCTTG TCTGTATCACCCGCAGCTTCCAGAGTGTCTATCTCCGGC CGACGCGCCGTGCGCCGTAAGTTCCTGGGCGTACCGCC TGGCGGTCCGCAGCTACGCCGGCTGTTCCAGGACTACG GGCCCGCCGCGATGTTTTGCCGAGGCTCGCATGGAACC GGTCCCGGGGTTGGCGTGGCTGGCCTCCACCGTCAATC TGGAATTCCAGCACGCCTCCCCCCAGCACGCCGGCCTC TACCTGTGCGTGGTGTACGTGGACGATCATATCCACGC CTGGGGCCACATGACCATCAGCACCGCGGCGCAGTACC GGAACGCGGTGGTGGAACAGCACCTCCCCCAGCGCCA GCCCGAGCCCGTCGAGCCCACCCGCCCGCACGTGAGA GCCCCCCTCCCGCGCCCTCCGCGCGCGGCCCGCTGCG C |
| 42 | gE-2t 417 Mutant #14 positions 1-60 - signal peptide positions 733-735, 955-957 - mutation | ATGGCTCGCGGGGCCGGGTTGGTGTTTTTTGTTGGAGT TTGGGTCGTATCGTGCCTGGCGGCAGCACCCAGAACGT CCTGGAAACGGGTAACCTCGGGCGAGGACGTGGTGTT GCTTCCGGCGCCCGCGGGGCCGGAGGAACGCACCCGG GCCCACAAACTACTGTGGGCCGCGGAACCCCTGGATGC CTGCGGTCCCCTGCGCCCGTCGTGGGTGGCGCTGTGGC CCCCCCGACGGGTGCTCGAGACGGTCGTGGATGCGGCG TGCATGCGCGCCCCGGAACCGCTCGCCATAGCATACAG TCCCCCGTTCCCCGCGGGCGACGAGGGACTGTATTCGG AGTTGGCGTGGCGCGATCGCGTAGCCGTGGTCAACGAG AGTCTGGTCATCTACGGGGCCCTGGAGACGGACAGCG GTCTGTACACCCTGTCCGTGGTCGGCCTAAGCGACGAG GCGCGCCAAGTGGCGTCGGTGGTTCTGGTCGTGGAGCC CGCCCCTGTGCCGACCCCGACCCCCGACGACTACGACG AAGAAGACGACGCGGGCGTGAGCGAACGCACGCCGGT CAGCGTTCCCCCCCAACCCCCCCCCGTCGTCCCCCCGT CGCCCCCCGACGCACCCTCGTGTTATCCCCGAGGTGT CCCACGTGCGCGGGGTAACGGTCCATATGGAGACCCCG GAGGCCATTCTGTTTGCCCCCGGGGAGACGTTTGGGAC GAACGTCTCCATCGGCGCCATTGCCCACGACGACGGTC CGTACGCCATGGACGTCGTCTGGATGCGGTTTGACGTG CCGTCCTCGTGCGCCGAGATGCGGATCTACGAAGCTTG TCTGTATCACCCGCAGCTTCCAGAGTGTCTATCTCCGGC CGACGCGCCGTGCGCCGTAAGTTCCTGGGCGTACCGCC TGGCGGTCCGCAGCTACGCCGGCTGTTCCAGGACTACG CCCCCGGGCCGATGTTTTGCCGAGGCTCGCATGGAACC GGTCCCGGGGTTGGCGTGGCTGGCCTCCACCGTCAATC TGGAATTCCAGCACGCCTCCCCCCAGCACGCCGGCCTC TACCTGTGCGTGGTGTACGTGGACGATCATATCCACGC |

Table of Sequences

| SEQ ID NO: | Description | Sequence |
|---|---|---|
| | | CTGGGGCCACATGACCATCAGCACCGCGGCGCAGTACC<br>GGAACGCGGTGGTGGAACAGCACCTCCCCCAGCGCCA<br>GCCCGAGCCCGTCGAGCCCACCCGCCCGCACGTGAGA<br>GCCCCCCCTCCCGCGCCCTCCGCGCGCGGCCCGCTGCG<br>C |
| 43 | gE-2t 417 Mutant #15 positions 1-60 - signal peptide positions 949- 951, 955-957 - mutation | ATGGCTCGCGGGGCCGGGTTGGTGTTTTTGTTGGAGT<br>TTGGGTCGTATCGTGCCTGGCGGCAGCACCCAGAACGT<br>CCTGGAAACGGGTAACCTCGGGCGAGGACGTGGTGTT<br>GCTTCCGGCGCCCGCGGGGCCGGAGGAACGCACCCGG<br>GCCCACAAACTACTGTGGGCCGCGGAACCCCTGGATGC<br>CTGCGGTCCCCTGCGCCCGTCGTGGGTGGCGCTGTGGC<br>CCCCCCGACGGGTGCTCGAGACGGTCGTGGATGCGGCG<br>TGCATGCGCGCCCCGGAACCGCTCGCCATAGCATACAG<br>TCCCCCGTTCCCCGCGGGCGACGAGGGACTGTATTCGG<br>AGTTGGCGTGGCGCGATCGCGTAGCCGTGGTCAACGAG<br>AGTCTGGTCATCTACGGGGCCCTGGAGACGGACAGCG<br>GTCTGTACACCCTGTCCGTGGTCGGCCTAAGCGACGAG<br>GCGCGCCAAGTGGCGTCGGTGGTTCTGGTCGTGGAGCC<br>CGCCCCTGTGCCGACCCCGACCCCGACGACTACGACG<br>AAGAAGACGACGCGGGCGTGAGCGAACGCACGCCGGT<br>CAGCGTTCCCCCCCAACCCCCCCCGTCGTCCCCCCGT<br>CGCCCCCCCGACGCACCCTCGTGTTATCCCCGAGGTGT<br>CCCACGTGCGCGGGGTAACGGTCCATATGGAGACCCCG<br>GAGGCCATTCTGTTTGCCCCCGGGGAGACGTTTGGGAC<br>GAACGTCTCCATCCACGCCATTGCCCACGACGACGGTC<br>CGTACGCCATGGACGTCGTCTGGATGCGGTTTGACGTG<br>CCGTCCTCGTGCGCCGAGATGCGGATCTACGAAGCTTG<br>TCTGTATCACCCGCAGCTTCCAGAGTGTCTATCTCCGGC<br>CGACGCGCCGTGCGCCGTAAGTTCCTGGGCGTACCGCC<br>TGGCGGTCCGCAGCTACGCCGGCTGTTCCAGGACTACG<br>GGCCCGGGCCGATGTTTTGCCGAGGCTCGCATGGAACC<br>GGTCCCGGGGTTGGCGTGGCTGGCCTCCACCGTCAATC<br>TGGAATTCCAGCACGCCTCCCCCCAGCACGCCGGCCTC<br>TACCTGTGCGTGGTGTACGTGGACGATCATATCCACGC<br>CTGGGGCCACATGACCATCAGCACCGCGGCGCAGTACC<br>GGAACGCGGTGGTGGAACAGCACCTCCCCCAGCGCCA<br>GCCCGAGCCCGTCGAGCCCACCCGCCCGCACGTGAGA<br>GCCCCCCCTCCCGCGCCCTCCGCGCGCGGCCCGCTGCG<br>C |
| 44 | gE-2t 417 Mutant #16 positions 1-60 - signal peptide positions 733- 735, 949-951, 955-957 - mutation | ATGGCTCGCGGGGCCGGGTTGGTGTTTTTGTTGGAGT<br>TTGGGTCGTATCGTGCCTGGCGGCAGCACCCAGAACGT<br>CCTGGAAACGGGTAACCTCGGGCGAGGACGTGGTGTT<br>GCTTCCGGCGCCCGCGGGGCCGGAGGAACGCACCCGG<br>GCCCACAAACTACTGTGGGCCGCGGAACCCCTGGATGC<br>CTGCGGTCCCCTGCGCCCGTCGTGGGTGGCGCTGTGGC<br>CCCCCCGACGGGTGCTCGAGACGGTCGTGGATGCGGCG<br>TGCATGCGCGCCCCGGAACCGCTCGCCATAGCATACAG<br>TCCCCCGTTCCCCGCGGGCGACGAGGGACTGTATTCGG<br>AGTTGGCGTGGCGCGATCGCGTAGCCGTGGTCAACGAG<br>AGTCTGGTCATCTACGGGGCCCTGGAGACGGACAGCG<br>GTCTGTACACCCTGTCCGTGGTCGGCCTAAGCGACGAG<br>GCGCGCCAAGTGGCGTCGGTGGTTCTGGTCGTGGAGCC<br>CGCCCCTGTGCCGACCCCGACCCCGACGACTACGACG<br>AAGAAGACGACGCGGGCGTGAGCGAACGCACGCCGGT<br>CAGCGTTCCCCCCCAACCCCCCCCGTCGTCCCCCCGT<br>CGCCCCCCCGACGCACCCTCGTGTTATCCCCGAGGTGT<br>CCCACGTGCGCGGGGTAACGGTCCATATGGAGACCCCG<br>GAGGCCATTCTGTTTGCCCCCGGGGAGACGTTTGGGAC<br>GAACGTCTCCATCGGCGCCATTGCCCACGACGACGGTC<br>CGTACGCCATGGACGTCGTCTGGATGCGGTTTGACGTG<br>CCGTCCTCGTGCGCCGAGATGCGGATCTACGAAGCTTG<br>TCTGTATCACCCGCAGCTTCCAGAGTGTCTATCTCCGGC<br>CGACGCGCCGTGCGCCGTAAGTTCCTGGGCGTACCGCC<br>TGGCGGTCCGCAGCTACGCCGGCTGTTCCAGGACTACG<br>GGCCCGGGCCGATGTTTTGCCGAGGCTCGCATGGAACC<br>GGTCCCGGGGTTGGCGTGGCTGGCCTCCACCGTCAATC<br>TGGAATTCCAGCACGCCTCCCCCCAGCACGCCGGCCTC |

-continued

Table of Sequences

| SEQ ID NO: | Description | Sequence |
|---|---|---|
| | | TACCTGTGCGTGGTGTACGTGGACGATCATATCCACGC<br>CTGGGGCCACATGACCATCAGCACCGCGGCGCAGTACC<br>GGAACGCGGTGGTGGAACAGCACCTCCCCCAGCGCCA<br>GCCCGAGCCCGTCGAGCCCACCCGCCCGCACGTGAGA<br>GCCCCCCCTCCCGCGCCCTCCGCGCGCGGCCCGCTGCG<br>C |
| 45 | gE-2t 417 wild type positions 1-60 - signal peptide positions 1009-1020 - encodes surface-exposed loop | ATGGCTCGCGGGGCCGGGTTGGTGTTTTTTGTTGGAGT<br>TTGGGTCGTATCGTGCCTGGCGGCAGCACCCAGAACGT<br>CCTGGAAACGGGTAACCTCGGGCGAGGACGTGGTGTT<br>GCTTCCGGCGCCCGCGGGGCCGGAGGAACGCACCCGG<br>GCCCACAAACTACTGTGGGCCGCGGAACCCCTGGATGC<br>CTGCGGTCCCCTGCGCCCGTCGTGGGTGGCGCTGTGGC<br>CCCCCCGACGGGTGCTCGAGACGGTCGTGGATGCGGCG<br>TGCATGCGCGCCCCGGAACCGCTCGCCATAGCATACAG<br>TCCCCCGTTCCCCGCGGGCGACGAGGGACTGTATTCGG<br>AGTTGGCGTGGCGCGATCGCGTAGCCGTGGTCAACGAG<br>AGTCTGGTCATCTACGGGGCCCTGGAGACGGACAGCG<br>GTCTGTACACCCTGTCCGTGGTCGGCCTAAGCGACGAG<br>GCGCGCCAAGTGGCGTCGGTGGTTCTGGTCGTGGAGCC<br>CGCCCCTGTGCCGACCCCGACCCCCGACGACTACGACG<br>AAGAAGACGACGCGGGCGTGAGCGAACGCACGCCGGT<br>CAGCGTTCCCCCCCCAACCCCCCCCCGTCGTCCCCCCGT<br>CGCCCCCCCGACGCACCCTCGTGTTATCCCCGAGGTGT<br>CCCACGTGCGCGGGGTAACGGTCCATATGGAGACCCCG<br>GAGGCCATTCTGTTTGCCCCCGGGGAGACGTTTGGGAC<br>GAACGTCTCCATCCACGCCATTGCCCACGACGACGGTC<br>CGTACGCCATGGACGTCGTCTGGATGCGGTTTGACGTG<br>CCGTCCTCGTGCGCCGAGATGCGGATCTACGAAGCTTG<br>TCTGTATCACCCGCAGCTTCCAGAGTGTCTATCTCCGGC<br>CGACGCGCCGTGCGCCGTAAGTTCCTGGGCGTACCGCC<br>TGGCGGTCCGCAGCTACGCCGGCTGTTCCAGGACTACG<br>CCCCCGCCGCGATGTTTTGCCGAGGCTCGCATGGAACC<br>GGTCCCGGGGTTGGCGTGGCTGGCCTCCACCGTCAATC<br>TGGAATTCCAGCACGCCTCCCCCCAGCACGCCGGCCTC<br>TACCTGTGCGTGGTGTACGTGGACGATCATATCCACGC<br>CTGGGGCCACATGACCATCAGCACCGCGGCGCAGTACC<br>GGAACGCGGTGGTGGAACAGCACCTCCCCCAGCGCCA<br>GCCCGAGCCCGTCGAGCCCACCCGCCCGCACGTGAGA<br>GCCCCCCCTCCCGCGCCCTCCGCGCGCGGCCCGCTGCG<br>C |
| 46 | residues inserted at position 337 of wild type gE-2t 417 for mutant #1 | AARAA |

All references, including patent documents, disclosed herein are incorporated by reference in their entirety.

What is claimed is:

1. An isolated polypeptide comprising the mature amino acid sequence of any one of SEQ ID NOs: 12-27, or a variant thereof, wherein the variant of SEQ ID NO: 12 does not vary any of positions 337-344, wherein the variant of SEQ ID NO: 13 does not vary any of positions 337-340, wherein the variant of SEQ ID NO: 14 does not vary any of positions 337-339, wherein the variant of SEQ ID NO: 15 does not vary any of positions 337-340, wherein the variant of SEQ ID NO: 16 does not vary any of positions 337-339, wherein the variant of SEQ ID NO: 17 does not vary any of positions 337-340, wherein the variant of SEQ ID NO: 18 does not vary any of positions 337-338, wherein the variant of SEQ ID NO: 19 does not vary any of positions 337-340, wherein the variant of SEQ ID NO: 20 does not vary any of positions 337-340, wherein the variant of SEQ ID NO: 21 does not vary any of positions 245, 317, or 319, wherein the variant of SEQ ID NO: 22 does not vary any of positions 245, 317, or 319, wherein the variant of SEQ ID NO: 23 does not vary any of positions 245, 317, or 319, wherein the variant of SEQ ID NO: 24 does not vary any of positions 245, 317, or 319, wherein the variant of SEQ ID NO: 25 does not vary any of positions 245, 317, or 319, wherein the variant of SEQ ID NO: 26 does not vary any of positions 245, 317, or 319, or wherein the variant of SEQ ID NO: 27 does not vary any of positions 245, 317, or 319, and wherein the variant amino acid sequence of the isolated polypeptide has 95-99% homology to the amino acid sequence of SEQ ID NO: 12, 13, 14, 15, 16, 17, 18, 19, 20, 21, 22, 23, 24, 25, 26, or 27.

2. The isolated polypeptide of claim 1, comprising the mature amino acid sequence of any one of SEQ ID NOs: 12, 15, 17, 20-24, and 26, or the variant thereof.

3. The isolated polypeptide of claim 1, comprising the mature amino acid sequence of SEQ ID NOS: 12, 20, 24, or 26, or the variant thereof.

4. An isolated polypeptide, comprising the amino acid sequence of SEQ ID NOs: 12, 20, 24, or 26, or a variant thereof, wherein the variant of SEQ ID NO: 12 does not vary any of positions 337-344, wherein the variant of SEQ ID NO: 20 does not vary any of positions 337-340, wherein the variant of SEQ ID NO: 24 does not vary any of positions 245, 317, or 319, or wherein the variant of SEQ ID NO: 26 does not vary any of positions 245, 317, or 319, and wherein the variant amino acid sequence of the isolated polypeptide has 95-99% homology to the amino acid sequence of SEQ ID NO: 12, 20, 24, or 26.

5. An isolated nucleic acid comprising the nucleotide sequence of any one of SEQ ID NOs: 29-44, or a variant thereof, wherein the variant of SEQ ID NO: 29 comprises nucleotides at positions 1009-1032 that encode amino acids at positions 337-344 of SEQ ID NO: 12, wherein the variant of SEQ ID NO: 30 comprises nucleotides at positions 1009-1020 that encode amino acids at positions 337-340 of SEQ ID NO: 13, wherein the variant of SEQ ID NO: 31 comprises nucleotides at positions 1009-1017 that encode amino acids at positions 337-339 of SEQ ID NO: 14, wherein the variant of SEQ ID NO: 32 comprises nucleotides at positions 1009-1020 that encode amino acids at positions 337-340 of SEQ ID NO: 15, wherein the variant of SEQ ID NO: 33 comprises nucleotides at positions 1009-1017 that encode amino acids at positions 337-339 of SEQ ID NO: 16, wherein the variant of SEQ ID NO: 34 comprises nucleotides at positions 1009-1020 that encode amino acids at positions 337-340 of SEQ ID NO: 17, wherein the variant of SEQ ID NO: 35 comprises nucleotides at positions 1009-1014 that encode amino acids at positions 337-338 of SEQ ID NO: 18, wherein the variant of SEQ ID NO: 36 comprises nucleotides at positions 1009-1020 that encode amino acids at positions 337-340 of SEQ ID NO: 19, wherein the variant of SEQ ID NO: 37 comprises nucleotides at positions 1009-1020 that encode amino acids at positions 337-340 of SEQ ID NO: 20, wherein the variant of SEQ ID NO: 38 comprises nucleotides at positions 733-735 that encode residue 245 of SEQ ID NO: 21, wherein the variant of SEQ ID NO: 39 comprises nucleotides at positions 949-951 that encode residue 317 of SEQ ID NO: 22, wherein the variant of SEQ ID NO: 40 comprises nucleotides at positions 955-957 that encode residue 319 of SEQ ID NO: 23, wherein the variant of SEQ ID NO: 41 comprises nucleotides at positions 733-735 and 949-951 that encode amino acids at positions 245 and 317, respectively, of SEQ ID NO: 24, wherein the variant of SEQ ID NO: 42 comprises nucleotides at positions 733-735 and 955-957 that encode amino acids at positions 245 and 319, respectively, of SEQ ID NO: 25, wherein the variant of SEQ ID NO: 43 comprises nucleotides at positions 949-951 and 955-957 that encode amino acids at positions 317 and 319, respectively, of SEQ ID NO: 26, or wherein the variant of SEQ ID NO: 44 comprises nucleotides at positions 733-735, 949-951, and 955-957 that encode amino acids at positions 245, 317, and 319, respectively, of SEQ ID NO: 27, and wherein the variant nucleic acid sequence of the isolated nucleic acid has 95-99% homology to the nucleic acid sequence of SEQ ID NOs: 29, 30, 31, 32, 33, 34, 35, 36, 37, 38, 39, 40, 41, 42, 43, or 44.

6. The isolated nucleic acid of claim 5, comprising the nucleotide sequence of SEQ ID NOs: 29, 32, 34, 37-41 or 43, or the variant thereof.

7. The isolated nucleic acid of claim 6, comprising the nucleotide sequence of SEQ ID NOs: 29, 37, 41, or 43, or the variant thereof.

8. A Herpes Simplex Virus (HSV) vaccine comprising an isolated antigenic polypeptide, the isolated antigenic polypeptide comprising the mature amino acid sequence of any one of SEQ ID NOs: 12-27, or a variant thereof, wherein the variant of SEQ ID NO: 12 does not vary any of positions 337-344, wherein the variant of SEQ ID NO: 13 does not vary any of positions 337-340, wherein the variant of SEQ ID NO: 14 does not vary any of positions 337-339, wherein the variant of SEQ ID NO: 15 does not vary any of positions 337-340, wherein the variant of SEQ ID NO: 16 does not vary any of positions 337-339, wherein the variant of SEQ ID NO: 17 does not vary any of positions 337-340, wherein the variant of SEQ ID NO: 18 does not vary any of positions 337-338, wherein the variant of SEQ ID NO: 19 does not vary any of positions 337-340, wherein the variant of SEQ ID NO: 20 does not vary any of positions 337-340, wherein the variant of SEQ ID NO: 21 does not vary any of positions 245, 317, or 319, wherein the variant of SEQ ID NO: 22 does not vary any of positions 245, 317, or 319, wherein the variant of SEQ ID NO: 23 does not vary any of positions 245, 317, or 319, wherein the variant of SEQ ID NO: 24 does not vary any of positions 245, 317, or 319, wherein the variant of SEQ ID NO: 25 does not vary any of positions 245, 317, or 319, wherein the variant of SEQ ID NO: 26 does not vary any of positions 245, 317, or 319, or wherein the variant of SEQ ID NO: 27 does not vary any of positions 245, 317, or 319, and wherein the variant isolated antigenic polypeptide has 95-99% homology to the amino acid sequence of SEQ ID NOs: 12, 13, 14, 15, 16, 17, 18, 19, 20, 21, 22, 23, 24, 25, 26, or 27.

9. The HSV vaccine of claim 8, comprising the isolated antigenic polypeptide comprising the mature amino acid sequence of SEQ ID NOs: 12, 15, 17, 20-24, or 26, or the variant thereof.

10. The HSV vaccine of claim 8, comprising the isolated antigenic polypeptide comprising the mature amino acid sequence of SEQ ID NOs: 12, 20, 24, or 26, or the variant thereof.

11. The HSV vaccine of claim 8, further comprising a second isolated antigenic polypeptide, the second isolated antigenic polypeptide comprising the mature amino acid sequence of SEQ ID NO: 10, or a variant thereof, wherein the variant isolated antigenic polypeptide has 95-99% homology to the mature amino acid sequence of SEQ ID NO: 10.

12. The HSV vaccine of claim 8, wherein the HSV vaccine is multivalent.

13. The HSV vaccine of claim 8, formulated in an effective amount to produce an antigen-specific immune response.

14. The HSV vaccine of claim 8, wherein the HSV vaccine further comprises an adjuvant.

15. The HSV vaccine of claim 8, wherein the HSV vaccine does not comprise an adjuvant.

* * * * *

SEQUENCE LISTING

```
<160> NUMBER OF SEQ ID NOS: 49

<210> SEQ ID NO 1
<211> LENGTH: 548
<212> TYPE: PRT
<213> ORGANISM: Herpes Simplex Virus 2
<220> FEATURE:
<221> NAME/KEY: SIGNAL
<222> LOCATION: (1)..(20)
<220> FEATURE:
<221> NAME/KEY: MISC_FEATURE
<222> LOCATION: (21)..(417)
<223> OTHER INFORMATION: ectodomain

<400> SEQUENCE: 1
```

```
Met Ala Arg Gly Ala Gly Leu Val Phe Phe Val Gly Val Trp Val Val
1               5                   10                  15

Ser Cys Leu Ala Ala Pro Arg Thr Ser Trp Lys Arg Val Thr Ser
                20                  25                  30

Gly Glu Asp Val Val Leu Leu Pro Ala Pro Ala Gly Pro Glu Glu Arg
            35                  40                  45

Thr Arg Ala His Lys Leu Leu Trp Ala Ala Glu Pro Leu Asp Ala Cys
        50                  55                  60

Gly Pro Leu Arg Pro Ser Trp Val Ala Leu Trp Pro Pro Arg Arg Val
65                      70                  75                  80

Leu Glu Thr Val Val Asp Ala Ala Cys Met Arg Ala Pro Glu Pro Leu
                    85                  90                  95

Ala Ile Ala Tyr Ser Pro Pro Phe Pro Ala Gly Asp Glu Gly Leu Tyr
                100                 105                 110

Ser Glu Leu Ala Trp Arg Asp Arg Val Ala Val Val Asn Glu Ser Leu
            115                 120                 125

Val Ile Tyr Gly Ala Leu Glu Thr Asp Ser Gly Leu Tyr Thr Leu Ser
        130                 135                 140

Val Val Gly Leu Ser Asp Glu Ala Arg Gln Val Ala Ser Val Val Leu
145                 150                 155                 160

Val Val Glu Pro Ala Pro Val Pro Thr Pro Thr Pro Asp Asp Tyr Asp
                165                 170                 175

Glu Glu Asp Asp Ala Gly Val Ser Glu Arg Thr Pro Val Ser Val Pro
            180                 185                 190

Pro Pro Thr Pro Pro Arg Arg Pro Val Ala Pro Pro Thr His Pro
        195                 200                 205

Arg Val Ile Pro Glu Val Ser His Val Arg Gly Val Thr Val His Met
        210                 215                 220

Glu Thr Pro Glu Ala Ile Leu Phe Ala Pro Gly Glu Thr Phe Gly Thr
225                 230                 235                 240

Asn Val Ser Ile His Ala Ile Ala His Asp Asp Gly Pro Tyr Ala Met
                245                 250                 255

Asp Val Val Trp Met Arg Phe Asp Val Pro Ser Ser Cys Ala Glu Met
            260                 265                 270

Arg Ile Tyr Glu Ala Cys Leu Tyr His Pro Gln Leu Pro Glu Cys Leu
        275                 280                 285

Ser Pro Ala Asp Ala Pro Cys Ala Val Ser Ser Trp Ala Tyr Arg Leu
        290                 295                 300

Ala Val Arg Ser Tyr Ala Gly Cys Ser Arg Thr Thr Pro Pro Pro Arg
305                 310                 315                 320

Cys Phe Ala Glu Ala Arg Met Glu Pro Val Pro Gly Leu Ala Trp Leu
            325                 330                 335

Ala Ser Thr Val Asn Leu Glu Phe Gln His Ala Ser Pro Gln His Ala
            340                 345                 350

Gly Leu Tyr Leu Cys Val Val Tyr Val Asp Asp His Ile His Ala Trp
        355                 360                 365

Gly His Met Thr Ile Ser Thr Ala Ala Gln Tyr Arg Asn Ala Val Val
        370                 375                 380

Glu Gln His Leu Pro Gln Arg Gln Pro Glu Pro Val Glu Pro Thr Arg
385                 390                 395                 400

Pro His Val Arg Ala Pro Pro Ala Pro Ser Ala Arg Gly Pro Leu
                405                 410                 415
```

```
Arg Leu Gly Ala Val Leu Gly Ala Leu Leu Ala Ala Leu Gly
            420             425             430

Leu Ser Ala Trp Ala Cys Met Thr Cys Trp Arg Arg Ser Trp Arg
        435                 440             445

Ala Val Lys Ser Arg Ala Ser Ala Thr Gly Pro Thr Tyr Ile Arg Val
        450                 455             460

Ala Asp Ser Glu Leu Tyr Ala Asp Trp Ser Ser Asp Ser Glu Gly Glu
465             470                 475             480

Arg Asp Gly Ser Leu Trp Gln Asp Pro Glu Arg Pro Asp Ser Pro
                485             490             495

Ser Thr Asn Gly Ser Gly Phe Glu Ile Leu Ser Pro Thr Ala Pro Ser
        500             505             510

Val Tyr Pro His Ser Glu Gly Arg Lys Ser Arg Pro Leu Thr Thr
        515             520             525

Phe Gly Ser Gly Ser Pro Gly Arg Arg His Ser Gln Ala Ser Tyr Ser
        530             535             540

Ser Val Leu Trp
545

<210> SEQ ID NO 2
<211> LENGTH: 417
<212> TYPE: PRT
<213> ORGANISM: Artificial Sequence
<220> FEATURE:
<223> OTHER INFORMATION: gE-2t 417 wild type
<220> FEATURE:
<221> NAME/KEY: SIGNAL
<222> LOCATION: (1)..(20)

<400> SEQUENCE: 2

Met Ala Arg Gly Ala Gly Leu Val Phe Phe Val Gly Val Trp Val Val
1               5                   10                  15

Ser Cys Leu Ala Ala Ala Pro Arg Thr Ser Trp Lys Arg Val Thr Ser
            20                  25                  30

Gly Glu Asp Val Val Leu Leu Pro Ala Pro Ala Gly Pro Glu Glu Arg
        35                  40                  45

Thr Arg Ala His Lys Leu Leu Trp Ala Ala Glu Pro Leu Asp Ala Cys
    50                  55                  60

Gly Pro Leu Arg Pro Ser Trp Val Ala Leu Trp Pro Pro Arg Arg Val
65              70                  75                  80

Leu Glu Thr Val Val Asp Ala Ala Cys Met Arg Ala Pro Glu Pro Leu
                85                  90                  95

Ala Ile Ala Tyr Ser Pro Pro Phe Pro Ala Gly Asp Glu Gly Leu Tyr
            100                 105                 110

Ser Glu Leu Ala Trp Arg Asp Arg Val Ala Val Val Asn Glu Ser Leu
        115                 120                 125

Val Ile Tyr Gly Ala Leu Glu Thr Asp Ser Gly Leu Tyr Thr Leu Ser
    130                 135                 140

Val Val Gly Leu Ser Asp Glu Ala Arg Gln Val Ala Ser Val Val Leu
145             150                 155                 160

Val Val Glu Pro Ala Pro Val Pro Thr Pro Thr Pro Asp Asp Tyr Asp
                165                 170                 175

Glu Glu Asp Asp Ala Gly Val Ser Glu Arg Thr Pro Val Ser Val Pro
            180                 185                 190

Pro Pro Thr Pro Pro Arg Arg Pro Pro Val Ala Pro Pro Thr His Pro
        195                 200                 205
```

```
Arg Val Ile Pro Glu Val Ser His Val Arg Gly Val Thr Val His Met
            210                 215                 220
Glu Thr Pro Glu Ala Ile Leu Phe Ala Pro Gly Glu Thr Phe Gly Thr
225                 230                 235                 240
Asn Val Ser Ile His Ala Ile Ala His Asp Asp Gly Pro Tyr Ala Met
            245                 250                 255
Asp Val Val Trp Met Arg Phe Asp Val Pro Ser Ser Cys Ala Glu Met
            260                 265                 270
Arg Ile Tyr Glu Ala Cys Leu Tyr His Pro Gln Leu Pro Glu Cys Leu
            275                 280                 285
Ser Pro Ala Asp Ala Pro Cys Ala Val Ser Ser Trp Ala Tyr Arg Leu
290                 295                 300
Ala Val Arg Ser Tyr Ala Gly Cys Ser Arg Thr Thr Pro Pro Pro Arg
305                 310                 315                 320
Cys Phe Ala Glu Ala Arg Met Glu Pro Val Pro Gly Leu Ala Trp Leu
            325                 330                 335
Ala Ser Thr Val Asn Leu Glu Phe Gln His Ala Ser Pro Gln His Ala
            340                 345                 350
Gly Leu Tyr Leu Cys Val Val Tyr Val Asp Asp His Ile His Ala Trp
            355                 360                 365
Gly His Met Thr Ile Ser Thr Ala Ala Gln Tyr Arg Asn Ala Val Val
            370                 375                 380
Glu Gln His Leu Pro Gln Arg Gln Pro Glu Pro Val Glu Pro Thr Arg
385                 390                 395                 400
Pro His Val Arg Ala Pro Pro Ala Pro Ser Ala Arg Gly Pro Leu
                    405                 410                 415
Arg

<210> SEQ ID NO 3
<211> LENGTH: 405
<212> TYPE: PRT
<213> ORGANISM: Artificial Sequence
<220> FEATURE:
<223> OTHER INFORMATION: gE-2t 405
<220> FEATURE:
<221> NAME/KEY: SIGNAL
<222> LOCATION: (1)..(20)

<400> SEQUENCE: 3

Met Ala Arg Gly Ala Gly Leu Val Phe Phe Val Gly Val Trp Val Val
1               5                   10                  15
Ser Cys Leu Ala Ala Ala Pro Arg Thr Ser Trp Lys Arg Val Thr Ser
            20                  25                  30
Gly Glu Asp Val Val Leu Leu Pro Ala Pro Ala Gly Pro Glu Glu Arg
            35                  40                  45
Thr Arg Ala His Lys Leu Leu Trp Ala Ala Glu Pro Leu Asp Ala Cys
50                  55                  60
Gly Pro Leu Arg Pro Ser Trp Val Ala Leu Trp Pro Pro Arg Arg Val
65                  70                  75                  80
Leu Glu Thr Val Val Asp Ala Ala Cys Met Arg Ala Pro Glu Pro Leu
            85                  90                  95
Ala Ile Ala Tyr Ser Pro Pro Phe Pro Ala Gly Asp Glu Gly Leu Tyr
            100                 105                 110
Ser Glu Leu Ala Trp Arg Asp Arg Val Ala Val Asn Glu Ser Leu
            115                 120                 125
Val Ile Tyr Gly Ala Leu Glu Thr Asp Ser Gly Leu Tyr Thr Leu Ser
```

```
                130             135             140
Val Val Gly Leu Ser Asp Glu Ala Arg Gln Val Ala Ser Val Val Leu
145                 150                 155                 160

Val Val Glu Pro Ala Pro Val Pro Thr Pro Thr Pro Asp Asp Tyr Asp
                165                 170                 175

Glu Glu Asp Asp Ala Gly Val Ser Glu Arg Thr Pro Val Ser Val Pro
                180                 185                 190

Pro Pro Thr Pro Pro Arg Arg Pro Pro Val Ala Pro Pro Thr His Pro
                195                 200                 205

Arg Val Ile Pro Glu Val Ser His Val Arg Gly Val Thr Val His Met
                210                 215                 220

Glu Thr Pro Glu Ala Ile Leu Phe Ala Pro Gly Glu Thr Phe Gly Thr
225                 230                 235                 240

Asn Val Ser Ile His Ala Ile Ala His Asp Asp Gly Pro Tyr Ala Met
                245                 250                 255

Asp Val Val Trp Met Arg Phe Asp Val Pro Ser Ser Cys Ala Glu Met
                260                 265                 270

Arg Ile Tyr Glu Ala Cys Leu Tyr His Pro Gln Leu Pro Glu Cys Leu
                275                 280                 285

Ser Pro Ala Asp Ala Pro Cys Ala Val Ser Ser Trp Ala Tyr Arg Leu
                290                 295                 300

Ala Val Arg Ser Tyr Ala Gly Cys Ser Arg Thr Thr Pro Pro Pro Arg
305                 310                 315                 320

Cys Phe Ala Glu Ala Arg Met Glu Pro Val Pro Gly Leu Ala Trp Leu
                325                 330                 335

Ala Ser Thr Val Asn Leu Glu Phe Gln His Ala Ser Pro Gln His Ala
                340                 345                 350

Gly Leu Tyr Leu Cys Val Val Tyr Val Asp Asp His Ile His Ala Trp
                355                 360                 365

Gly His Met Thr Ile Ser Thr Ala Ala Gln Tyr Arg Asn Ala Val Val
                370                 375                 380

Glu Gln His Leu Pro Gln Arg Gln Pro Glu Pro Val Glu Pro Thr Arg
385                 390                 395                 400

Pro His Val Arg Ala
                405

<210> SEQ ID NO 4
<211> LENGTH: 383
<212> TYPE: PRT
<213> ORGANISM: Artificial Sequence
<220> FEATURE:
<223> OTHER INFORMATION: gE-2t 24-405

<400> SEQUENCE: 4

Pro Arg Thr Ser Trp Lys Arg Val Thr Ser Gly Glu Asp Val Val Leu
1               5                   10                  15

Leu Pro Ala Pro Ala Gly Pro Glu Glu Arg Thr Arg Ala His Lys Leu
                20                  25                  30

Leu Trp Ala Ala Glu Pro Leu Asp Ala Cys Gly Pro Leu Arg Pro Ser
            35                  40                  45

Trp Val Ala Leu Trp Pro Pro Arg Arg Val Leu Glu Thr Val Val Asp
            50                  55                  60

Ala Ala Cys Met Arg Ala Pro Glu Pro Leu Ala Ile Ala Tyr Ser Pro
65                  70                  75                  80

Pro Phe Pro Ala Gly Asp Glu Gly Leu Tyr Ser Glu Leu Ala Trp Arg
```

85                  90                  95
Asp Arg Val Ala Val Val Asn Glu Ser Leu Val Ile Tyr Gly Ala Leu
            100                 105                 110

Glu Thr Asp Ser Gly Leu Tyr Thr Leu Ser Val Val Gly Leu Ser Asp
            115                 120                 125

Glu Ala Arg Gln Val Ala Ser Val Val Leu Val Val Glu Pro Ala Pro
        130                 135                 140

Val Pro Thr Pro Thr Pro Asp Asp Tyr Asp Glu Glu Asp Asp Ala Gly
145                 150                 155                 160

Val Ser Glu Arg Thr Pro Val Ser Val Pro Pro Thr Pro Arg
                165                 170                 175

Arg Pro Pro Val Ala Pro Pro Thr His Pro Arg Val Ile Pro Glu Val
                180                 185                 190

Ser His Val Arg Gly Val Thr Val His Met Glu Thr Pro Glu Ala Ile
        195                 200                 205

Leu Phe Ala Pro Gly Glu Thr Phe Gly Thr Asn Val Ser Ile His Ala
    210                 215                 220

Ile Ala His Asp Asp Gly Pro Tyr Ala Met Asp Val Val Trp Met Arg
225                 230                 235                 240

Phe Asp Val Pro Ser Ser Cys Ala Glu Met Arg Ile Tyr Glu Ala Cys
                245                 250                 255

Leu Tyr His Pro Gln Leu Pro Glu Cys Leu Ser Pro Ala Asp Ala Pro
                260                 265                 270

Cys Ala Val Ser Ser Trp Ala Tyr Arg Leu Ala Val Arg Ser Tyr Ala
        275                 280                 285

Gly Cys Ser Arg Thr Thr Pro Pro Arg Cys Phe Ala Glu Ala Arg
    290                 295                 300

Met Glu Pro Val Pro Gly Leu Ala Trp Leu Ala Ser Thr Val Asn Leu
305                 310                 315                 320

Glu Phe Gln His Ala Ser Pro Gln His Ala Gly Leu Tyr Leu Cys Val
                325                 330                 335

Val Tyr Val Asp Asp His Ile His Ala Trp Gly His Met Thr Ile Ser
            340                 345                 350

Thr Ala Ala Gln Tyr Arg Asn Ala Val Val Glu Gln His Leu Pro Gln
        355                 360                 365

Arg Gln Pro Glu Pro Val Glu Pro Thr Arg Pro His Val Arg Ala
    370                 375                 380

<210> SEQ ID NO 5
<211> LENGTH: 414
<212> TYPE: PRT
<213> ORGANISM: Artificial Sequence
<220> FEATURE:
<223> OTHER INFORMATION: gE-2t 414
<220> FEATURE:
<221> NAME/KEY: SIGNAL
<222> LOCATION: (1)..(20)

<400> SEQUENCE: 5

Met Ala Arg Gly Ala Gly Leu Val Phe Phe Val Gly Val Trp Val Val
1               5                   10                  15

Ser Cys Leu Ala Ala Ala Pro Arg Thr Ser Trp Lys Arg Val Thr Ser
            20                  25                  30

Gly Glu Asp Val Val Leu Leu Pro Ala Pro Ala Gly Pro Glu Glu Arg
        35                  40                  45

Thr Arg Ala His Lys Leu Leu Trp Ala Ala Glu Pro Leu Asp Ala Cys

```
              50                  55                  60
Gly Pro Leu Arg Pro Ser Trp Val Ala Leu Trp Pro Arg Arg Val
 65                  70                  75                  80

Leu Glu Thr Val Val Asp Ala Ala Cys Met Arg Ala Pro Glu Pro Leu
                 85                  90                  95

Ala Ile Ala Tyr Ser Pro Pro Phe Ala Gly Asp Glu Gly Leu Tyr
                100                 105                 110

Ser Glu Leu Ala Trp Arg Asp Arg Val Ala Val Asn Glu Ser Leu
                115                 120                 125

Val Ile Tyr Gly Ala Leu Glu Thr Asp Ser Gly Leu Tyr Thr Leu Ser
130                 135                 140

Val Val Gly Leu Ser Asp Glu Ala Arg Gln Val Ala Ser Val Val Leu
145                 150                 155                 160

Val Val Glu Pro Ala Pro Val Pro Thr Pro Thr Pro Asp Asp Tyr Asp
                165                 170                 175

Glu Glu Asp Asp Ala Gly Val Ser Glu Arg Thr Pro Val Ser Val Pro
                180                 185                 190

Pro Pro Thr Pro Pro Arg Arg Pro Val Ala Pro Pro Thr His Pro
                195                 200                 205

Arg Val Ile Pro Glu Val Ser His Val Arg Gly Val Thr Val His Met
210                 215                 220

Glu Thr Pro Glu Ala Ile Leu Phe Ala Pro Gly Glu Thr Phe Gly Thr
225                 230                 235                 240

Asn Val Ser Ile His Ala Ile Ala His Asp Asp Gly Pro Tyr Ala Met
                245                 250                 255

Asp Val Val Trp Met Arg Phe Asp Val Pro Ser Ser Cys Ala Glu Met
                260                 265                 270

Arg Ile Tyr Glu Ala Cys Leu Tyr His Pro Gln Leu Pro Glu Cys Leu
                275                 280                 285

Ser Pro Ala Asp Ala Pro Cys Ala Val Ser Ser Trp Ala Tyr Arg Leu
                290                 295                 300

Ala Val Arg Ser Tyr Ala Gly Cys Ser Arg Thr Thr Pro Pro Pro Arg
305                 310                 315                 320

Cys Phe Ala Glu Ala Arg Met Glu Pro Val Pro Gly Leu Ala Trp Leu
                325                 330                 335

Ala Ser Thr Val Asn Leu Glu Phe Gln His Ala Ser Pro Gln His Ala
                340                 345                 350

Gly Leu Tyr Leu Cys Val Val Tyr Val Asp Asp His Ile His Ala Trp
                355                 360                 365

Gly His Met Thr Ile Ser Thr Ala Ala Gln Tyr Arg Asn Ala Val Val
                370                 375                 380

Glu Gln His Leu Pro Gln Arg Gln Pro Glu Pro Val Glu Pro Thr Arg
385                 390                 395                 400

Pro His Val Arg Ala Pro Pro Ala Pro Ser Ala Arg Gly
                405                 410

<210> SEQ ID NO 6
<211> LENGTH: 419
<212> TYPE: PRT
<213> ORGANISM: Artificial Sequence
<220> FEATURE:
<223> OTHER INFORMATION: gE-2t 419
<220> FEATURE:
<221> NAME/KEY: SIGNAL
<222> LOCATION: (1)..(20)
```

```
<400> SEQUENCE: 6

Met Ala Arg Gly Ala Gly Leu Val Phe Phe Val Gly Val Trp Val Val
1               5                   10                  15

Ser Cys Leu Ala Ala Ala Pro Arg Thr Ser Trp Lys Arg Val Thr Ser
                20                  25                  30

Gly Glu Asp Val Val Leu Leu Pro Ala Pro Ala Gly Pro Glu Glu Arg
            35                  40                  45

Thr Arg Ala His Lys Leu Leu Trp Ala Ala Glu Pro Leu Asp Ala Cys
        50                  55                  60

Gly Pro Leu Arg Pro Ser Trp Val Ala Leu Trp Pro Arg Arg Val
65                  70                  75                  80

Leu Glu Thr Val Val Asp Ala Ala Cys Met Arg Ala Pro Glu Pro Leu
                85                  90                  95

Ala Ile Ala Tyr Ser Pro Pro Phe Pro Ala Gly Asp Glu Gly Leu Tyr
            100                 105                 110

Ser Glu Leu Ala Trp Arg Asp Arg Val Ala Val Val Asn Glu Ser Leu
        115                 120                 125

Val Ile Tyr Gly Ala Leu Glu Thr Asp Ser Gly Leu Tyr Thr Leu Ser
    130                 135                 140

Val Val Gly Leu Ser Asp Glu Ala Arg Gln Val Ala Ser Val Val Leu
145                 150                 155                 160

Val Val Glu Pro Ala Pro Val Pro Thr Pro Thr Pro Asp Asp Tyr Asp
                165                 170                 175

Glu Glu Asp Asp Ala Gly Val Ser Glu Arg Thr Pro Val Ser Val Pro
            180                 185                 190

Pro Pro Thr Pro Pro Arg Arg Pro Val Ala Pro Pro Thr His Pro
        195                 200                 205

Arg Val Ile Pro Glu Val Ser His Val Arg Gly Val Thr Val His Met
    210                 215                 220

Glu Thr Pro Glu Ala Ile Leu Phe Ala Pro Gly Glu Thr Phe Gly Thr
225                 230                 235                 240

Asn Val Ser Ile His Ala Ile His Asp Asp Gly Pro Tyr Ala Met
                245                 250                 255

Asp Val Val Trp Met Arg Phe Asp Val Pro Ser Ser Cys Ala Glu Met
            260                 265                 270

Arg Ile Tyr Glu Ala Cys Leu Tyr His Pro Gln Leu Pro Glu Cys Leu
        275                 280                 285

Ser Pro Ala Asp Ala Pro Cys Ala Val Ser Ser Trp Ala Tyr Arg Leu
    290                 295                 300

Ala Val Arg Ser Tyr Ala Gly Cys Ser Arg Thr Thr Pro Pro Arg
305                 310                 315                 320

Cys Phe Ala Glu Ala Arg Met Glu Pro Val Pro Gly Leu Ala Trp Leu
                325                 330                 335

Ala Ser Thr Val Asn Leu Glu Phe Gln His Ala Ser Pro Gln His Ala
            340                 345                 350

Gly Leu Tyr Leu Cys Val Val Tyr Val Asp Asp His Ile His Ala Trp
        355                 360                 365

Gly His Met Thr Ile Ser Thr Ala Ala Gln Tyr Arg Asn Ala Val Val
    370                 375                 380

Glu Gln His Leu Pro Gln Arg Gln Pro Glu Pro Val Glu Pro Thr Arg
385                 390                 395                 400

Pro His Val Arg Ala Pro Pro Ala Pro Ser Ala Arg Gly Pro Leu
                405                 410                 415
```

Arg Leu Gly

<210> SEQ ID NO 7
<211> LENGTH: 419
<212> TYPE: PRT
<213> ORGANISM: Artificial Sequence
<220> FEATURE:
<223> OTHER INFORMATION: gE-1t 419
<220> FEATURE:
<221> NAME/KEY: SIGNAL
<222> LOCATION: (1)..(20)

<400> SEQUENCE: 7

```
Met Asp Arg Gly Ala Val Val Gly Phe Leu Leu Gly Val Cys Val Val
 1               5                  10                  15

Ser Cys Leu Ala Gly Thr Pro Lys Thr Ser Trp Arg Arg Val Ser Val
             20                  25                  30

Gly Glu Asp Val Ser Leu Leu Pro Ala Pro Gly Pro Thr Gly Arg Gly
         35                  40                  45

Pro Thr Gln Lys Leu Leu Trp Ala Val Glu Pro Leu Asp Gly Cys Gly
     50                  55                  60

Pro Leu His Pro Ser Trp Val Ser Leu Met Pro Pro Lys Gln Val Pro
 65                  70                  75                  80

Glu Thr Val Val Asp Ala Ala Cys Met Arg Ala Pro Val Pro Leu Ala
                 85                  90                  95

Met Ala Tyr Ala Pro Pro Ala Pro Ser Ala Thr Gly Gly Leu Arg Thr
            100                 105                 110

Asp Phe Val Trp Gln Glu Arg Ala Ala Val Val Asn Arg Ser Leu Val
        115                 120                 125

Ile His Gly Val Arg Glu Thr Asp Ser Gly Leu Tyr Thr Leu Ser Val
    130                 135                 140

Gly Asp Ile Lys Asp Pro Ala Arg Gln Val Ala Ser Val Val Leu Val
145                 150                 155                 160

Val Gln Pro Ala Pro Val Pro Thr Pro Pro Pro Thr Pro Ala Asp Tyr
                165                 170                 175

Asp Glu Asp Asp Asn Asp Glu Gly Glu Asp Glu Ser Leu Ala Gly Thr
            180                 185                 190

Pro Ala Ser Gly Thr Pro Arg Leu Pro Pro Pro Ala Pro Pro Arg
        195                 200                 205

Ser Trp Pro Ser Ala Pro Glu Val Ser His Val Arg Gly Val Thr Val
    210                 215                 220

Arg Met Glu Thr Pro Glu Ala Ile Leu Phe Ser Pro Gly Glu Thr Phe
225                 230                 235                 240

Ser Thr Asn Val Ser Ile His Ala Ile Ala His Asp Asp Gln Thr Tyr
                245                 250                 255

Ser Met Asp Val Val Trp Leu Arg Phe Asp Val Pro Thr Ser Cys Ala
            260                 265                 270

Glu Met Arg Ile Tyr Glu Ser Cys Leu Tyr His Pro Gln Leu Pro Glu
        275                 280                 285

Cys Leu Ser Pro Ala Asp Ala Pro Cys Ala Ala Ser Thr Trp Thr Ser
    290                 295                 300

Arg Leu Ala Val Arg Ser Tyr Ala Gly Cys Ser Arg Thr Asn Pro Pro
305                 310                 315                 320

Pro Arg Cys Ser Ala Glu Ala His Met Glu Pro Val Pro Gly Leu Ala
                325                 330                 335
```

```
Trp Gln Ala Ala Ser Val Asn Leu Glu Phe Arg Asp Ala Ser Pro Gln
                340                 345                 350

His Ser Gly Leu Tyr Leu Cys Val Val Tyr Val Asn Asp His Ile His
            355                 360                 365

Ala Trp Gly His Ile Thr Ile Ser Thr Ala Ala Gln Tyr Arg Asn Ala
        370                 375                 380

Val Val Glu Gln Pro Leu Pro Gln Arg Gly Ala Asp Leu Ala Glu Pro
385                 390                 395                 400

Thr His Pro His Val Gly Ala Pro Pro His Ala Pro Thr His Gly
                405                 410                 415

Ala Leu Arg

<210> SEQ ID NO 8
<211> LENGTH: 339
<212> TYPE: PRT
<213> ORGANISM: Artificial Sequence
<220> FEATURE:
<223> OTHER INFORMATION: gD-2t 339
<220> FEATURE:
<221> NAME/KEY: SIGNAL
<222> LOCATION: (1)..(25)

<400> SEQUENCE: 8

Met Gly Arg Leu Thr Ser Gly Val Gly Thr Ala Ala Leu Leu Val Val
1               5                   10                  15

Ala Val Gly Leu Arg Val Val Cys Ala Lys Tyr Ala Leu Ala Asp Pro
                20                  25                  30

Ser Leu Lys Met Ala Asp Pro Asn Arg Phe Arg Gly Lys Asn Leu Pro
            35                  40                  45

Val Leu Asp Gln Leu Thr Asp Pro Pro Gly Val Lys Arg Val Tyr His
    50                  55                  60

Ile Gln Pro Ser Leu Glu Asp Pro Phe Gln Pro Pro Ser Ile Pro Ile
65                  70                  75                  80

Thr Val Tyr Tyr Ala Val Leu Glu Arg Ala Cys Arg Ser Val Leu Leu
                85                  90                  95

His Ala Pro Ser Glu Ala Pro Gln Ile Val Arg Gly Ala Ser Asp Glu
            100                 105                 110

Ala Arg Lys His Thr Tyr Asn Leu Thr Ile Ala Trp Tyr Arg Met Gly
        115                 120                 125

Asp Asn Cys Ala Ile Pro Ile Thr Val Met Glu Tyr Thr Glu Cys Pro
130                 135                 140

Tyr Asn Lys Ser Leu Gly Val Cys Pro Ile Arg Thr Gln Pro Arg Trp
145                 150                 155                 160

Ser Tyr Tyr Asp Ser Phe Ser Ala Val Ser Glu Asp Asn Leu Gly Phe
                165                 170                 175

Leu Met His Ala Pro Ala Phe Glu Thr Ala Gly Thr Tyr Leu Arg Leu
            180                 185                 190

Val Lys Ile Asn Asp Trp Thr Glu Ile Thr Gln Phe Ile Leu Glu His
        195                 200                 205

Arg Ala Arg Ala Ser Cys Lys Tyr Ala Leu Pro Leu Arg Ile Pro Pro
210                 215                 220

Ala Ala Cys Leu Thr Ser Lys Ala Tyr Gln Gln Gly Val Thr Val Asp
225                 230                 235                 240

Ser Ile Gly Met Leu Pro Arg Phe Ile Pro Glu Asn Gln Arg Thr Val
                245                 250                 255

Ala Leu Tyr Ser Leu Lys Ile Ala Gly Trp His Gly Pro Lys Pro Pro
```

```
                    260                 265                 270
Tyr Thr Ser Thr Leu Leu Pro Pro Glu Leu Ser Asp Thr Thr Asn Ala
                275                 280                 285

Thr Gln Pro Glu Leu Val Pro Glu Asp Pro Glu Asp Ser Ala Leu Leu
                290                 295                 300

Glu Asp Pro Ala Gly Thr Val Ser Ser Gln Ile Pro Pro Asn Trp His
305                 310                 315                 320

Ile Pro Ser Ile Gln Asp Val Ala Pro His His Ala Pro Ala Ala Pro
                325                 330                 335

Ser Asn Pro

<210> SEQ ID NO 9
<211> LENGTH: 372
<212> TYPE: PRT
<213> ORGANISM: Herpes Simplex Virus 2
<220> FEATURE:
<221> NAME/KEY: SIGNAL
<222> LOCATION: (1)..(20)
<220> FEATURE:
<221> NAME/KEY: MISC_FEATURE
<222> LOCATION: (21)..(262)
<223> OTHER INFORMATION: ectodomain

<400> SEQUENCE: 9

Met Pro Gly Arg Ser Leu Gln Gly Leu Ala Ile Leu Gly Leu Trp Val
1               5                   10                  15

Cys Ala Thr Gly Leu Val Val Arg Gly Pro Thr Val Ser Leu Val Ser
                20                  25                  30

Asp Ser Leu Val Asp Ala Gly Val Gly Pro Gln Gly Phe Val Glu
                35                  40                  45

Glu Asp Leu Arg Val Phe Gly Glu Leu His Phe Val Gly Ala Gln Val
                50                  55                  60

Pro His Thr Asn Tyr Tyr Asp Gly Ile Ile Glu Leu Phe His Tyr Pro
65                  70                  75                  80

Leu Gly Asn His Cys Pro Arg Val Val His Val Thr Leu Thr Ala
                85                  90                  95

Cys Pro Arg Arg Pro Ala Val Ala Phe Thr Leu Cys Arg Ser Thr His
                100                 105                 110

His Ala His Ser Pro Ala Tyr Pro Thr Leu Glu Leu Gly Leu Ala Arg
                115                 120                 125

Gln Pro Leu Leu Arg Val Arg Thr Ala Thr Arg Asp Tyr Ala Gly Leu
                130                 135                 140

Tyr Val Leu Arg Val Trp Val Gly Ser Ala Thr Asn Ala Ser Leu Phe
145                 150                 155                 160

Val Leu Gly Val Ala Leu Ser Ala Asn Gly Thr Phe Val Tyr Asn Gly
                165                 170                 175

Ser Asp Tyr Gly Ser Cys Asp Pro Ala Gln Leu Pro Phe Ser Ala Pro
                180                 185                 190

Arg Leu Gly Pro Ser Ser Val Tyr Thr Pro Gly Ala Ser Arg Pro Thr
                195                 200                 205

Pro Pro Arg Thr Thr Thr Ser Pro Ser Ser Pro Arg Asp Pro Thr Pro
                210                 215                 220

Ala Pro Gly Asp Thr Gly Thr Pro Ala Pro Ala Ser Gly Glu Arg Ala
225                 230                 235                 240

Pro Pro Asn Ser Thr Arg Ser Ala Ser Glu Ser Arg His Arg Leu Thr
                245                 250                 255
```

Val Ala Gln Val Ile Gln Ile Ala Ile Pro Ala Ser Ile Ile Ala Phe
                260                 265                 270

Val Phe Leu Gly Ser Cys Ile Cys Phe Ile His Arg Cys Gln Arg Arg
            275                 280                 285

Tyr Arg Arg Pro Arg Gly Gln Ile Tyr Asn Pro Gly Gly Val Ser Cys
        290                 295                 300

Ala Val Asn Glu Ala Ala Met Ala Arg Leu Gly Ala Glu Leu Arg Ser
305                 310                 315                 320

His Pro Asn Thr Pro Pro Lys Pro Arg Arg Ser Ser Ser Ser Thr
                325                 330                 335

Thr Met Pro Ser Leu Thr Ser Ile Ala Glu Glu Ser Glu Pro Gly Pro
            340                 345                 350

Val Val Leu Leu Ser Val Ser Pro Arg Pro Arg Ser Gly Pro Thr Ala
            355                 360                 365

Pro Gln Glu Val
        370

<210> SEQ ID NO 10
<211> LENGTH: 262
<212> TYPE: PRT
<213> ORGANISM: Artificial Sequence
<220> FEATURE:
<223> OTHER INFORMATION: gI-2t 262

<400> SEQUENCE: 10

Met Pro Gly Arg Ser Leu Gln Gly Leu Ala Ile Leu Gly Leu Trp Val
1               5                   10                  15

Cys Ala Thr Gly Leu Val Val Arg Gly Pro Thr Val Ser Leu Val Ser
            20                  25                  30

Asp Ser Leu Val Asp Ala Gly Ala Val Gly Pro Gln Gly Phe Val Glu
        35                  40                  45

Glu Asp Leu Arg Val Phe Gly Glu Leu His Phe Val Gly Ala Gln Val
50                  55                  60

Pro His Thr Asn Tyr Tyr Asp Gly Ile Ile Glu Leu Phe His Tyr Pro
65                  70                  75                  80

Leu Gly Asn His Cys Pro Arg Val Val His Val Thr Leu Thr Ala
            85                  90                  95

Cys Pro Arg Arg Pro Ala Val Ala Phe Thr Leu Cys Arg Ser Thr His
        100                 105                 110

His Ala His Ser Pro Ala Tyr Pro Thr Leu Glu Leu Gly Leu Ala Arg
        115                 120                 125

Gln Pro Leu Leu Arg Val Arg Thr Ala Thr Arg Asp Tyr Ala Gly Leu
130                 135                 140

Tyr Val Leu Arg Val Trp Val Gly Ser Ala Thr Asn Ala Ser Leu Phe
145                 150                 155                 160

Val Leu Gly Val Ala Leu Ser Ala Asn Gly Thr Phe Val Tyr Asn Gly
            165                 170                 175

Ser Asp Tyr Gly Ser Cys Asp Pro Ala Gln Leu Pro Phe Ser Ala Pro
        180                 185                 190

Arg Leu Gly Pro Ser Ser Val Tyr Thr Pro Gly Ala Ser Arg Pro Thr
        195                 200                 205

Pro Pro Arg Thr Thr Thr Ser Pro Ser Ser Pro Arg Asp Pro Thr Pro
    210                 215                 220

Ala Pro Gly Asp Thr Gly Thr Pro Ala Pro Ala Ser Gly Glu Arg Ala
225                 230                 235                 240

-continued

```
Pro Pro Asn Ser Thr Arg Ser Ala Ser Glu Ser Arg His Arg Leu Thr
                245                 250                 255

Val Ala Gln Val Ile Gln
            260

<210> SEQ ID NO 11
<211> LENGTH: 269
<212> TYPE: PRT
<213> ORGANISM: Artificial Sequence
<220> FEATURE:
<223> OTHER INFORMATION: gI-1t 269
<220> FEATURE:
<221> NAME/KEY: SIGNAL
<222> LOCATION: (1)..(20)

<400> SEQUENCE: 11

Met Pro Cys Arg Pro Leu Gln Gly Leu Val Leu Val Gly Leu Trp Val
1               5                   10                  15

Cys Ala Thr Ser Leu Val Val Arg Gly Pro Thr Val Ser Leu Val Ser
            20                  25                  30

Asn Ser Phe Val Asp Ala Gly Ala Leu Gly Pro Asp Gly Val Val Glu
        35                  40                  45

Glu Asp Leu Leu Ile Leu Gly Glu Leu Arg Phe Val Gly Asp Gln Val
    50                  55                  60

Pro His Thr Thr Tyr Tyr Asp Gly Val Val Glu Leu Trp His Tyr Pro
65                  70                  75                  80

Met Gly His Lys Cys Pro Arg Val His Val Val Thr Val Thr Ala
                85                  90                  95

Cys Pro Arg Arg Pro Ala Val Ala Phe Ala Leu Cys Arg Ala Thr Asp
            100                 105                 110

Ser Thr His Ser Pro Ala Tyr Pro Thr Leu Glu Leu Asn Leu Ala Gln
        115                 120                 125

Gln Pro Leu Leu Arg Val Arg Arg Ala Thr Arg Asp Tyr Ala Gly Val
    130                 135                 140

Tyr Val Leu Arg Val Trp Val Gly Asp Ala Pro Asn Ala Ser Leu Phe
145                 150                 155                 160

Val Leu Gly Met Ala Ile Ala Ala Glu Gly Thr Leu Ala Tyr Asn Gly
                165                 170                 175

Ser Ala His Gly Ser Cys Asp Pro Lys Leu Leu Pro Ser Ser Ala Pro
            180                 185                 190

Arg Leu Ala Pro Ala Ser Val Tyr Gln Pro Ala Pro Asn Pro Ala Ser
        195                 200                 205

Thr Pro Ser Thr Thr Thr Ser Thr Pro Ser Thr Thr Ile Pro Ala Pro
    210                 215                 220

Gln Ala Ser Thr Thr Pro Phe Pro Thr Gly Asp Pro Lys Pro Gln Pro
225                 230                 235                 240

His Gly Val Asn His Glu Pro Pro Ser Asn Ala Thr Arg Ala Thr Arg
                245                 250                 255

Asp Ser Arg Tyr Ala Leu Thr Val Thr Gln Ile Ile Gln
            260                 265

<210> SEQ ID NO 12
<211> LENGTH: 421
<212> TYPE: PRT
<213> ORGANISM: Artificial Sequence
<220> FEATURE:
<223> OTHER INFORMATION: gE-2t 417 Mutant #1
<220> FEATURE:
<221> NAME/KEY: SIGNAL
```

<220> FEATURE:
<221> NAME/KEY: MISC_FEATURE
<222> LOCATION: (1)..(20)
<220> FEATURE:
<221> NAME/KEY: MISC_FEATURE
<222> LOCATION: (337)..(344)
<223> OTHER INFORMATION: mutated surface-exposed loop

<400> SEQUENCE: 12

Met Ala Arg Gly Ala Gly Leu Val Phe Phe Val Gly Val Trp Val Val
1               5                   10                  15

Ser Cys Leu Ala Ala Ala Pro Arg Thr Ser Trp Lys Arg Val Thr Ser
            20                  25                  30

Gly Glu Asp Val Val Leu Leu Pro Ala Pro Ala Gly Pro Glu Glu Arg
        35                  40                  45

Thr Arg Ala His Lys Leu Leu Trp Ala Ala Glu Pro Leu Asp Ala Cys
    50                  55                  60

Gly Pro Leu Arg Pro Ser Trp Val Ala Leu Trp Pro Pro Arg Arg Val
65                  70                  75                  80

Leu Glu Thr Val Val Asp Ala Ala Cys Met Arg Ala Pro Glu Pro Leu
                85                  90                  95

Ala Ile Ala Tyr Ser Pro Pro Phe Pro Ala Gly Asp Glu Gly Leu Tyr
            100                 105                 110

Ser Glu Leu Ala Trp Arg Asp Arg Val Ala Val Val Asn Glu Ser Leu
        115                 120                 125

Val Ile Tyr Gly Ala Leu Glu Thr Asp Ser Gly Leu Tyr Thr Leu Ser
    130                 135                 140

Val Val Gly Leu Ser Asp Glu Ala Arg Gln Val Ala Ser Val Val Leu
145                 150                 155                 160

Val Val Glu Pro Ala Pro Val Pro Thr Pro Thr Pro Asp Asp Tyr Asp
                165                 170                 175

Glu Glu Asp Asp Ala Gly Val Ser Glu Arg Thr Pro Val Ser Val Pro
            180                 185                 190

Pro Pro Thr Pro Pro Arg Arg Pro Pro Val Ala Pro Thr His Pro
        195                 200                 205

Arg Val Ile Pro Glu Val Ser His Val Arg Gly Val Thr Val His Met
    210                 215                 220

Glu Thr Pro Glu Ala Ile Leu Phe Ala Pro Gly Glu Thr Phe Gly Thr
225                 230                 235                 240

Asn Val Ser Ile His Ala Ile His Asp Asp Gly Pro Tyr Ala Met
                245                 250                 255

Asp Val Val Trp Met Arg Phe Asp Val Pro Ser Ser Cys Ala Glu Met
            260                 265                 270

Arg Ile Tyr Glu Ala Cys Leu Tyr His Pro Gln Leu Pro Glu Cys Leu
        275                 280                 285

Ser Pro Ala Asp Ala Pro Cys Ala Val Ser Ser Trp Ala Tyr Arg Leu
    290                 295                 300

Ala Val Arg Ser Tyr Ala Gly Cys Ser Arg Thr Thr Pro Pro Arg
305                 310                 315                 320

Cys Phe Ala Glu Ala Arg Met Glu Pro Val Pro Gly Leu Ala Trp Leu
                325                 330                 335

Ala Ala Arg Ala Ala Ser Thr Val Asn Leu Glu Phe Gln His Ala Ser
            340                 345                 350

Pro Gln His Ala Gly Leu Tyr Leu Cys Val Val Tyr Val Asp Asp His
        355                 360                 365

Ile His Ala Trp Gly His Met Thr Ile Ser Thr Ala Ala Gln Tyr Arg
    370                 375                 380

```
Asn Ala Val Val Glu Gln His Leu Pro Gln Arg Gln Pro Glu Pro Val
385                 390                 395                 400

Glu Pro Thr Arg Pro His Val Arg Ala Pro Pro Ala Pro Ser Ala
            405                 410                 415

Arg Gly Pro Leu Arg
            420

<210> SEQ ID NO 13
<211> LENGTH: 417
<212> TYPE: PRT
<213> ORGANISM: Artificial Sequence
<220> FEATURE:
<223> OTHER INFORMATION: gE-2t 417 Mutant #2
<220> FEATURE:
<221> NAME/KEY: SIGNAL
<222> LOCATION: (1)..(20)
<220> FEATURE:
<221> NAME/KEY: MISC_FEATURE
<222> LOCATION: (337)..(340)
<223> OTHER INFORMATION: mutated surface-exposed loop

<400> SEQUENCE: 13

Met Ala Arg Gly Ala Gly Leu Val Phe Phe Val Gly Val Trp Val Val
1               5                   10                  15

Ser Cys Leu Ala Ala Pro Arg Thr Ser Trp Lys Arg Val Thr Ser
            20                  25                  30

Gly Glu Asp Val Val Leu Leu Pro Ala Pro Ala Gly Pro Glu Glu Arg
            35                  40                  45

Thr Arg Ala His Lys Leu Leu Trp Ala Ala Glu Pro Leu Asp Ala Cys
    50                  55                  60

Gly Pro Leu Arg Pro Ser Trp Val Ala Leu Trp Pro Pro Arg Arg Val
65                  70                  75                  80

Leu Glu Thr Val Val Asp Ala Ala Cys Met Arg Ala Pro Glu Pro Leu
                85                  90                  95

Ala Ile Ala Tyr Ser Pro Pro Phe Pro Ala Gly Asp Glu Gly Leu Tyr
            100                 105                 110

Ser Glu Leu Ala Trp Arg Asp Arg Val Ala Val Val Asn Glu Ser Leu
        115                 120                 125

Val Ile Tyr Gly Ala Leu Glu Thr Asp Ser Gly Leu Tyr Thr Leu Ser
    130                 135                 140

Val Val Gly Leu Ser Asp Glu Ala Arg Gln Val Ala Ser Val Val Leu
145                 150                 155                 160

Val Val Glu Pro Ala Pro Val Pro Thr Pro Thr Pro Asp Asp Tyr Asp
                165                 170                 175

Glu Glu Asp Asp Ala Gly Val Ser Glu Arg Thr Pro Val Ser Val Pro
            180                 185                 190

Pro Pro Thr Pro Pro Arg Arg Pro Pro Val Ala Pro Thr His Pro
        195                 200                 205

Arg Val Ile Pro Glu Val Ser His Val Arg Gly Val Thr Val His Met
    210                 215                 220

Glu Thr Pro Glu Ala Ile Leu Phe Ala Pro Gly Glu Thr Phe Gly Thr
225                 230                 235                 240

Asn Val Ser Ile His Ala Ile Ala His Asp Asp Gly Pro Tyr Ala Met
                245                 250                 255

Asp Val Val Trp Met Arg Phe Asp Val Pro Ser Ser Cys Ala Glu Met
            260                 265                 270

Arg Ile Tyr Glu Ala Cys Leu Tyr His Pro Gln Leu Pro Glu Cys Leu
```

```
                    275                 280                 285
Ser Pro Ala Asp Ala Pro Cys Ala Val Ser Ser Trp Ala Tyr Arg Leu
    290                 295                 300

Ala Val Arg Ser Tyr Ala Gly Cys Ser Arg Thr Thr Pro Pro Pro Arg
305                 310                 315                 320

Cys Phe Ala Glu Ala Arg Met Glu Pro Val Pro Gly Leu Ala Trp Leu
                325                 330                 335

Ala Gly Thr Val Asn Leu Glu Phe Gln His Ala Ser Pro Gln His Ala
                340                 345                 350

Gly Leu Tyr Leu Cys Val Val Tyr Val Asp Asp His Ile His Ala Trp
                355                 360                 365

Gly His Met Thr Ile Ser Thr Ala Ala Gln Tyr Arg Asn Ala Val Val
            370                 375                 380

Glu Gln His Leu Pro Gln Arg Gln Pro Glu Pro Val Glu Pro Thr Arg
385                 390                 395                 400

Pro His Val Arg Ala Pro Pro Ala Pro Ser Ala Arg Gly Pro Leu
                405                 410                 415

Arg

<210> SEQ ID NO 14
<211> LENGTH: 416
<212> TYPE: PRT
<213> ORGANISM: Artificial Sequence
<220> FEATURE:
<223> OTHER INFORMATION: gE-2t 417 Mutant #3

<400> SEQUENCE: 14

Met Ala Arg Gly Ala Gly Leu Val Phe Phe Val Gly Val Trp Val Val
1               5                   10                  15

Ser Cys Leu Ala Ala Ala Pro Arg Thr Ser Trp Lys Arg Val Thr Ser
                20                  25                  30

Gly Glu Asp Val Val Leu Leu Pro Ala Pro Ala Gly Pro Glu Glu Arg
            35                  40                  45

Thr Arg Ala His Lys Leu Leu Trp Ala Ala Glu Pro Leu Asp Ala Cys
    50                  55                  60

Gly Pro Leu Arg Pro Ser Trp Val Ala Leu Trp Pro Pro Arg Arg Val
65                  70                  75                  80

Leu Glu Thr Val Val Asp Ala Ala Cys Met Arg Ala Pro Glu Pro Leu
                85                  90                  95

Ala Ile Ala Tyr Ser Pro Pro Phe Pro Ala Gly Asp Glu Gly Leu Tyr
                100                 105                 110

Ser Glu Leu Ala Trp Arg Asp Arg Val Ala Val Val Asn Glu Ser Leu
            115                 120                 125

Val Ile Tyr Gly Ala Leu Glu Thr Asp Ser Gly Leu Tyr Thr Leu Ser
    130                 135                 140

Val Val Gly Leu Ser Asp Glu Ala Arg Gln Val Ala Ser Val Val Leu
145                 150                 155                 160

Val Val Glu Pro Ala Pro Val Pro Thr Pro Thr Pro Asp Asp Tyr Asp
                165                 170                 175

Glu Glu Asp Asp Ala Gly Val Ser Glu Arg Thr Pro Val Ser Val Pro
                180                 185                 190

Pro Pro Thr Pro Pro Arg Arg Pro Pro Val Ala Pro Pro Thr His Pro
            195                 200                 205

Arg Val Ile Pro Glu Val Ser His Val Arg Gly Val Thr Val His Met
    210                 215                 220
```

```
Glu Thr Pro Glu Ala Ile Leu Phe Ala Pro Gly Thr Phe Gly Thr
225                 230                 235                 240

Asn Val Ser Ile His Ala Ile Ala His Asp Asp Gly Pro Tyr Ala Met
                245                 250                 255

Asp Val Val Trp Met Arg Phe Asp Val Pro Ser Ser Cys Ala Glu Met
            260                 265                 270

Arg Ile Tyr Glu Ala Cys Leu Tyr His Pro Gln Leu Pro Glu Cys Leu
        275                 280                 285

Ser Pro Ala Asp Ala Pro Cys Ala Val Ser Ser Trp Ala Tyr Arg Leu
    290                 295                 300

Ala Val Arg Ser Tyr Ala Gly Cys Ser Arg Thr Thr Pro Pro Arg
305                 310                 315                 320

Cys Phe Ala Glu Ala Arg Met Glu Pro Val Pro Gly Leu Ala Trp Leu
                325                 330                 335

Ala Thr Val Asn Leu Glu Phe Gln His Ala Ser Pro Gln His Ala Gly
                340                 345                 350

Leu Tyr Leu Cys Val Val Tyr Val Asp Asp His Ile His Ala Trp Gly
            355                 360                 365

His Met Thr Ile Ser Thr Ala Ala Gln Tyr Arg Asn Ala Val Val Glu
        370                 375                 380

Gln His Leu Pro Gln Arg Gln Pro Glu Pro Val Glu Pro Thr Arg Pro
385                 390                 395                 400

His Val Arg Ala Pro Pro Ala Pro Ser Ala Arg Gly Pro Leu Arg
                405                 410                 415

<210> SEQ ID NO 15
<211> LENGTH: 417
<212> TYPE: PRT
<213> ORGANISM: Artificial Sequence
<220> FEATURE:
<223> OTHER INFORMATION: gE-2t 417 Mutant #4
<220> FEATURE:
<221> NAME/KEY: SIGNAL
<222> LOCATION: (1)..(20)
<220> FEATURE:
<221> NAME/KEY: MISC_FEATURE
<222> LOCATION: (337)..(340)
<223> OTHER INFORMATION: mutated surface-exposed loop

<400> SEQUENCE: 15

Met Ala Arg Gly Ala Gly Leu Val Phe Phe Val Gly Val Trp Val Val
1               5                   10                  15

Ser Cys Leu Ala Ala Ala Pro Arg Thr Ser Trp Lys Arg Val Thr Ser
            20                  25                  30

Gly Glu Asp Val Val Leu Leu Pro Ala Pro Ala Gly Pro Glu Glu Arg
        35                  40                  45

Thr Arg Ala His Lys Leu Leu Trp Ala Ala Glu Pro Leu Asp Ala Cys
    50                  55                  60

Gly Pro Leu Arg Pro Ser Trp Val Ala Leu Trp Pro Pro Arg Arg Val
65                  70                  75                  80

Leu Glu Thr Val Val Asp Ala Ala Cys Met Arg Ala Pro Glu Pro Leu
                85                  90                  95

Ala Ile Ala Tyr Ser Pro Pro Phe Pro Ala Gly Asp Glu Gly Leu Tyr
                100                 105                 110

Ser Glu Leu Ala Trp Arg Asp Arg Val Ala Val Asn Glu Ser Leu
            115                 120                 125

Val Ile Tyr Gly Ala Leu Glu Thr Asp Ser Gly Leu Tyr Thr Leu Ser
```

```
                130             135             140
Val Val Gly Leu Ser Asp Glu Ala Arg Gln Val Ala Ser Val Val Leu
145                 150                 155                 160

Val Val Glu Pro Ala Pro Val Pro Thr Pro Thr Pro Asp Asp Tyr Asp
                165                 170                 175

Glu Glu Asp Asp Ala Gly Val Ser Glu Arg Thr Pro Val Ser Val Pro
                180                 185                 190

Pro Pro Thr Pro Pro Arg Arg Pro Pro Val Ala Pro Pro Thr His Pro
                195                 200                 205

Arg Val Ile Pro Glu Val Ser His Val Arg Gly Val Thr Val His Met
210                 215                 220

Glu Thr Pro Glu Ala Ile Leu Phe Ala Pro Gly Glu Thr Phe Gly Thr
225                 230                 235                 240

Asn Val Ser Ile His Ala Ile Ala His Asp Asp Gly Pro Tyr Ala Met
                245                 250                 255

Asp Val Val Trp Met Arg Phe Asp Val Pro Ser Ser Cys Ala Glu Met
                260                 265                 270

Arg Ile Tyr Glu Ala Cys Leu Tyr His Pro Gln Leu Pro Glu Cys Leu
                275                 280                 285

Ser Pro Ala Asp Ala Pro Cys Ala Val Ser Ser Trp Ala Tyr Arg Leu
                290                 295                 300

Ala Val Arg Ser Tyr Ala Gly Cys Ser Arg Thr Thr Pro Pro Pro Arg
305                 310                 315                 320

Cys Phe Ala Glu Ala Arg Met Glu Pro Val Pro Gly Leu Ala Trp Leu
                325                 330                 335

Ala Ser Gly Val Asn Leu Glu Phe Gln His Ala Ser Pro Gln His Ala
                340                 345                 350

Gly Leu Tyr Leu Cys Val Val Tyr Val Asp Asp His Ile His Ala Trp
                355                 360                 365

Gly His Met Thr Ile Ser Thr Ala Ala Gln Tyr Arg Asn Ala Val Val
                370                 375                 380

Glu Gln His Leu Pro Gln Arg Gln Pro Glu Pro Val Glu Pro Thr Arg
385                 390                 395                 400

Pro His Val Arg Ala Pro Pro Ala Pro Ser Ala Arg Gly Pro Leu
                405                 410                 415

Arg

<210> SEQ ID NO 16
<211> LENGTH: 416
<212> TYPE: PRT
<213> ORGANISM: Artificial Sequence
<220> FEATURE:
<223> OTHER INFORMATION: gE-2t 417 Mutant #5
<220> FEATURE:
<221> NAME/KEY: SIGNAL
<222> LOCATION: (1)..(20)
<220> FEATURE:
<221> NAME/KEY: MISC_FEATURE
<222> LOCATION: (337)..(339)
<223> OTHER INFORMATION: mutated surface-exposed loop

<400> SEQUENCE: 16

Met Ala Arg Gly Ala Gly Leu Val Phe Phe Val Gly Val Trp Val Val
1               5                   10                  15

Ser Cys Leu Ala Ala Ala Pro Arg Thr Ser Trp Lys Arg Val Thr Ser
                20                  25                  30

Gly Glu Asp Val Val Leu Leu Pro Ala Pro Ala Gly Pro Glu Glu Arg
```

```
            35                  40                  45
Thr Arg Ala His Lys Leu Leu Trp Ala Ala Glu Pro Leu Asp Ala Cys
 50                  55                  60
Gly Pro Leu Arg Pro Ser Trp Val Ala Leu Trp Pro Pro Arg Arg Val
 65                  70                  75                  80
Leu Glu Thr Val Val Asp Ala Ala Cys Met Arg Ala Pro Glu Pro Leu
                 85                  90                  95
Ala Ile Ala Tyr Ser Pro Pro Phe Pro Ala Gly Asp Glu Gly Leu Tyr
                100                 105                 110
Ser Glu Leu Ala Trp Arg Asp Arg Val Ala Val Val Asn Glu Ser Leu
            115                 120                 125
Val Ile Tyr Gly Ala Leu Glu Thr Asp Ser Gly Leu Tyr Thr Leu Ser
            130                 135                 140
Val Val Gly Leu Ser Asp Glu Ala Arg Gln Val Ala Ser Val Val Leu
145                 150                 155                 160
Val Val Glu Pro Ala Pro Val Pro Thr Pro Thr Pro Asp Asp Tyr Asp
                165                 170                 175
Glu Glu Asp Asp Ala Gly Val Ser Glu Arg Thr Pro Val Ser Val Pro
                180                 185                 190
Pro Pro Thr Pro Pro Arg Arg Pro Pro Val Ala Pro Pro Thr His Pro
            195                 200                 205
Arg Val Ile Pro Glu Val Ser His Val Arg Gly Val Thr Val His Met
 210                 215                 220
Glu Thr Pro Glu Ala Ile Leu Phe Ala Pro Gly Glu Thr Phe Gly Thr
225                 230                 235                 240
Asn Val Ser Ile His Ala Ile Ala His Asp Asp Gly Pro Tyr Ala Met
                245                 250                 255
Asp Val Val Trp Met Arg Phe Asp Val Pro Ser Ser Cys Ala Glu Met
                260                 265                 270
Arg Ile Tyr Glu Ala Cys Leu Tyr His Pro Gln Leu Pro Glu Cys Leu
            275                 280                 285
Ser Pro Ala Asp Ala Pro Cys Ala Val Ser Ser Trp Ala Tyr Arg Leu
            290                 295                 300
Ala Val Arg Ser Tyr Ala Gly Cys Ser Arg Thr Thr Pro Pro Pro Arg
305                 310                 315                 320
Cys Phe Ala Glu Ala Arg Met Glu Pro Val Pro Gly Leu Ala Trp Leu
                325                 330                 335
Ala Ser Val Asn Leu Glu Phe Gln His Ala Ser Pro Gln His Ala Gly
                340                 345                 350
Leu Tyr Leu Cys Val Val Tyr Val Asp Asp His Ile His Ala Trp Gly
            355                 360                 365
His Met Thr Ile Ser Thr Ala Ala Gln Tyr Arg Asn Ala Val Val Glu
            370                 375                 380
Gln His Leu Pro Gln Arg Gln Pro Glu Pro Val Glu Pro Thr Arg Pro
385                 390                 395                 400
His Val Arg Ala Pro Pro Pro Ala Pro Ser Ala Arg Gly Pro Leu Arg
                405                 410                 415

<210> SEQ ID NO 17
<211> LENGTH: 417
<212> TYPE: PRT
<213> ORGANISM: Artificial Sequence
<220> FEATURE:
<223> OTHER INFORMATION: gE-2t 417 Mutant #6
<220> FEATURE:
```

```
<221> NAME/KEY: SIGNAL
<222> LOCATION: (1)..(20)
<220> FEATURE:
<221> NAME/KEY: MISC_FEATURE
<222> LOCATION: (337)..(340)
<223> OTHER INFORMATION: mutated surface-exposed loop

<400> SEQUENCE: 17
```

| Met | Ala | Arg | Gly | Ala | Gly | Leu | Val | Phe | Phe | Val | Gly | Val | Trp | Val | Val |
|---|---|---|---|---|---|---|---|---|---|---|---|---|---|---|---|
| 1 | | | | 5 | | | | | 10 | | | | | 15 | |

| Ser | Cys | Leu | Ala | Ala | Pro | Arg | Thr | Ser | Trp | Lys | Arg | Val | Thr | Ser |
|---|---|---|---|---|---|---|---|---|---|---|---|---|---|---|
| | | | 20 | | | | | 25 | | | | | 30 | |

| Gly | Glu | Asp | Val | Val | Leu | Leu | Pro | Ala | Pro | Ala | Gly | Pro | Glu | Glu | Arg |
|---|---|---|---|---|---|---|---|---|---|---|---|---|---|---|---|
| | | 35 | | | | | 40 | | | | | 45 | | | |

| Thr | Arg | Ala | His | Lys | Leu | Leu | Trp | Ala | Ala | Glu | Pro | Leu | Asp | Ala | Cys |
|---|---|---|---|---|---|---|---|---|---|---|---|---|---|---|---|
| | 50 | | | | | 55 | | | | | 60 | | | | |

| Gly | Pro | Leu | Arg | Pro | Ser | Trp | Val | Ala | Leu | Trp | Pro | Pro | Arg | Arg | Val |
|---|---|---|---|---|---|---|---|---|---|---|---|---|---|---|---|
| 65 | | | | | 70 | | | | | 75 | | | | | 80 |

| Leu | Glu | Thr | Val | Val | Asp | Ala | Ala | Cys | Met | Arg | Ala | Pro | Glu | Pro | Leu |
|---|---|---|---|---|---|---|---|---|---|---|---|---|---|---|---|
| | | | | 85 | | | | | 90 | | | | | 95 | |

| Ala | Ile | Ala | Tyr | Ser | Pro | Pro | Phe | Pro | Ala | Gly | Asp | Glu | Gly | Leu | Tyr |
|---|---|---|---|---|---|---|---|---|---|---|---|---|---|---|---|
| | | | 100 | | | | | 105 | | | | | 110 | | |

| Ser | Glu | Leu | Ala | Trp | Arg | Asp | Arg | Val | Ala | Val | Val | Asn | Glu | Ser | Leu |
|---|---|---|---|---|---|---|---|---|---|---|---|---|---|---|---|
| | | 115 | | | | | 120 | | | | | 125 | | | |

| Val | Ile | Tyr | Gly | Ala | Leu | Glu | Thr | Asp | Ser | Gly | Leu | Tyr | Thr | Leu | Ser |
|---|---|---|---|---|---|---|---|---|---|---|---|---|---|---|---|
| | 130 | | | | | 135 | | | | | 140 | | | | |

| Val | Val | Gly | Leu | Ser | Asp | Glu | Ala | Arg | Gln | Val | Ala | Ser | Val | Val | Leu |
|---|---|---|---|---|---|---|---|---|---|---|---|---|---|---|---|
| 145 | | | | | 150 | | | | | 155 | | | | | 160 |

| Val | Val | Glu | Pro | Ala | Pro | Val | Pro | Thr | Pro | Thr | Pro | Asp | Asp | Tyr | Asp |
|---|---|---|---|---|---|---|---|---|---|---|---|---|---|---|---|
| | | | | 165 | | | | | 170 | | | | | 175 | |

| Glu | Glu | Asp | Asp | Ala | Gly | Val | Ser | Glu | Arg | Thr | Pro | Val | Ser | Val | Pro |
|---|---|---|---|---|---|---|---|---|---|---|---|---|---|---|---|
| | | | 180 | | | | | 185 | | | | | 190 | | |

| Pro | Pro | Thr | Pro | Pro | Arg | Arg | Pro | Pro | Val | Ala | Pro | Pro | Thr | His | Pro |
|---|---|---|---|---|---|---|---|---|---|---|---|---|---|---|---|
| | | 195 | | | | | 200 | | | | | 205 | | | |

| Arg | Val | Ile | Pro | Glu | Val | Ser | His | Val | Arg | Gly | Val | Thr | Val | His | Met |
|---|---|---|---|---|---|---|---|---|---|---|---|---|---|---|---|
| | 210 | | | | | 215 | | | | | 220 | | | | |

| Glu | Thr | Pro | Glu | Ala | Ile | Leu | Phe | Ala | Pro | Gly | Glu | Thr | Phe | Gly | Thr |
|---|---|---|---|---|---|---|---|---|---|---|---|---|---|---|---|
| 225 | | | | | 230 | | | | | 235 | | | | | 240 |

| Asn | Val | Ser | Ile | His | Ala | Ile | Ala | His | Asp | Asp | Gly | Pro | Tyr | Ala | Met |
|---|---|---|---|---|---|---|---|---|---|---|---|---|---|---|---|
| | | | | 245 | | | | | 250 | | | | | 255 | |

| Asp | Val | Val | Trp | Met | Arg | Phe | Asp | Val | Pro | Ser | Ser | Cys | Ala | Glu | Met |
|---|---|---|---|---|---|---|---|---|---|---|---|---|---|---|---|
| | | | 260 | | | | | 265 | | | | | 270 | | |

| Arg | Ile | Tyr | Glu | Ala | Cys | Leu | Tyr | His | Pro | Gln | Leu | Pro | Glu | Cys | Leu |
|---|---|---|---|---|---|---|---|---|---|---|---|---|---|---|---|
| | 275 | | | | | 280 | | | | | 285 | | | | |

| Ser | Pro | Ala | Asp | Ala | Pro | Cys | Ala | Val | Ser | Ser | Trp | Ala | Tyr | Arg | Leu |
|---|---|---|---|---|---|---|---|---|---|---|---|---|---|---|---|
| | 290 | | | | | 295 | | | | | 300 | | | | |

| Ala | Val | Arg | Ser | Tyr | Ala | Gly | Cys | Ser | Arg | Thr | Thr | Pro | Pro | Arg |
|---|---|---|---|---|---|---|---|---|---|---|---|---|---|---|
| 305 | | | | | 310 | | | | | 315 | | | | 320 |

| Cys | Phe | Ala | Glu | Ala | Arg | Met | Glu | Pro | Val | Pro | Gly | Leu | Ala | Trp | Leu |
|---|---|---|---|---|---|---|---|---|---|---|---|---|---|---|---|
| | | | | 325 | | | | | 330 | | | | | 335 | |

| Ala | Gly | Gly | Val | Asn | Leu | Glu | Phe | Gln | His | Ala | Ser | Pro | Gln | His | Ala |
|---|---|---|---|---|---|---|---|---|---|---|---|---|---|---|---|
| | | | 340 | | | | | 345 | | | | | 350 | | |

| Gly | Leu | Tyr | Leu | Cys | Val | Val | Tyr | Val | Asp | Asp | His | Ile | His | Ala | Trp |
|---|---|---|---|---|---|---|---|---|---|---|---|---|---|---|---|
| | | 355 | | | | | 360 | | | | | 365 | | | |

| Gly | His | Met | Thr | Ile | Ser | Thr | Ala | Ala | Gln | Tyr | Arg | Asn | Ala | Val | Val |
|---|---|---|---|---|---|---|---|---|---|---|---|---|---|---|---|

```
                    370                 375                 380
Glu Gln His Leu Pro Gln Arg Gln Pro Glu Pro Val Glu Pro Thr Arg
385                 390                 395                 400

Pro His Val Arg Ala Pro Pro Ala Pro Ser Ala Arg Gly Pro Leu
                405                 410                 415

Arg

<210> SEQ ID NO 18
<211> LENGTH: 415
<212> TYPE: PRT
<213> ORGANISM: Artificial Sequence
<220> FEATURE:
<223> OTHER INFORMATION: gE-2t 417 Mutant #7
<220> FEATURE:
<221> NAME/KEY: SIGNAL
<222> LOCATION: (1)..(20)
<220> FEATURE:
<221> NAME/KEY: MISC_FEATURE
<222> LOCATION: (337)..(338)
<223> OTHER INFORMATION: mutated surface-exposed loop

<400> SEQUENCE: 18

Met Ala Arg Gly Ala Gly Leu Val Phe Phe Val Gly Val Trp Val Val
1               5                   10                  15

Ser Cys Leu Ala Ala Pro Arg Thr Ser Trp Lys Arg Val Thr Ser
                20                  25                  30

Gly Glu Asp Val Val Leu Leu Pro Ala Pro Ala Gly Pro Glu Glu Arg
                35                  40                  45

Thr Arg Ala His Lys Leu Leu Trp Ala Ala Glu Pro Leu Asp Ala Cys
50                  55                  60

Gly Pro Leu Arg Pro Ser Trp Val Ala Leu Trp Pro Pro Arg Arg Val
65                  70                  75                  80

Leu Glu Thr Val Val Asp Ala Ala Cys Met Arg Ala Pro Glu Pro Leu
                85                  90                  95

Ala Ile Ala Tyr Ser Pro Pro Phe Pro Ala Gly Asp Glu Gly Leu Tyr
                100                 105                 110

Ser Glu Leu Ala Trp Arg Asp Arg Val Ala Val Val Asn Glu Ser Leu
                115                 120                 125

Val Ile Tyr Gly Ala Leu Glu Thr Asp Ser Gly Leu Tyr Thr Leu Ser
                130                 135                 140

Val Val Gly Leu Ser Asp Glu Ala Arg Gln Val Ala Ser Val Val Leu
145                 150                 155                 160

Val Val Glu Pro Ala Pro Val Pro Thr Pro Thr Pro Asp Asp Tyr Asp
                165                 170                 175

Glu Glu Asp Asp Ala Gly Val Ser Glu Arg Thr Pro Val Ser Val Pro
                180                 185                 190

Pro Pro Thr Pro Pro Arg Arg Pro Pro Val Ala Pro Pro Thr His Pro
                195                 200                 205

Arg Val Ile Pro Glu Val Ser His Val Arg Gly Val Thr Val His Met
                210                 215                 220

Glu Thr Pro Glu Ala Ile Leu Phe Ala Pro Gly Glu Thr Phe Gly Thr
225                 230                 235                 240

Asn Val Ser Ile His Ala Ile Ala His Asp Asp Gly Pro Tyr Ala Met
                245                 250                 255

Asp Val Val Trp Met Arg Phe Asp Val Pro Ser Ser Cys Ala Glu Met
                260                 265                 270

Arg Ile Tyr Glu Ala Cys Leu Tyr His Pro Gln Leu Pro Glu Cys Leu
```

```
                    275                 280                 285
Ser Pro Ala Asp Ala Pro Cys Ala Val Ser Ser Trp Ala Tyr Arg Leu
290                 295                 300

Ala Val Arg Ser Tyr Ala Gly Cys Ser Arg Thr Thr Pro Pro Pro Arg
305                 310                 315                 320

Cys Phe Ala Glu Ala Arg Met Glu Pro Val Pro Gly Leu Ala Trp Leu
                325                 330                 335

Ala Val Asn Leu Glu Phe Gln His Ala Ser Pro Gln His Ala Gly Leu
                340                 345                 350

Tyr Leu Cys Val Val Tyr Val Asp Asp His Ile His Ala Trp Gly His
                355                 360                 365

Met Thr Ile Ser Thr Ala Ala Gln Tyr Arg Asn Ala Val Val Glu Gln
                370                 375                 380

His Leu Pro Gln Arg Gln Pro Glu Pro Val Glu Pro Thr Arg Pro His
385                 390                 395                 400

Val Arg Ala Pro Pro Pro Ala Pro Ser Ala Arg Gly Pro Leu Arg
                405                 410                 415

<210> SEQ ID NO 19
<211> LENGTH: 417
<212> TYPE: PRT
<213> ORGANISM: Artificial Sequence
<220> FEATURE:
<223> OTHER INFORMATION: gE-2t 417 Mutant #8
<220> FEATURE:
<221> NAME/KEY: SIGNAL
<222> LOCATION: (1)..(20)
<220> FEATURE:
<221> NAME/KEY: MISC_FEATURE
<222> LOCATION: (337)..(340)
<223> OTHER INFORMATION: mutated surface-exposed loop

<400> SEQUENCE: 19

Met Ala Arg Gly Ala Gly Leu Val Phe Phe Val Gly Val Trp Val Val
1               5                   10                  15

Ser Cys Leu Ala Ala Ala Pro Arg Thr Ser Trp Lys Arg Val Thr Ser
                20                  25                  30

Gly Glu Asp Val Val Leu Leu Pro Ala Pro Ala Gly Pro Glu Glu Arg
                35                  40                  45

Thr Arg Ala His Lys Leu Leu Trp Ala Ala Glu Pro Leu Asp Ala Cys
50                  55                  60

Gly Pro Leu Arg Pro Ser Trp Val Ala Leu Trp Pro Pro Arg Arg Val
65                  70                  75                  80

Leu Glu Thr Val Val Asp Ala Ala Cys Met Arg Ala Pro Glu Pro Leu
                85                  90                  95

Ala Ile Ala Tyr Ser Pro Pro Phe Pro Ala Gly Asp Glu Gly Leu Tyr
                100                 105                 110

Ser Glu Leu Ala Trp Arg Asp Arg Val Ala Val Val Asn Glu Ser Leu
                115                 120                 125

Val Ile Tyr Gly Ala Leu Glu Thr Asp Ser Gly Leu Tyr Thr Leu Ser
                130                 135                 140

Val Val Gly Leu Ser Asp Glu Ala Arg Gln Val Ala Ser Val Val Leu
145                 150                 155                 160

Val Val Glu Pro Ala Pro Val Pro Thr Pro Thr Pro Asp Asp Tyr Asp
                165                 170                 175

Glu Glu Asp Asp Ala Gly Val Ser Glu Arg Thr Pro Val Ser Val Pro
                180                 185                 190
```

Pro Pro Thr Pro Pro Arg Arg Pro Val Ala Pro Thr His Pro
            195                 200                 205

Arg Val Ile Pro Glu Val Ser His Val Arg Gly Val Thr Val His Met
    210                 215                 220

Glu Thr Pro Glu Ala Ile Leu Phe Ala Pro Gly Glu Thr Phe Gly Thr
225                 230                 235                 240

Asn Val Ser Ile His Ala Ile Ala His Asp Asp Gly Pro Tyr Ala Met
                245                 250                 255

Asp Val Val Trp Met Arg Phe Asp Val Pro Ser Ser Cys Ala Glu Met
                260                 265                 270

Arg Ile Tyr Glu Ala Cys Leu Tyr His Pro Gln Leu Pro Glu Cys Leu
                275                 280                 285

Ser Pro Ala Asp Ala Pro Cys Ala Val Ser Ser Trp Ala Tyr Arg Leu
    290                 295                 300

Ala Val Arg Ser Tyr Ala Gly Cys Ser Arg Thr Thr Pro Pro Pro Arg
305                 310                 315                 320

Cys Phe Ala Glu Ala Arg Met Glu Pro Val Pro Gly Leu Ala Trp Leu
                325                 330                 335

Gly Gly Gly Val Asn Leu Glu Phe Gln His Ala Ser Pro Gln His Ala
                340                 345                 350

Gly Leu Tyr Leu Cys Val Val Tyr Val Asp Asp His Ile His Ala Trp
            355                 360                 365

Gly His Met Thr Ile Ser Thr Ala Ala Gln Tyr Arg Asn Ala Val Val
            370                 375                 380

Glu Gln His Leu Pro Gln Arg Gln Pro Glu Pro Val Glu Pro Thr Arg
385                 390                 395                 400

Pro His Val Arg Ala Pro Pro Ala Pro Ser Ala Arg Gly Pro Leu
                405                 410                 415

Arg

<210> SEQ ID NO 20
<211> LENGTH: 417
<212> TYPE: PRT
<213> ORGANISM: Artificial Sequence
<220> FEATURE:
<223> OTHER INFORMATION: gE-2t 417 Mutant #9
<220> FEATURE:
<221> NAME/KEY: SIGNAL
<222> LOCATION: (1)..(20)
<220> FEATURE:
<221> NAME/KEY: MISC_FEATURE
<222> LOCATION: (337)..(340)
<223> OTHER INFORMATION: mutated surface-exposed loop

<400> SEQUENCE: 20

Met Ala Arg Gly Ala Gly Leu Val Phe Phe Val Gly Val Trp Val Val
1               5                   10                  15

Ser Cys Leu Ala Ala Ala Pro Arg Thr Ser Trp Lys Arg Val Thr Ser
                20                  25                  30

Gly Glu Asp Val Val Leu Leu Pro Ala Pro Ala Gly Pro Glu Glu Arg
            35                  40                  45

Thr Arg Ala His Lys Leu Leu Trp Ala Ala Glu Pro Leu Asp Ala Cys
        50                  55                  60

Gly Pro Leu Arg Pro Ser Trp Val Ala Leu Trp Pro Pro Arg Arg Val
65                  70                  75                  80

Leu Glu Thr Val Val Asp Ala Ala Cys Met Arg Ala Pro Glu Pro Leu
                85                  90                  95

```
Ala Ile Ala Tyr Ser Pro Pro Phe Pro Ala Gly Asp Glu Gly Leu Tyr
            100                 105                 110

Ser Glu Leu Ala Trp Arg Asp Arg Val Ala Val Val Asn Glu Ser Leu
        115                 120                 125

Val Ile Tyr Gly Ala Leu Glu Thr Asp Ser Gly Leu Tyr Thr Leu Ser
    130                 135                 140

Val Val Gly Leu Ser Asp Glu Ala Arg Gln Val Ala Ser Val Val Leu
145                 150                 155                 160

Val Val Glu Pro Ala Pro Val Pro Thr Pro Thr Pro Asp Asp Tyr Asp
                165                 170                 175

Glu Glu Asp Asp Ala Gly Val Ser Glu Arg Thr Pro Val Ser Val Pro
            180                 185                 190

Pro Pro Thr Pro Pro Arg Arg Pro Pro Val Ala Pro Pro Thr His Pro
        195                 200                 205

Arg Val Ile Pro Glu Val Ser His Val Arg Gly Val Thr Val His Met
    210                 215                 220

Glu Thr Pro Glu Ala Ile Leu Phe Ala Pro Gly Glu Thr Phe Gly Thr
225                 230                 235                 240

Asn Val Ser Ile His Ala Ile Ala His Asp Asp Gly Pro Tyr Ala Met
                245                 250                 255

Asp Val Val Trp Met Arg Phe Asp Val Pro Ser Ser Cys Ala Glu Met
            260                 265                 270

Arg Ile Tyr Glu Ala Cys Leu Tyr His Pro Gln Leu Pro Glu Cys Leu
        275                 280                 285

Ser Pro Ala Asp Ala Pro Cys Ala Val Ser Ser Trp Ala Tyr Arg Leu
    290                 295                 300

Ala Val Arg Ser Tyr Ala Gly Cys Ser Arg Thr Thr Pro Pro Pro Arg
305                 310                 315                 320

Cys Phe Ala Glu Ala Arg Met Glu Pro Val Pro Gly Leu Ala Trp Leu
                325                 330                 335

Ala Gly Gly Val Asn Leu Glu Phe Gln His Ala Ser Pro Gln His Ala
            340                 345                 350

Gly Leu Tyr Leu Cys Val Val Tyr Val Asp Asp His Ile His Ala Trp
        355                 360                 365

Gly His Met Thr Ile Ser Thr Ala Ala Gln Tyr Arg Asn Ala Val Val
    370                 375                 380

Glu Gln His Leu Pro Gln Arg Gln Pro Glu Pro Val Glu Pro Thr Arg
385                 390                 395                 400

Pro His Val Arg Ala Pro Pro Ala Pro Ser Ala Arg Gly Pro Leu
                405                 410                 415

Arg

<210> SEQ ID NO 21
<211> LENGTH: 417
<212> TYPE: PRT
<213> ORGANISM: Artificial Sequence
<220> FEATURE:
<223> OTHER INFORMATION: gE-2t 417 Mutant #10
<220> FEATURE:
<221> NAME/KEY: SIGNAL
<222> LOCATION: (1)..(20)
<220> FEATURE:
<221> NAME/KEY: MISC_FEATURE
<222> LOCATION: (245)..(245)
<223> OTHER INFORMATION: residue substitution from wild type

<400> SEQUENCE: 21
```

```
Met Ala Arg Gly Ala Gly Leu Val Phe Phe Val Gly Val Trp Val Val
1               5                   10                  15

Ser Cys Leu Ala Ala Pro Arg Thr Ser Trp Lys Arg Val Thr Ser
            20                  25                  30

Gly Glu Asp Val Val Leu Leu Pro Ala Pro Ala Gly Pro Glu Glu Arg
            35                  40                  45

Thr Arg Ala His Lys Leu Leu Trp Ala Ala Glu Pro Leu Asp Ala Cys
            50                  55                  60

Gly Pro Leu Arg Pro Ser Trp Val Ala Leu Trp Pro Pro Arg Arg Val
65                  70                  75                  80

Leu Glu Thr Val Val Asp Ala Ala Cys Met Arg Ala Pro Glu Pro Leu
                85                  90                  95

Ala Ile Ala Tyr Ser Pro Pro Phe Pro Ala Gly Asp Glu Gly Leu Tyr
            100                 105                 110

Ser Glu Leu Ala Trp Arg Asp Arg Val Ala Val Val Asn Glu Ser Leu
            115                 120                 125

Val Ile Tyr Gly Ala Leu Glu Thr Asp Ser Gly Leu Tyr Thr Leu Ser
            130                 135                 140

Val Val Gly Leu Ser Asp Glu Ala Arg Gln Val Ala Ser Val Val Leu
145                 150                 155                 160

Val Val Glu Pro Ala Pro Val Pro Thr Pro Thr Pro Asp Asp Tyr Asp
                165                 170                 175

Glu Glu Asp Asp Ala Gly Val Ser Glu Arg Thr Pro Val Ser Val Pro
            180                 185                 190

Pro Pro Thr Pro Pro Arg Arg Pro Pro Val Ala Pro Thr His Pro
            195                 200                 205

Arg Val Ile Pro Glu Val Ser His Val Arg Gly Val Thr Val His Met
            210                 215                 220

Glu Thr Pro Glu Ala Ile Leu Phe Ala Pro Gly Glu Thr Phe Gly Thr
225                 230                 235                 240

Asn Val Ser Ile Gly Ala Ile Ala His Asp Asp Gly Pro Tyr Ala Met
            245                 250                 255

Asp Val Val Trp Met Arg Phe Asp Val Pro Ser Ser Cys Ala Glu Met
            260                 265                 270

Arg Ile Tyr Glu Ala Cys Leu Tyr His Pro Gln Leu Pro Glu Cys Leu
            275                 280                 285

Ser Pro Ala Asp Ala Pro Cys Ala Val Ser Ser Trp Ala Tyr Arg Leu
            290                 295                 300

Ala Val Arg Ser Tyr Ala Gly Cys Ser Arg Thr Thr Pro Pro Arg
305                 310                 315                 320

Cys Phe Ala Glu Ala Arg Met Glu Pro Val Pro Gly Leu Ala Trp Leu
            325                 330                 335

Ala Ser Thr Val Asn Leu Glu Phe Gln His Ala Ser Pro Gln His Ala
            340                 345                 350

Gly Leu Tyr Leu Cys Val Val Tyr Val Asp Asp His Ile His Ala Trp
            355                 360                 365

Gly His Met Thr Ile Ser Thr Ala Ala Gln Tyr Arg Asn Ala Val Val
            370                 375                 380

Glu Gln His Leu Pro Gln Arg Gln Pro Glu Val Glu Pro Thr Arg
385                 390                 395                 400

Pro His Val Arg Ala Pro Pro Ala Pro Ser Ala Arg Gly Pro Leu
            405                 410                 415

Arg
```

<210> SEQ ID NO 22
<211> LENGTH: 417
<212> TYPE: PRT
<213> ORGANISM: Artificial Sequence
<220> FEATURE:
<223> OTHER INFORMATION: gE-2t 417 Mutant #11
<220> FEATURE:
<221> NAME/KEY: SIGNAL
<222> LOCATION: (1)..(20)
<220> FEATURE:
<221> NAME/KEY: MISC_FEATURE
<222> LOCATION: (317)..(317)
<223> OTHER INFORMATION: residue substitution from wild type

<400> SEQUENCE: 22

```
Met Ala Arg Gly Ala Gly Leu Val Phe Phe Val Gly Trp Val Val
1               5                   10                  15

Ser Cys Leu Ala Ala Pro Arg Thr Ser Trp Lys Arg Val Thr Ser
                20                  25                  30

Gly Glu Asp Val Val Leu Leu Pro Ala Pro Ala Gly Pro Glu Glu Arg
            35                  40                  45

Thr Arg Ala His Lys Leu Leu Trp Ala Ala Glu Pro Leu Asp Ala Cys
50                  55                  60

Gly Pro Leu Arg Pro Ser Trp Val Ala Leu Trp Pro Pro Arg Arg Val
65                  70                  75                  80

Leu Glu Thr Val Val Asp Ala Ala Cys Met Arg Ala Pro Glu Pro Leu
                85                  90                  95

Ala Ile Ala Tyr Ser Pro Pro Phe Pro Ala Gly Asp Glu Gly Leu Tyr
            100                 105                 110

Ser Glu Leu Ala Trp Arg Asp Arg Val Ala Val Val Asn Glu Ser Leu
        115                 120                 125

Val Ile Tyr Gly Ala Leu Glu Thr Asp Ser Gly Leu Tyr Thr Leu Ser
    130                 135                 140

Val Val Gly Leu Ser Asp Glu Ala Arg Gln Val Ala Ser Val Val Leu
145                 150                 155                 160

Val Val Glu Pro Ala Pro Val Pro Thr Pro Thr Pro Asp Asp Tyr Asp
                165                 170                 175

Glu Glu Asp Asp Ala Gly Val Ser Glu Arg Thr Pro Val Ser Val Pro
            180                 185                 190

Pro Pro Thr Pro Pro Arg Arg Pro Pro Val Ala Pro Pro Thr His Pro
        195                 200                 205

Arg Val Ile Pro Glu Val Ser His Val Arg Gly Val Thr Val His Met
210                 215                 220

Glu Thr Pro Glu Ala Ile Leu Phe Ala Pro Gly Glu Thr Phe Gly Thr
225                 230                 235                 240

Asn Val Ser Ile His Ala Ile Ala His Asp Asp Gly Pro Tyr Ala Met
                245                 250                 255

Asp Val Val Trp Met Arg Phe Val Pro Ser Ser Cys Ala Glu Met
            260                 265                 270

Arg Ile Tyr Glu Ala Cys Leu Tyr His Pro Gln Leu Pro Glu Cys Leu
        275                 280                 285

Ser Pro Ala Asp Ala Pro Cys Ala Val Ser Ser Trp Ala Tyr Arg Leu
    290                 295                 300

Ala Val Arg Ser Tyr Ala Gly Cys Ser Arg Thr Thr Gly Pro Pro Arg
305                 310                 315                 320

Cys Phe Ala Glu Ala Arg Met Glu Pro Val Pro Gly Leu Ala Trp Leu
```

-continued

```
                    325                 330                 335
Ala Ser Thr Val Asn Leu Glu Phe Gln His Ala Ser Pro Gln His Ala
                340                 345                 350

Gly Leu Tyr Leu Cys Val Val Tyr Val Asp Asp His Ile His Ala Trp
                355                 360                 365

Gly His Met Thr Ile Ser Thr Ala Ala Gln Tyr Arg Asn Ala Val Val
            370                 375                 380

Glu Gln His Leu Pro Gln Arg Gln Pro Glu Pro Val Glu Pro Thr Arg
385                 390                 395                 400

Pro His Val Arg Ala Pro Pro Ala Pro Ser Ala Arg Gly Pro Leu
                    405                 410                 415

Arg

<210> SEQ ID NO 23
<211> LENGTH: 417
<212> TYPE: PRT
<213> ORGANISM: Artificial Sequence
<220> FEATURE:
<223> OTHER INFORMATION: gE-2t 417 Mutant #12
<220> FEATURE:
<221> NAME/KEY: SIGNAL
<222> LOCATION: (1)..(20)
<220> FEATURE:
<221> NAME/KEY: MISC_FEATURE
<222> LOCATION: (319)..(319)
<223> OTHER INFORMATION: residue substitution from wild type

<400> SEQUENCE: 23

Met Ala Arg Gly Ala Gly Leu Val Phe Phe Val Gly Val Trp Val Val
1               5                   10                  15

Ser Cys Leu Ala Ala Ala Pro Arg Thr Ser Trp Lys Arg Val Thr Ser
                20                  25                  30

Gly Glu Asp Val Val Leu Leu Pro Ala Pro Ala Gly Pro Glu Glu Arg
            35                  40                  45

Thr Arg Ala His Lys Leu Leu Trp Ala Ala Glu Pro Leu Asp Ala Cys
        50                  55                  60

Gly Pro Leu Arg Pro Ser Trp Val Ala Leu Trp Pro Pro Arg Arg Val
65                  70                  75                  80

Leu Glu Thr Val Val Asp Ala Ala Cys Met Arg Ala Pro Glu Pro Leu
                85                  90                  95

Ala Ile Ala Tyr Ser Pro Pro Phe Pro Ala Gly Asp Glu Gly Leu Tyr
                100                 105                 110

Ser Glu Leu Ala Trp Arg Asp Arg Val Ala Val Val Asn Glu Ser Leu
            115                 120                 125

Val Ile Tyr Gly Ala Leu Glu Thr Asp Ser Gly Leu Tyr Thr Leu Ser
        130                 135                 140

Val Val Gly Leu Ser Asp Glu Ala Arg Gln Val Ala Ser Val Val Leu
145                 150                 155                 160

Val Val Glu Pro Ala Pro Val Pro Thr Pro Thr Pro Asp Asp Tyr Asp
                165                 170                 175

Glu Glu Asp Asp Ala Gly Val Ser Glu Arg Thr Pro Val Ser Val Pro
                180                 185                 190

Pro Pro Thr Pro Pro Arg Arg Pro Pro Val Ala Pro Pro Thr His Pro
            195                 200                 205

Arg Val Ile Pro Glu Val Ser His Val Arg Gly Val Thr Val His Met
        210                 215                 220

Glu Thr Pro Glu Ala Ile Leu Phe Ala Pro Gly Glu Thr Phe Gly Thr
```

-continued

```
                225                 230                 235                 240
Asn Val Ser Ile His Ala Ile Ala His Asp Asp Gly Pro Tyr Ala Met
                    245                 250                 255

Asp Val Val Trp Met Arg Phe Asp Val Pro Ser Ser Cys Ala Glu Met
                    260                 265                 270

Arg Ile Tyr Glu Ala Cys Leu Tyr His Pro Gln Leu Pro Glu Cys Leu
                    275                 280                 285

Ser Pro Ala Asp Ala Pro Cys Ala Val Ser Ser Trp Ala Tyr Arg Leu
        290                 295                 300

Ala Val Arg Ser Tyr Ala Gly Cys Ser Arg Thr Thr Pro Pro Gly Arg
305                 310                 315                 320

Cys Phe Ala Glu Ala Arg Met Glu Pro Val Pro Gly Leu Ala Trp Leu
                    325                 330                 335

Ala Ser Thr Val Asn Leu Glu Phe Gln His Ala Ser Pro Gln His Ala
                    340                 345                 350

Gly Leu Tyr Leu Cys Val Val Tyr Val Asp Asp His Ile His Ala Trp
                    355                 360                 365

Gly His Met Thr Ile Ser Thr Ala Ala Gln Tyr Arg Asn Ala Val Val
                    370                 375                 380

Glu Gln His Leu Pro Gln Arg Gln Pro Glu Pro Val Glu Pro Thr Arg
385                 390                 395                 400

Pro His Val Arg Ala Pro Pro Ala Pro Ser Ala Arg Gly Pro Leu
                    405                 410                 415
Arg

<210> SEQ ID NO 24
<211> LENGTH: 417
<212> TYPE: PRT
<213> ORGANISM: Artificial Sequence
<220> FEATURE:
<223> OTHER INFORMATION: gE-2t 417 Mutant #13
<220> FEATURE:
<221> NAME/KEY: SIGNAL
<222> LOCATION: (1)..(20)
<220> FEATURE:
<221> NAME/KEY: MISC_FEATURE
<222> LOCATION: (245)..(245)
<223> OTHER INFORMATION: residue substitution from wild type
<220> FEATURE:
<221> NAME/KEY: MISC_FEATURE
<222> LOCATION: (317)..(317)
<223> OTHER INFORMATION: residue substitution from wild type

<400> SEQUENCE: 24

Met Ala Arg Gly Ala Gly Leu Val Phe Phe Val Gly Val Trp Val Val
1               5                   10                  15

Ser Cys Leu Ala Ala Ala Pro Arg Thr Ser Trp Lys Arg Val Thr Ser
                    20                  25                  30

Gly Glu Asp Val Val Leu Leu Pro Ala Pro Ala Gly Pro Glu Glu Arg
                    35                  40                  45

Thr Arg Ala His Lys Leu Leu Trp Ala Ala Glu Pro Leu Asp Ala Cys
                    50                  55                  60

Gly Pro Leu Arg Pro Ser Trp Val Ala Leu Trp Pro Arg Arg Val
65                  70                  75                  80

Leu Glu Thr Val Val Asp Ala Ala Cys Met Arg Ala Pro Glu Pro Leu
                    85                  90                  95

Ala Ile Ala Tyr Ser Pro Pro Phe Pro Ala Gly Asp Glu Gly Leu Tyr
                    100                 105                 110
```

```
Ser Glu Leu Ala Trp Arg Asp Arg Val Ala Val Val Asn Glu Ser Leu
        115                 120                 125

Val Ile Tyr Gly Ala Leu Glu Thr Asp Ser Gly Leu Tyr Thr Leu Ser
    130                 135                 140

Val Val Gly Leu Ser Asp Glu Ala Arg Gln Val Ala Ser Val Val Leu
145                 150                 155                 160

Val Val Glu Pro Ala Pro Val Pro Thr Pro Thr Pro Asp Asp Tyr Asp
                165                 170                 175

Glu Glu Asp Asp Ala Gly Val Ser Glu Arg Thr Pro Val Ser Val Pro
            180                 185                 190

Pro Pro Thr Pro Pro Arg Arg Pro Pro Val Ala Pro Pro Thr His Pro
        195                 200                 205

Arg Val Ile Pro Glu Val Ser His Val Arg Gly Val Thr Val His Met
    210                 215                 220

Glu Thr Pro Glu Ala Ile Leu Phe Ala Pro Gly Glu Thr Phe Gly Thr
225                 230                 235                 240

Asn Val Ser Ile Gly Ala Ile Ala His Asp Asp Gly Pro Tyr Ala Met
                245                 250                 255

Asp Val Val Trp Met Arg Phe Asp Val Pro Ser Ser Cys Ala Glu Met
            260                 265                 270

Arg Ile Tyr Glu Ala Cys Leu Tyr His Pro Gln Leu Pro Glu Cys Leu
        275                 280                 285

Ser Pro Ala Asp Ala Pro Cys Ala Val Ser Ser Trp Ala Tyr Arg Leu
    290                 295                 300

Ala Val Arg Ser Tyr Ala Gly Cys Ser Arg Thr Thr Gly Pro Pro Arg
305                 310                 315                 320

Cys Phe Ala Glu Ala Arg Met Glu Pro Val Pro Gly Leu Ala Trp Leu
                325                 330                 335

Ala Ser Thr Val Asn Leu Glu Phe Gln His Ala Ser Pro Gln His Ala
            340                 345                 350

Gly Leu Tyr Leu Cys Val Val Tyr Val Asp Asp His Ile His Ala Trp
        355                 360                 365

Gly His Met Thr Ile Ser Thr Ala Ala Gln Tyr Arg Asn Ala Val Val
    370                 375                 380

Glu Gln His Leu Pro Gln Arg Gln Pro Glu Pro Val Glu Pro Thr Arg
385                 390                 395                 400

Pro His Val Arg Ala Pro Pro Pro Ala Pro Ser Ala Arg Gly Pro Leu
                405                 410                 415

Arg
```

<210> SEQ ID NO 25
<211> LENGTH: 417
<212> TYPE: PRT
<213> ORGANISM: Artificial Sequence
<220> FEATURE:
<223> OTHER INFORMATION: gE-2t 417 Mutant #14
<220> FEATURE:
<221> NAME/KEY: SIGNAL
<222> LOCATION: (1)..(20)
<220> FEATURE:
<221> NAME/KEY: MISC_FEATURE
<222> LOCATION: (245)..(245)
<223> OTHER INFORMATION: residue substitution from wild type
<220> FEATURE:
<221> NAME/KEY: MISC_FEATURE
<222> LOCATION: (319)..(319)
<223> OTHER INFORMATION: residue substitution from wild type

<400> SEQUENCE: 25

```
Met Ala Arg Gly Ala Gly Leu Val Phe Phe Val Gly Val Trp Val Val
1               5                   10                  15

Ser Cys Leu Ala Ala Pro Arg Thr Ser Trp Lys Arg Val Thr Ser
            20                  25                  30

Gly Glu Asp Val Val Leu Leu Pro Ala Pro Ala Gly Pro Glu Glu Arg
        35                  40                  45

Thr Arg Ala His Lys Leu Leu Trp Ala Ala Glu Pro Leu Asp Ala Cys
    50                  55                  60

Gly Pro Leu Arg Pro Ser Trp Val Ala Leu Trp Pro Pro Arg Arg Val
65              70                  75                      80

Leu Glu Thr Val Val Asp Ala Ala Cys Met Arg Ala Pro Glu Pro Leu
                85                  90                  95

Ala Ile Ala Tyr Ser Pro Pro Phe Pro Ala Gly Asp Glu Gly Leu Tyr
            100                 105                 110

Ser Glu Leu Ala Trp Arg Asp Arg Val Ala Val Val Asn Glu Ser Leu
        115                 120                 125

Val Ile Tyr Gly Ala Leu Glu Thr Asp Ser Gly Leu Tyr Thr Leu Ser
    130                 135                 140

Val Val Gly Leu Ser Asp Glu Ala Arg Gln Val Ala Ser Val Val Leu
145                 150                 155                 160

Val Val Glu Pro Ala Pro Val Pro Thr Pro Thr Pro Asp Asp Tyr Asp
                165                 170                 175

Glu Glu Asp Asp Ala Gly Val Ser Glu Arg Thr Pro Val Ser Val Pro
            180                 185                 190

Pro Pro Thr Pro Pro Arg Arg Pro Val Ala Pro Pro Thr His Pro
            195                 200                 205

Arg Val Ile Pro Glu Val Ser His Val Arg Gly Val Thr Val His Met
    210                 215                 220

Glu Thr Pro Glu Ala Ile Leu Phe Ala Pro Gly Glu Thr Phe Gly Thr
225                 230                 235                 240

Asn Val Ser Ile Gly Ala Ile Ala His Asp Asp Gly Pro Tyr Ala Met
            245                 250                 255

Asp Val Val Trp Met Arg Phe Asp Val Pro Ser Ser Cys Ala Glu Met
            260                 265                 270

Arg Ile Tyr Glu Ala Cys Leu Tyr His Pro Gln Leu Pro Glu Cys Leu
    275                 280                 285

Ser Pro Ala Asp Ala Pro Cys Ala Val Ser Ser Trp Ala Tyr Arg Leu
    290                 295                 300

Ala Val Arg Ser Tyr Ala Gly Cys Ser Arg Thr Thr Pro Pro Gly Arg
305                 310                 315                 320

Cys Phe Ala Glu Ala Arg Met Glu Pro Val Pro Gly Leu Ala Trp Leu
                325                 330                 335

Ala Ser Thr Val Asn Leu Glu Phe Gln His Ala Ser Pro Gln His Ala
            340                 345                 350

Gly Leu Tyr Leu Cys Val Val Tyr Val Asp Asp His Ile His Ala Trp
            355                 360                 365

Gly His Met Thr Ile Ser Thr Ala Ala Gln Tyr Arg Asn Ala Val Val
    370                 375                 380

Glu Gln His Leu Pro Gln Arg Gln Pro Glu Pro Val Glu Pro Thr Arg
385                 390                 395                 400

Pro His Val Arg Ala Pro Pro Pro Ala Pro Ser Ala Arg Gly Pro Leu
                405                 410                 415
```

Arg

```
<210> SEQ ID NO 26
<211> LENGTH: 417
<212> TYPE: PRT
<213> ORGANISM: Artificial Sequence
<220> FEATURE:
<223> OTHER INFORMATION: gE-2t 417 Mutant #15
<220> FEATURE:
<221> NAME/KEY: SIGNAL
<222> LOCATION: (1)..(20)
<220> FEATURE:
<221> NAME/KEY: MISC_FEATURE
<222> LOCATION: (317)..(317)
<223> OTHER INFORMATION: residue substitution from wild type
<220> FEATURE:
<221> NAME/KEY: MISC_FEATURE
<222> LOCATION: (319)..(319)
<223> OTHER INFORMATION: residue substitution from wild type

<400> SEQUENCE: 26

Met Ala Arg Gly Ala Gly Leu Val Phe Phe Val Gly Val Trp Val Val
1               5                   10                  15

Ser Cys Leu Ala Ala Ala Pro Arg Thr Ser Trp Lys Arg Val Thr Ser
                20                  25                  30

Gly Glu Asp Val Val Leu Leu Pro Ala Pro Ala Gly Pro Glu Glu Arg
            35                  40                  45

Thr Arg Ala His Lys Leu Leu Trp Ala Ala Glu Pro Leu Asp Ala Cys
50                  55                  60

Gly Pro Leu Arg Pro Ser Trp Val Ala Leu Trp Pro Pro Arg Arg Val
65                  70                  75                  80

Leu Glu Thr Val Val Asp Ala Ala Cys Met Arg Ala Pro Glu Pro Leu
                85                  90                  95

Ala Ile Ala Tyr Ser Pro Pro Phe Pro Ala Gly Asp Glu Gly Leu Tyr
            100                 105                 110

Ser Glu Leu Ala Trp Arg Asp Arg Val Ala Val Val Asn Glu Ser Leu
        115                 120                 125

Val Ile Tyr Gly Ala Leu Glu Thr Asp Ser Gly Leu Tyr Thr Leu Ser
130                 135                 140

Val Val Gly Leu Ser Asp Glu Ala Arg Gln Val Ala Ser Val Val Leu
145                 150                 155                 160

Val Val Glu Pro Ala Pro Val Pro Thr Pro Thr Pro Asp Asp Tyr Asp
                165                 170                 175

Glu Glu Asp Asp Ala Gly Val Ser Gly Arg Thr Pro Val Ser Val Pro
            180                 185                 190

Pro Pro Thr Pro Pro Arg Arg Pro Pro Val Ala Pro Pro Thr His Pro
        195                 200                 205

Arg Val Ile Pro Glu Val Ser His Val Arg Gly Val Thr Val His Met
210                 215                 220

Glu Thr Pro Glu Ala Ile Leu Phe Ala Pro Gly Glu Thr Phe Gly Thr
225                 230                 235                 240

Asn Val Ser Ile His Ala Ile Ala His Asp Asp Gly Pro Tyr Ala Met
                245                 250                 255

Asp Val Val Trp Met Arg Phe Val Pro Ser Ser Cys Ala Glu Met
            260                 265                 270

Arg Ile Tyr Glu Ala Cys Leu Tyr His Pro Gln Leu Pro Glu Cys Leu
        275                 280                 285

Ser Pro Ala Asp Ala Pro Cys Ala Val Ser Ser Trp Ala Tyr Arg Leu
290                 295                 300
```

```
Ala Val Arg Ser Tyr Ala Gly Cys Ser Arg Thr Thr Gly Pro Gly Arg
305                 310                 315                 320

Cys Phe Ala Glu Ala Arg Met Glu Pro Val Pro Gly Leu Ala Trp Leu
                325                 330                 335

Ala Ser Thr Val Asn Leu Glu Phe Gln His Ala Ser Pro Gln His Ala
            340                 345                 350

Gly Leu Tyr Leu Cys Val Val Tyr Val Asp Asp His Ile His Ala Trp
        355                 360                 365

Gly His Met Thr Ile Ser Thr Ala Ala Gln Tyr Arg Asn Ala Val Val
    370                 375                 380

Glu Gln His Leu Pro Gln Arg Gln Pro Glu Pro Val Gly Pro Thr Arg
385                 390                 395                 400

Pro His Val Arg Ala Pro Pro Ala Pro Ser Ala Arg Gly Pro Leu
                405                 410                 415

Arg

<210> SEQ ID NO 27
<211> LENGTH: 417
<212> TYPE: PRT
<213> ORGANISM: Artificial Sequence
<220> FEATURE:
<223> OTHER INFORMATION: gE-2t 417 Mutant #16
<220> FEATURE:
<221> NAME/KEY: SIGNAL
<222> LOCATION: (1)..(20)
<220> FEATURE:
<221> NAME/KEY: MISC_FEATURE
<222> LOCATION: (245)..(245)
<223> OTHER INFORMATION: residue substitution from wild type
<220> FEATURE:
<221> NAME/KEY: MISC_FEATURE
<222> LOCATION: (317)..(317)
<223> OTHER INFORMATION: residue substitution from wild type
<220> FEATURE:
<221> NAME/KEY: MISC_FEATURE
<222> LOCATION: (319)..(319)
<223> OTHER INFORMATION: residue mutated from wild type

<400> SEQUENCE: 27

Met Ala Arg Gly Ala Gly Leu Val Phe Phe Val Gly Val Trp Val Val
1               5                   10                  15

Ser Cys Leu Ala Ala Ala Pro Arg Thr Ser Trp Lys Arg Val Thr Ser
            20                  25                  30

Gly Glu Asp Val Val Leu Leu Pro Ala Pro Gly Pro Glu Glu Arg
        35                  40                  45

Thr Arg Ala His Lys Leu Leu Trp Ala Ala Glu Pro Leu Asp Ala Cys
    50                  55                  60

Gly Pro Leu Arg Pro Ser Trp Val Ala Leu Trp Pro Pro Arg Arg Val
65                  70                  75                  80

Leu Glu Thr Val Val Asp Ala Ala Cys Met Arg Ala Pro Glu Pro Leu
                85                  90                  95

Ala Ile Ala Tyr Ser Pro Pro Phe Pro Ala Gly Asp Glu Gly Leu Tyr
            100                 105                 110

Ser Glu Leu Ala Trp Arg Asp Arg Val Ala Val Val Asn Glu Ser Leu
        115                 120                 125

Val Ile Tyr Gly Ala Leu Glu Thr Asp Ser Gly Leu Tyr Thr Leu Ser
    130                 135                 140

Val Val Gly Leu Ser Asp Glu Ala Arg Gln Val Ala Ser Val Val Leu
145                 150                 155                 160
```

```
Val Val Glu Pro Ala Pro Val Pro Thr Pro Thr Pro Asp Asp Tyr Asp
                165                 170                 175

Glu Glu Asp Asp Ala Gly Val Ser Glu Arg Thr Pro Val Ser Val Pro
            180                 185                 190

Pro Pro Thr Pro Pro Arg Arg Pro Pro Val Ala Pro Thr His Pro
        195                 200                 205

Arg Val Ile Pro Glu Val Ser His Val Arg Gly Val Thr Val His Met
    210                 215                 220

Glu Thr Pro Glu Ala Ile Leu Phe Ala Pro Gly Glu Thr Phe Gly Thr
225                 230                 235                 240

Asn Val Ser Ile Gly Ala Ile Ala His Asp Asp Gly Pro Tyr Ala Met
                245                 250                 255

Asp Val Val Trp Met Arg Phe Asp Val Pro Ser Ser Cys Ala Glu Met
            260                 265                 270

Arg Ile Tyr Glu Ala Cys Leu Tyr His Pro Gln Leu Pro Glu Cys Leu
        275                 280                 285

Ser Pro Ala Asp Ala Pro Cys Ala Val Ser Ser Trp Ala Tyr Arg Leu
    290                 295                 300

Ala Val Arg Ser Tyr Ala Gly Cys Ser Arg Thr Thr Gly Pro Gly Arg
305                 310                 315                 320

Cys Phe Ala Glu Ala Arg Met Glu Pro Val Pro Gly Leu Ala Trp Leu
                325                 330                 335

Ala Ser Thr Val Asn Leu Glu Phe Gln His Ala Ser Pro Gln His Ala
            340                 345                 350

Gly Leu Tyr Leu Cys Val Val Tyr Val Asp Asp His Ile His Ala Trp
        355                 360                 365

Gly His Met Thr Ile Ser Thr Ala Ala Gln Tyr Arg Asn Ala Val Val
    370                 375                 380

Glu Gln His Leu Pro Gln Arg Gln Pro Glu Pro Val Glu Pro Thr Arg
385                 390                 395                 400

Pro His Val Arg Ala Pro Pro Ala Pro Ser Ala Arg Gly Pro Leu
                405                 410                 415

Arg

<210> SEQ ID NO 28
<211> LENGTH: 550
<212> TYPE: PRT
<213> ORGANISM: Artificial Sequence
<220> FEATURE:
<223> OTHER INFORMATION: gE-1 strain KOS
<220> FEATURE:
<221> NAME/KEY: SIGNAL
<222> LOCATION: (1)..(20)

<400> SEQUENCE: 28

Met Asp Arg Gly Ala Val Val Gly Phe Leu Leu Gly Val Cys Val Val
1               5                   10                  15

Ser Cys Leu Ala Gly Thr Pro Lys Thr Ser Trp Arg Arg Val Ser Val
                20                  25                  30

Gly Glu Asp Val Ser Leu Leu Pro Ala Pro Gly Pro Thr Gly Arg Gly
            35                  40                  45

Pro Thr Gln Lys Leu Leu Trp Ala Val Glu Pro Leu Asp Gly Cys Gly
        50                  55                  60

Pro Leu His Pro Ser Trp Val Ser Leu Met Pro Pro Lys Gln Val Pro
65                  70                  75                  80

Glu Thr Val Val Asp Ala Ala Cys Met Arg Ala Pro Val Pro Leu Ala
```

```
                85                  90                  95
Met Ala Tyr Ala Pro Ala Pro Ser Ala Thr Gly Gly Leu Arg Thr
            100                 105                 110

Asp Phe Val Trp Gln Glu Arg Ala Ala Val Val Asn Arg Ser Leu Val
            115                 120                 125

Ile His Gly Val Arg Glu Thr Asp Ser Gly Leu Tyr Thr Leu Ser Val
    130                 135                 140

Gly Asp Ile Lys Asp Pro Ala Arg Gln Val Ala Ser Val Val Leu Val
145                 150                 155                 160

Val Gln Pro Ala Pro Val Pro Thr Pro Pro Thr Pro Ala Asp Tyr
                165                 170                 175

Asp Glu Asp Asp Asn Asp Glu Gly Glu Asp Glu Ser Leu Ala Gly Thr
                180                 185                 190

Pro Ala Ser Gly Thr Pro Arg Leu Pro Pro Pro Ala Pro Pro Arg
            195                 200                 205

Ser Trp Pro Ser Ala Pro Glu Val Ser His Val Arg Gly Val Thr Val
    210                 215                 220

Arg Met Glu Thr Pro Glu Ala Ile Leu Phe Ser Pro Gly Glu Thr Phe
225                 230                 235                 240

Ser Thr Asn Val Ser Ile His Ala Ile Ala His Asp Gln Thr Tyr
                245                 250                 255

Ser Met Asp Val Val Trp Leu Arg Phe Asp Val Pro Thr Ser Cys Ala
            260                 265                 270

Glu Met Arg Ile Tyr Glu Ser Cys Leu Tyr His Pro Gln Leu Pro Glu
        275                 280                 285

Cys Leu Ser Pro Ala Asp Ala Pro Cys Ala Ala Ser Thr Trp Thr Ser
    290                 295                 300

Arg Leu Ala Val Arg Ser Tyr Ala Gly Cys Ser Arg Thr Asn Pro Pro
305                 310                 315                 320

Pro Arg Cys Ser Ala Glu Ala His Met Glu Pro Val Pro Gly Leu Ala
            325                 330                 335

Trp Gln Ala Ala Ser Val Asn Leu Glu Phe Arg Asp Ala Ser Pro Gln
            340                 345                 350

His Ser Gly Leu Tyr Leu Cys Val Val Tyr Val Asn Asp His Ile His
        355                 360                 365

Ala Trp Gly His Ile Thr Ile Ser Thr Ala Ala Gln Tyr Arg Asn Ala
    370                 375                 380

Val Val Glu Gln Pro Leu Pro Gln Arg Gly Ala Asp Leu Ala Glu Pro
385                 390                 395                 400

Thr His Pro His Val Gly Ala Pro Pro His Ala Pro Pro Thr His Gly
                405                 410                 415

Ala Leu Arg Leu Gly Ala Val Met Gly Ala Ala Leu Leu Leu Ser Ala
            420                 425                 430

Leu Gly Leu Ser Val Trp Ala Cys Met Thr Cys Trp Arg Arg Ala
            435                 440                 445

Trp Arg Ala Val Lys Ser Arg Ala Ser Gly Lys Gly Pro Thr Tyr Ile
    450                 455                 460

Arg Val Ala Asp Ser Glu Leu Tyr Ala Asp Trp Ser Ser Asp Ser Glu
465                 470                 475                 480

Gly Glu Arg Asp Gln Val Pro Trp Leu Ala Pro Pro Glu Arg Pro Asp
                485                 490                 495

Ser Pro Ser Thr Asn Gly Ser Gly Phe Glu Ile Leu Ser Pro Thr Ala
            500                 505                 510
```

Pro Ser Val Tyr Pro Arg Ser Asp Gly His Gln Ser Arg Arg Gln Leu
        515                 520                 525

Thr Thr Phe Gly Ser Gly Arg Pro Asp Arg Arg Tyr Ser Gln Ala Ser
    530                 535                 540

Asp Ser Ser Val Phe Trp
545                 550

<210> SEQ ID NO 29
<211> LENGTH: 1263
<212> TYPE: DNA
<213> ORGANISM: Artificial Sequence
<220> FEATURE:
<223> OTHER INFORMATION: gE-2t 417 Mutant #1
<220> FEATURE:
<221> NAME/KEY: sig_peptide
<222> LOCATION: (1)..(60)
<220> FEATURE:
<221> NAME/KEY: misc_feature
<222> LOCATION: (1009)..(1032)
<223> OTHER INFORMATION: encodes mutated surface-exposed loop

<400> SEQUENCE: 29
atggctcgcg gggccgggtt ggtgttttt gttggagttt gggtcgtatc gtgcctggcg      60
gcagcaccca gaacgtcctg gaaacgggta acctcgggcg aggacgtggt gttgcttccg     120
gcgcccgcgg ggccggagga acgcacccgg gcccacaaac tactgtgggc cgcggaaccc     180
ctggatgcct gcggtcccct cgcccgtcg tgggtggcgc tgtggccccc ccgacgggtg      240
ctcgagacgg tcgtggatgc ggcgtgcatg cgcgccccgg aaccgctcgc catagcatac     300
agtccccgt tccccgcggg cgacgaggga ctgtattcgg agttggcgtg gcgcgatcgc      360
gtagccgtgg tcaacgagag tctggtcatc tacggggccc tggagacgga cagcggtctg    420
tacaccctgt ccgtggtcgg cctaagcgac gaggcgcgcc aagtggcgtc ggtggttctg    480
gtcgtggagc ccgcccctgt gccgaccccg accccgacg actacgacga agaagacgac     540
gcgggcgtga gcgaacgcac gccggtcagc gttccccccc caaccccccc ccgtcgtccc    600
cccgtcgccc cccgacgca ccctcgtgtt atccccgagg tgtcccacgt gcgcggggta     660
acggtccata tggagacccc ggaggccatt ctgtttgccc ccggggagac gtttgggacg    720
aacgtctcca tccacgccat gcccacgac gacggtccgt acgccatgga cgtcgtctgg     780
atgcggtttg acgtgccgtc ctcgtgcgcc gagatgcgga tctacgaagc ttgtctgtat    840
cacccgcagc ttccagagtg tctatctccg gccgacgcgc cgtgcgccgt aagttcctgg    900
gcgtaccgcc tggcggtccg cagctacgcc ggctgttcca ggactacgcc ccgccgcga    960
tgtttgccg aggctcgcat ggaaccggtc ccggggttgg cgtggctggc cgcccgcgcc    1020
gcctccaccg tcaatctgga attccagcac gcctccccc agcacgccgg cctctacctg    1080
tgcgtggtgt acgtggacga tcatatccac gcctggggcc acatgaccat cagcaccgcg    1140
gcgcagtacc ggaacgcggt ggtggaacag cacctccccc agcgccagcc cgagcccgtc    1200
gagcccaccc gcccgcacgt gagagccccc cctcccgcgc cctccgcgcg cggccgctg    1260
cgc                                                                  1263

<210> SEQ ID NO 30
<211> LENGTH: 1251
<212> TYPE: DNA
<213> ORGANISM: Artificial Sequence
<220> FEATURE:
<223> OTHER INFORMATION: gE-2t 417 Mutant #2
<220> FEATURE:

<220> FEATURE:
<221> NAME/KEY: sig_peptide
<222> LOCATION: (1)..(60)
<220> FEATURE:
<221> NAME/KEY: misc_feature
<222> LOCATION: (1009)..(1020)
<223> OTHER INFORMATION: encodes mutated surface-exposed loop

<400> SEQUENCE: 30

```
atggctcgcg gggccgggtt ggtgtttttt gttggagttt gggtcgtatc gtgcctggcg      60
gcagcaccca gaacgtcctg gaaacgggta acctcgggcg aggacgtggt gttgcttccg     120
gcgcccgcgg ggccggagga acgcacccgg gcccacaaac tactgtgggc gcggaaccc     180
ctggatgcct gcggtcccct gcgcccgtcg tgggtggcgc tgtggccccc ccgacgggtg     240
ctcgagacgg tcgtggatgc ggcgtgcatg cgcgccccgg aaccgctcgc catagcatac     300
agtccccgt tccccgcggg cgacgaggga ctgtattcgg agttggcgtg gcgcgatcgc     360
gtagccgtgg tcaacgagag tctggtcatc tacggggccc tggagacgga cagcggtctg     420
tacaccctgt ccgtggtcgg cctaagcgac gaggcgcgcc aagtggcgtc ggtggttctg     480
gtcgtggagc ccgcccctgt gccgaccccg accccgacg actacgacga agaagacgac     540
gcgggcgtga cgaacgcac gccggtcagc gttccccccc caaccccccc ccgtcgtccc     600
cccgtcgccc ccccgacgca ccctcgtgtt atccccgagg tgtcccacgt gcgcggggta     660
acggtccata tggagacccc ggaggccatt ctgtttgccc ccggggagac gtttgggacg     720
aacgtctcca tccacgccat tgcccacgac gacggtccgt acgccatgga cgtcgtctgg     780
atgcggttg acgtgccgtc ctcgtgcgcc gagatgcgga tctacgaagc ttgtctgtat     840
cacccgcagc ttccagagtg tctatctccg gccgacgcgc cgtgcgccgt aagttcctgg     900
gcgtaccgcc tggcggtccg cagctacgcc ggctgttcca ggactacgcc ccgccgcga     960
tgttttgccg aggctcgcat ggaaccggtc ccggggttgg cgtggctggc cggcaccgtc    1020
aatctggaat tccagcacgc ctccccccag cacgccggcc tctacctgtg cgtggtgtac    1080
gtggacgatc atatccacgc ctggggccac atgaccatca gcaccgcggc gcagtaccgg    1140
aacgcggtgg tggaacagca cctcccccag cgccagcccg agcccgtcga gcccacccgc    1200
ccgcacgtga gagcccccccc tcccgcgccc tccgcgcgcg gcccgctgcg c            1251
```

<210> SEQ ID NO 31
<211> LENGTH: 1248
<212> TYPE: DNA
<213> ORGANISM: Artificial Sequence
<220> FEATURE:
<223> OTHER INFORMATION: gE-2t 417 Mutant #3
<220> FEATURE:
<221> NAME/KEY: sig_peptide
<222> LOCATION: (1)..(60)
<220> FEATURE:
<221> NAME/KEY: misc_feature
<222> LOCATION: (1009)..(1017)
<223> OTHER INFORMATION: encodes mutated surface-exposed loop

<400> SEQUENCE: 31

```
atggctcgcg gggccgggtt ggtgtttttt gttggagttt gggtcgtatc gtgcctggcg      60
gcagcaccca gaacgtcctg gaaacgggta acctcgggcg aggacgtggt gttgcttccg     120
gcgcccgcgg ggccggagga acgcacccgg gcccacaaac tactgtgggc gcggaaccc     180
ctggatgcct gcggtcccct gcgcccgtcg tgggtggcgc tgtggccccc ccgacgggtg     240
ctcgagacgg tcgtggatgc ggcgtgcatg cgcgccccgg aaccgctcgc catagcatac     300
agtccccgt tccccgcggg cgacgaggga ctgtattcgg agttggcgtg gcgcgatcgc     360
```

```
gtagccgtgg tcaacgagag tctggtcatc tacggggccc tggagacgga cagcggtctg        420
tacaccctgt ccgtggtcgg cctaagcgac gaggcgcgcc aagtggcgtc ggtggttctg        480
gtcgtggagc ccgcccctgt gccgaccccg accccgacg actacgacga agaagacgac         540
gcgggcgtga gcgaacgcac gccggtcagc gttcccccc caacccccc ccgtcgtccc          600 cccgtcgccc ccccgacgca ccctcgtgtt atccccgagg tgtcccacgt gcgcggggta        660
acggtccata tggagacccc ggaggccatt ctgtttgccc ccggggagac gtttgggacg        720
aacgtctcca tccacgccat tgcccacgac gacggtccgt acgccatgga cgtcgtctgg        780
atgcggtttg acgtgccgtc ctcgtgcgcc gagatgcgga tctacgaagc ttgtctgtat        840
cacccgcagc ttccagagtg tctatctccg gccgacgcgc cgtgcgccgt aagttcctgg        900
gcgtaccgcc tggcggtccg cagctacgcc ggctgttcca ggactacgcc cccgccgcga        960
tgttttgccg aggctcgcat ggaaccggtc ccggggttgg cgtggctggc caccgtcaat       1020
ctggaattcc agcacgcctc ccccagcac gccggcctct acctgtgcgt ggtgtacgtg        1080
gacgatcata tccacgcctg gggccacatg accatcagca ccgcggcgca gtaccggaac       1140
gcggtggtgg aacagcacct ccccagcgc cagcccgagc ccgtcgagcc cacccgcccg        1200
cacgtgagag ccccccctcc cgcgccctcc gcgcgcggcc cgctgcgc                    1248
```

<210> SEQ ID NO 32
<211> LENGTH: 1251
<212> TYPE: DNA
<213> ORGANISM: Artificial Sequence
<220> FEATURE:
<223> OTHER INFORMATION: gE-2t 417 Mutant #4
<220> FEATURE:
<221> NAME/KEY: sig_peptide
<222> LOCATION: (1)..(60)
<220> FEATURE:
<221> NAME/KEY: misc_feature
<222> LOCATION: (1009)..(1020)
<223> OTHER INFORMATION: encodes mutated surface-exposed loop

<400> SEQUENCE: 32

```
atggctcgcg gggccgggtt ggtgtttttt gttggagttt gggtcgtatc gtgcctggcg         60
gcagcaccca gaacgtcctg gaaacgggta acctcgggcg aggacgtggt gttgcttccg        120
gcgcccgcgg ggccggagga acgcacccgg gcccacaaac tactgtgggc cgcggaaccc        180
ctggatgcct gcggtcccct cgcccgtcg tgggtggcgc tgtggccccc ccgacgggtg        240
ctcgagacgg tcgtggatgc ggcgtgcatg cgcgccccgg aaccgctcgc catagcatac        300 agtccccgt tccccgcggg cgacgaggga ctgtattcgg agttggcgtg gcgcgatcgc         360
gtagccgtgg tcaacgagag tctggtcatc tacggggccc tggagacgga cagcggtctg        420
tacaccctgt ccgtggtcgg cctaagcgac gaggcgcgcc aagtggcgtc ggtggttctg        480
gtcgtggagc ccgcccctgt gccgaccccg accccgacg actacgacga agaagacgac         540
gcgggcgtga gcgaacgcac gccggtcagc gttcccccc caacccccc ccgtcgtccc          600 cccgtcgccc ccccgacgca ccctcgtgtt atccccgagg tgtcccacgt gcgcggggta        660
acggtccata tggagacccc ggaggccatt ctgtttgccc ccggggagac gtttgggacg        720
aacgtctcca tccacgccat tgcccacgac gacggtccgt acgccatgga cgtcgtctgg        780
atgcggtttg acgtgccgtc ctcgtgcgcc gagatgcgga tctacgaagc ttgtctgtat        840
cacccgcagc ttccagagtg tctatctccg gccgacgcgc cgtgcgccgt aagttcctgg        900
gcgtaccgcc tggcggtccg cagctacgcc ggctgttcca ggactacgcc cccgccgcga        960
```

```
tgttttgccg aggctcgcat ggaaccggtc ccggggttgg cgtggctggc ctccggcgtc    1020
aatctggaat tccagcacgc ctcccccag cacgccggcc tctacctgtg cgtggtgtac    1080
gtggacgatc atatccacgc tggggccac atgaccatca gcaccgcggc gcagtaccgg    1140
aacgcggtgg tggaacagca cctccccag cgccagcccg agcccgtcga gcccacccgc    1200
ccgcacgtga gaccccccc tcccgcgccc tccgcgcgcg cccgctgcg c              1251
```

<210> SEQ ID NO 33
<211> LENGTH: 1248
<212> TYPE: DNA
<213> ORGANISM: Artificial Sequence
<220> FEATURE:
<223> OTHER INFORMATION: gE-2t 417 Mutant #5
<220> FEATURE:
<221> NAME/KEY: sig_peptide
<222> LOCATION: (1)..(60)
<220> FEATURE:
<221> NAME/KEY: misc_feature
<222> LOCATION: (1009)..(1017)
<223> OTHER INFORMATION: encodes mutated surface-exposed loop

<400> SEQUENCE: 33

```
atggctcgcg gggccgggtt ggtgtttttt gttggagttt gggtcgtatc gtgcctggcg      60
gcagcaccca gaacgtcctg gaaacgggta acctcgggcg aggacgtggt gttgcttccg     120
gcgcccgcgg ggccggagga acgcacccgg gcccacaaac tactgtgggc gcggaaccc     180 ctggatgcct gcggtcccct gcgcccgtcg tgggtggcgc tgtggccccc ccgacgggtg    240
ctcgagacgt tcgtggatgc ggcgtgcatg cgcgccccgg aaccgctcgc catagcatac    300 agtccccgt tccccgcggg cgacgaggga ctgtattcgg agttggcgtg gcgcgatcgc    360
gtagccgtgg tcaacgagag tctggtcatc tacggggccc tggagacgga cagcggtctg    420
tacaccctgt ccgtggtcgg cctaagcgac gaggcgcgcc aagtggcgtc ggtggttctg    480
gtcgtggagc ccgcccctgt gccgaccccg accccgacg actacgacga agaagacgac    540
gcgggcgtga gcgaacgcac gccggtcagc gttcccccc caacccccc ccgtcgtccc    600 cccgtcgccc ccccgacgca ccctcgtgtt atccccgagg tgtcccacgt gcgcggggta    660
acggtccata tggagacccc ggaggccatt ctgtttgccc ccggggagac gtttgggacg    720
aacgtctcca tccacgccat tgcccacgac gacggtccgt acgccatgga cgtcgtctgg    780
atgcggtttg acgtgccgtc ctcgtgcgcc gagatgcgga tctacgaagc ttgtctgtat    840
cacccgcagc ttccagagtg tctatctccg gccgacgcgc cgtgcgccgt aagttcctgg    900
gcgtaccgcc tggcggtccg cagctacgcc ggctgttcca ggactacgcc ccgccgcga    960 tgttttgccg aggctcgcat ggaaccggtc ccggggttgg cgtggctggc ctccgtcaat   1020
ctggaattcc agcacgcctc ccccagcac gccggcctct acctgtgcgt ggtgtacgtg   1080
gacgatcata tccacgcctg ggccacatg accatcagca ccgcggcgca gtaccggaac   1140
gcggtggtgg aacagcacct ccccagcgc cagcccgagc cgtcgagcc cacccgcccg   1200 cacgtgagag cccccctcc cgcgccctcc gcgcgcggcc cgctgcgc                 1248
```

<210> SEQ ID NO 34
<211> LENGTH: 1251
<212> TYPE: DNA
<213> ORGANISM: Artificial Sequence
<220> FEATURE:
<223> OTHER INFORMATION: gE-2t 417 Mutant #6
<220> FEATURE:
<221> NAME/KEY: sig_peptide

```
<222> LOCATION: (1)..(60)
<220> FEATURE:
<221> NAME/KEY: misc_feature
<222> LOCATION: (1009)..(1020)
<223> OTHER INFORMATION: encodes mutated surface-exposed loop

<400> SEQUENCE: 34
atggctcgcg gggccgggtt ggtgtttttt gttggagttt gggtcgtatc gtgcctggcg      60
gcagcaccca gaacgtcctg gaaacgggta acctcgggcg aggacgtggt gttgcttccg     120
gcgcccgcgg ggccggagga acgcacccgg gcccacaaac tactgtgggc gcggaaccc     180 ctggatgcct gcggtcccct gcgcccgtcg tgggtggcgc tgtggccccc ccgacgggtg    240
ctcgagacgg tcgtggatgc ggcgtgcatg cgcgccccgg aaccgctcgc catagcatac    300 agtccccccgt tccccgcggg cgacgaggga ctgtattcgg agttggcgtg gcgcgatcgc   360
gtagccgtgg tcaacgagag tctggtcatc tacggggccc tggagacgga cagcggtctg   420
tacaccctgt ccgtggtcgg cctaagcgac gaggcgcgcc aagtggcgtc ggtggttctg    480
gtcgtggagc ccgcccctgt gccgaccccg acccccgacg actacgacga agaagacgac    540
gcgggcgtga gcgaacgcac gccggtcagc gttccccccc caaccccccc ccgtcgtccc    600
cccgtcgccc ccccgacgca ccctcgtgtt atccccgagg tgtcccacgt gcgcggggta    660
acggtccata tggagacccc ggaggccatt ctgtttgccc ccggggagac gtttgggacg    720
aacgtctcca tccacgccat tgcccacgac gacggtccgt acgccatgga cgtcgtctgg    780
atgcggtttg acgtgccgtc ctcgtgcgcc gagatgcgga tctacgaagc ttgtctgtat    840
cacccgcagc ttccagagtg tctatctccg gccgacgcgc cgtgcgccgt aagttcctgg    900
gcgtaccgcc tggcggtccg cagctacgcc ggctgttcca ggactacgcc cccgccgcga    960
tgttttgccg aggctcgcat ggaaccggtc ccggggttgg cgtggctggc cggcggcgtc   1020
aatctggaat tccagcacgc ctccccccag cacgccggcc tctacctgtg cgtggtgtac   1080
gtggacgatc atatccacgc ctggggccac atgaccatca gcaccgcggc gcagtaccgg   1140
aacgcggtgg tggaacagca cctcccccag cgccagcccg agcccgtcga gcccacccgc   1200
ccgcacgtga gagccccccc tcccgcgccc tccgcgcgcg gccccgctgcg c           1251

<210> SEQ ID NO 35
<211> LENGTH: 1245
<212> TYPE: DNA
<213> ORGANISM: Artificial Sequence
<220> FEATURE:
<223> OTHER INFORMATION: gE-2t 417 Mutant #7
<220> FEATURE:
<221> NAME/KEY: sig_peptide
<222> LOCATION: (1)..(60)
<220> FEATURE:
<221> NAME/KEY: misc_feature
<222> LOCATION: (1009)..(1014)
<223> OTHER INFORMATION: encodes mutated surface-exposed loop

<400> SEQUENCE: 35
atggctcgcg gggccgggtt ggtgtttttt gttggagttt gggtcgtatc gtgcctggcg      60
gcagcaccca gaacgtcctg gaaacgggta acctcgggcg aggacgtggt gttgcttccg     120
gcgcccgcgg ggccggagga acgcacccgg gcccacaaac tactgtgggc gcggaaccc     180 ctggatgcct gcggtcccct gcgcccgtcg tgggtggcgc tgtggccccc ccgacgggtg    240
ctcgagacgg tcgtggatgc ggcgtgcatg cgcgccccgg aaccgctcgc catagcatac    300 agtccccccgt tccccgcggg cgacgaggga ctgtattcgg agttggcgtg gcgcgatcgc   360
```

```
gtagccgtgg tcaacgagag tctggtcatc tacggggccc tggagacgga cagcggtctg     420
tacaccctgt ccgtggtcgg cctaagcgac gaggcgcgcc aagtggcgtc ggtggttctg     480
gtcgtggagc ccgcccctgt gccgaccccg accccgacg actacgacga agaagacgac      540
gcgggcgtga gcgaacgcac gccggtcagc gttccccccc caaccccccc ccgtcgtccc     600
cccgtcgccc ccccgacgca ccctcgtgtt atccccgagg tgtcccacgt gcgcggggta    660
acggtccata tggagacccc ggaggccatt ctgtttgccc ccggggagac gtttgggacg     720
aacgtctcca tccacgccat tgcccacgac gacggtccgt acgccatgga cgtcgtctgg    780
atgcggtttg acgtgccgtc ctcgtgcgcc gagatgcgga tctacgaagc ttgtctgtat    840 caccccgcagc ttccagagtg tctatctccg gccgacgcgc cgtgcgccgt aagttcctgg   900
gcgtaccgcc tggcggtccg cagctacgcc ggctgttcca ggactacgcc ccgccgcga    960 tgttttgccg aggctcgcat ggaaccggtc ccggggttgg cgtggctggc cgtcaatctg   1020
gaattccagc acgcctcccc ccagcacgcc ggcctctacc tgtgcgtggt gtacgtggac   1080
gatcatatcc acgcctgggg ccacatgacc atcagcaccg cggcgcagta ccggaacgcg   1140
gtggtggaac agcacctccc ccagcgccag cccgagcccg tcgagcccac ccgcccgcac   1200
gtgagagccc ccctccccgc gccctccgcg cgcggcccgc tgcgc                    1245
```

<210> SEQ ID NO 36
<211> LENGTH: 1251
<212> TYPE: DNA
<213> ORGANISM: Artificial Sequence
<220> FEATURE:
<223> OTHER INFORMATION: gE-2t 417 Mutant #8
<220> FEATURE:
<221> NAME/KEY: sig_peptide
<222> LOCATION: (1)..(60)
<220> FEATURE:
<221> NAME/KEY: misc_feature
<222> LOCATION: (1009)..(1020)
<223> OTHER INFORMATION: encodes mutated surface-exposed loop

<400> SEQUENCE: 36

```
atggctcgcg gggccgggtt ggtgtttttt gttggagttt gggtcgtatc gtgcctggcg     60
gcagcaccca gaacgtcctg gaaacgggta acctcgggcg aggacgtggt gttgcttccg    120
gcgcccgcgg ggccggagga acgcacccgg gcccacaaac tactgtgggc gcgggaaccc    180
ctggatgcct gcggtcccct cgcccgtcg tgggtggcgc tgtggccccc ccgacgggtg     240
ctcgagacgg tcgtggatgc ggcgtgcatg cgcgccccgg aaccgctcgc catagcatac    300 agtccccgt tccccgcggg cgacgaggga ctgtattcgg agttggcgtg gcgcgatcgc    360
gtagccgtgg tcaacgagag tctggtcatc tacggggccc tggagacgga cagcggtctg    420
tacaccctgt ccgtggtcgg cctaagcgac gaggcgcgcc aagtggcgtc ggtggttctg    480
gtcgtggagc ccgcccctgt gccgaccccg accccgacg actacgacga agaagacgac     540
gcgggcgtga gcgaacgcac gccggtcagc gttccccccc caaccccccc ccgtcgtccc    600
cccgtcgccc ccccgacgca ccctcgtgtt atccccgagg tgtcccacgt gcgcggggta   660
acggtccata tggagacccc ggaggccatt ctgtttgccc ccggggagac gtttgggacg    720
aacgtctcca tccacgccat tgcccacgac gacggtccgt acgccatgga cgtcgtctgg   780
atgcggtttg acgtgccgtc ctcgtgcgcc gagatgcgga tctacgaagc ttgtctgtat   840 caccccgcagc ttccagagtg tctatctccg gccgacgcgc cgtgcgccgt aagttcctgg  900
gcgtaccgcc tggcggtccg cagctacgcc ggctgttcca ggactacgcc ccgccgcga   960
```

```
tgttttgccg aggctcgcat ggaaccggtc ccggggttgg cgtggctggg cggcggcgtc    1020
aatctggaat tccagcacgc ctcccccag cacgccggcc tctacctgtg cgtggtgtac     1080
gtggacgatc atatccacgc ctggggccac atgaccatca gcaccgcggc gcagtaccgg    1140
aacgcggtgg tggaacagca cctcccccag cgccagcccg agcccgtcga gcccacccgc    1200
ccgcacgtga gagccccccc tccgcgcccc tccgcgcgcg gcccgctgcg c             1251
```

<210> SEQ ID NO 37
<211> LENGTH: 1251
<212> TYPE: DNA
<213> ORGANISM: Artificial Sequence
<220> FEATURE:
<223> OTHER INFORMATION: gE-2t 417 Mutant #9
<220> FEATURE:
<221> NAME/KEY: sig_peptide
<222> LOCATION: (1)..(60)
<220> FEATURE:
<221> NAME/KEY: misc_feature
<222> LOCATION: (1009)..(1020)
<223> OTHER INFORMATION: encodes mutated surface-exposed loop

<400> SEQUENCE: 37

```
atggctcgcg gggccgggtt ggtgtttttt gttggagttt gggtcgtatc gtgcctggcg      60
gcagcaccca gaacgtcctg gaaacgggta acctcgggcg aggacgtggt gttgcttccg    120
gcgcccgcgg ggccggagga acgcaccgg gcccacaaac tactgtgggc cgcggaaccc    180
ctggatgcct gcggtcccct cgcccgtcg tgggtggcgc tgtggccccc ccgacgggtg     240
ctcgagacgg tcgtggatgc ggcgtgcatg cgcgccccgg aaccgctcgc catagcatac    300 agtccccgt tcccgcgggg cgacgaggga ctgtattcgg agttggcgtg gcgcgatcgc     360
gtagccgtgg tcaacgagag tctggtcatc tacggggccc tggagacgga cagcggtctg    420
tacaccctgt ccgtggtcgg cctaagcgac gaggcgcgcc aagtggcgtc ggtggttctg    480
gtcgtggagc ccgcccctgt gccgaccccg accccgacg actacgacga agaagacgac     540
gcgggcgtga gcgaacgcac gccggtcagc gttccccccc caaccccccc ccgtcgtccc    600
cccgtcgccc ccccgacgca ccctcgtgtt atccccgagg tgtcccacgt gcgcgggta    660 acggtccata tggagacccc ggaggccatt ctgtttgccc ccggggagac gtttgggacg    720
aacgtctcca tccacgccat gcccacgac acggtccgt acgccatgga cgtcgtctgg    780
atgcggtttg acgtgccgtc ctcgtgcgcc gagatgcgga tctacgaagc ttgtctgtat    840
cacccgcagc ttccagagtg tctatctccg gccgacgcgc cgtgcgccgt aagttcctgg    900
gcgtaccgcc tggcggtccg cagctacgcc ggctgttcca ggactacgcc ccgccgcga    960 tgttttgccg aggctcgcat ggaaccggtc ccggggttgg cgtggctggc cggcggcggc    1020
aatctggaat tccagcacgc ctcccccag cacgccggcc tctacctgtg cgtggtgtac     1080
gtggacgatc atatccacgc ctggggccac atgaccatca gcaccgcggc gcagtaccgg    1140
aacgcggtgg tggaacagca cctcccccag cgccagcccg agcccgtcga gcccacccgc    1200
ccgcacgtga gagccccccc tccgcgcccc tccgcgcgcg gcccgctgcg c             1251
```

<210> SEQ ID NO 38
<211> LENGTH: 1251
<212> TYPE: DNA
<213> ORGANISM: Artificial Sequence
<220> FEATURE:
<223> OTHER INFORMATION: gE-2t 417 Mutant #10
<220> FEATURE:
<221> NAME/KEY: sig_peptide
<222> LOCATION: (1)..(60)

```
<220> FEATURE:
<221> NAME/KEY: mutation
<222> LOCATION: (733)..(735)

<400> SEQUENCE: 38
atggctcgcg gggccgggtt ggtgtttttt gttggagttt gggtcgtatc gtgcctggcg      60
gcagcaccca gaacgtcctg gaaacgggta acctcgggcg aggacgtggt gttgcttccg     120
gcgcccgcgg ggccggagga acgcacccgg gcccacaaac tactgtgggc gcggaaccc     180
ctggatgcct gcggtcccct gcgcccgtcg tgggtggcgc tgtggccccc ccgacgggtg     240
ctcgagacgg tcgtggatgc ggcgtgcatg cgcgccccgg aaccgctcgc catagcatac     300
agtccccgt tccccgcggg cgacgaggga ctgtattcgg agttggcgtg gcgcgatcgc      360
gtagccgtgg tcaacgagag tctggtcatc tacggggccc tggagacgga cagcggtctg     420
tacaccctgt ccgtggtcgg cctaagcgac gaggcgcgcc aagtggcgtc ggtggttctg     480
gtcgtggagc ccgcccctgt gccgaccccg accccgacg actacgacga agaagacgac      540
gcgggcgtga gcgaacgcac gccggtcagc gttccccccc caaccccccc ccgtcgtccc     600
cccgtcgccc cccgacgca ccctcgtgtt atccccgagg tgtcccacgt gcgcggggta      660
acggtccata tggagacccc ggaggccatt ctgtttgccc ccggggagac gtttgggacg     720
aacgtctcca tcggcgccat tgcccacgac gacggtccgt acgccatgga cgtcgtctgg     780
atgcggtttg acgtgccgtc ctcgtgcgcc gagatgcgga tctacgaagc ttgtctgtat     840
cacccgcagc ttccagagtg tctatctccg gccgacgcgc cgtgcgccgt aagttcctgg     900
gcgtaccgcc tggcggtccg cagctacgcc ggctgttcca ggactacgcc cccgccgcga     960
tgttttgccg aggctcgcat ggaaccggtc ccggggttgg cgtggctggc ctccaccgtc    1020
aatctggaat tccagcacgc ctccccccag cacgccggcc tctacctgtg cgtggtgtac    1080
gtggacgatc atatccacgc ctggggccac atgaccatca gcaccgcggc gcagtaccgg    1140
aacgcggtgg tggaacagca cctcccccag cgccagcccg agcccgtcga cccacccgc     1200
ccgcacgtga gagcccccccc tcccgcgccc tccgcgcgcg gcccgctgcg c            1251

<210> SEQ ID NO 39
<211> LENGTH: 1251
<212> TYPE: DNA
<213> ORGANISM: Artificial Sequence
<220> FEATURE:
<223> OTHER INFORMATION: gE-2t 417 Mutant #11
<220> FEATURE:
<221> NAME/KEY: sig_peptide
<222> LOCATION: (1)..(60)
<220> FEATURE:
<221> NAME/KEY: mutation
<222> LOCATION: (949)..(951)

<400> SEQUENCE: 39
atggctcgcg gggccgggtt ggtgtttttt gttggagttt gggtcgtatc gtgcctggcg      60
gcagcaccca gaacgtcctg gaaacgggta acctcgggcg aggacgtggt gttgcttccg     120
gcgcccgcgg ggccggagga acgcacccgg gcccacaaac tactgtgggc gcggaaccc     180
ctggatgcct gcggtcccct gcgcccgtcg tgggtggcgc tgtggccccc ccgacgggtg     240
ctcgagacgg tcgtggatgc ggcgtgcatg cgcgccccgg aaccgctcgc catagcatac     300
agtccccgt tccccgcggg cgacgaggga ctgtattcgg agttggcgtg gcgcgatcgc      360
gtagccgtgg tcaacgagag tctggtcatc tacggggccc tggagacgga cagcggtctg     420
tacaccctgt ccgtggtcgg cctaagcgac gaggcgcgcc aagtggcgtc ggtggttctg     480
```

-continued

```
gtcgtggagc cgccccctgt gccgaccccg accccgacg actacgacga agaagacgac    540
gcgggcgtga gcgaacgcac gccggtcagc gttccccccc caaccccccc ccgtcgtccc    600
cccgtcgccc ccccgacgca ccctcgtgtt atccccgagg tgtcccacgt gcgcggggta    660
acggtccata tggagacccc ggaggccatt ctgtttgccc ccggggagac gtttgggacg    720
aacgtctcca tccacgccat tgcccacgac gacggtccgt acgccatgga cgtcgtctgg    780
atgcggtttg acgtgccgtc ctcgtgcgcc gagatgcgga tctacgaagc ttgtctgtat    840
cacccgcagc ttccagagtg tctatctccg gccgacgcgc cgtgcgccgt aagttcctgg    900
gcgtaccgcc tggcggtccg cagctacgcc ggctgttcca ggactacggg cccgccgcga    960
tgttttgccg aggctcgcat ggaaccggtc ccggggttgg cgtggctggc ctccaccgtc   1020
aatctggaat ccagcacgc ctcccccag cacgccggcc tctacctgtg cgtggtgtac   1080
gtggacgatc atatccacgc ctggggccac atgaccatca gcaccgcggc gcagtaccgg   1140
aacgcggtgg tggaacagca cctcccccag cgccagcccg agcccgtcga gcccaccgc   1200 ccgcacgtga gagcccccc tcccgcgccc tccgcgcgcg gcccgctgcg c            1251
```

<210> SEQ ID NO 40
<211> LENGTH: 1251
<212> TYPE: DNA
<213> ORGANISM: Artificial Sequence
<220> FEATURE:
<223> OTHER INFORMATION: gE-2t 417 Mutant #12
<220> FEATURE:
<221> NAME/KEY: sig_peptide
<222> LOCATION: (1)..(60)
<220> FEATURE:
<221> NAME/KEY: mutation
<222> LOCATION: (955)..(957)

<400> SEQUENCE: 40

```
atggctcgcg gggccgggtt ggtgtttttt gttggagttt gggtcgtatc gtgcctggcg     60
gcagcaccca gaacgtcctg gaaacgggta acctcgggcg aggacgtggt gttgcttccg    120
gcgcccgcgg ggccggagga acgcacccgg gcccacaaac tactgtgggc cgcggaaccc    180
ctggatgcct gcggtcccct gcgccgtcg tgggtggcgc tgtggccccc ccgacgggtg    240
ctcgagacgg tcgtggatgc ggcgtgcatg cgcgccccgg aaccgctcgc catagcatac    300 agtccccgt tccccgcggg cgacgaggga ctgtattcgg agttggcgtg gcgcgatcgc    360
gtagccgtgg tcaacgagag tctggtcatc tacggggccc tggagacgga cagcggtctg    420
tacaccctgt ccgtggtcgg cctaagcgac gaggcgcgcc aagtgcgtc ggtggttctg    480 gtcgtggagc cgccccctgt gccgaccccg accccgacg actacgacga agaagacgac    540
gcgggcgtga gcgaacgcac gccggtcagc gttccccccc caaccccccc ccgtcgtccc    600
cccgtcgccc ccccgacgca ccctcgtgtt atccccgagg tgtcccacgt gcgcggggta    660
acggtccata tggagacccc ggaggccatt ctgtttgccc ccggggagac gtttgggacg    720
aacgtctcca tccacgccat tgcccacgac gacggtccgt acgccatgga cgtcgtctgg    780
atgcggtttg acgtgccgtc ctcgtgcgcc gagatgcgga tctacgaagc ttgtctgtat    840
cacccgcagc ttccagagtg tctatctccg gccgacgcgc cgtgcgccgt aagttcctgg    900
gcgtaccgcc tggcggtccg cagctacgcc ggctgttcca ggactacgcc cccgggccga    960
tgttttgccg aggctcgcat ggaaccggtc ccggggttgg cgtggctggc ctccaccgtc   1020
aatctggaat ccagcacgc ctcccccag cacgccggcc tctacctgtg cgtggtgtac   1080
```

<210> SEQ ID NO 41
<211> LENGTH: 1251
<212> TYPE: DNA
<213> ORGANISM: Artificial Sequence
<220> FEATURE:
<223> OTHER INFORMATION: gE-2t 417 Mutant #13
<220> FEATURE:
<221> NAME/KEY: sig_peptide
<222> LOCATION: (1)..(60)
<220> FEATURE:
<221> NAME/KEY: mutation
<222> LOCATION: (733)..(735)
<220> FEATURE:
<221> NAME/KEY: mutation
<222> LOCATION: (949)..(951)

<400> SEQUENCE: 41

```
atggctcgcg gggccgggtt ggtgtttttt gttggagttt gggtcgtatc gtgcctggcg      60
gcagcaccca gaacgtcctg gaaacgggta acctcgggcg aggacgtggt gttgcttccg     120
gcgcccgcgg ggccggagga acgcacccgg gcccacaaac tactgtgggc cgcggaaccc     180
ctggatgcct gcggtcccct gcgcccgtcg tgggtggcgc tgtggccccc cgacgggtg     240
ctcgagacgg tcgtggatgc ggcgtgcatg cgcgccccgg aaccgctcgc catagcatac     300
agtccccgt tccccgcggg cgacgaggga ctgtattcgg agttggcgtg gcgcgatcgc     360
gtagccgtgg tcaacgagag tctggtcatc tacggggccc tggagacgga cagcggtctg     420
tacaccctgt ccgtggtcgg cctaagcgac gaggcgcgcc aagtggcgtc ggtggttctg     480
gtcgtggagc ccgcccctgt gccgaccccg accccgacg actacgacga agaagacgac     540
gcgggcgtga cgaacgcac gccggtcagc gttccccccc caaccccccc ccgtcgtccc     600
cccgtcgccc ccccgacgca ccctcgtgtt atccccgagg tgtcccacgt gcgcggggta     660
acggtccata tggagacccc ggaggccatt ctgtttgccc ccggggagac gtttggggacg     720
aacgtctcca tcggcgccat tgcccacgac gacggtccgt acgccatgga cgtcgtctgg     780
atgcggtttg acgtgccgtc ctcgtgcgcc gagatgcgga tctacgaagc ttgtctgtat     840
cacccgcagc ttccagagtg tctatctccg gccgacgcgc cgtgcgccgt aagttcctgg     900
gcgtaccgcc tggcggtccg cagctacgcc ggctgttcca ggactacggg cccgccgcga     960
tgttttgccg aggctcgcat ggaaccggtc ccggggttgg cgtggctggc ctccaccgtc    1020
aatctggaat tccagcacgc ctccccccag cacgccggcc tctacctgtg cgtggtgtac    1080
gtggacgatc atatccacgc ctggggccac atgaccatca gcaccgcggc gcagtaccgg    1140
aacgcggtgg tggaacagca cctcccccag cgccagcccg agcccgtcga gcccacccgc    1200
ccgcacgtga gagccccccc tcccgcgccc tccgcgcgcg gcccgctgcg c              1251
```

<210> SEQ ID NO 42
<211> LENGTH: 1251
<212> TYPE: DNA
<213> ORGANISM: Artificial Sequence
<220> FEATURE:
<223> OTHER INFORMATION: gE-2t 417 Mutant #14
<220> FEATURE:
<221> NAME/KEY: sig_peptide
<222> LOCATION: (1)..(60)
<220> FEATURE:
<221> NAME/KEY: mutation

```
<222> LOCATION: (733)..(735)
<220> FEATURE:
<221> NAME/KEY: mutation
<222> LOCATION: (955)..(957)

<400> SEQUENCE: 42
atggctcgcg gggccgggtt ggtgttttt gttggagttt ggtcgtatc gtgcctggcg      60
gcagcaccca gaacgtcctg gaaacgggta acctcgggcg aggacgtggt gttgcttccg     120
gcgcccgcgg ggccggagga acgcacccgg gcccacaaac tactgtgggc gcggaaccc     180
ctggatgcct gcggtcccct gcgcccgtcg tgggtggcgc tgtggccccc ccgacgggtg    240
ctcgagacgt cgtggatgc ggcgtgcatg cgcgccccgg aaccgctcgc catagcatac    300
agtccccgt tccccgcggg cgacgaggga ctgtattcgg agttggcgtg gcgcgatcgc    360
gtagccgtgg tcaacgagag tctggtcatc tacggggccc tggagacgga cagcggtctg    420
tacaccctgt ccgtggtcgg cctaagcgac gaggcgcgcc aagtggcgtc ggtggttctg    480
gtcgtggagc ccgccctgt gccgaccccg accccgacg actacgacga agaagacgac      540
gcgggcgtga gcgaacgcac gccggtcagc gttccccccc caaccccccc ccgtcgtccc    600
cccgtcgccc ccccgacgca ccctcgtgtt atccccgagg tgtcccacgt gcgcggggta    660
acggtccata tggagacccc ggaggccatt ctgtttgccc ccggggagac gtttgggacg    720
aacgtctcca tcggcgccat tgcccacgac gacggtccgt acgccatgga cgtcgtctgg    780
atgcggtttg acgtgccgtc ctcgtgcgcc gagatgcgga tctacgaagc ttgtctgtat    840
cacccgcagc ttccagagtg tctatctccg gccgacgcgc cgtgcgccgt aagttcctgg    900
gcgtaccgcc tggcggtccg cagctacgcc ggctgttcca ggactacgcc cccgggccga    960
tgttttgccg aggctcgcat ggaaccggtc ccggggttgg cgtggctggc ctccaccgtc   1020
aatctggaat ccagcacgc ctcccccag cacgccggcc tctacctgtg cgtggtgtac    1080
gtggacgatc atatccacgc ctggggccac atgaccatca gcaccgcggc gcagtaccgg    1140
aacgcggtgg tggaacagca cctccccag cgccagcccg agcccgtcga gcccaccgc    1200
ccgcacgtga gagcccccccc tcccgcgccc tccgcgcgcg gcccgctgcg c           1251
```

```
<210> SEQ ID NO 43
<211> LENGTH: 1251
<212> TYPE: DNA
<213> ORGANISM: Artificial Sequence
<220> FEATURE:
<223> OTHER INFORMATION: gE-2t 417 Mutant #15
<220> FEATURE:
<221> NAME/KEY: sig_peptide
<222> LOCATION: (1)..(60)
<220> FEATURE:
<221> NAME/KEY: mutation
<222> LOCATION: (949)..(951)
<220> FEATURE:
<221> NAME/KEY: mutation
<222> LOCATION: (955)..(957)

<400> SEQUENCE: 43
atggctcgcg gggccgggtt ggtgttttt gttggagttt ggtcgtatc gtgcctggcg      60
gcagcaccca gaacgtcctg gaaacgggta acctcgggcg aggacgtggt gttgcttccg     120
gcgcccgcgg ggccggagga acgcacccgg gcccacaaac tactgtgggc gcggaaccc     180
ctggatgcct gcggtcccct gcgcccgtcg tgggtggcgc tgtggccccc ccgacgggtg    240
ctcgagacgt cgtggatgc ggcgtgcatg cgcgccccgg aaccgctcgc catagcatac    300
agtccccgt tccccgcggg cgacgaggga ctgtattcgg agttggcgtg gcgcgatcgc    360
```

```
gtagccgtgg tcaacgagag tctggtcatc tacggggccc tggagacgga cagcggtctg      420
tacaccctgt ccgtggtcgg cctaagcgac gaggcgcgcc aagtggcgtc ggtggttctg      480
gtcgtggagc ccgcccctgt gccgacccc accccgacg actacgacga agaagacgac       540
gcgggcgtga gcgaacgcac gccggtcagc gttccccccc aaccccccc ccgtcgtccc      600 cccgtcgccc cccgacgca ccctcgtgtt atccccgagg tgtcccacgt gcgcggggta      660
acggtccata tggagacccc ggaggccatt ctgtttgccc ccggggagac gtttgggacg      720
aacgtctcca tccacgccat tgcccacgac gacggtccgt acgccatgga cgtcgtctgg      780
atgcggtttg acgtgccgtc ctcgtgcgcc gagatgcgga tctacgaagc ttgtctgtat      840
cacccgcagc ttccagagtg tctatctccg gccgacgcgc cgtgcgccgt aagttcctgg      900
gcgtaccgcc tggcggtccg cagctacgcc ggctgttcca ggactacggg cccgggccga      960
tgttttgccg aggctcgcat ggaaccggtc ccggggttgg cgtggctggc ctccaccgtc     1020
aatctggaat ccagcacgc ctcccccag cacgccggcc tctacctgtg cgtggtgtac       1080
gtggacgatc atatccacgc ctggggccac atgaccatca gcaccgcggc gcagtaccgg     1140
aacgcggtgg tggaacagca cctcccccag cgccagcccg agcccgtcga gcccacccgc     1200
ccgcacgtga gagccccccc tcccgcgccc tccgcgcgcg gcccgctgcg c              1251
```

<210> SEQ ID NO 44
<211> LENGTH: 1251
<212> TYPE: DNA
<213> ORGANISM: Artificial Sequence
<220> FEATURE:
<223> OTHER INFORMATION: gE-2t 417 Mutant #16
<220> FEATURE:
<221> NAME/KEY: sig_peptide
<222> LOCATION: (1)..(60)
<220> FEATURE:
<221> NAME/KEY: mutation
<222> LOCATION: (733)..(735)
<220> FEATURE:
<221> NAME/KEY: mutation
<222> LOCATION: (949)..(951)
<220> FEATURE:
<221> NAME/KEY: mutation
<222> LOCATION: (955)..(957)

<400> SEQUENCE: 44

```
atggctcgcg gggccgggtt ggtgtttttt gttggagttt gggtcgtatc gtgcctggcg       60
gcagcaccca gaacgtcctg gaaacgggta acctcgggcg aggacgtggt gttgcttccg      120
gcgcccgcgg ggccggagga acgcacccgg gcccacaaac tactgtgggc gcggaacccc      180
ctggatgcct gcggtcccct gcgcccgtcg tgggtggcgc tgtggccccc ccgacgggtg      240
ctcgagacgt cgtggatgc ggcgtgcatg cgcgccccgg aaccgctcgc catagcatac      300 agtccccgt tccccgcggg cgacgaggga ctgtattcgg agttggcgtg gcgcgatcgc       360
gtagccgtgg tcaacgagag tctggtcatc tacggggccc tggagacgga cagcggtctg      420
tacaccctgt ccgtggtcgg cctaagcgac gaggcgcgcc aagtggcgtc ggtggttctg      480
gtcgtggagc ccgcccctgt gccgacccc accccgacg actacgacga agaagacgac       540
gcgggcgtga gcgaacgcac gccggtcagc gttccccccc aaccccccc ccgtcgtccc      600 cccgtcgccc cccgacgca ccctcgtgtt atccccgagg tgtcccacgt gcgcggggta      660
acggtccata tggagacccc ggaggccatt ctgtttgccc ccggggagac gtttgggacg      720
aacgtctcca tcggcgccat tgcccacgac gacggtccgt acgccatgga cgtcgtctgg      780
```

| atgcggtttg acgtgccgtc ctcgtgcgcc gagatgcgga tctacgaagc ttgtctgtat | 840 |
| cacccgcagc ttccagagtg tctatctccg gccgacgcgc cgtgcgccgt aagttcctgg | 900 |
| gcgtaccgcc tggcggtccg cagctacgcc ggctgttcca ggactacggg cccgggccga | 960 |
| tgttttgccg aggctcgcat ggaaccggtc cggggttgg cgtggctggc ctccaccgtc | 1020 |
| aatctggaat tccagcacgc ctcccccag cacgccggcc tctacctgtg cgtggtgtac | 1080 |
| gtggacgatc atatccacgc ctggggccac atgaccatca gcaccgcggc gcagtaccgg | 1140 |
| aacgcggtgg tggaacagca cctcccccag cgccagcccg agcccgtcga gcccacccgc | 1200 |
| ccgcacgtga gaccccccc tcccgcgccc tccgcgcgcg gcccgctgcg c | 1251 |

<210> SEQ ID NO 45
<211> LENGTH: 1251
<212> TYPE: DNA
<213> ORGANISM: Artificial Sequence
<220> FEATURE:
<223> OTHER INFORMATION: gE-2t 417 Wild Type
<220> FEATURE:
<221> NAME/KEY: sig_peptide
<222> LOCATION: (1)..(60)
<220> FEATURE:
<221> NAME/KEY: misc_feature
<222> LOCATION: (1009)..(1020)
<223> OTHER INFORMATION: encodes surface exposed loop

<400> SEQUENCE: 45

| atggctcgcg gggccgggtt ggtgttttt gttggagttt gggtcgtatc gtgcctggcg | 60 |
| gcagcaccca gaacgtcctg gaaacgggta acctcgggcg aggacgtggt gttgcttccg | 120 |
| gcgcccgcgg ggccggagga acgcacccgg gcccacaaac tactgtgggc cgcggaaccc | 180 |
| ctggatgcct gcggtcccct gcgcccgtcg tgggtggcgc tgtggccccc cgacgggtg | 240 |
| ctcgagacgg tcgtggatgc ggcgtgcatg cgcgccccgg aaccgctcgc catagcatac | 300 |
| agtccccgt tccccgcggg cgacgaggga ctgtattcgg agttggcgtg gcgcgatcgc | 360 |
| gtagccgtgg tcaacgagag tctggtcatc tacggggccc tggagacgga cagcggtctg | 420 |
| tacaccctgt ccgtggtcgg cctaagcgac gaggcgcgcc aagtggcgtc ggtggttctg | 480 |
| gtcgtggagc ccgcccctgt gccgaccccg accccgacg actacgacga agaagacgac | 540 |
| gcgggcgtga gcgaacgcac gccggtcagc gttcccccc caaccccccc ccgtcgtccc | 600 |
| cccgtcgccc cccgacgca ccctcgtgtt atccccgagg tgtcccacgt gcgcgggta | 660 |
| acggtccata tggagacccc ggaggccatt ctgtttgccc ccggggagac gtttgggacg | 720 |
| aacgtctcca tccgaccat tgcccacgac gacggtccgt acgccatgga cgtcgtctgg | 780 |
| atgcggtttg acgtgccgtc ctcgtgcgcc gagatgcgga tctacgaagc ttgtctgtat | 840 |
| cacccgcagc ttccagagtg tctatctccg gccgacgcgc cgtgcgccgt aagttcctgg | 900 |
| gcgtaccgcc tggcggtccg cagctacgcc ggctgttcca ggactacgcc cccgccgcga | 960 |
| tgttttgccg aggctcgcat ggaaccggtc cggggttgg cgtggctggc ctccaccgtc | 1020 |
| aatctggaat tccagcacgc ctcccccag cacgccggcc tctacctgtg cgtggtgtac | 1080 |
| gtggacgatc atatccacgc ctggggccac atgaccatca gcaccgcggc gcagtaccgg | 1140 |
| aacgcggtgg tggaacagca cctcccccag cgccagcccg agcccgtcga gcccacccgc | 1200 |
| ccgcacgtga gaccccccc tcccgcgccc tccgcgcgcg gcccgctgcg c | 1251 |

<210> SEQ ID NO 46
<211> LENGTH: 5
<212> TYPE: PRT

```
<213> ORGANISM: Artificial Sequence
<220> FEATURE:
<223> OTHER INFORMATION: residues inserted at position 337 of wild type
      gE-2t 417 for Mutant #1

<400> SEQUENCE: 46

Ala Ala Arg Ala Ala
1               5

<210> SEQ ID NO 47
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 47

Ala Gly Gly Gly
1

<210> SEQ ID NO 48
<211> LENGTH: 419
<212> TYPE: PRT
<213> ORGANISM: Herpes simplex virus 1

<400> SEQUENCE: 48

Met Asp Arg Gly Ala Val Val Gly Phe Leu Leu Gly Val Cys Val Val
1               5                   10                  15

Ser Cys Leu Ala Gly Thr Pro Lys Thr Ser Trp Arg Arg Val Ser Val
            20                  25                  30

Gly Glu Asp Val Ser Leu Leu Pro Ala Pro Gly Pro Thr Gly Arg Gly
        35                  40                  45

Pro Thr Gln Lys Leu Leu Trp Ala Val Glu Pro Leu Asp Gly Cys Gly
    50                  55                  60

Pro Leu His Pro Ser Trp Val Ser Leu Met Pro Pro Lys Gln Val Pro
65                  70                  75                  80

Glu Thr Val Val Asp Ala Ala Cys Met Arg Ala Pro Val Pro Leu Ala
                85                  90                  95

Met Ala Tyr Ala Pro Pro Ala Pro Ser Ala Thr Gly Gly Leu Arg Thr
            100                 105                 110

Asp Phe Val Trp Gln Glu Arg Ala Ala Val Val Asn Arg Ser Leu Val
        115                 120                 125

Ile His Gly Val Arg Glu Thr Asp Ser Gly Leu Tyr Thr Leu Ser Val
    130                 135                 140

Gly Asp Ile Lys Asp Pro Ala Arg Gln Val Ala Ser Val Val Leu Val
145                 150                 155                 160

Val Gln Pro Ala Pro Val Pro Thr Pro Pro Thr Pro Ala Asp Tyr
                165                 170                 175

Asp Glu Asp Asp Asn Asp Glu Gly Glu Asp Glu Ser Leu Ala Gly Thr
            180                 185                 190

Pro Ala Ser Gly Thr Pro Arg Leu Pro Pro Pro Ala Pro Pro Arg
        195                 200                 205

Ser Trp Pro Ser Ala Pro Glu Val Ser His Val Arg Gly Val Thr Val
    210                 215                 220

Arg Met Glu Thr Pro Glu Ala Ile Leu Phe Ser Pro Gly Glu Thr Phe
225                 230                 235                 240

Ser Thr Asn Val Ser Ile His Ala Ile Ala His Asp Asp Gln Thr Tyr
                245                 250                 255
```

```
Ser Met Asp Val Val Trp Leu Arg Phe Asp Val Pro Thr Ser Cys Ala
        260                 265                 270

Glu Met Arg Ile Tyr Glu Ser Cys Leu Tyr His Pro Gln Leu Pro Glu
        275                 280                 285

Cys Leu Ser Pro Ala Asp Ala Pro Cys Ala Ala Ser Thr Trp Thr Ser
        290                 295                 300

Arg Leu Ala Val Arg Ser Tyr Ala Gly Cys Ser Arg Thr Asn Pro Pro
305                 310                 315                 320

Pro Arg Cys Ser Ala Glu Ala His Met Glu Pro Val Pro Gly Leu Ala
                325                 330                 335

Trp Gln Ala Ala Ser Val Asn Leu Glu Phe Arg Asp Ala Ser Pro Gln
                340                 345                 350

His Ser Gly Leu Tyr Leu Cys Val Val Tyr Val Asn Asp His Ile His
                355                 360                 365

Ala Trp Gly His Ile Thr Ile Ser Thr Ala Ala Gln Tyr Arg Asn Ala
        370                 375                 380

Val Val Glu Gln Pro Leu Pro Gln Arg Gly Ala Asp Leu Ala Glu Pro
385                 390                 395                 400

Thr His Pro His Val Gly Ala Pro Pro His Ala Pro Thr His Gly
                405                 410                 415

Ala Leu Arg

<210> SEQ ID NO 49
<211> LENGTH: 417
<212> TYPE: PRT
<213> ORGANISM: Herpes simplex virus 2

<400> SEQUENCE: 49

Met Ala Arg Gly Ala Gly Leu Val Phe Phe Val Gly Val Trp Val Val
1               5                   10                  15

Ser Cys Leu Ala Ala Ala Pro Arg Thr Ser Trp Lys Arg Val Thr Ser
                20                  25                  30

Gly Glu Asp Val Val Leu Leu Pro Ala Pro Ala Gly Pro Glu Glu Arg
            35                  40                  45

Thr Arg Ala His Lys Leu Leu Trp Ala Ala Glu Pro Leu Asp Ala Cys
        50                  55                  60

Gly Pro Leu Arg Pro Ser Trp Val Ala Leu Trp Pro Pro Arg Arg Val
65                  70                  75                  80

Leu Glu Thr Val Val Asp Ala Ala Cys Met Arg Ala Pro Glu Pro Leu
                85                  90                  95

Ala Ile Ala Tyr Ser Pro Pro Phe Pro Ala Gly Asp Glu Gly Leu Tyr
                100                 105                 110

Ser Glu Leu Ala Trp Arg Asp Arg Val Ala Val Asn Glu Ser Leu
            115                 120                 125

Val Ile Tyr Gly Ala Leu Glu Thr Asp Ser Gly Leu Tyr Thr Leu Ser
        130                 135                 140

Val Val Gly Leu Ser Asp Glu Ala Arg Gln Val Ala Ser Val Val Leu
145                 150                 155                 160

Val Val Glu Pro Ala Pro Val Pro Thr Pro Thr Pro Asp Asp Tyr Asp
                165                 170                 175

Glu Glu Asp Asp Ala Gly Val Ser Glu Arg Thr Pro Val Ser Val Pro
            180                 185                 190

Pro Pro Thr Pro Pro Arg Arg Pro Pro Val Ala Pro Thr His Pro
        195                 200                 205
```

```
Arg Val Ile Pro Glu Val Ser His Val Arg Gly Val Thr Val His Met
    210                 215                 220
Glu Thr Pro Glu Ala Ile Leu Phe Ala Pro Gly Glu Thr Phe Gly Thr
225                 230                 235                 240
Asn Val Ser Ile His Ala Ile Ala His Asp Asp Gly Pro Tyr Ala Met
                245                 250                 255
Asp Val Val Trp Met Arg Phe Asp Val Pro Ser Ser Cys Ala Glu Met
                260                 265                 270
Arg Ile Tyr Glu Ala Cys Leu Tyr His Pro Gln Leu Pro Glu Cys Leu
            275                 280                 285
Ser Pro Ala Asp Ala Pro Cys Ala Val Ser Ser Trp Ala Tyr Arg Leu
    290                 295                 300
Ala Val Arg Ser Tyr Ala Gly Cys Ser Arg Thr Thr Pro Pro Pro Arg
305                 310                 315                 320
Cys Phe Ala Glu Ala Arg Met Glu Pro Val Pro Gly Leu Ala Trp Leu
                325                 330                 335
Ala Ser Thr Val Asn Leu Glu Phe Gln His Ala Ser Pro Gln His Ala
                340                 345                 350
Gly Leu Tyr Leu Cys Val Val Tyr Val Asp Asp His Ile His Ala Trp
            355                 360                 365
Gly His Met Thr Ile Ser Thr Ala Ala Gln Tyr Arg Asn Ala Val Val
            370                 375                 380
Glu Gln His Leu Pro Gln Arg Gln Pro Glu Pro Val Glu Pro Thr Arg
385                 390                 395                 400
Pro His Val Arg Ala Pro Pro Pro Ala Pro Ser Ala Arg Gly Pro Leu
                405                 410                 415
Arg
```